Sept. 3, 1963 F. A. HILL ET AL 3,102,996

COMPUTER

Filed Aug. 10, 1959 60 Sheets-Sheet 1

INVENTORS
FRANK A. HILL
HOWARD L. STAHLE

BY [signature]

ATTORNEY

FIG. 1c

"CA" CHARACTER COUNT SIGNAL

← CHARACTER TIME →

| C1 1234567 | C2 1234567 | C3 1234567 | C4 1234567 | C5 1234567 | C6 1234567 | C7 1234567 | C8 1234567 | C9 1234567 | C10 1234567 | C11 1234567 | C12 1234567 | WORD TIME |
|---|---|---|---|---|---|---|---|---|---|---|---|---|
| 0000110 | 0001110 | 0000001 | 0001001 | 0000101 | 0001101 | 0000011 | 0001011 | 0000111 | 0001111 | 0000000 | 1001010 | W8 |
| 1000110 | 1001110 | 1000001 | 1001001 | 1000101 | 1001101 | 1000011 | 1001011 | 1000111 | 1001111 | 1000000 | 0101010 | W1 |
| 0100110 | 0101110 | 0100001 | 0101001 | 0100101 | 0101101 | 0100011 | 0101011 | 0100111 | 0101111 | 0100000 | 1101010 | W2 |
| 1100110 | 1101110 | 1100001 | 1101001 | 1100101 | 1101101 | 1100011 | 1101011 | 1100111 | 1101111 | 1100000 | 0011010 | W3 |
| 0010110 | 0011110 | 0010001 | 0011001 | 0010101 | 0011101 | 0010011 | 0011011 | 0010111 | 0011111 | 0010000 | 1011010 | W4 |
| 1010110 | 1011110 | 1010001 | 1011001 | 1010101 | 1011101 | 1010011 | 1011011 | 1010111 | 1011111 | 1010000 | 0111010 | W5 |
| 0110110 | 0111110 | 0110001 | 0111001 | 0110101 | 0111101 | 0110011 | 0111011 | 0110111 | 0111111 | 0110000 | 1111010 | W6 |
| 1110110 | 1111110 | 1110001 | 1111001 | 1110101 | 1111101 | 1110011 | 1111011 | 1110111 | 1111111 | 1110000 | 0001010 | W7 |

FIG. 3

COMMAND AND ADDRESS CODE (ALPHA)

| | PARITY BIT | (6) | (5) | (4) | (3) | (2) | (1) |
|---|---|---|---|---|---|---|---|
| • | 1 | 1 | 0 | 0 | 0 | 0 | 0 |
| A | 0 | 1 | 0 | 0 | 0 | 0 | 1 |
| B | 0 | 1 | 0 | 0 | 0 | 1 | 0 |
| C | 1 | 1 | 0 | 0 | 0 | 1 | 1 |
| D | 0 | 1 | 0 | 0 | 1 | 0 | 0 |
| E | 1 | 1 | 0 | 0 | 1 | 0 | 1 |
| F | 1 | 1 | 0 | 0 | 1 | 1 | 0 |
| G | 0 | 1 | 0 | 0 | 1 | 1 | 1 |
| H | 0 | 1 | 0 | 1 | 0 | 0 | 0 |
| I | 1 | 1 | 0 | 1 | 0 | 0 | 1 |
| J | 1 | 1 | 0 | 1 | 0 | 1 | 0 |
| K | 0 | 1 | 0 | 1 | 0 | 1 | 1 |
| L | 1 | 1 | 0 | 1 | 1 | 0 | 0 |
| M | 0 | 1 | 0 | 1 | 1 | 0 | 1 |
| — | 0 | 1 | 0 | 1 | 1 | 1 | 0 |
| $ | 1 | 1 | 0 | 1 | 1 | 1 | 1 |
| @ | 0 | 1 | 1 | 0 | 0 | 0 | 0 |
| N | 1 | 1 | 1 | 0 | 0 | 0 | 1 |
| θ | 1 | 1 | 1 | 0 | 0 | 1 | 0 |
| P | 0 | 1 | 1 | 0 | 0 | 1 | 1 |
| Q | 1 | 1 | 1 | 0 | 1 | 0 | 0 |
| R | 0 | 1 | 1 | 0 | 1 | 0 | 1 |
| S | 0 | 1 | 1 | 0 | 1 | 1 | 0 |
| T | 1 | 1 | 1 | 0 | 1 | 1 | 1 |
| U | 1 | 1 | 1 | 1 | 0 | 0 | 0 |
| V | 0 | 1 | 1 | 1 | 0 | 0 | 1 |
| W | 0 | 1 | 1 | 1 | 0 | 1 | 0 |
| X | 1 | 1 | 1 | 1 | 0 | 1 | 1 |
| Y | 0 | 1 | 1 | 1 | 1 | 0 | 0 |
| Z | 1 | 1 | 1 | 1 | 1 | 0 | 1 |
| , | 1 | 1 | 1 | 1 | 1 | 1 | 0 |
| (NULL) | 0 | 1 | 1 | 1 | 1 | 1 | 1 |

(6)–(1): ←(FOR COMMANDS)→

←1 CHARACTER→

FIG. 2

COMMAND AND ADDRESS CODE (NUMERIC AND MISCELLANEOUS)

| | PARITY BIT | (6) | (5) | (4) | (3) | (2) | (1) |
|---|---|---|---|---|---|---|---|
| BLANK | 0 | 0 | 0 | 0 | 0 | 0 | 0 |
| LINE FEED | 1 | 0 | 0 | 0 | 0 | 0 | 1 |
| SPACE | 0 | 0 | 0 | 0 | 0 | 1 | 1 |
| CARRIAGE RETURN | 1 | 0 | 0 | 1 | 0 | 0 | 0 |
| * EOM | 0 | 0 | 0 | 1 | 0 | 0 | 1 |
| VOID | 0 | 0 | 0 | 1 | 0 | 1 | 0 |
| TABULATE | 1 | 0 | 0 | 1 | 1 | 0 | 1 |
| U. C. | 1 | 0 | 0 | 1 | 1 | 1 | 0 |
| L. C. | 0 | 0 | 0 | 1 | 1 | 1 | 1 |
| ϕ | 1 | 0 | 1 | 0 | 0 | 1 | 1 |
| 1 | 0 | 0 | 1 | 0 | 1 | 0 | 0 |
| 2 | 1 | 0 | 1 | 0 | 1 | 0 | 1 |
| 3 | 1 | 0 | 1 | 0 | 1 | 1 | 0 |
| 4 | 0 | 0 | 1 | 0 | 1 | 1 | 1 |
| 5 | 0 | 0 | 1 | 1 | 0 | 0 | 0 |
| 6 | 1 | 0 | 1 | 1 | 0 | 0 | 1 |
| 7 | 1 | 0 | 1 | 1 | 0 | 1 | 0 |
| 8 | 0 | 0 | 1 | 1 | 0 | 1 | 1 |
| 9 | 1 | 0 | 1 | 1 | 1 | 0 | 0 |
| % | 1 | 0 | 1 | 1 | 1 | 1 | 1 |

(6)–(1): ←(FOR COMMANDS)→

←1 CHARACTER→

Sept. 3, 1963 F. A. HILL ET AL 3,102,996

COMPUTER

Filed Aug. 10, 1959 60 Sheets-Sheet 5

Sept. 3, 1963 F. A. HILL ET AL 3,102,996

COMPUTER

Filed Aug. 10, 1959 60 Sheets-Sheet 6

FIG. 7 (INTERNAL STORAGE— GENERAL BLOCK DIAGRAM)
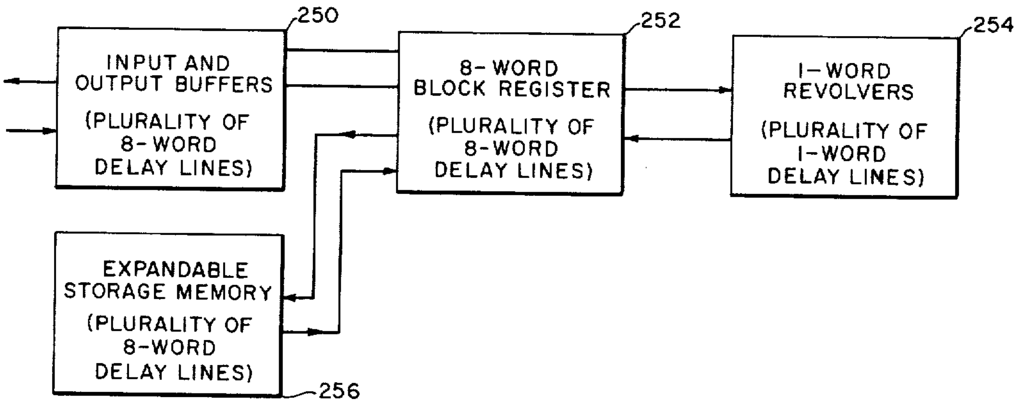
FIG. 8 INPUT AND OUTPUT BUFFERS (8 WORDS)
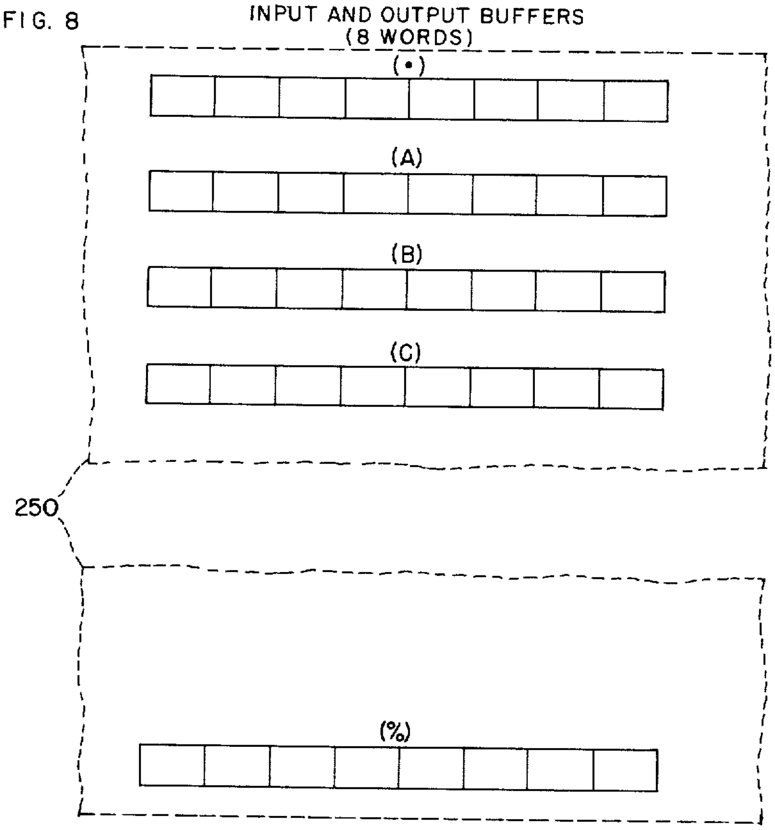

Sept. 3, 1963 F. A. HILL ET AL 3,102,996

COMPUTER

Filed Aug. 10, 1959 60 Sheets-Sheet 12

Sept. 3, 1963 F. A. HILL ET AL 3,102,996

COMPUTER

Filed Aug. 10, 1959 60 Sheets-Sheet 13

Sept. 3, 1963 F. A. HILL ET AL 3,102,996

COMPUTER

Filed Aug. 10, 1959 60 Sheets-Sheet 14

Sept. 3, 1963 F. A. HILL ET AL 3,102,996

COMPUTER

Filed Aug. 10, 1959 60 Sheets-Sheet 19

Sept. 3, 1963 F. A. HILL ET AL 3,102,996

COMPUTER

Filed Aug. 10, 1959 60 Sheets-Sheet 20

COMMAND REVOLVER #5

Sept. 3, 1963 F. A. HILL ET AL 3,102,996

COMPUTER

Filed Aug. 10, 1959 60 Sheets-Sheet 23

ORDER HOLDERS

GATE DRIVER

GATE DRIVER

GATE DRIVER

GATE DRIVER

GATE DRIVER

GATE DRIVER

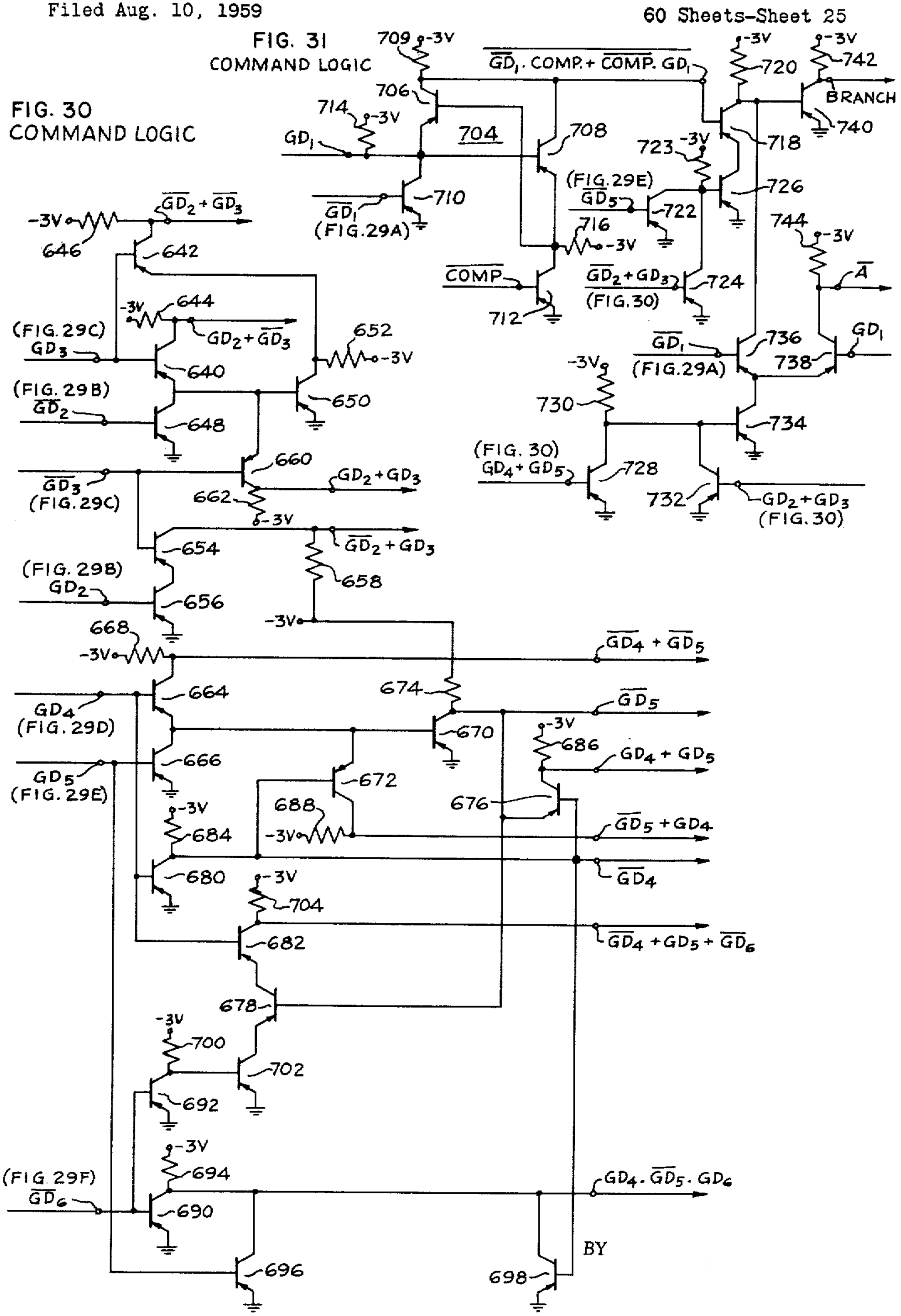
FIG. 30 COMMAND LOGIC, FIG. 31 COMMAND LOGIC

COMMAND LOGIC

COMMAND LOGIC

COMMAND LOGIC

COMMAND LOGIC

COMMAND LOGIC

COMMAND LOGIC

COMMAND LOGIC

COMMAND LOGIC

COMMAND LOGIC

COMMAND LOGIC

COMMAND LOGIC

COMMAND LOGIC

COMMAND LOGIC

COMMAND LOGIC

Sept. 3, 1963 F. A. HILL ET AL 3,102,996

COMPUTER

Filed Aug. 10, 1959 60 Sheets-Sheet 29

Sept. 3, 1963 F. A. HILL ET AL 3,102,996

COMPUTER

Filed Aug. 10, 1959 60 Sheets-Sheet 31

ADDRESS REVOLVER #6

FIG. 47 ADDRESS HOLDER
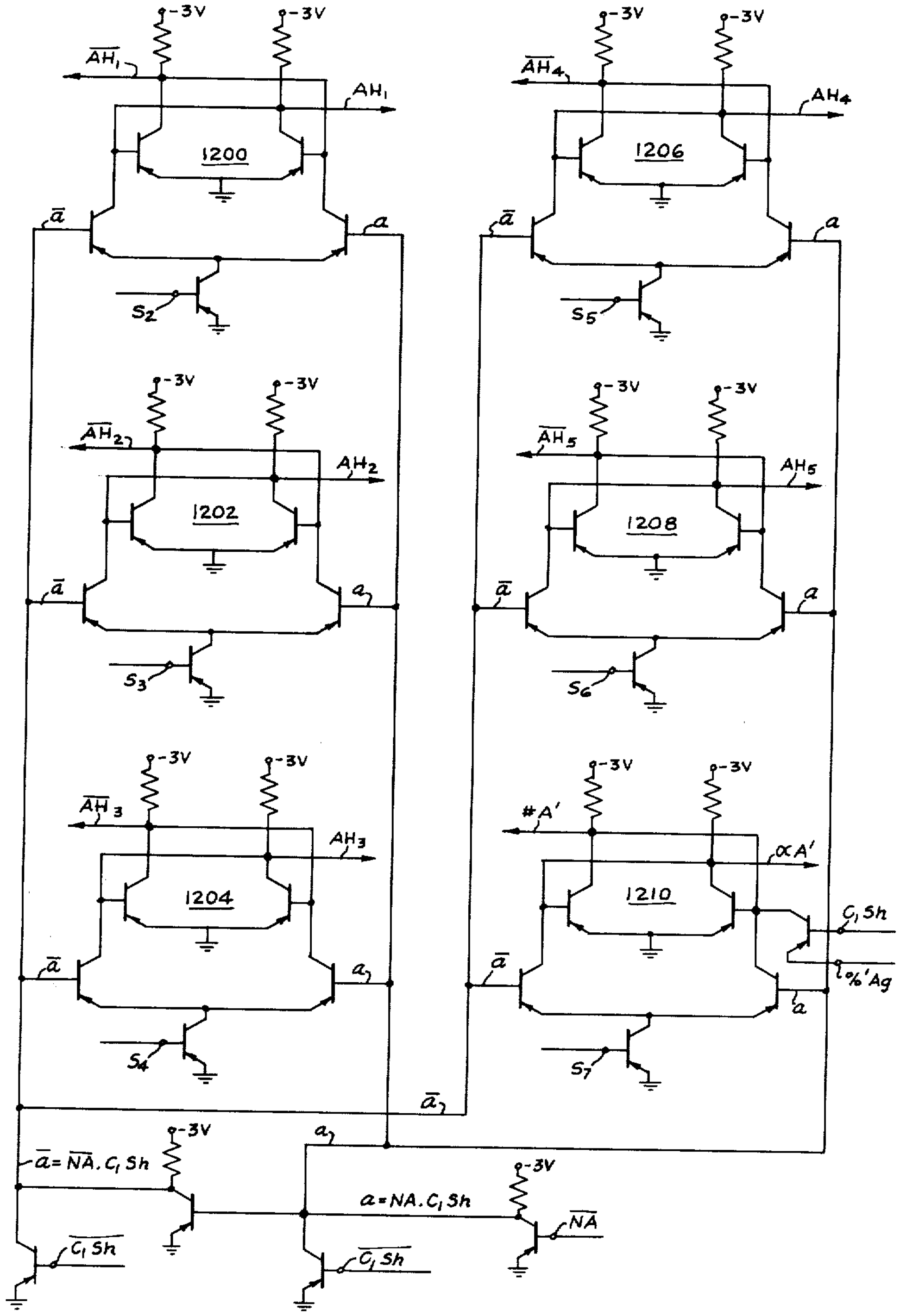

SPACIAL
GATE DRIVER

SPACIAL
GATE DRIVER

SPACIAL
GATE DRIVER

SPACIAL
GATE DRIVER

SPACIAL
GATE DRIVER

ADDRESS LOGIC

ADDRESS LOGIC

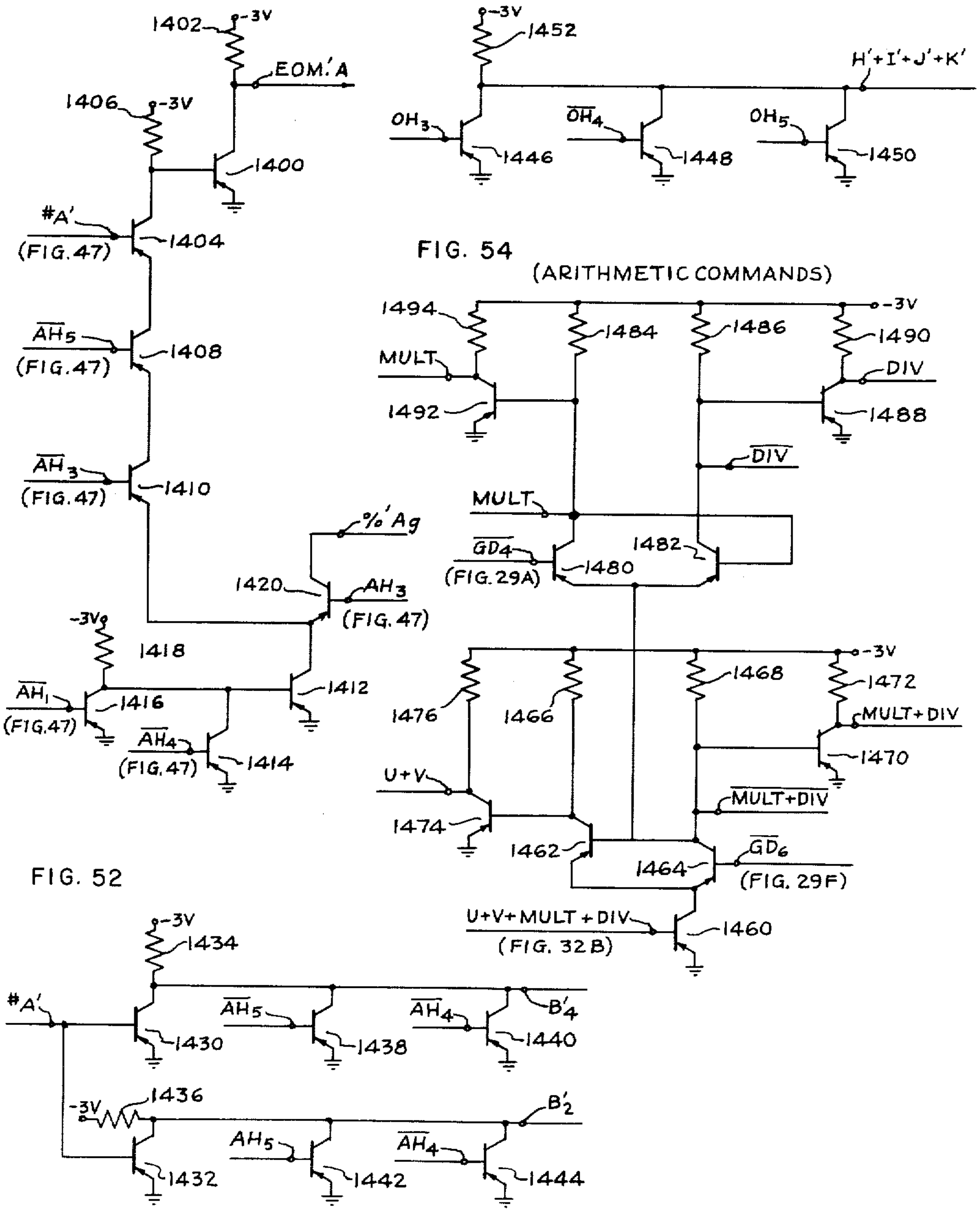
FIG. 51, FIG. 52, FIG. 53, FIG. 54 (ARITHMETIC COMMANDS)

TEMPORAL DETECTOR

Sept. 3, 1963 F. A. HILL ET AL 3,102,996

COMPUTER

Filed Aug. 10, 1959 60 Sheets-Sheet 38

FIG. 60 (MEMORY BLOCK REGISTER-1)

ADDRESS BLOCK REGISTER-(2)

ADDRESS BLOCK REGISTER (3)

COMMAND BLOCK REGISTER (4)

COMMAND BLOCK REGISTER (5)

DATA BLOCK REGISTER (6)

DATA BLOCK REGISTER (7)

TRANSFER BLOCK REGISTER (8)

(CONTENTS "61" – TO SPECIFIED ADDRESS)

COMPARATOR

MASK

Sept. 3, 1963 F. A. HILL ET AL 3,102,996

COMPUTER

Filed Aug. 10, 1959 60 Sheets-Sheet 52

FIG. 74 DATA REVOLVER #1

DATA REVOLVER #2

DATA REVOLVER #3

FIG. 78 EXCESS THREE CORRECTION

Sept. 3, 1963 F. A. HILL ET AL 3,102,996
COMPUTER
Filed Aug. 10, 1959 60 Sheets-Sheet 60
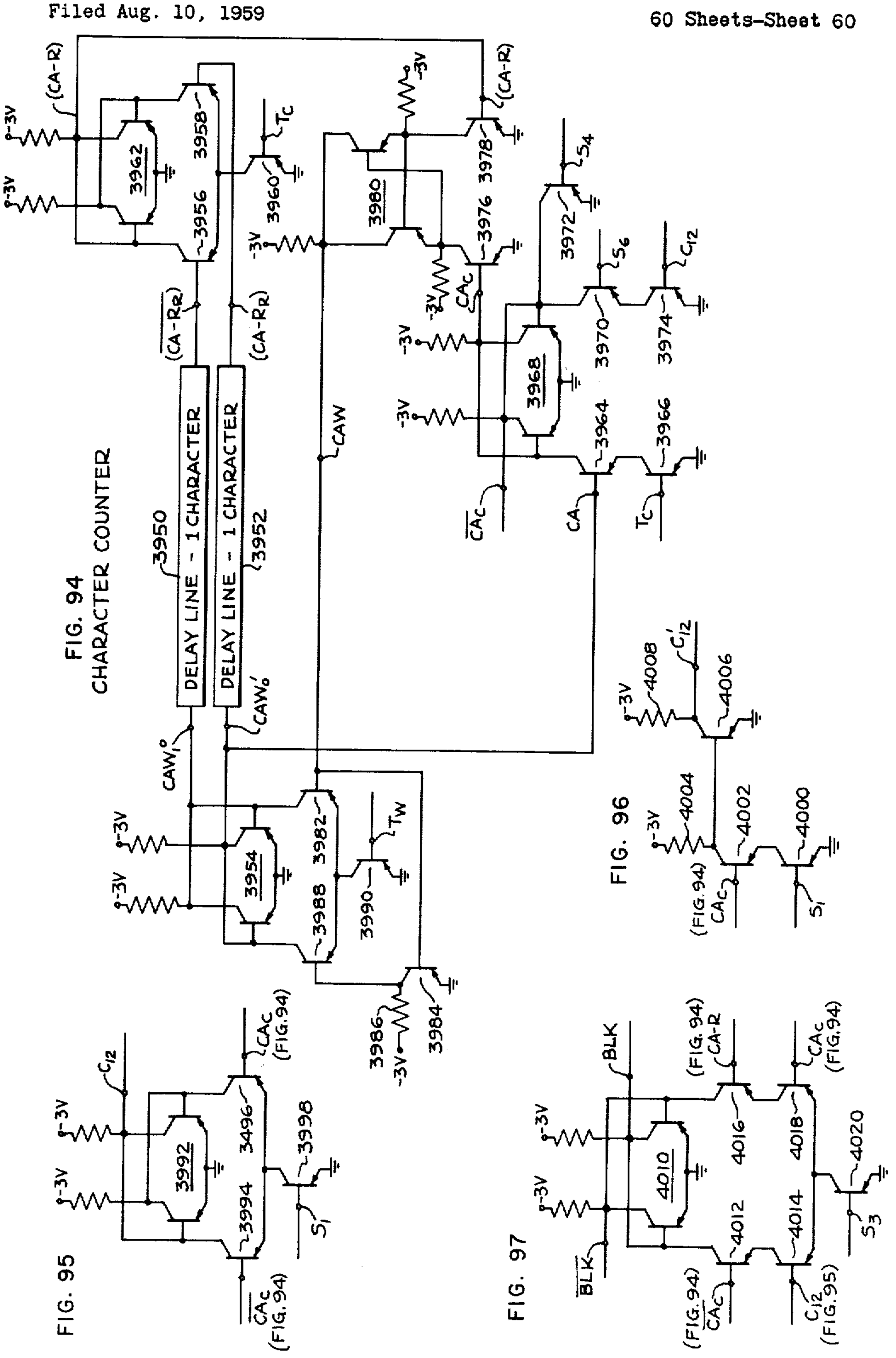
FIG. 94 CHARACTER COUNTER, FIG. 95, FIG. 96, FIG. 97

United States Patent Office 3,102,996

Patented Sept. 3, 1963

3,102,996

COMPUTER

Frank A. Hill, Van Nuys, and Howard L. Stahle, Montrose, Calif., assignors to General Precision, Inc., a corporation of Delaware

Filed Aug. 10, 1959, Ser. No. 832,522

14 Claims. (Cl. 340—172.5)

The present invention relates to electronic digital computers; and a general objective of the invention is to provide an improved general purpose digital computer which is extremely flexible in its applications, relatively economical in its construction, and relatively simple to program and operate.

The digital computer of the present invention is a serial type in which digital data is circulated in a bit-by-bit sequence into, within, and out of the apparatus. The computer of the invention is also of the type which performs decimal, rather than binary, arithmetic operations. The digital data utilized by the computer is arranged into a plurality of "blocks" each including eight "words" with each word being composed of twelve seven-bit characters.

The internal storage of the embodiment of the invention to be described includes a plurality of eight-word input and output buffers, an expandable storage memory, a plurality of eight-word block registers, and a plurality of one-word revolvers.

Each of the 8-word input and output buffers is controllable to serially receive a digital input from an appropriate input device, such as a usual paper tape reader, and subsequently to feed the received data into the other portions of the computer. Each buffer, moreover, is controllable to receive a digital output from the other portions of the computer and to serially feed the digital output to an appropriate output device such as a usual paper tape punch. The number of such buffers can conveniently be increased or decreased, depending upon the particular application to which any constructed computer unit of the invention is placed.

The eight-word block registers in the embodiment of the invention to be described also are controllable to feed data to and from the input and output buffers, to and from selected ones of the one-word revolvers, and to and from the expandable storage memory of the computer.

The provision of the particular input and output buffers mentioned above, and of the particular type of expandable memory, adds materially to the flexibility of the computer of the invention. As mentioned above, this is most advantageous in that the computer can be tailored to any particular need by the provision of an input and output buffer, and of a storage memory, having a capacity appropriate to that need. This provides for optimum economy with respect to cost and space, since each computer may be constructed with a capacity corresponding exactly to that required to meet the particular field of use of that particular computer.

The computer of the invention will be described as being controlled in accordance with a program of "instructions"; each instruction being composed of a "command" portion and an "address" portion. The computer is constructed so that the command portion of each instruction is stored in the computer in groups of general command words which are separated from the address portion of the different instructions. The address portions are also grouped into a plurality of separate address words. Each address is contained in a single character of the different address words and each command is contained in a single character of the different general command words, so that each of the general macro command words nad address words contains a plurality of different micro commands and addresses.

The first obvious advantage of separating the command portion of each instruction from the address portion is that such a separation results in a material saving in storage space in the computer. Most present day computer instructions involve of the order of sixteen macro or general command words, and these commands are used in conjunction with many thousands of differet addresses.

In the prior art computers in which each instruction, including its command portion and its address portion, was stored separately, there resulted in a tremendous duplication of stored commands. In the computer of the present invention, the commands are all stored separately as a plurality of general macro command words. Each macro or general command word includes a plurality of individual micro commands, and to form any given instruction, a general command word and a desired address word (which includes a plurality of different addresses) are selected and executed together. In this manner, the same general macro command may be used with a multiplicity of different address words as the computer program proceeds.

In the embodiment of the invention to be described, all the general macro command words are stored in two of eight-word block registers, and the addresses are stored in two others of these eight-word block registers and in the expandable storage memory. As will be described, additional eight-word block registers are available for storing and transferring blocks of general command words and address words. Then, as the computer program proceeds, the addresses are shifted a block at a time from the memory into the eight-word block registers, and general address words and general command words are then shifted a word at a time from the registers into respective ones of two of the one-word revolvers, respectively designated the "address" revolver and the "command" revolver.

Then, the address word in the address revolver is shifted out of that revolver a character at a time in correspondence with a like shift of the corresponding command word out of the command revolver. These latter shifts, as noted, occur a character at a time, and for each of these shifts a different micro command is executed.

A feature of the invention is that there is no necessary wait or "dead time" between individual micro commands throughout the processing of an entire general command word in the command and address revolvers, as is the case in most prior art computers. As each micro instruction is executed, the next instruction is shifted into place for execution immediately after the completion of the execution of the preceding one. Only after an entire macro command has been executed, is there a necessary wait until a new word is shifted into the command revolver and into the address revolver.

Another, and perhaps more important, advantage of the separation between commands and addresses in the computer of the invention, and of the grouping of the different micro commands into general macro command words, is that the programming of the computer is simplified to a material extent. This, together with the use of the eight-word block registers, achieves a correspondence between the internal flow of data in the computer of the invention and the block flow diagram of the programmer. Each general macro command word, for example, may include a series of micro commands in the sequence that these commands normally occur over and over again in a typical computer program. It is usually necessary for the programmer, in the case of the prior art computers, to provide repeatedly for these individual micro commands and to set them up in the proper sequence in each general macro command. In the computer of the invention, however, it is necessary for the programmer merely to choose the appropriate general macro command word and provide that it be matched with the appropriate address word for any particular group of micro instructions.

Another important feature of the computer of the invention is the utilization of a concept of partial addressing in the expandable memory to obtain a large number of different address words with a limited binary bit allocation for each address. For economy in storage requirements, a minimum of binary bits are used to identify each command character and each address character. For example, the embodiment of the invention to be described uses only six binary bits to identify each of all the necessary address and command characters. (One of the bits of each seven-bit character is a parity or redundancy bit.)

Without further improvization, the use of six bit characters would limit the capacity of the computer to sixty-four different addressed words or blocks. However, under the partial addressing concept, for example, double addresses are used. The first address of an appropriate command causes a selected block from a plurality of secondary eight-word memory blocks in the expandable memory to be brought into a primary memory block. The second address of the command then transfers the addressed word from the primary memory block for further processing. This, in effect, permits each second six-bit address designation to obtain any one of eight different address words from the primary memory block as determined by the first six-bit address. Therefore, eight different double address designations directed at the primary memory block can derive sixty-four different words from that block. This partial addressing method in its concept and practice will become clearer as the present description proceeds. It should be noted that the technique can be expanded, as will be described, by providing further banks of eight-word blocks in the expandable memory which may be controlled to feed different address words into the secondary blocks.

The computer of the present invention is capable of masking operations. Under the control of certain commands, selected characters only of the general command words and address words are used and executed. This provides for a timing flexibility in that no lost time is experienced during execution due to the necessary obliteration of individual instructions in any general command word or address word when all the different micro instructions are not required.

In a constructed embodiment of the invention, the logic control circuitry is made up to utilize transistors and the circuitry is arranged conveniently to be mounted on a plurality of individual cards or panels. This construction may be in accordance, for example, with the teachings of copending application Serial No. 569,341, which was filed March 5, 1956, in the name of Frank A. Hill et al. This grouping of the computer circuitry into individual cards has proven to be most advantageous both from a servicing standpoint, and from a constructional and space-saving standpoint.

In the embodiment of the invention to be described, the gating of an excessive number of signals in individual "and" or "or" networks is avoided, and cascading is used to a large extent. Although this practice does have a tendency to increase the time requirements of the logic of the computer, and the slight increase in time requirements is offset by the vast increase in reliability and economy of the apparatus. Moreover, for most purposes, the time required by the logic circuitry itself is much smaller than the time required by the other components of the computer.

The computer of the embodiment of the invention to be described is constructed to include networks for providing a common path for digital signals corresponding to groups of different instructions having a common characteristic. Individual gates are provided at the different destinations to enable the different instructions to be fed to their proper destinations. This use of common paths for groups of instructions results in a large saving in circuitry and components, as compared to systems in which independent paths from source to destination are provided for each different instruction.

In the embodiment of the invention to be described, for example, and as mentioned, sixteen general macro command words are stored in two of the eight word block registers, and sixteen general command words may also be stored in two additional eight word block registers, it will be remembered that each general macro command word contains twelve different micro commands. As mentioned previously, one of the one-word revolvers referred to above is used in the described manner as a command revolver. A particular command with an appropriate one of thirty-two different addresses will then transfer a selected general macro command word out of one of the eight-word command block registers into the command revolver. The general macro command word in the revolver is then shifted out of the revolver in the described character-by-character manner to cause each different micro command to be executed.

Likewise, thirty-two different address words are stored in four of the eight-word block registers, and a particular command with an appropriate address will transfer a desired address word out of one of these blocks into the one-word revolver designated as the "address revolver." As also explained, additional address words may be stored in the expandable storage memory which can be reached by a limited address designation under the concept of partial addressing.

The address word in the address revolver is shifted out of that revolver in the described manner in a character-by-character sequence in correspondence with the shift of the associated command word out of the command revolver. Therefore, each character shifted from the address revolver designates a different address which corresponds to the micro command shifted out of the command revolver at that time.

The computer of the invention is so controlled that the first character of each address word inserted into the address revolver, that is the first micro instruction, specfies the address of the general command word to be inserted in the command revolver and to be used with the remaining eleven addresses of the address word in the address revolver. The state of the command revolver at that particular time, causes the addressed general command word immediately to be shifted into the command revolver. Also, the last address of each address word inserted into the address revolver specifies the address of the next address word to be inserted into the address revolver. Therefore, the central ten characters of each address are useful micro program steps. Therefore, and as mentioned, there is no necessary delay or dead time between successive micro instructions for the central ten characters of each word. Then, of course, there is a delay at the end of each general command corresponding to the time required to bring a new address word into the address revolver and to bring a new general command word into the command revolver.

The eleventh or second-to-last character of each command word in the command revolver will contain the proper command to transfer the next selected address word, as addressed by the last character of the address word in the address revolver, into the address revolver. The twelfth or last character of the command word is not used. It should be observed that, the reason the eleventh character in the commond revolver corresponds to the twelfth character in the address revolver, is that each word is shifted out of the address revolver a character ahead of the shift of each word out of the command revolver.

Additional features and advantages of the computer of the invention will manifest themselves in the ensuing description.

In the drawings:

FIGURES 1A–1D are curves and tables concerning the various timing signals which are generated within the computer for timing and clocking the serial data in the computer;

FIGURE 2 is a table representing a typical command, address and number code which will be used in describing the operation of the invention, it will be noted that each of the commands or addresses in the illustrated code is composed of a binary number having seven binary bits with the least significant bit being on the right and with the left-hand bit being a parity or redundancy bit, this table representing different numeric and miscellaneous commands, numbers and numeric addresses;

FIGURE 3 is a table showing a selected command and address code for a plurality of alpha commands and addresses which also will be used in describing the operation of the invention;

Figure 4:
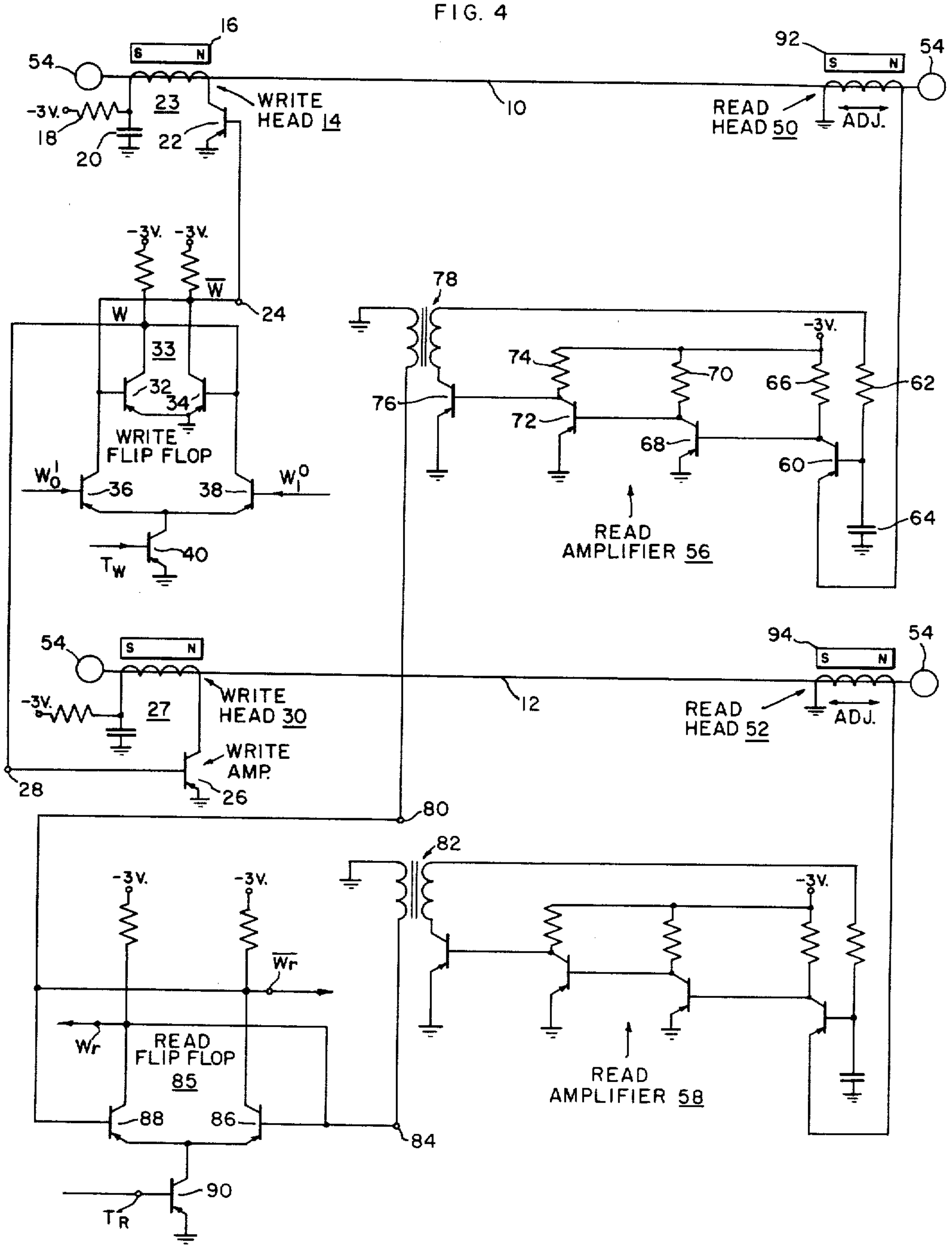
FIGURE 4 is a schematic and circuit representation of a delay line assembly which may be used to constitute individual ones of the various eight-word register or memory blocks, or one-word revolvers, utilized in the embodiment of the invention to be described, the illustrated assembly including a pair of magnetostrictive delay lines each with an input circuit and an output circuit.
Figures 5, 6:
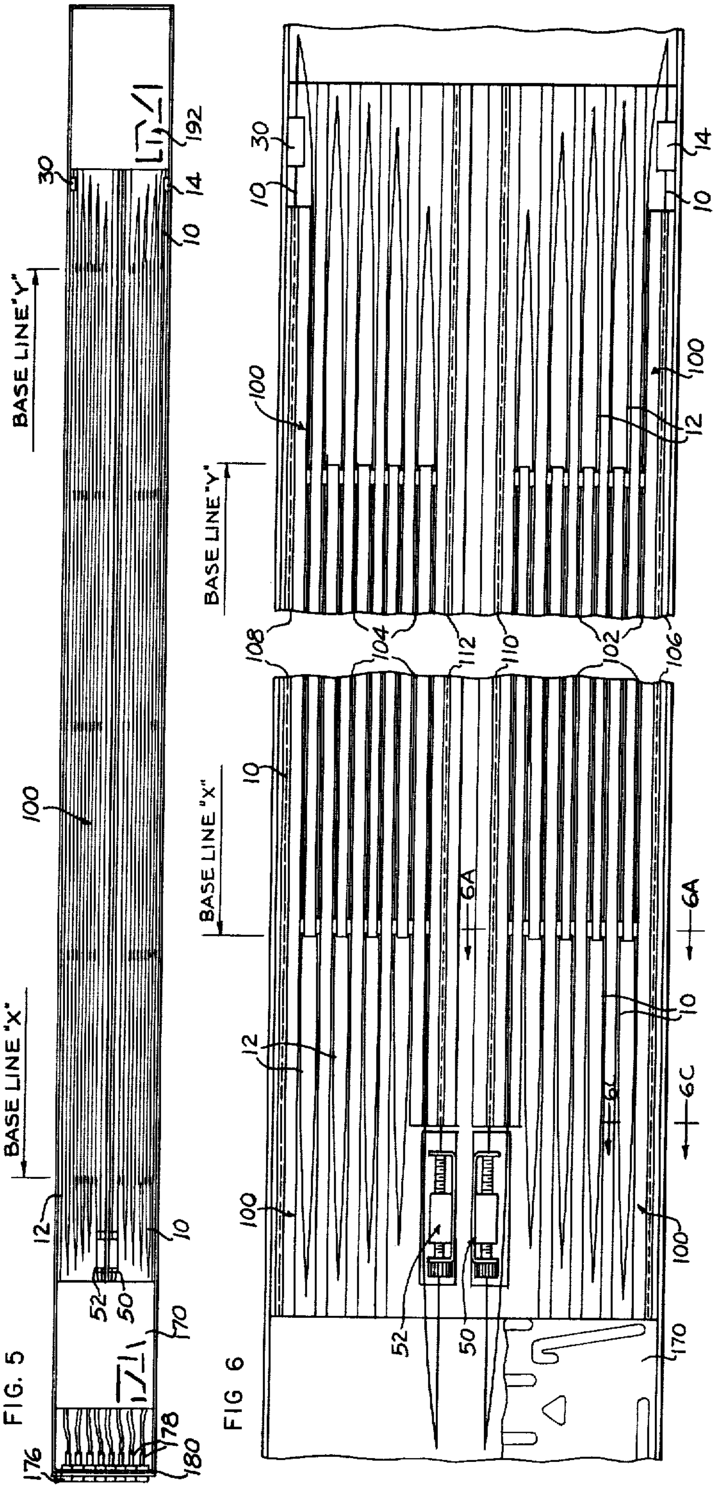
Figures 6A, 6B, 6C:
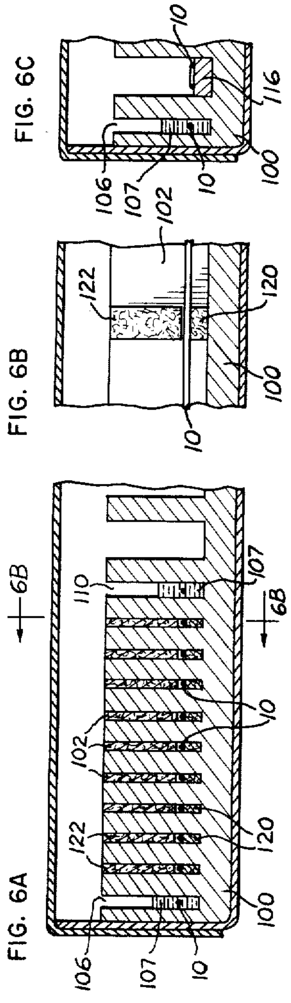
Figure 6D:
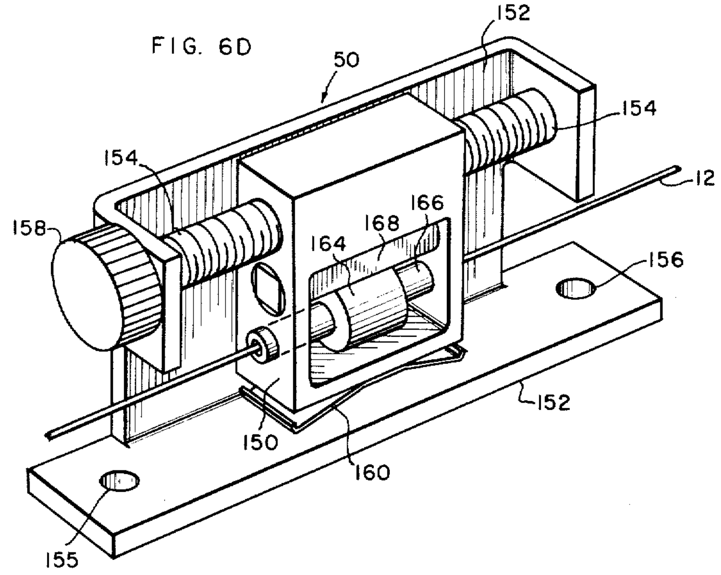
Figure 6E:
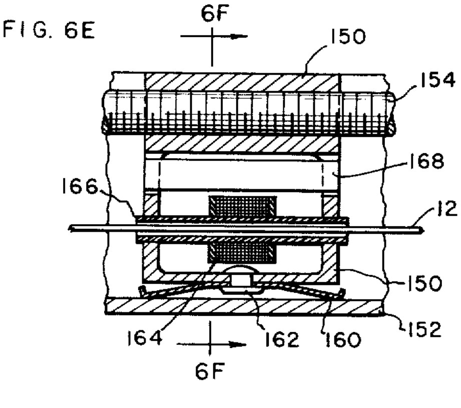
Figure 6F:
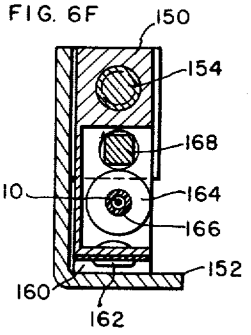
Figure 10:
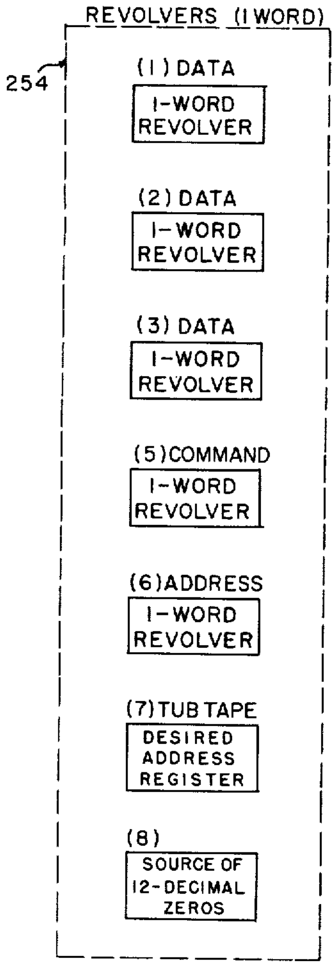
Figure 9:
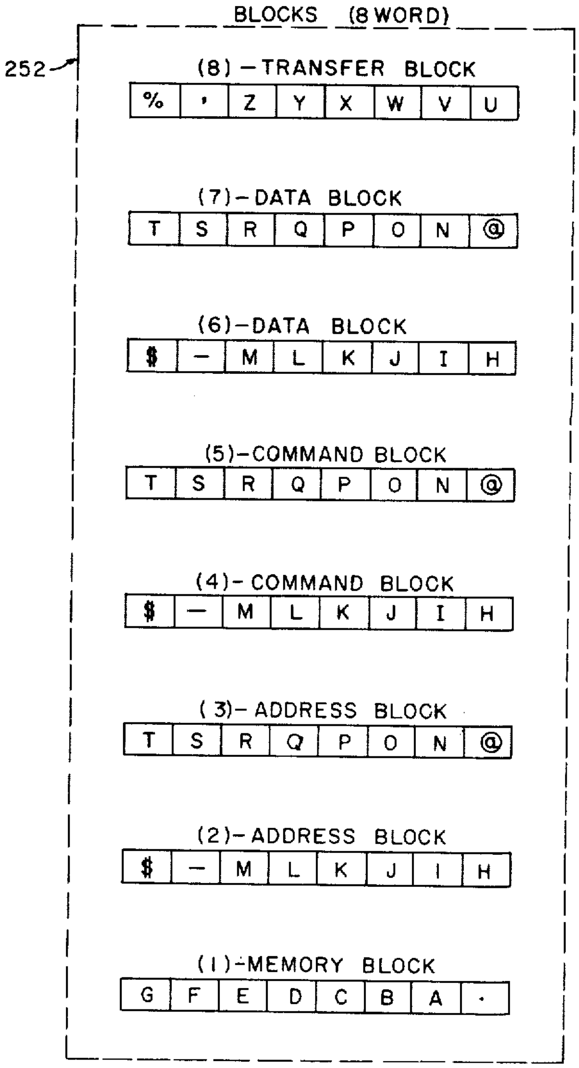
Figure 11A:
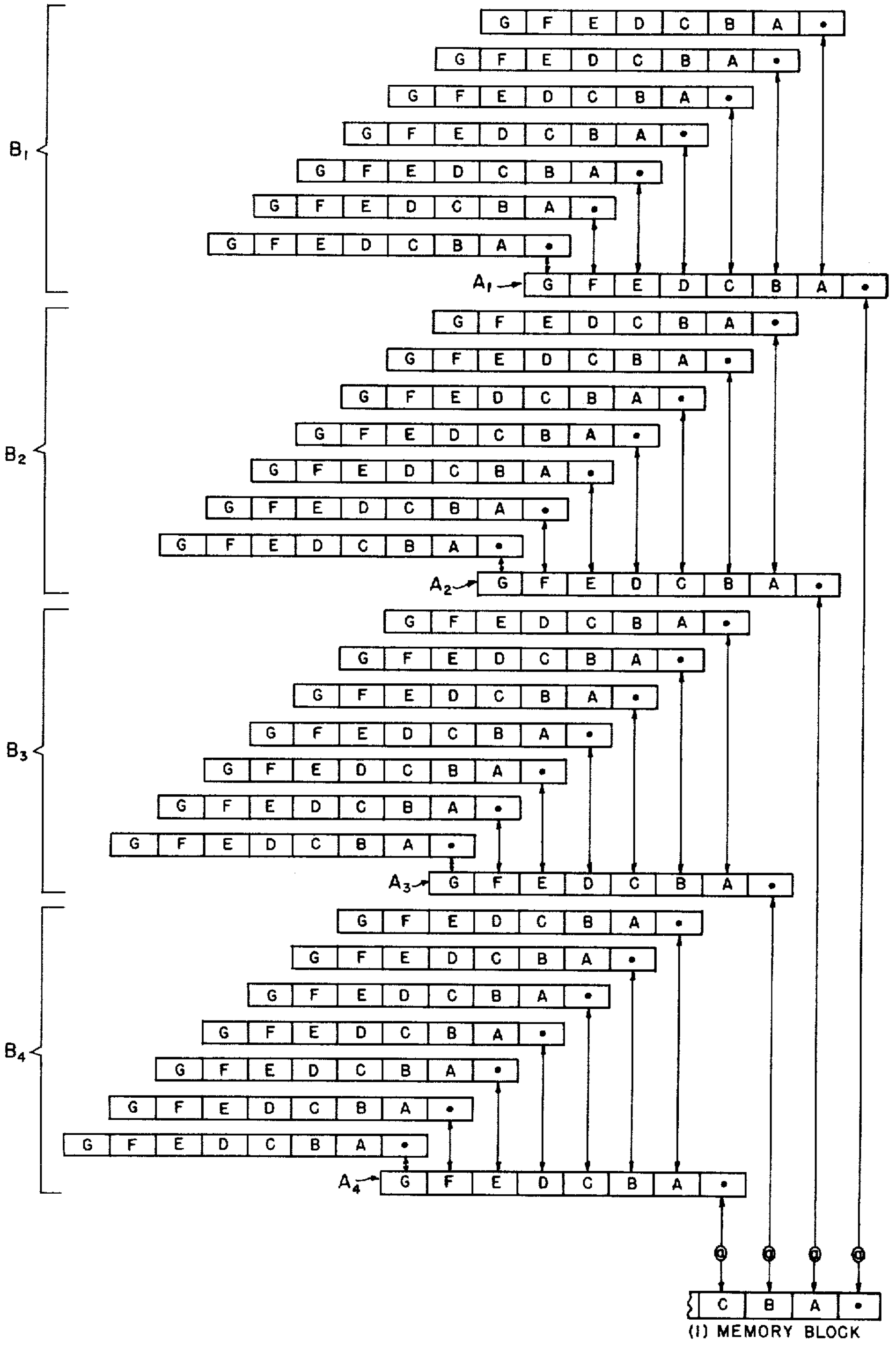
Figure 11B:
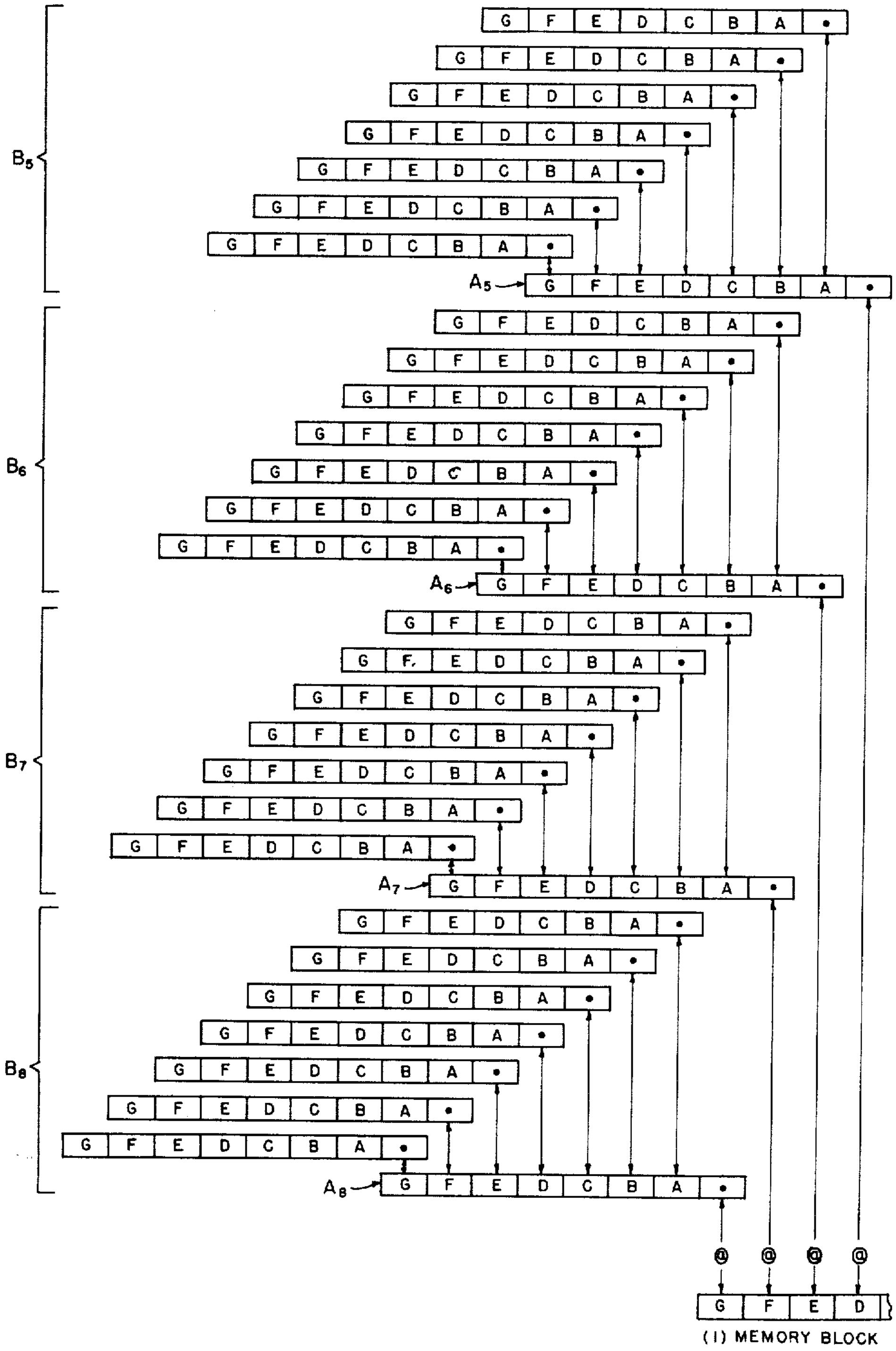
Figure 12:
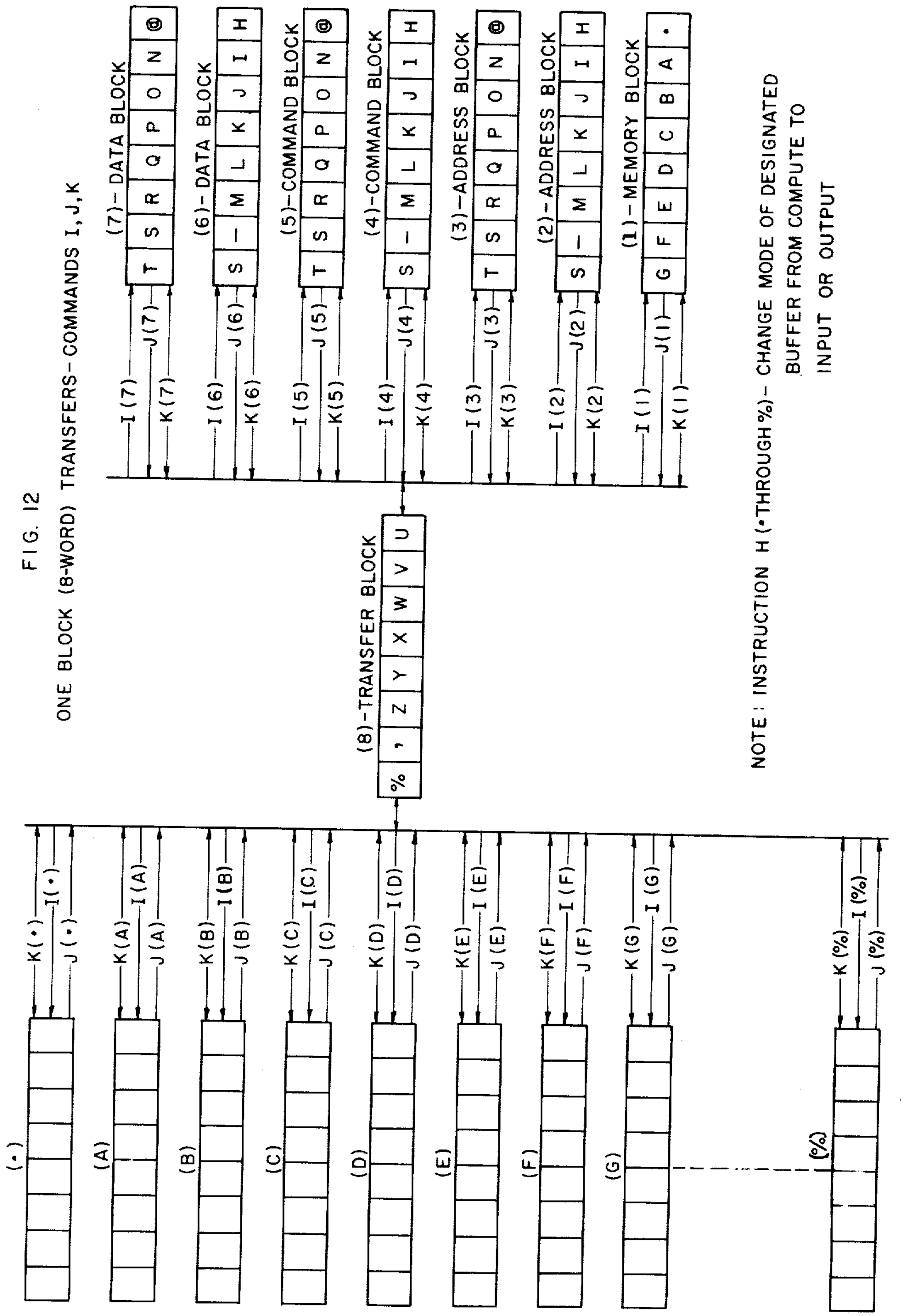
Figure 13:
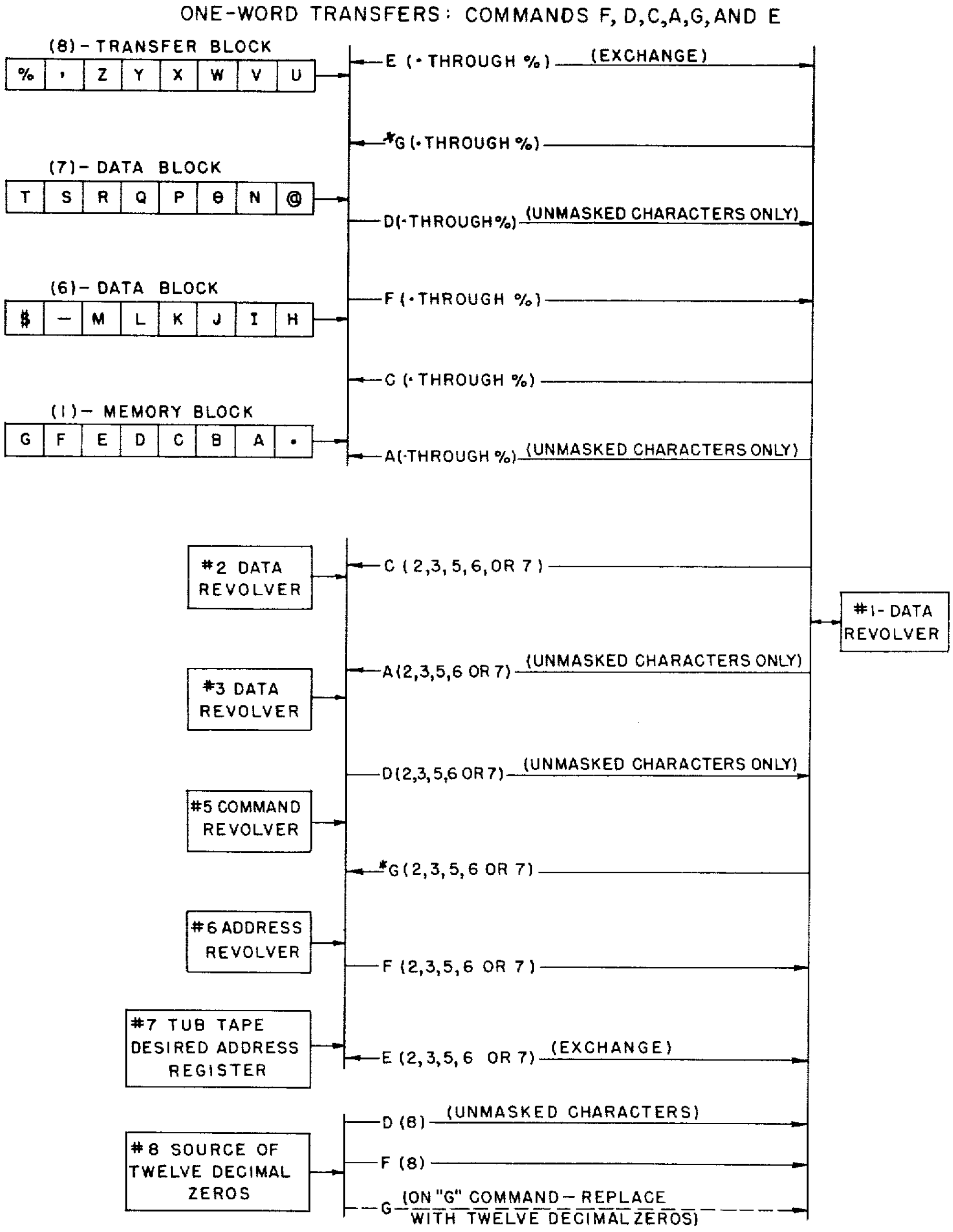
Figure 14:
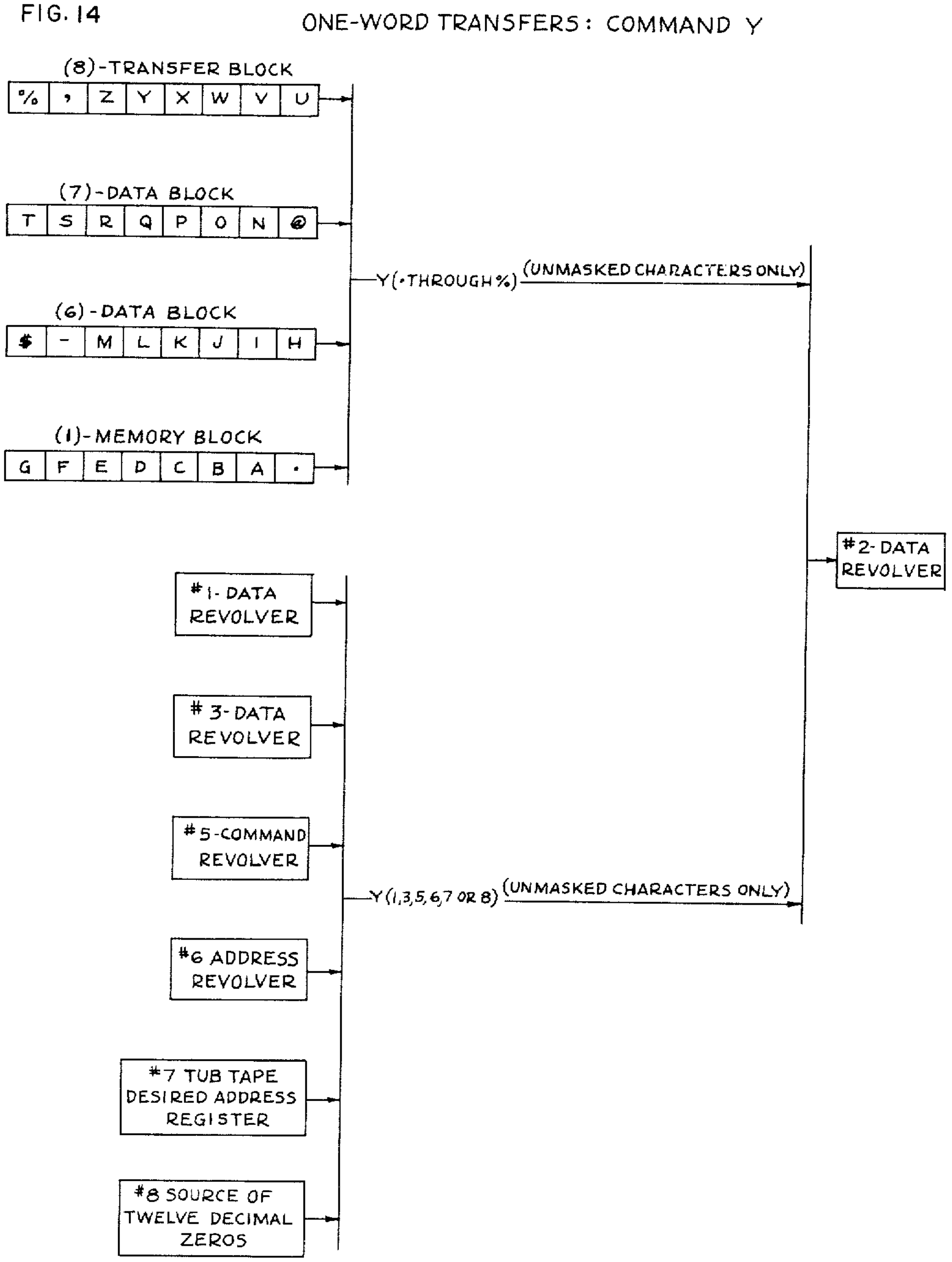
Figure 15:
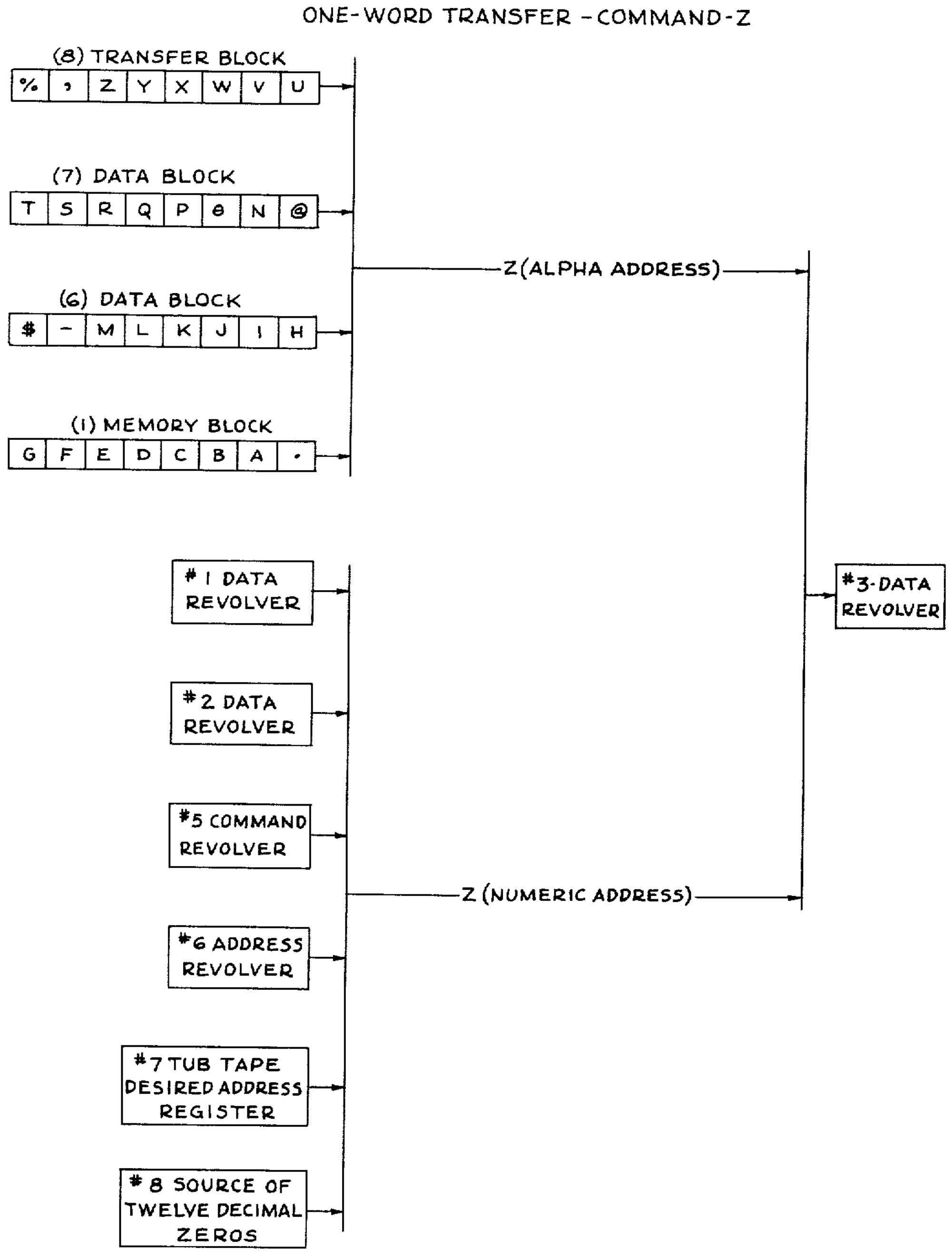
Figure 16:
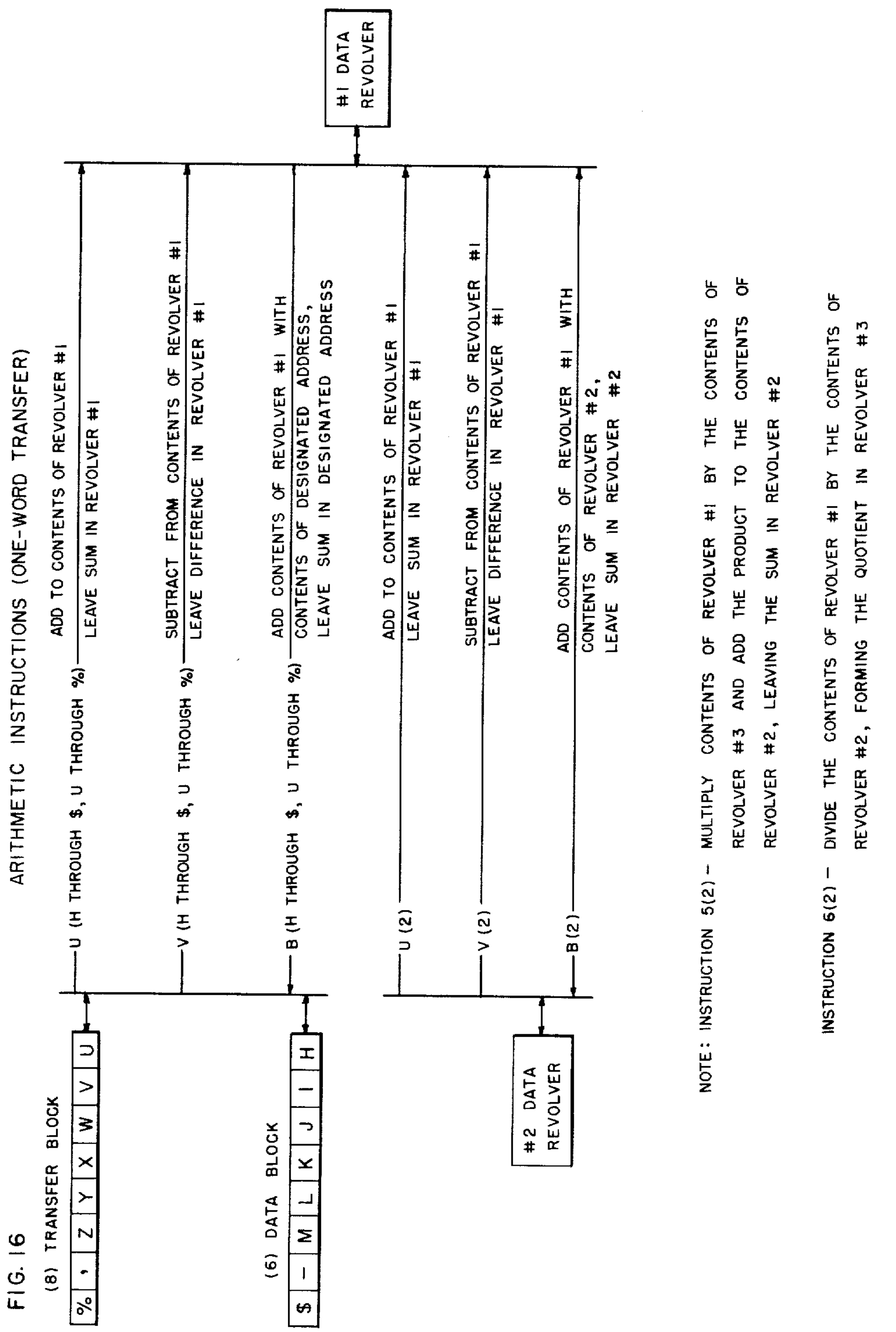
Figure 17:
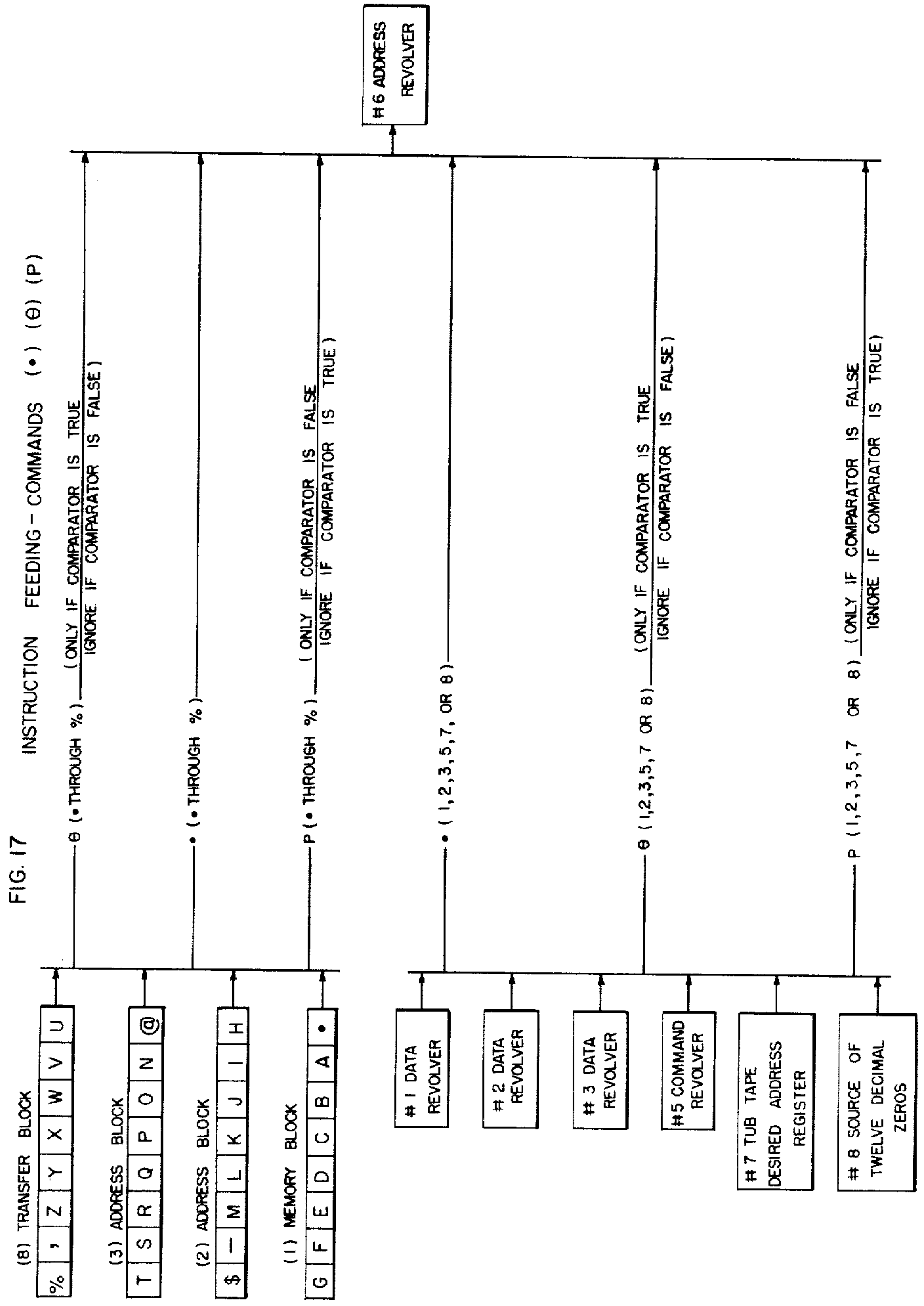
Figure 18:
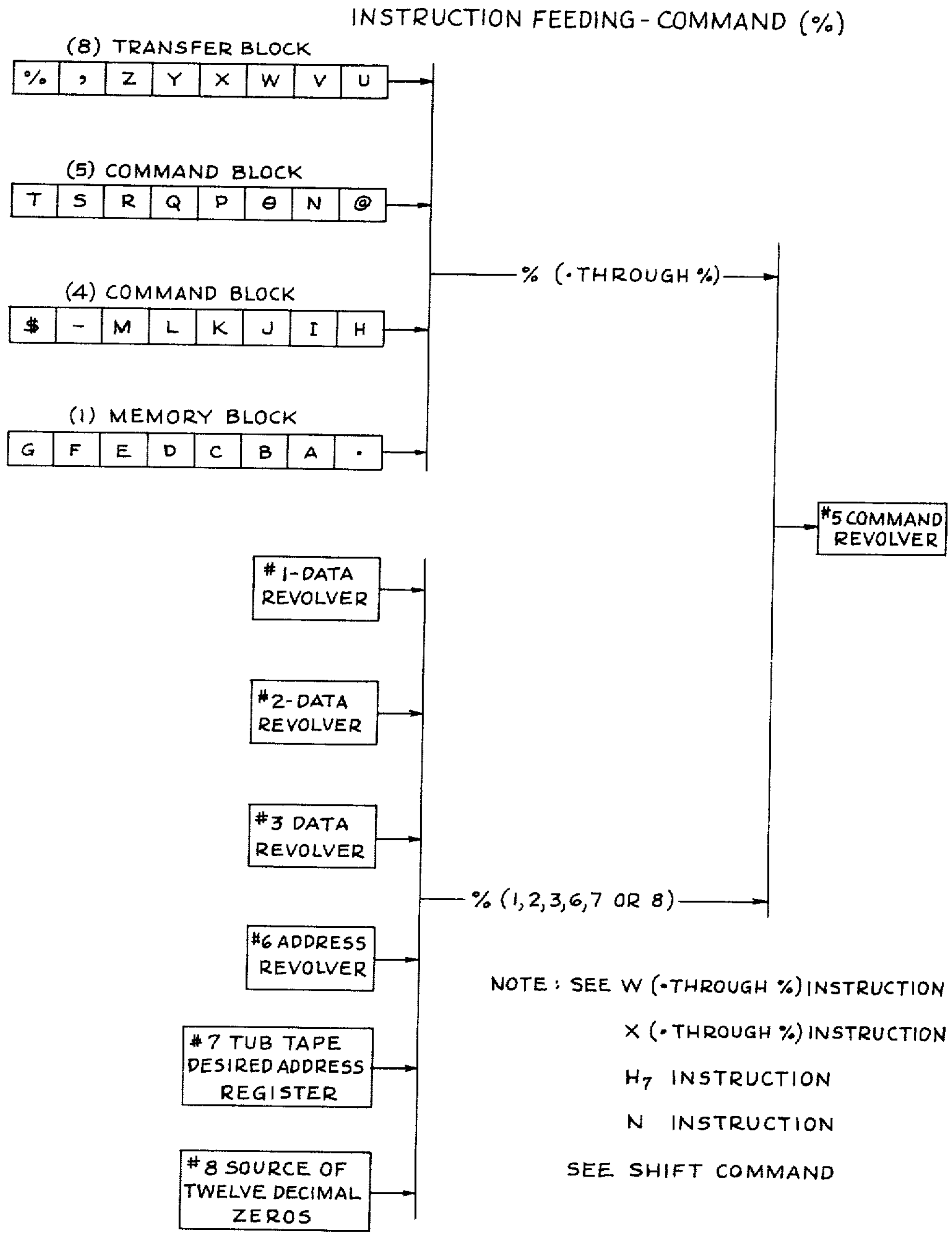
Figure 19:
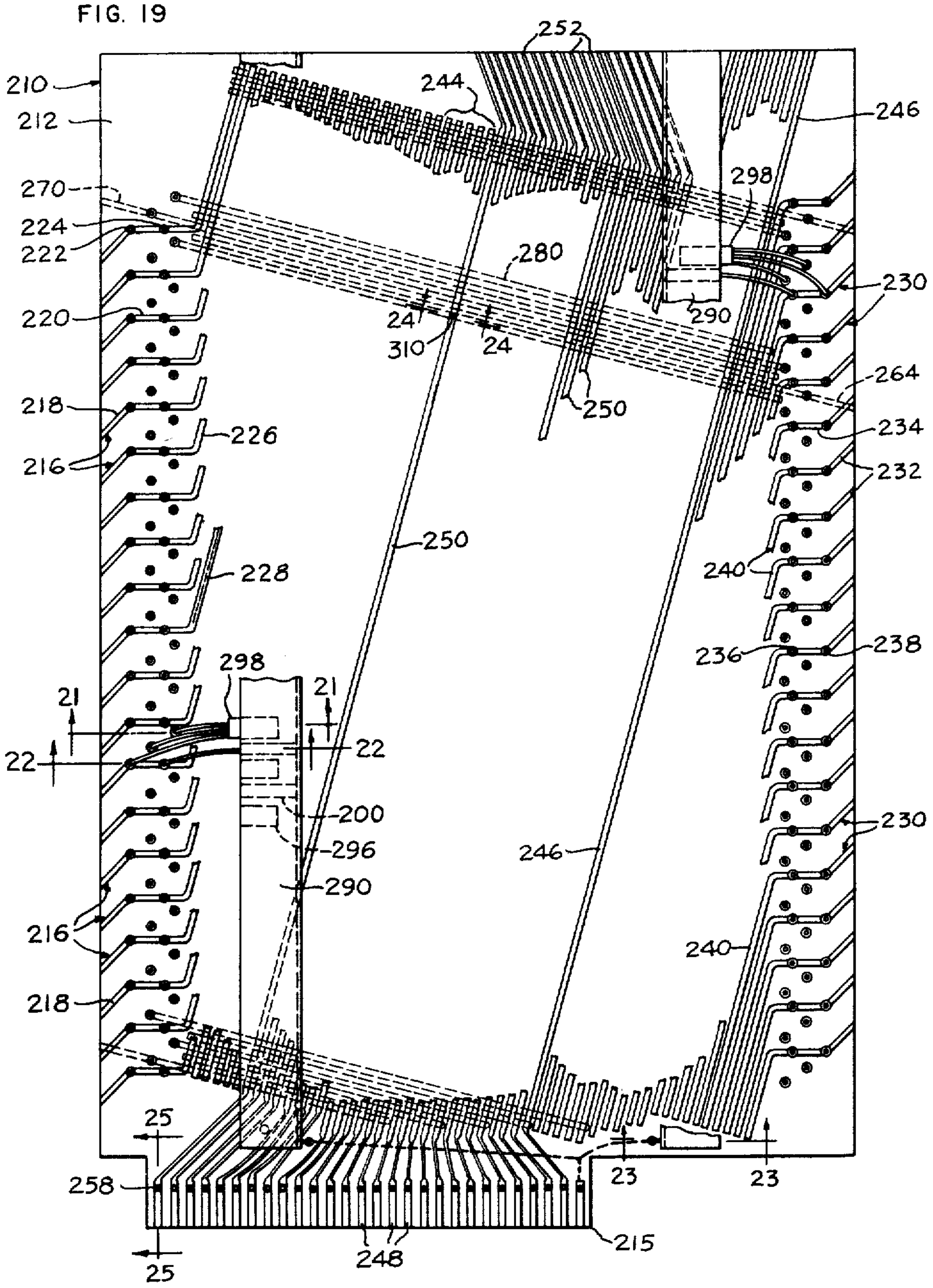
Figure 20:
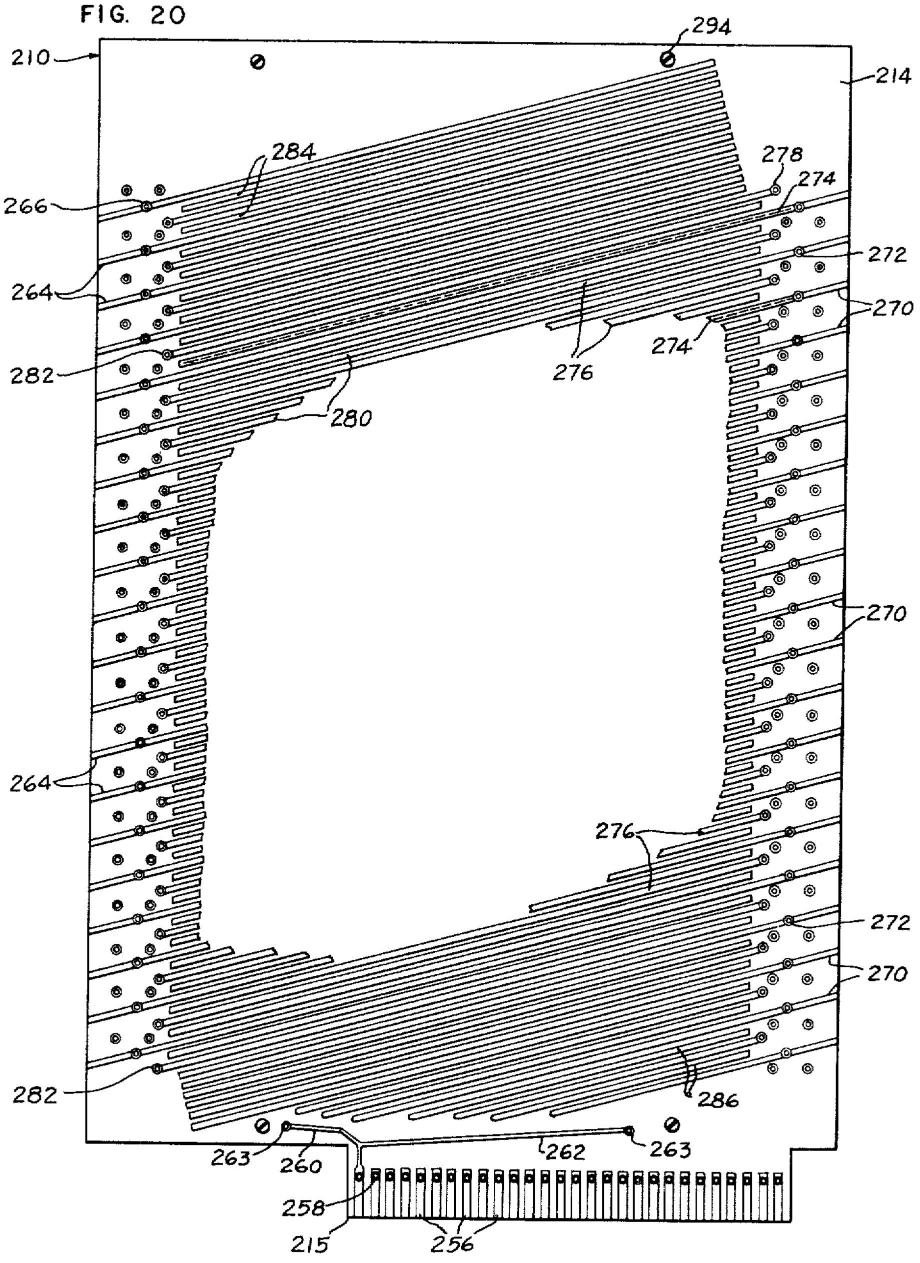
Figure 21:
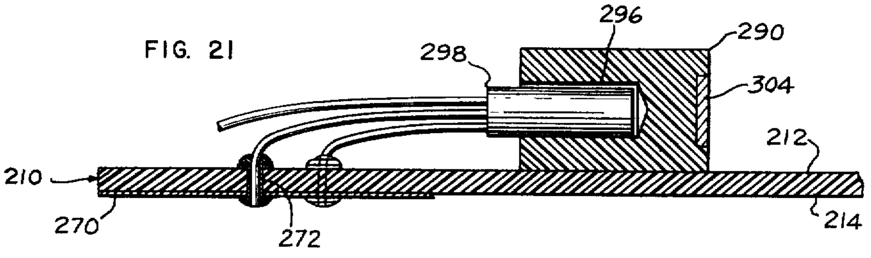
Figure 22:
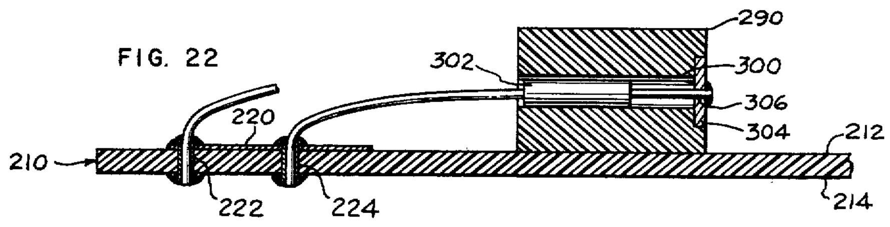
Figure 23:
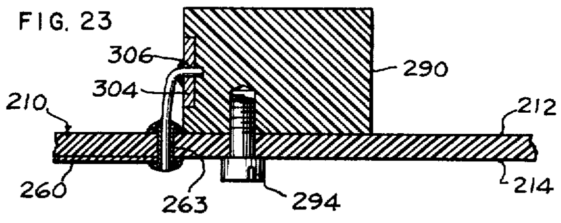
Figure 24:
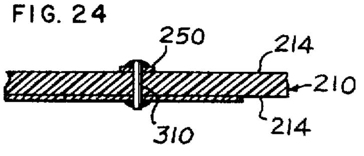
Figure 25:
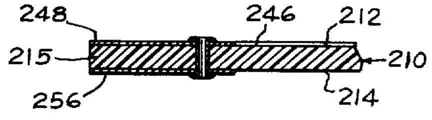
Figures 26, 27:
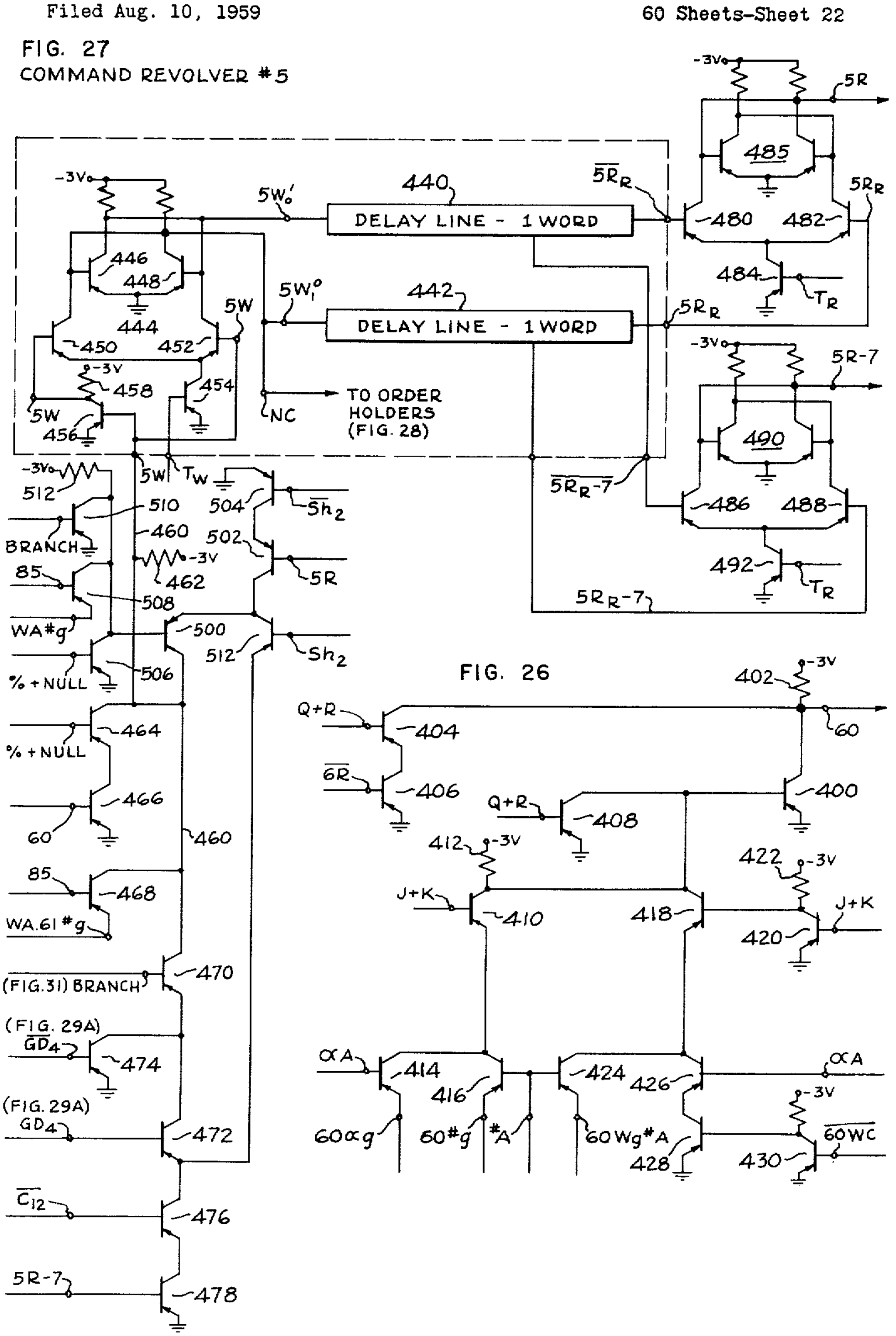
Figure 28:
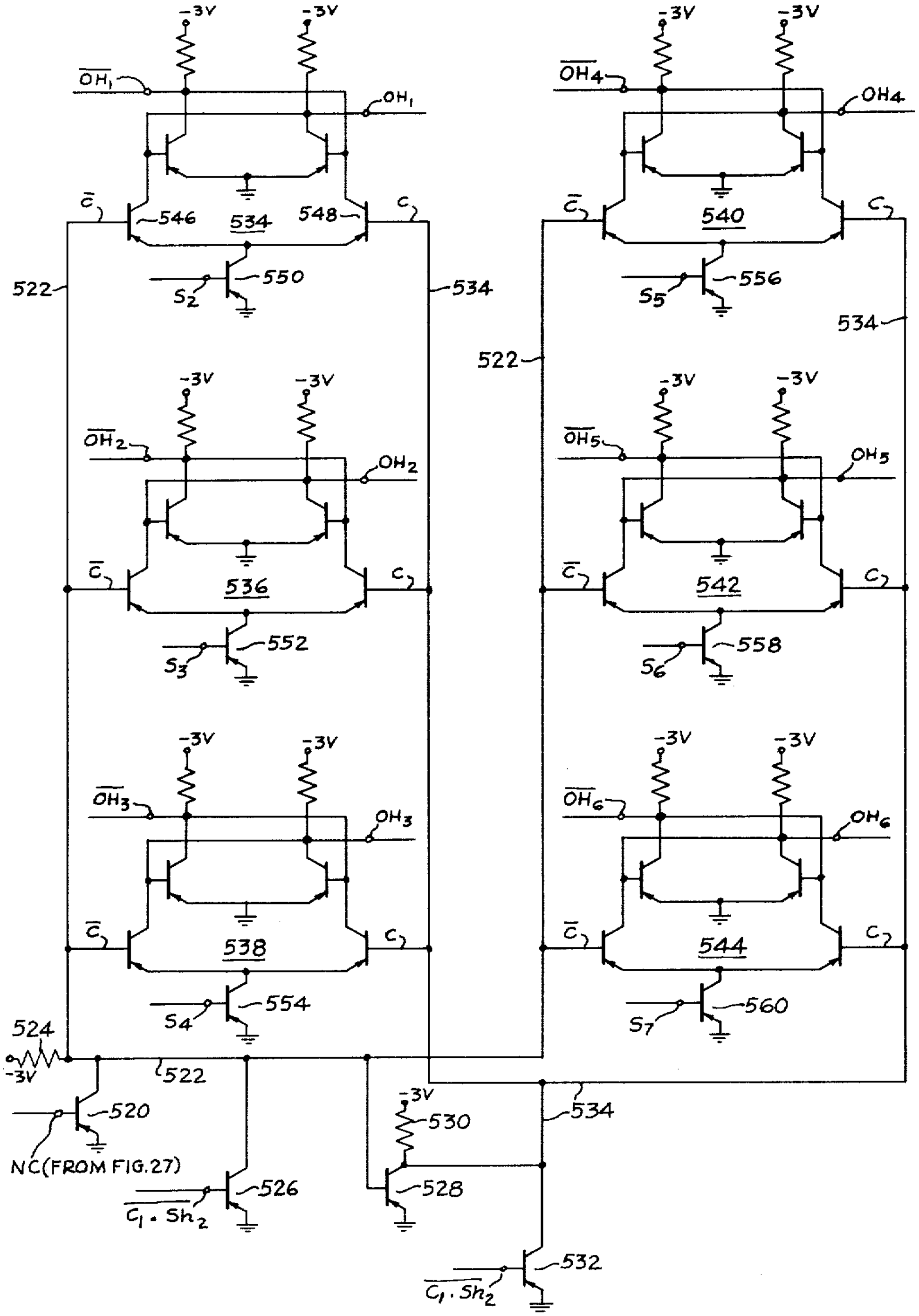
Figure 43:
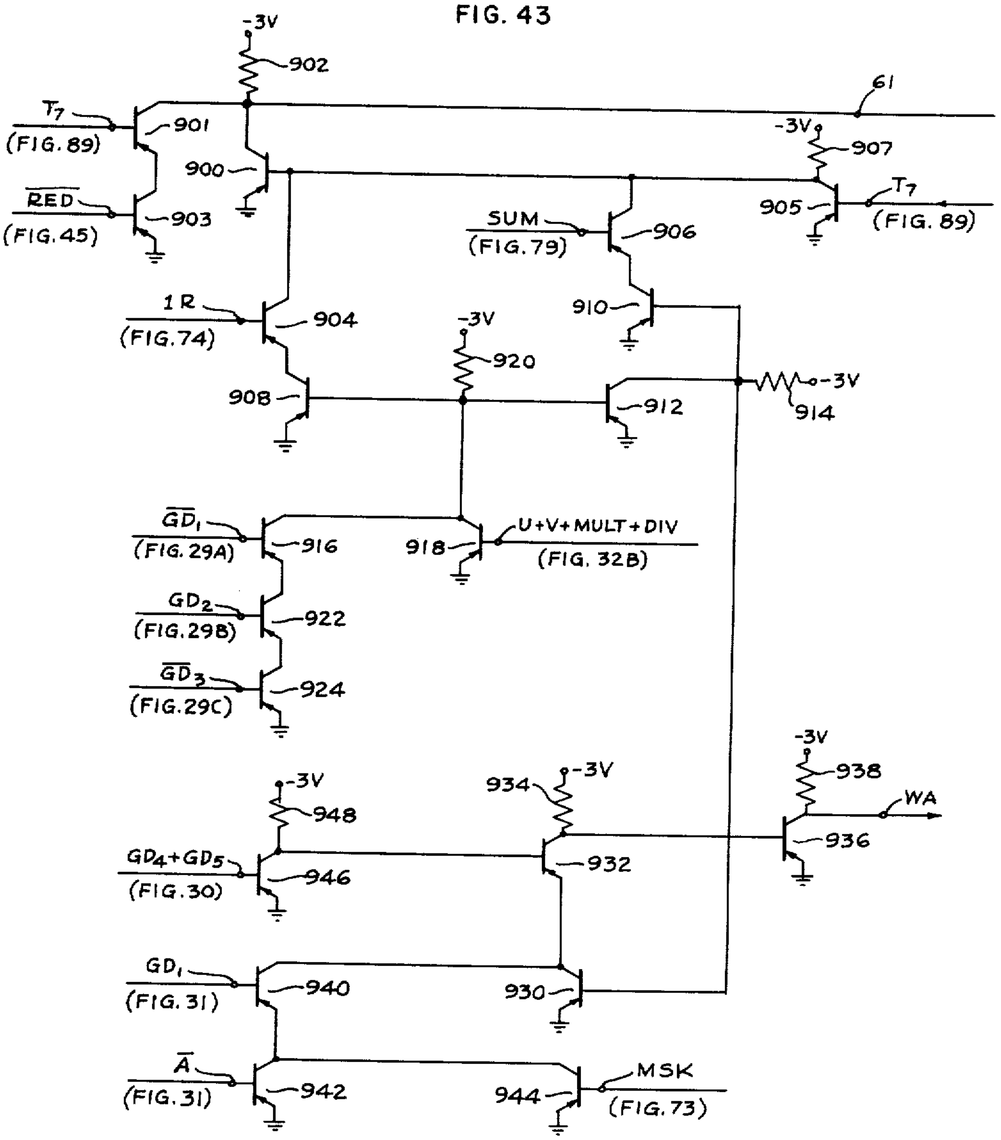
Figures 44, 45:
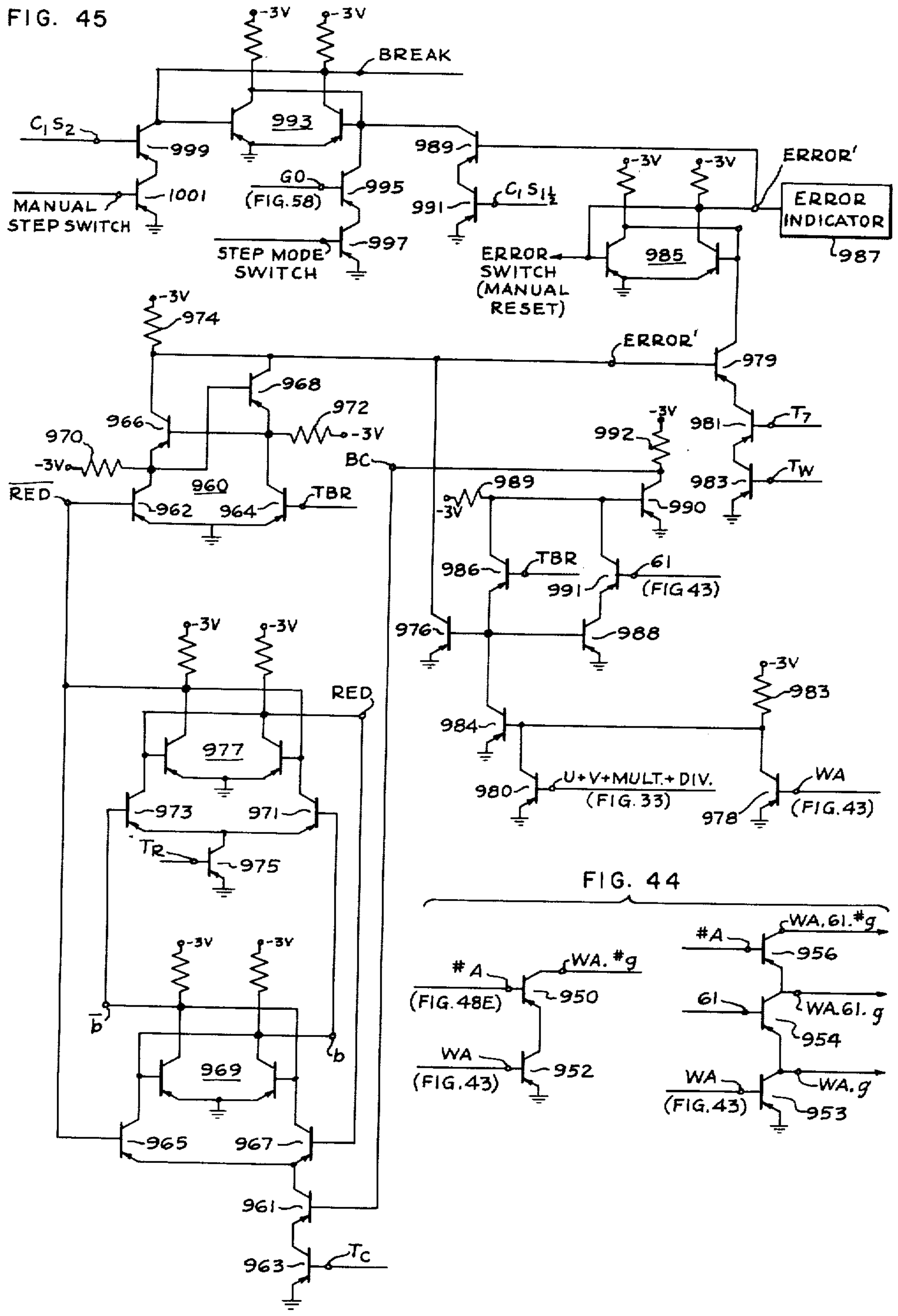
Figure 46:
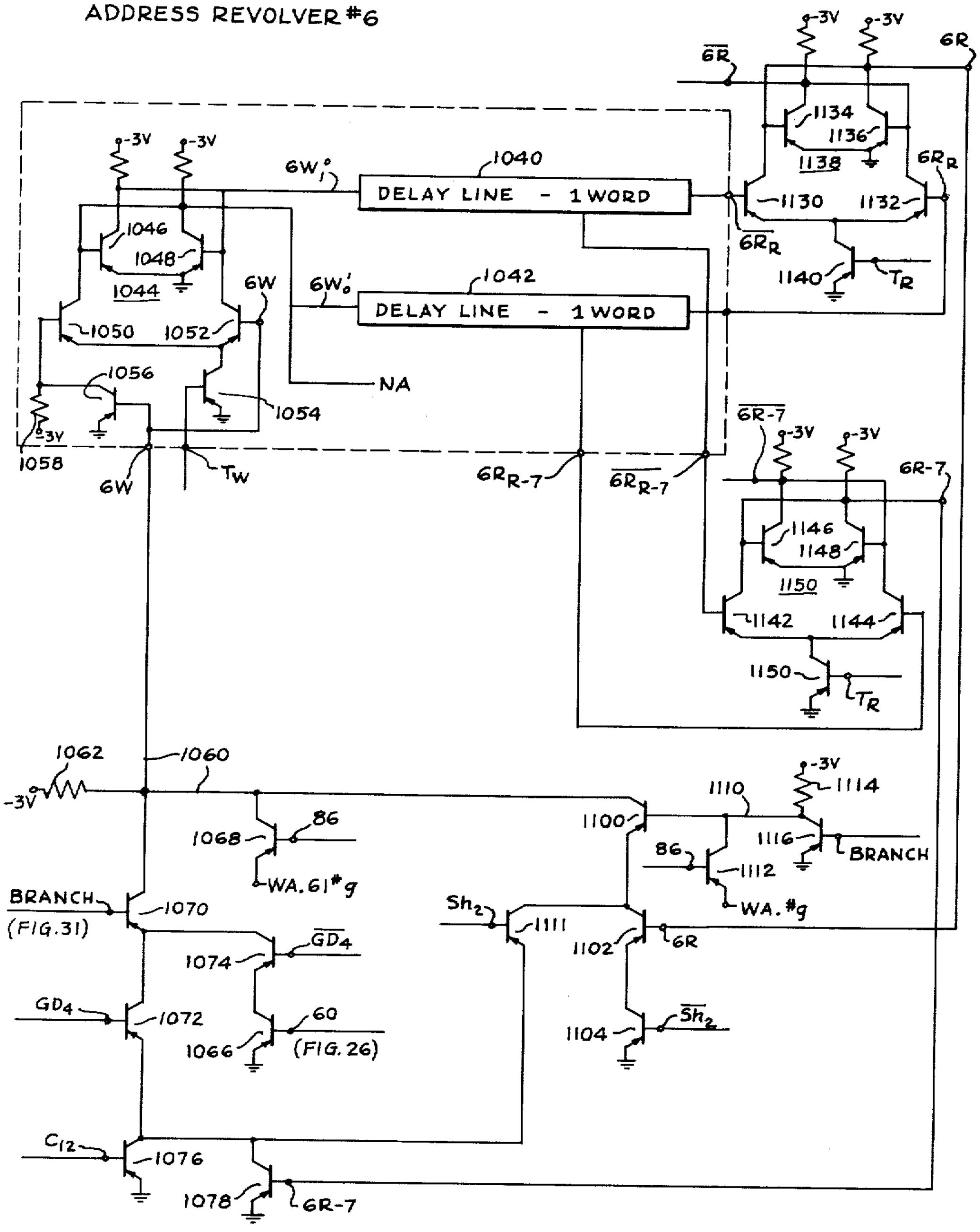
Figure 49:
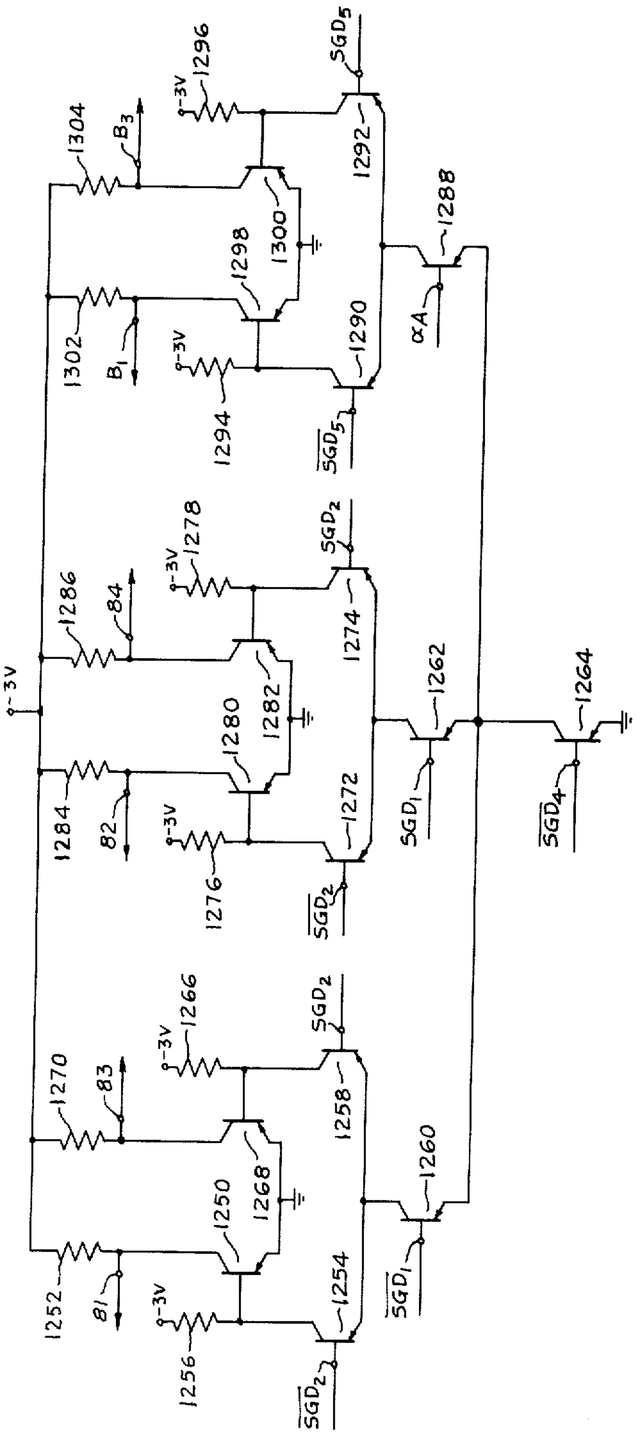
Figure 50:
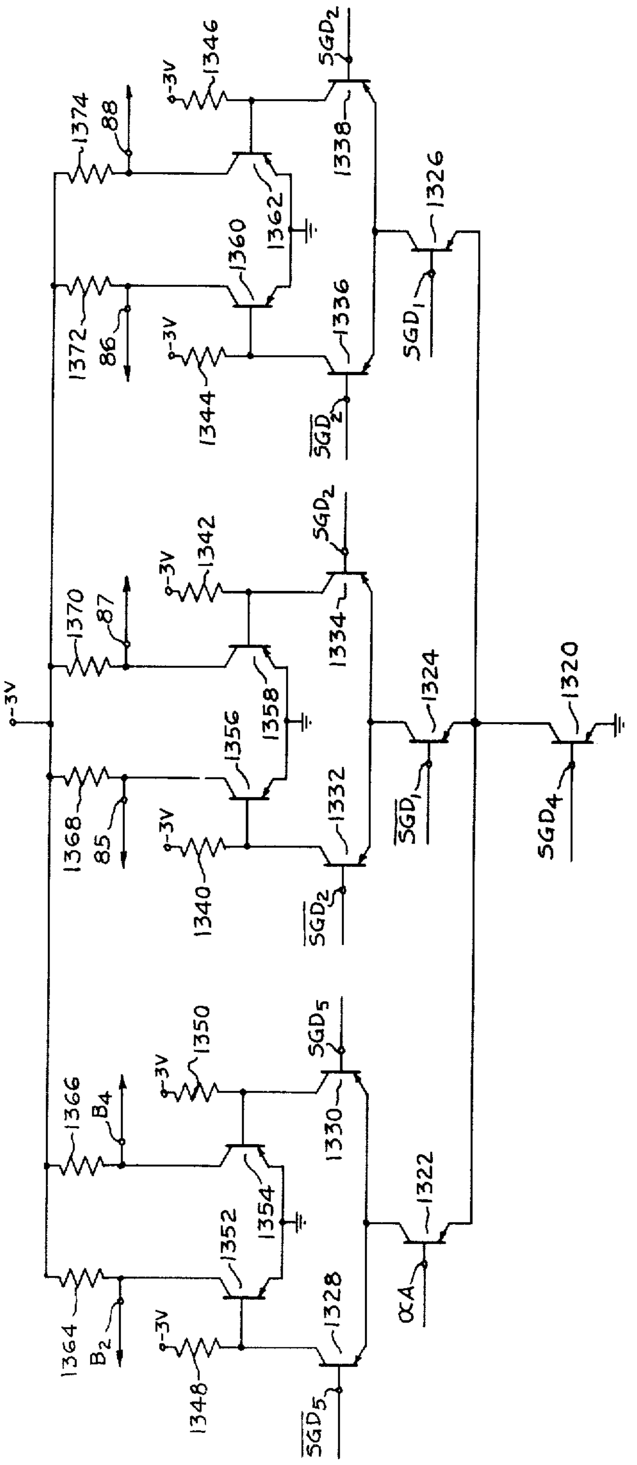
Figures 55, 56, 57:
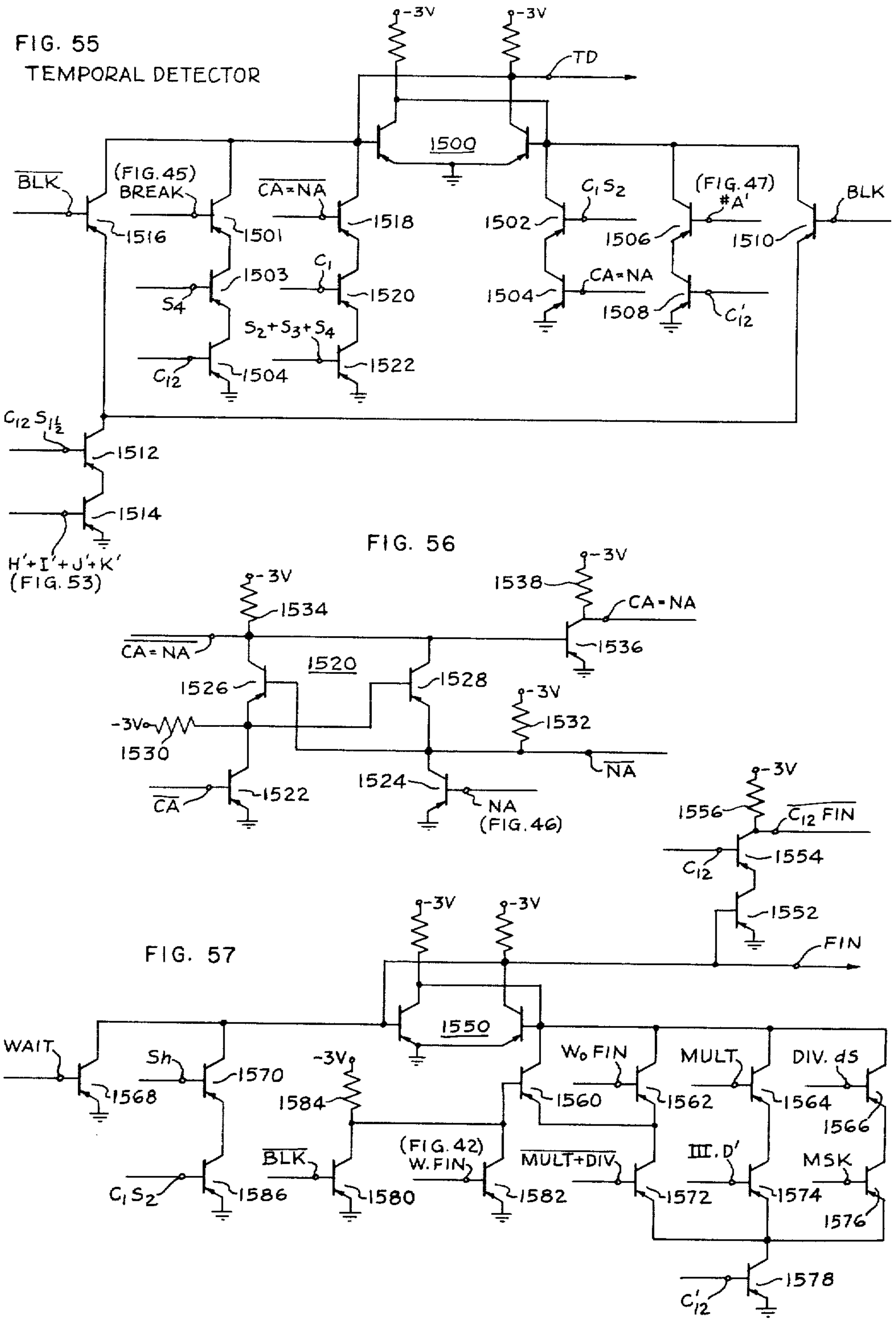
Figure 58:
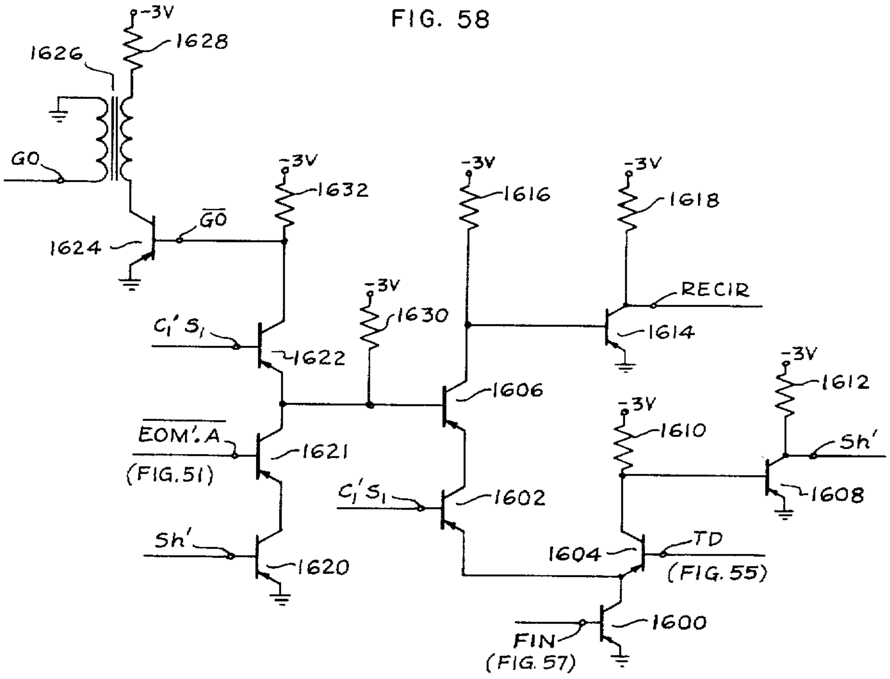
Figure 59:
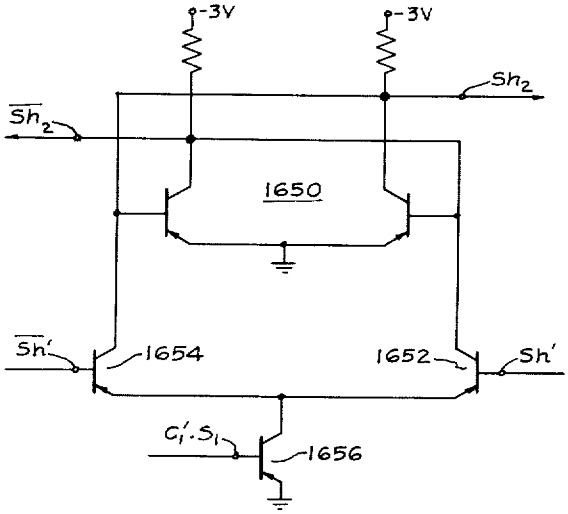
Figure 68:
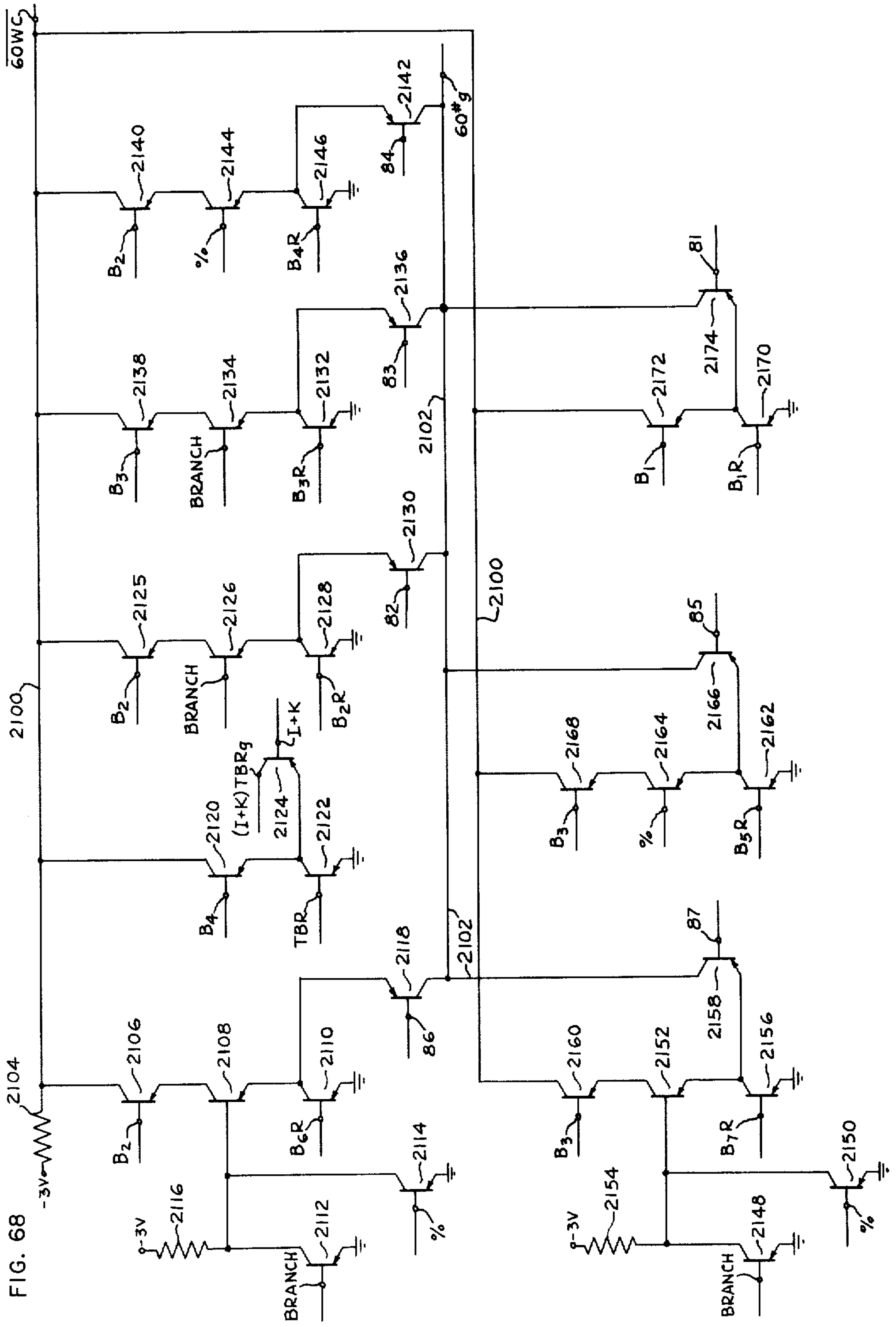
Figure 69:
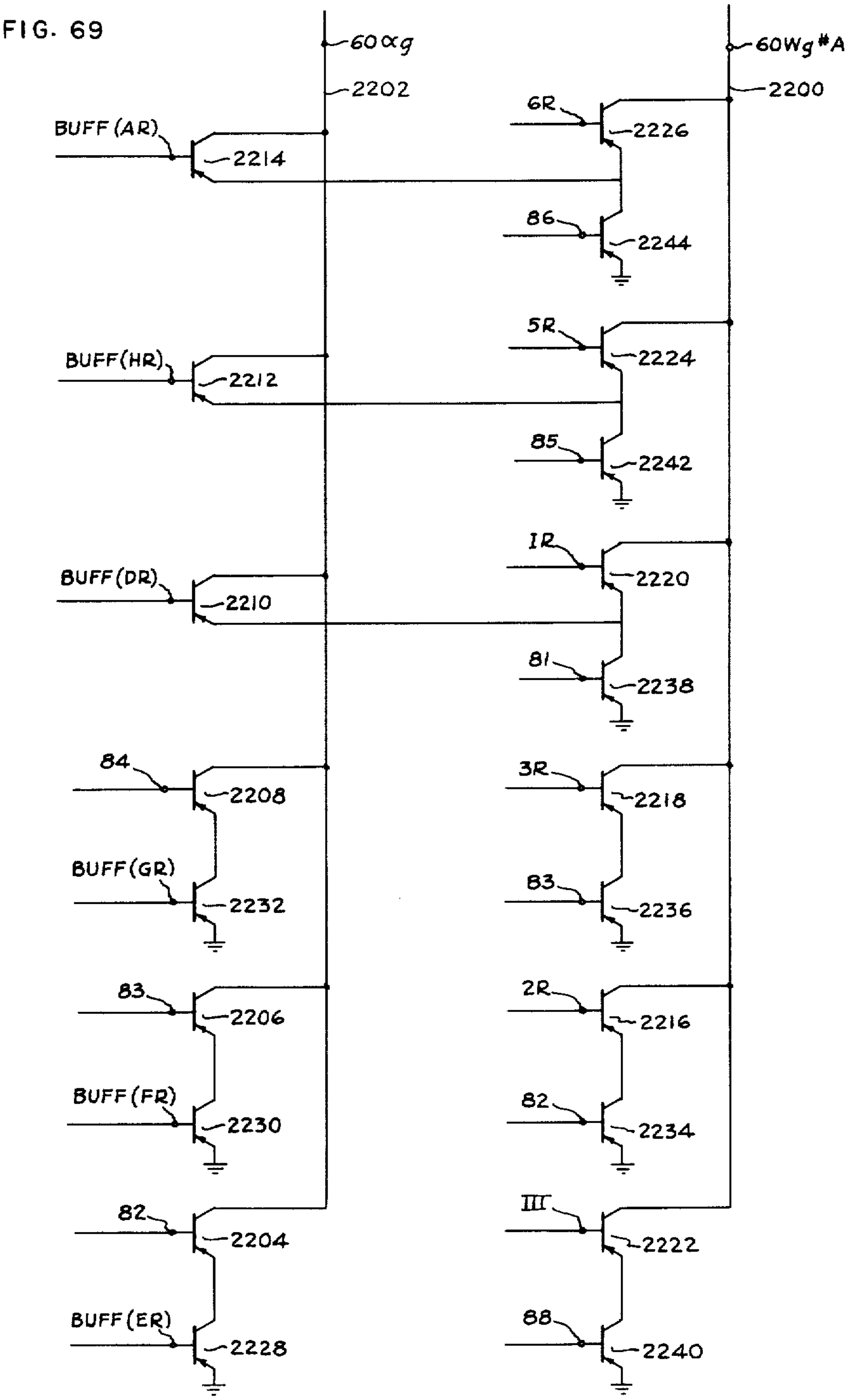
Figure 70:
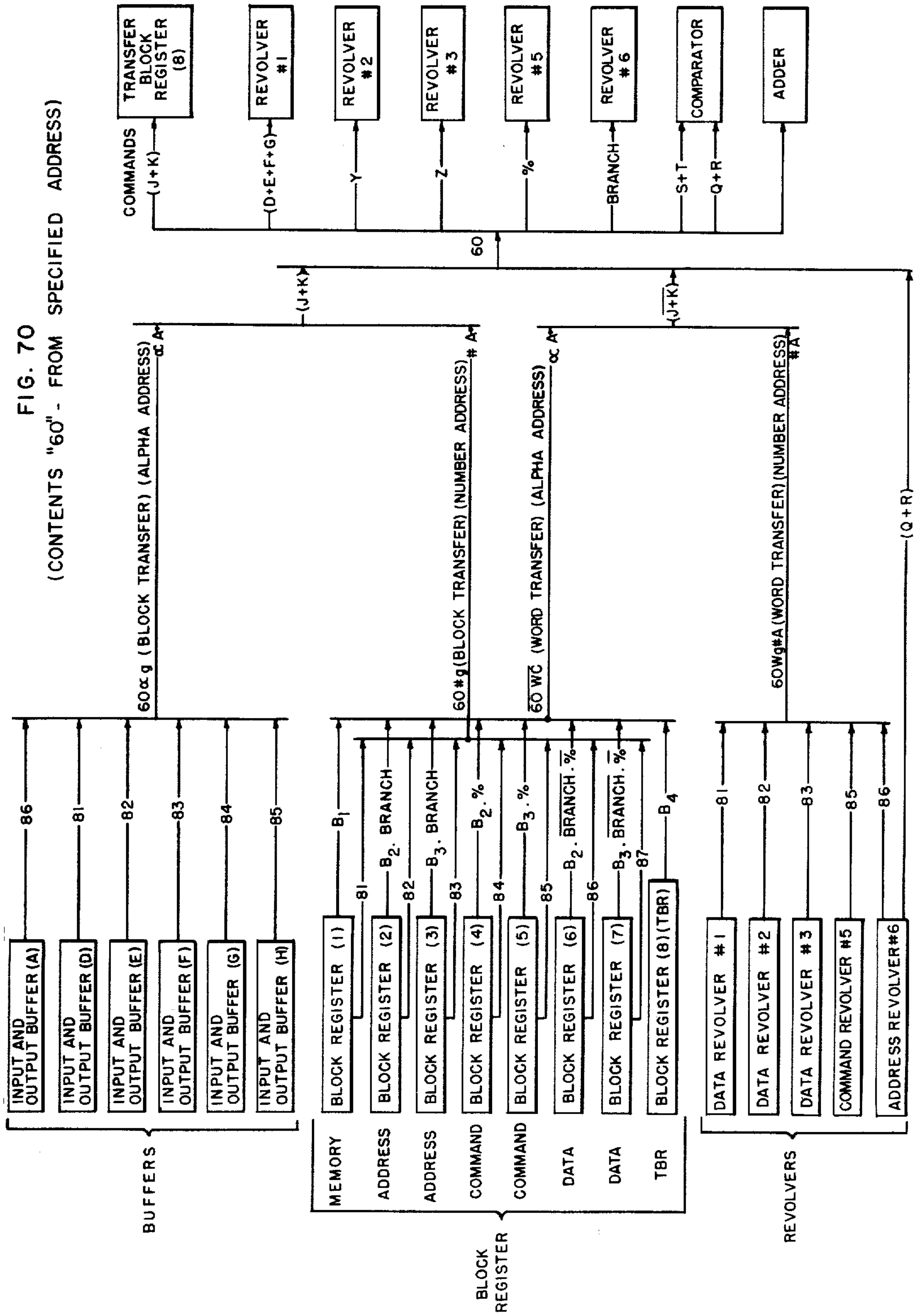
Figure 71:
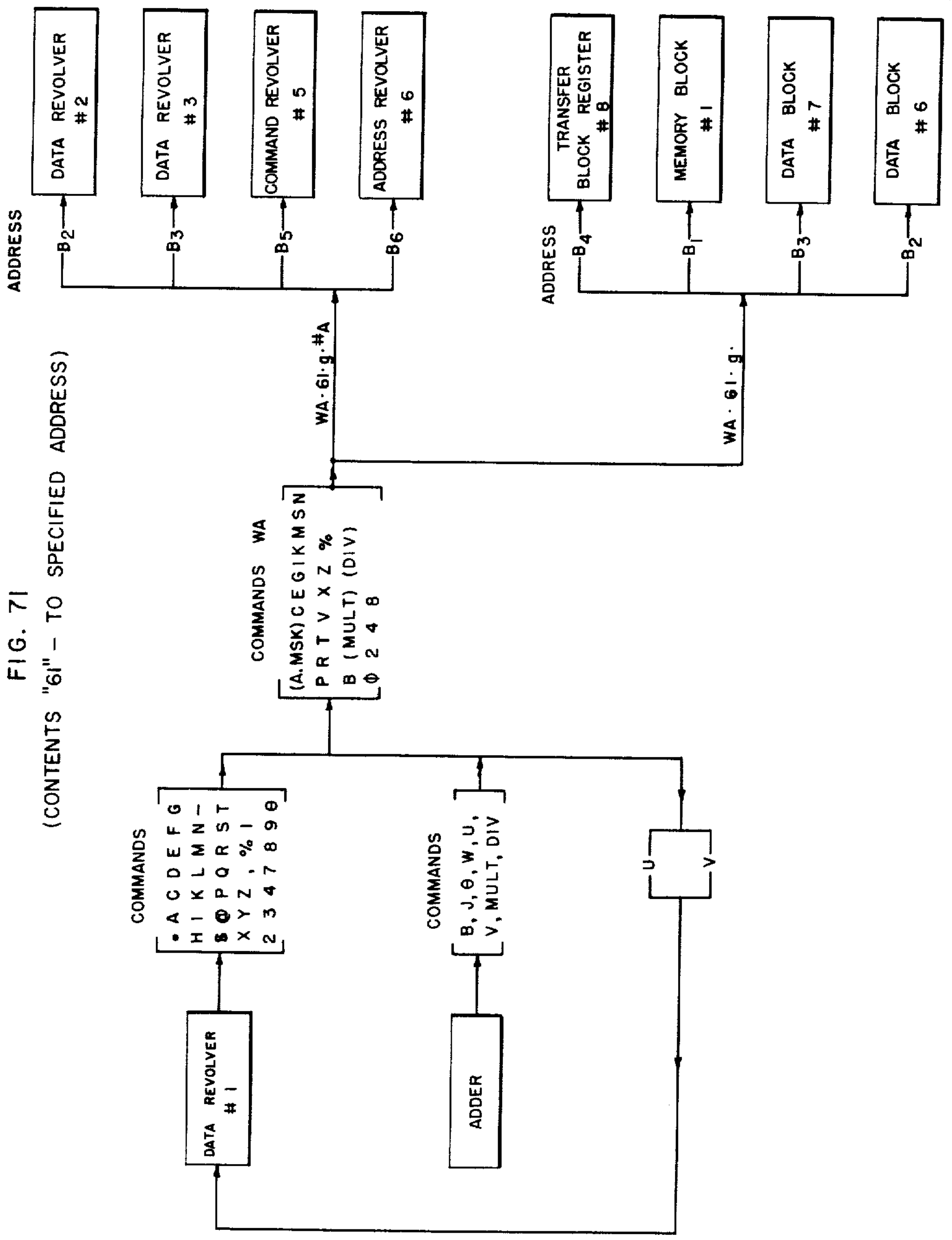
Figure 72:
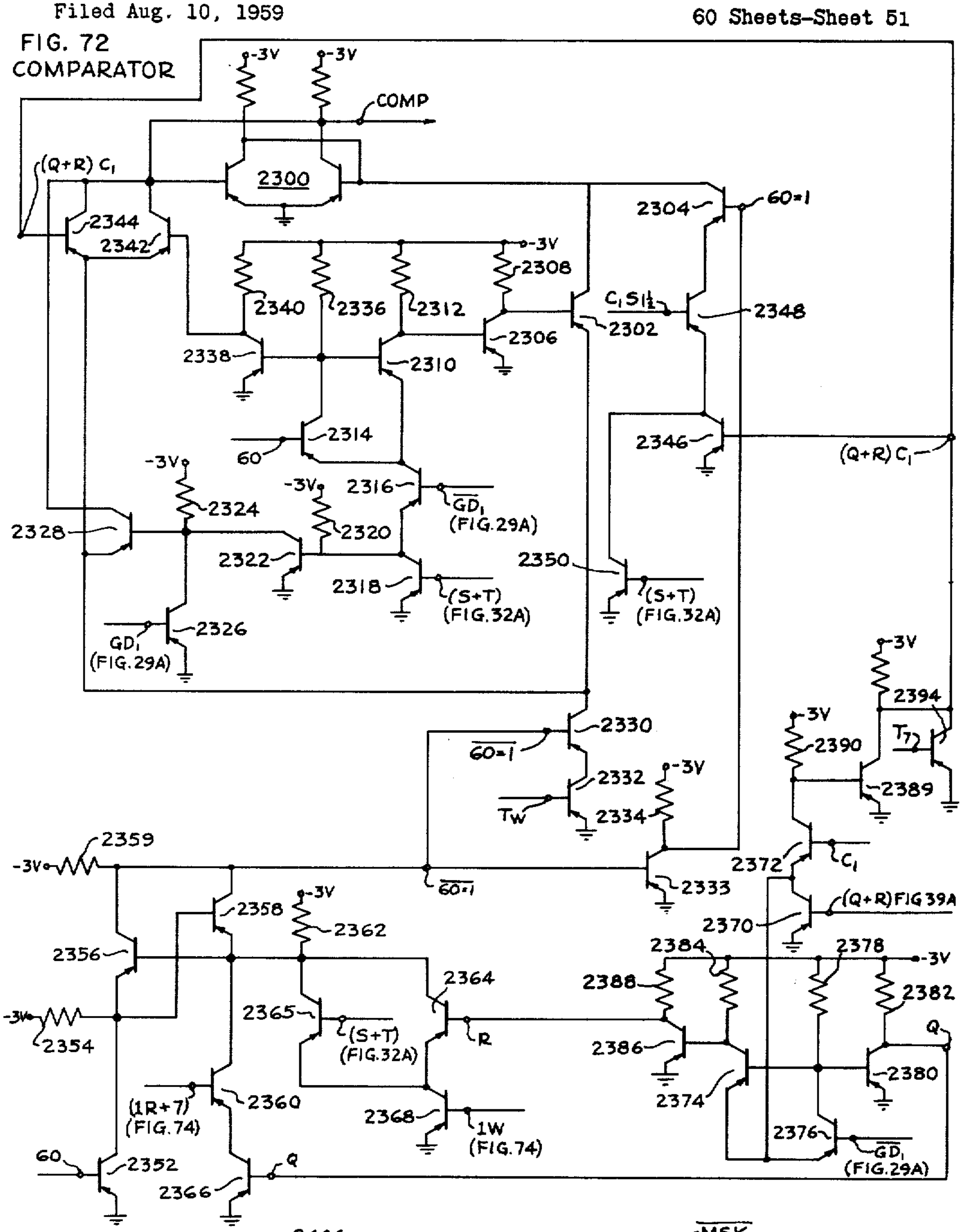
Figure 73:
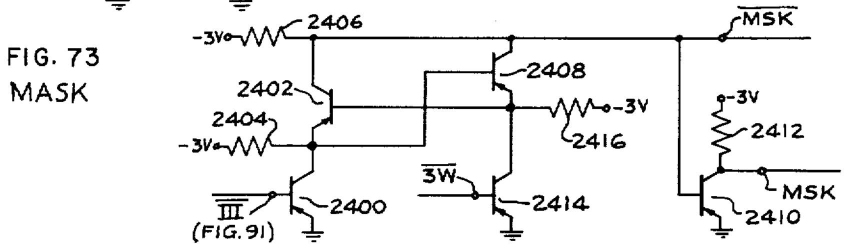
Figure 74:
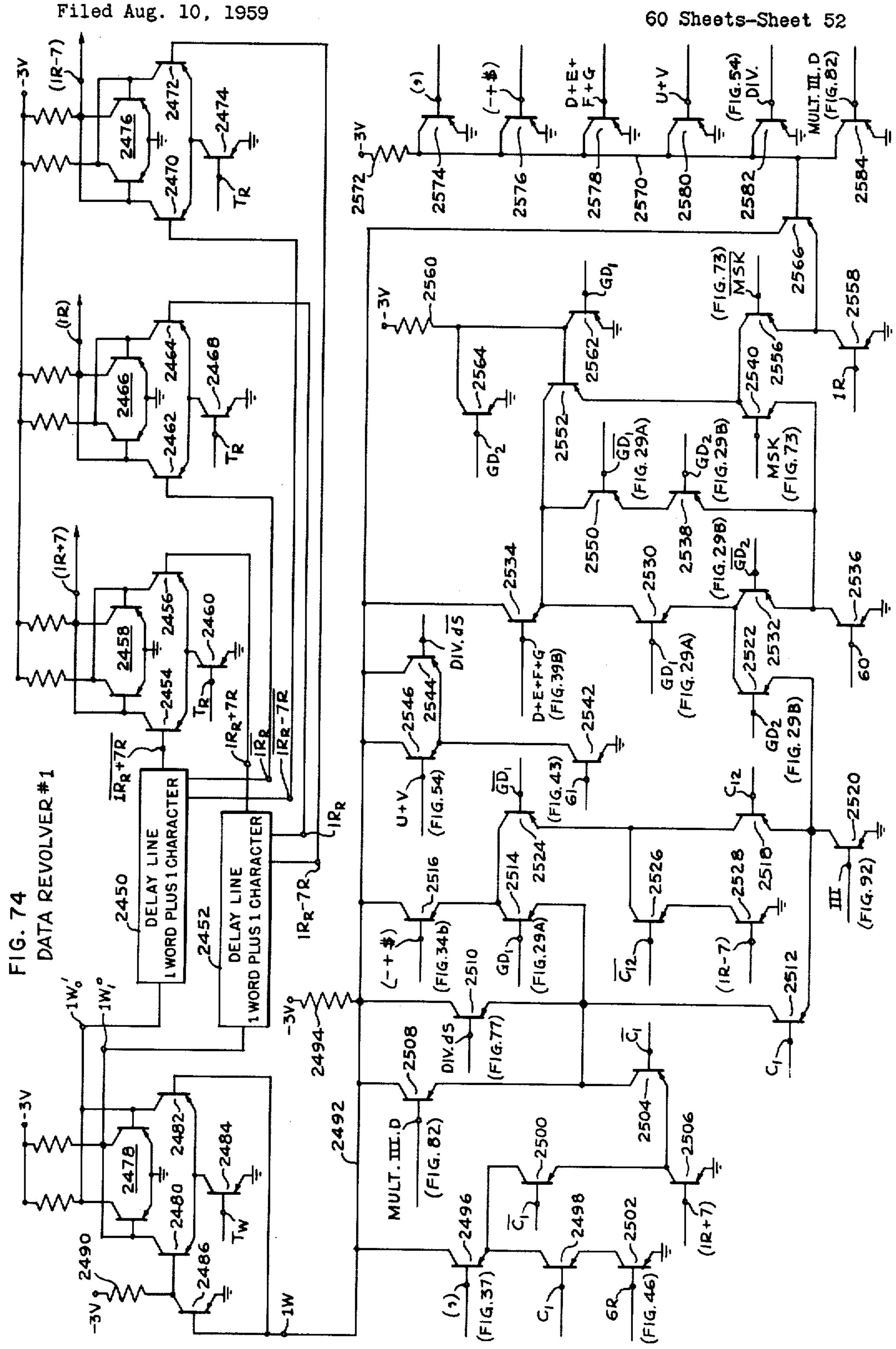
Figure 75:
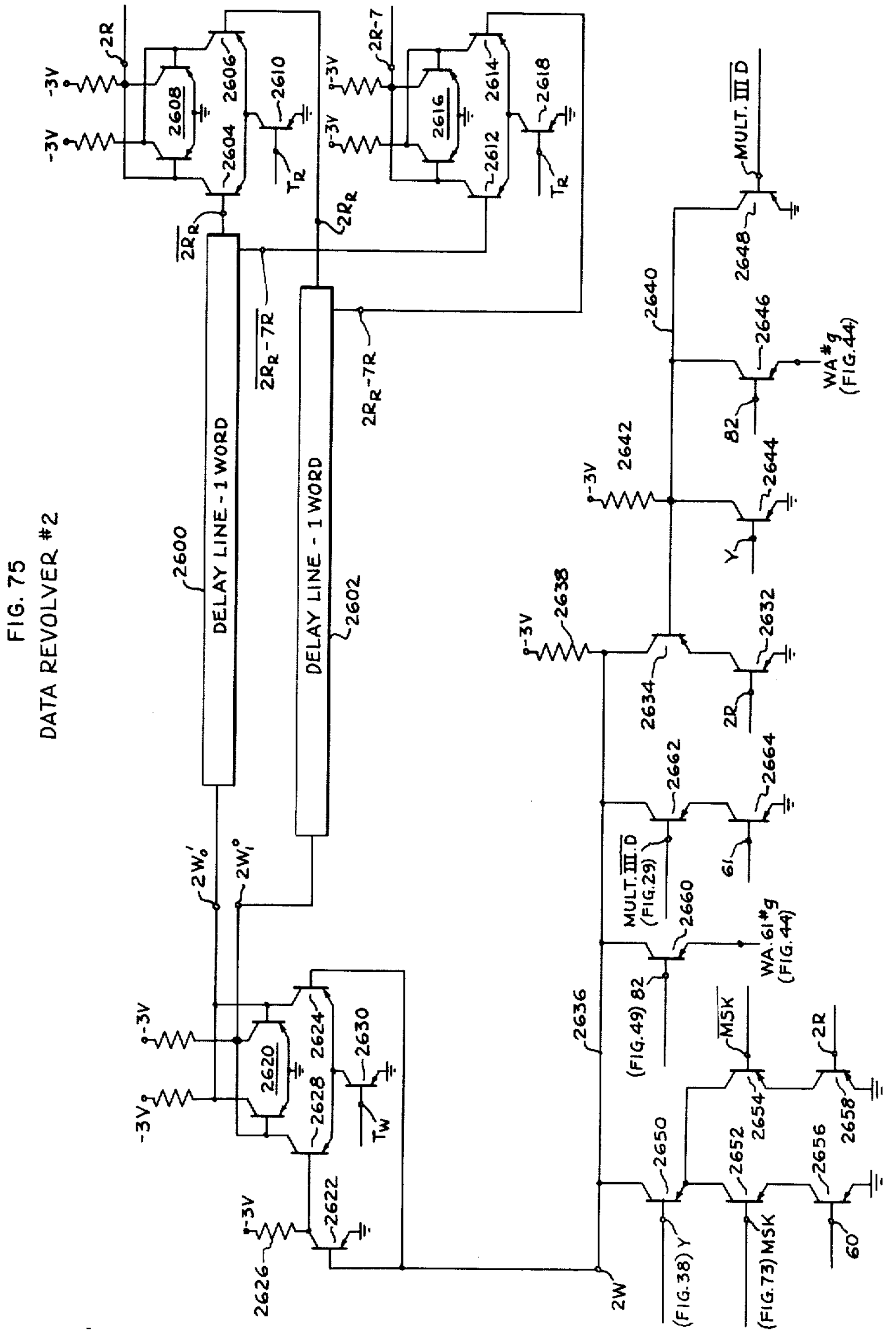
Figure 76:
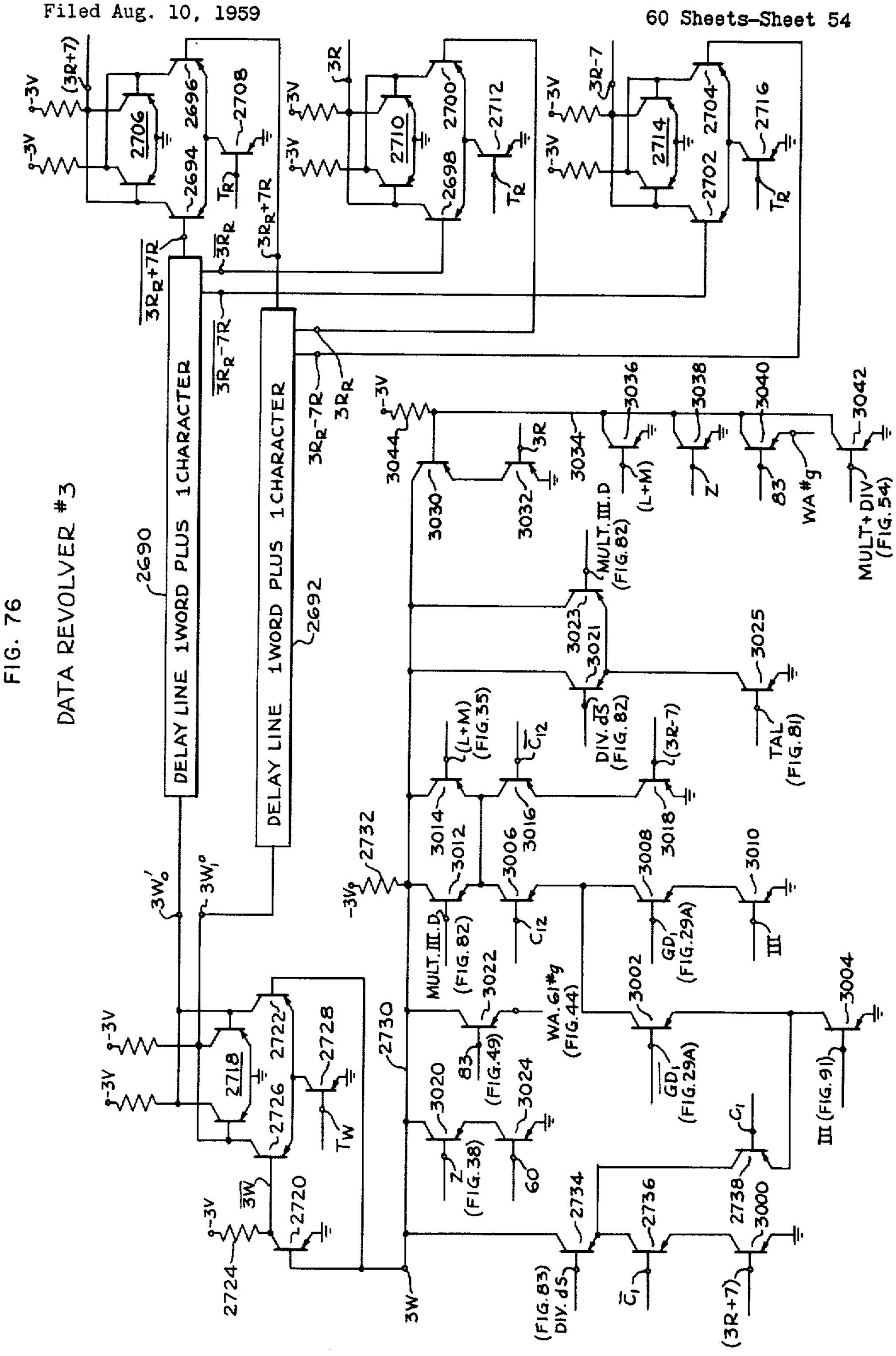
Figure 77:
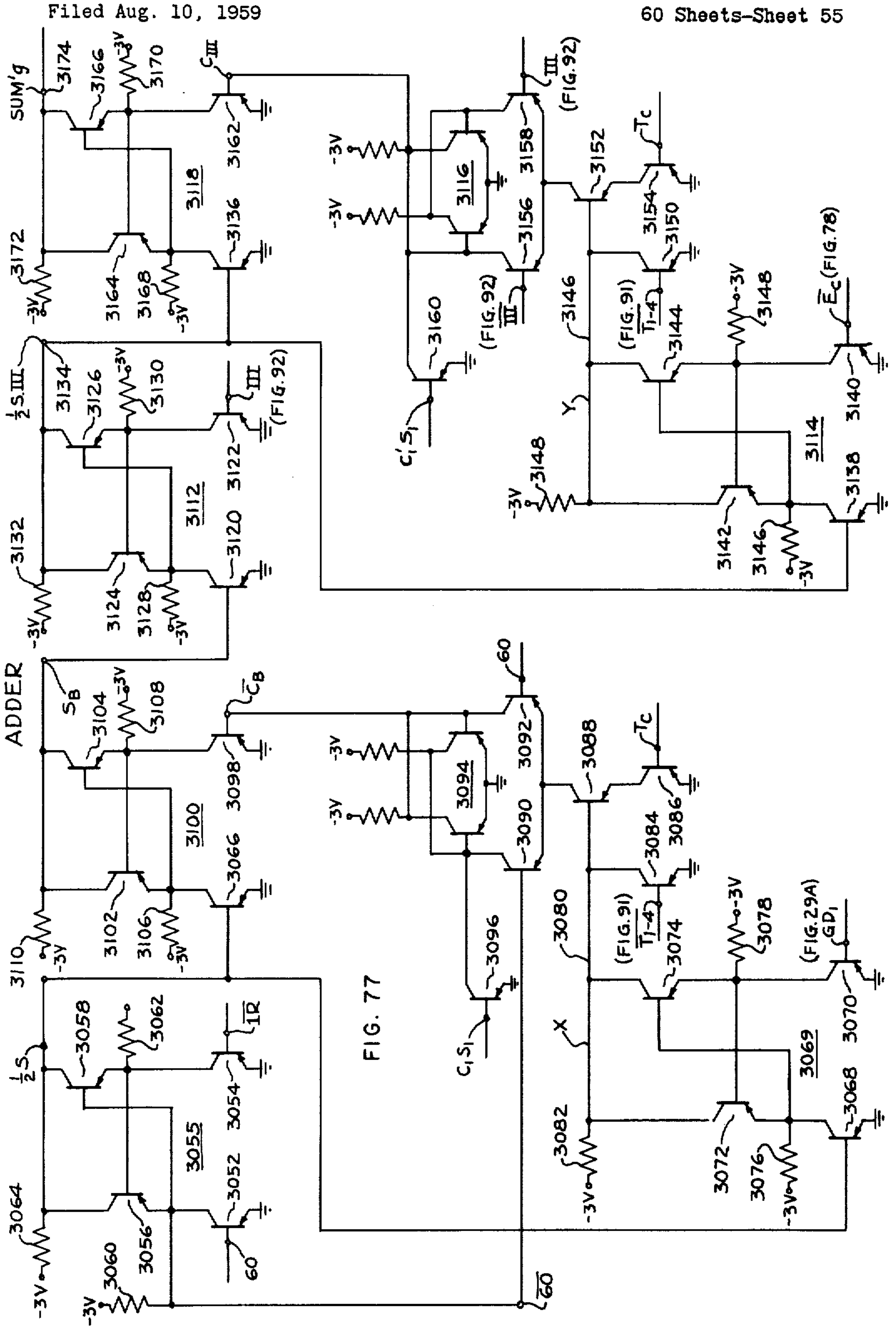
Figure 78:
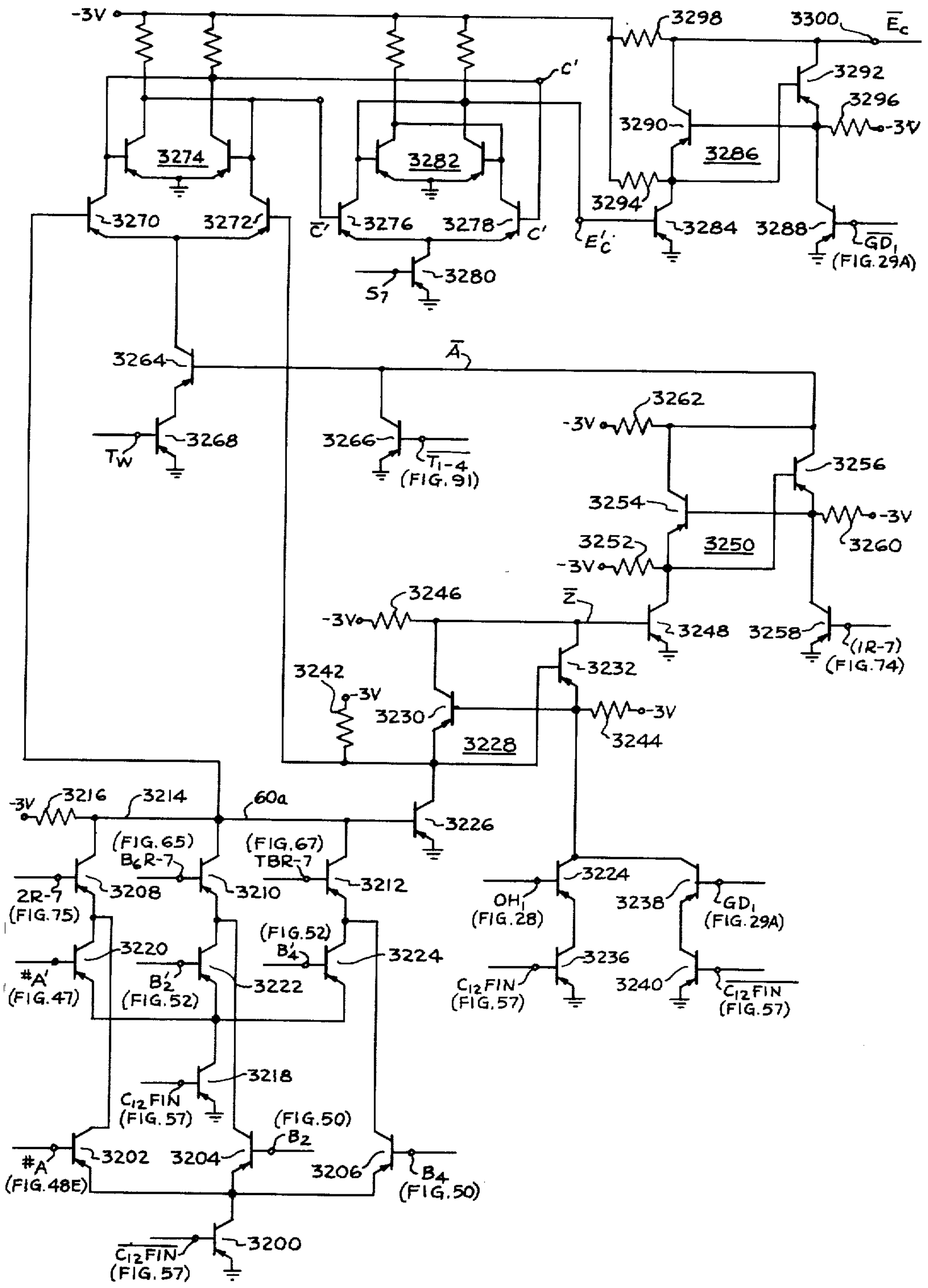
Figures 79, 80, 81:
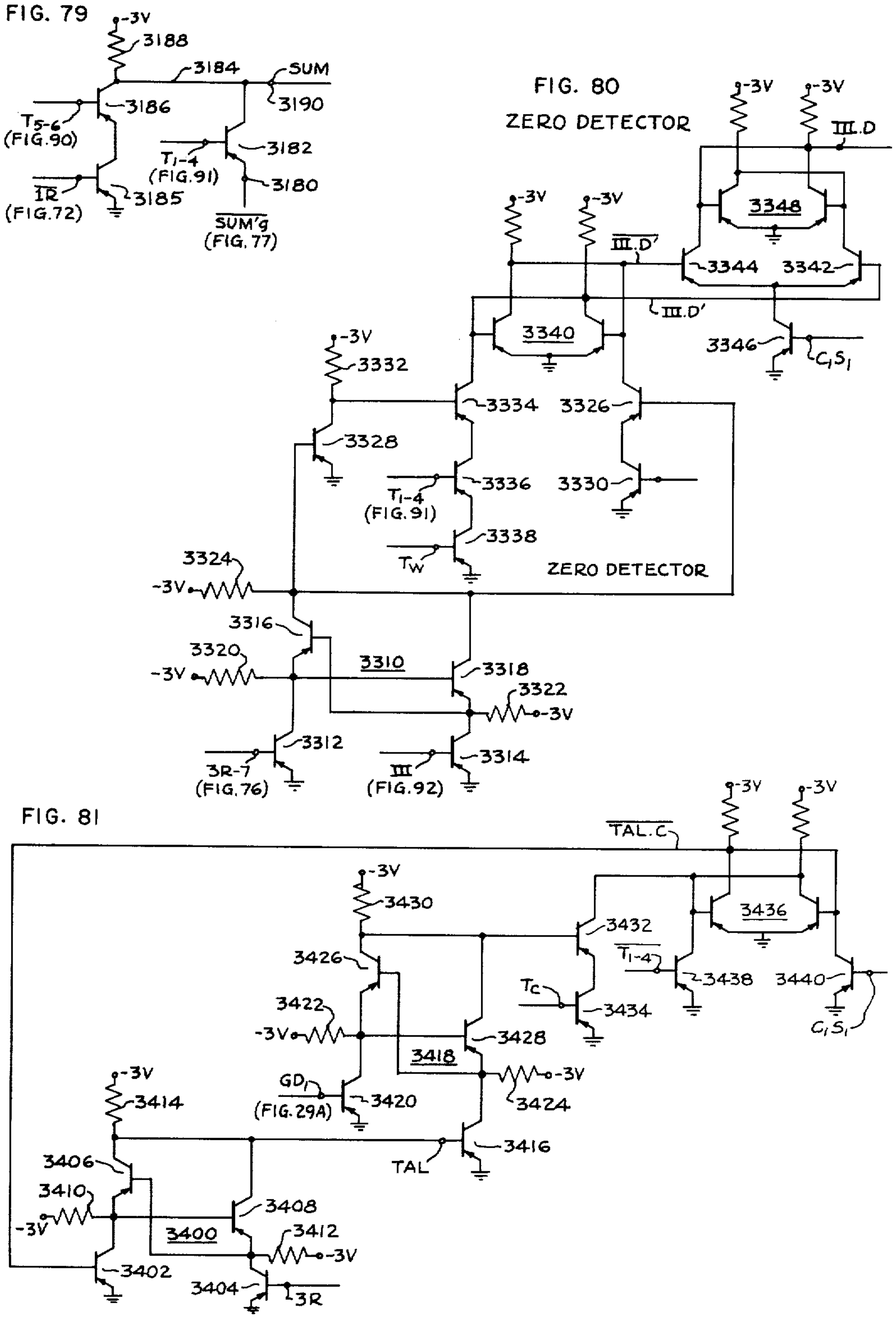
Figures 82, 83:
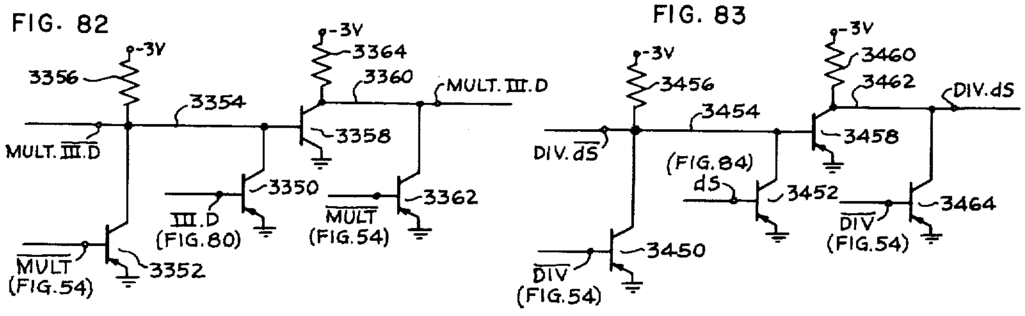
Figures 84, 85, 86:
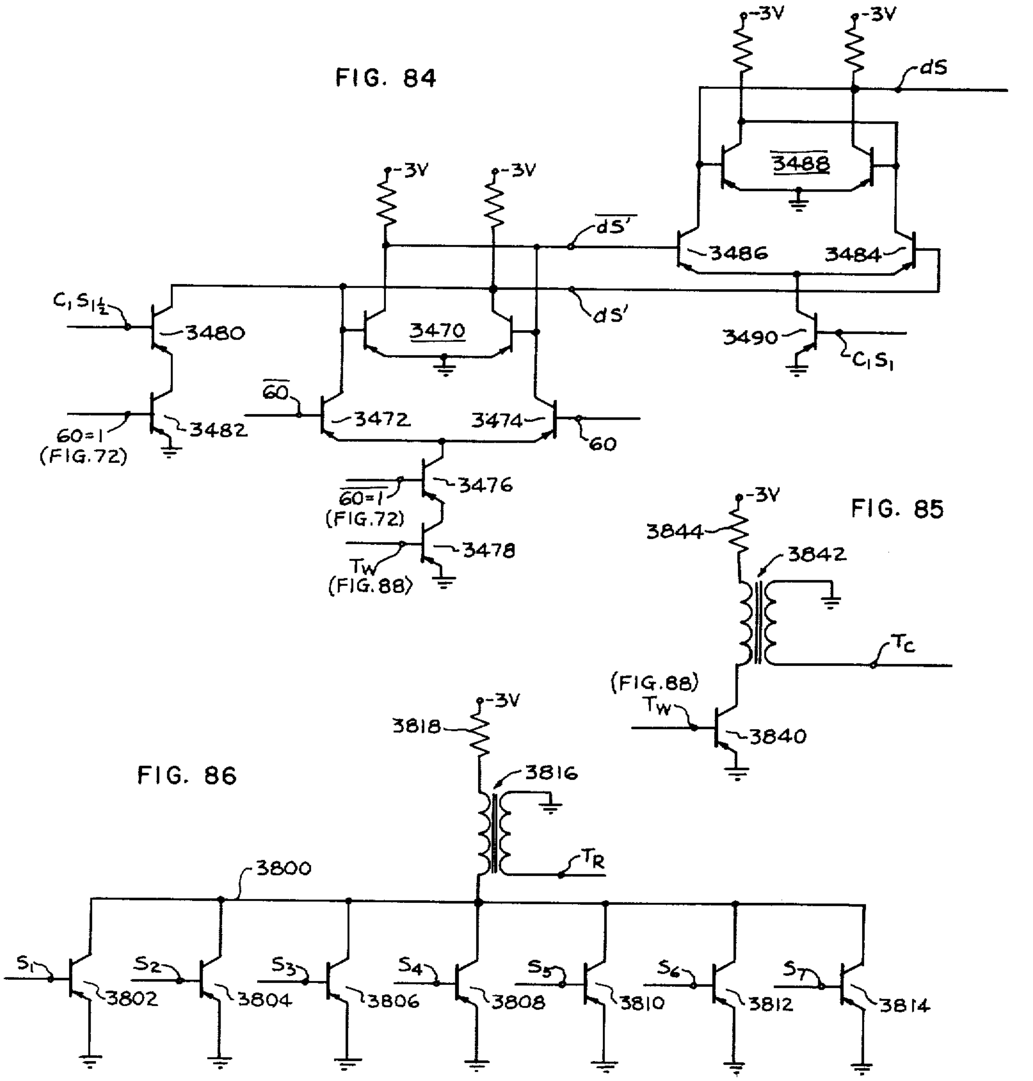
Figure 92:
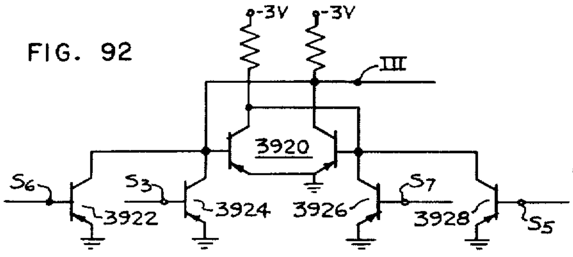
Figure 93:
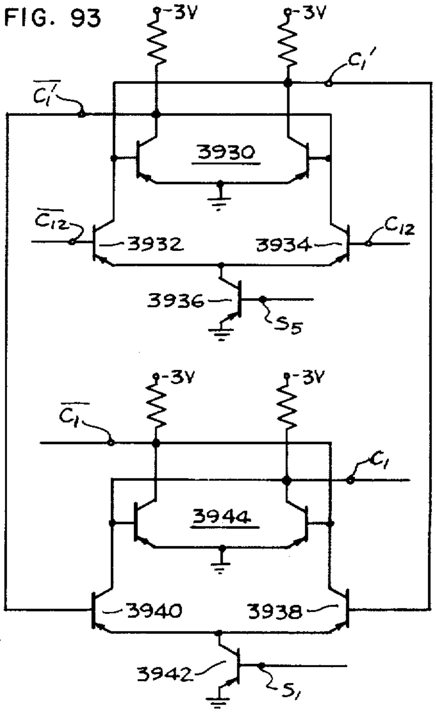

FIGURE 5 is a top plan view of a mechanical embodiment of the delay line assembly of FIGURE 4, this view showing a base supporting a plurality of magnetostrictive wires which are formed into two separate coils, with printed circuit panels being mounted at each end of the base which respectively contain the appropriate input and output circuitry, and which assembly also includes a pair of write heads at one end and a pair of read heads at the other end;

FIGURE 6 is a top plan view of the delay line similar to the view of FIGURE 5 but on an expanded scale and partially broken away, this latter view showing in somewhat more detail the read heads and the write heads, and the constructional details of various other components included in the assembly;

FIGURE 6A is a sectional view taken along the line 6A—6A in FIGURE 6;

FIGURE 6B is a sectional view substantially on the line 6B—6B of FIGURE 6A;

FIGURE 6C is a sectional view substantially on the line 6C—6C of FIGURE 6;

FIGURE 6D is an enlarged perspective view of an appropriate construction for an adjustable read head for inclusion in the assembly of FIGURE 5;

FIGURE 6E is a sectional view of a portion of the read head assembly shown in FIGURE 6D;

FIGURE 6F is a sectional view taken along the line 6F—6F of FIGURE 6E;

FIGURE 7 is a block diagram of the different components which make up the internal storage of the computer of the present invention, these components being in general a plurality of input and output buffers, an expandable memory, a plurality of eight-word block registers, and a plurality of one-word revolvers;

FIGURE 8 is a block diagram illustrating the various eight-word delay lines that may be used in the input and output buffers of FIGURE 7;

FIGURE 9 illustrates the plurality of eight-word delay lines which make up the eight-word block registers of the internal storage system of FIGURE 7;

FIGURE 10 shows a plurality of one-word revolvers which go to make up the one-word revolver components of the internal storage system of FIGURE 7;

FIGURES 11A and 11B represent a more detailed representation of the expandable storage memory of the system of FIGURE 7, this expandable memory including a plurality of eight-word delay line assemblies arranged in banks in a manner to be described;

FIGURE 12 is a schematic showing of the transfer of data between various components of the computer of the invention in response to different ones of a first series of commands in a typical program set up for the computer, these commands being designated for purpose of description as I, J and K;

FIGURE 13 also represents schematically the transfer of data between different components of the computer in response to a plurality of commands designated for convenience F, D, C, A, G and E;

FIGURE 14 indicates schematically the transfers of data in the computer in response to a command designated as Y;

FIGURE 15, in like manner, designates the transfer of data in response to a command indicated Z;

FIGURE 16 is a schematic representation of certain arithmetic instructions which may be utilized in the computer of the invention;

FIGURE 17 represents other instruction feeding in the computer in response to a series of commands designated · $\theta$ and P;

FIGURE 18 represents other instruction feeding in the computer of the invention in response to the command %;

FIGURE 19 represents a typical logic card utilized in the computer for a convenient mounting of logic circuitry, it being understood that a plurality of such cards are utilized in the computer and interconnected with one another to provide the logic required by the apparatus, this figure showing a top plan view illustrating the construction of a connector card suitable for supporting the transistors and other components included in the logic and other control circuitry of the computer of the invention;

FIGURE 20 is a bottom view illustrating the disposition of a plurality of leads on a second face of the connector card;

FIGURE 21 is an enlarged fragmentary sectional view substantially on the line 21—21 of FIGURE 19 and further illustrates the construction of the connector card shown in FIGURES 19 and 20 and the manner in which electric interconnections are made to various components including transistors supported on the connector card;

FIGURE 22 is an enlarged fragmentary sectional view substantially on the line 22—22 of FIGURE 19 and illustrates in further detail the manner in which electrical connections are made between the connector card and certain components supported on the card, such as resistors;

FIGURE 23 is an enlarged fragmentary sectional view substantially on the line 23—23 of FIGURE 19 and illustrates in further detail the manner in which voltage is applied to the various components including resistors;

FIGURE 24 is an enlarged sectional view substantially on the line 24—24 of FIGURE 19, and this view illustrates a particular electrical connection between one of the conductive leads shown in FIGURE 19 and one of the conductive leads shown in FIGURE 20;

FIGURE 25 is an enlarged fragmentary sectional view substantially on the line 25—25 of FIGURE 19, and this latter view illustrates in further detail the construction of certain leads for making electrical connections to sources external of the connector card;

FIGURE 26 represents logic circuitry which is used for deriving a term designated "60" which is the contents from a specified address;

FIGURE 27 is a circuit diagram of the command revolver No. 5 and its associated circuitry, this circuitry being utilized to circulate data in the revolver 5 or to write new data into the revolver or to read data out of the revolver;

FIGURE 28 is a circuit diagram which includes a plurality of flip-flops which function as order holders for commands shifted out of the command revolver 5;

FIGURES 29A–29F are individual circuits including respective flip-flops for receiving commands shifted out of the order holders of FIGURE 28;

FIGURE 30 is a circuit diagram of circuitry constituting command logic whereby various terms derived from the gate drivers of FIGURES 29A–29F are formed into composite terms for cascading purposes;

FIGURE 31 shows circuitry for deriving various terms used in the computer, including a term BRANCH which is used to bring a new address into the address revolver;

FIGURES 32A, 32B, 33, 34A, 34B, 35, 36, 37, 38, 39A, 39B, 40, 41 and 42 are different types of logic circuitry for deriving various command terms from the corresponding terms of the gate drivers referred to above;

FIGURE 43 is a circuit diagram of logic circuitry that may be used to derive a general command term WA which corresponds to a particular group of commands and for deriving a term 61 which represents the contents to be placed in a specified address;

FIGURE 44 represents logic circuitry that may be utilized to derive certain terms associated with the WA and 61 terms produced by the circuitry of FIGURE 43;

FIGURE 45 is a representation of suitable control circuitry for deriving an error signal which is utilized to indicate that an error has taken place;

FIGURE 46 represents the circuitry and components of an address revolver used in the computer of the invention, this circuitry permitting data to be read into or out of the revolver or to be circulated within the revolver;

FIGURE 47 is a designation of suitable circuitry constituting a plurality of address holders for receiving each address shifted out of the address revolver assembly of FIGURE 46;

FIGURES 48A–48E are individual flip-flop circuits for receiving the different digits of each address from the address holder circuitry of FIGURE 47, these latter circuits being designated as spacial gate drivers;

FIGURES 49 and 50 are logic diagrams whereby the digits of the different addresses placed in the spacial gate drivers are utilized to form gating signals in correspondence with the different addresses represented by these digits;

FIGURES 51–53 represent various logic circuit diagrams which are used to form prime functions, these prime functions occurring slightly before their corresponding functions, as will be described;

FIGURE 54 is a representation of suitable logic circuitry for forming different arithmetic commands used in the computer of the invention;

FIGURE 55 is a circuit diagram of a temporal detector which is used in the computer for timing the transfer of certain data within the apparatus;

FIGURE 56 is a comparator for comparing certain address designations with a count signal for timing purposes;

FIGURE 57 is a circuit diagram for producing the term FIN which occurs at the termination of the execution of any command;

FIGURE 58 represents control circuitry for providing a GO signal which controls the transfer of data between the address holders and other holders mentioned above and the corresponding date drivers, this circuitry also providing a recirculating command which is used for a skip operation;

FIGURE 59 is a flip-flop circuit by which a shift term is formed which controls the shifting of data from the revolvers into their associated holder circuits;

FIGURES 60–67 are individual block register assemblies utilized in the computer for storing eight-word blocks of data, each of these registers having associated circuitry for writing new data into the corresponding register, for reading data out of the corresponding register, or for circulating data in the register;

FIGURE 68 is a logic circuit diagram in which general terms associated with the block registers are developed;

FIGURE 69 is also a logic circuit diagram by which other general terms associated with the block registers are developed;

FIGURE 70 is a chart showing the flow of data from an addressed location in response to a particular instruction into a destination specified by that instruction;

FIGURE 71 is a flow chart of certain data from revolver 1 or from the adder of the computer to a specified address in response to one of a group of particular instructions;

FIGURE 72 is a comparator network which is included in the computer and which performs certain functions in response to test commands, as will be described;

FIGURE 73 is a network for deriving masking signals for masking unwanted command characters;

FIGURE 74 is a representation of the data revolver 1 and of the circuitry associated with that revolver;

FIGURE 75 is a representation of the data revolver 2 and its associated circuitry;

FIGURE 76 shows the data revolver 3 and its associated circuitry;

FIGURE 77 is a circuit of binary adder used for performing the arithmetic operations of addition and subtraction;

FIGURE 78 is a carry circuit associated with the adder of FIGURE 77;

FIGURE 79 is a network for adding certain identifying binary bits to the numbers formed by the circuitry of FIGURES 77 and 78;

FIGURE 80 is a circuit included in the computer for controlling the multiplication process;

FIGURES 81 and 82 are circuit representations of further networks utilized in the computer for performing the multiplication process;

FIGURE 83 is a circuit utilized in the computer for performing the arithmetic operation of division;

FIGURE 84 is a network which is utilized in conjunction with the circuit of FIGURE 83 in performing division;

FIGURES 85–91 are circuits for forming certain timing signals which are utilized by the computer to be described;

FIGURE 92 is a generator circuit for producing decimal zeros which are also used by the computer;

FIGURE 93 is a representation of further circuitry for forming timing signals required by the computer;

FIGURE 94 is a counter circuit for providing a character count for the data circulating serially through the computer;

FIGURES 95 and 96 represent respective circuits for forming still further timing signals required by the computer of the invention; and FIGURE 97 is a circuit for forming a term used for performing a computer function which will be described.

The digital data utilized by the computer of the invention is formed of a plurality of individual blocks. A block of data is the greatest quantity that is transferred within the computer at any one time. Each block is made up of eight words, with each word being constituted by twelve 7-bit characters.

A clock signal $T_C$ (FIGURES 1A, 1D) is generated in the computer and this clock signal has a negative going pulse which occurs once for every bit time. In addition to the clock signal $T_C$, a pair of clock signals $T_W$ and $T_R$ are also developed within the computer. The $T_R$ clock signal is the read clock and its negative pulses occur just prior to the corresponding pulses of the $T_W$ clock signal, the latter clock signal being the write clock signal. The write clock signal $T_W$ occurs just prior to the clock signal $T_C$. The use of the three clock signals permits data to be read, processed and written within a single clock interval.

Figure 1A:
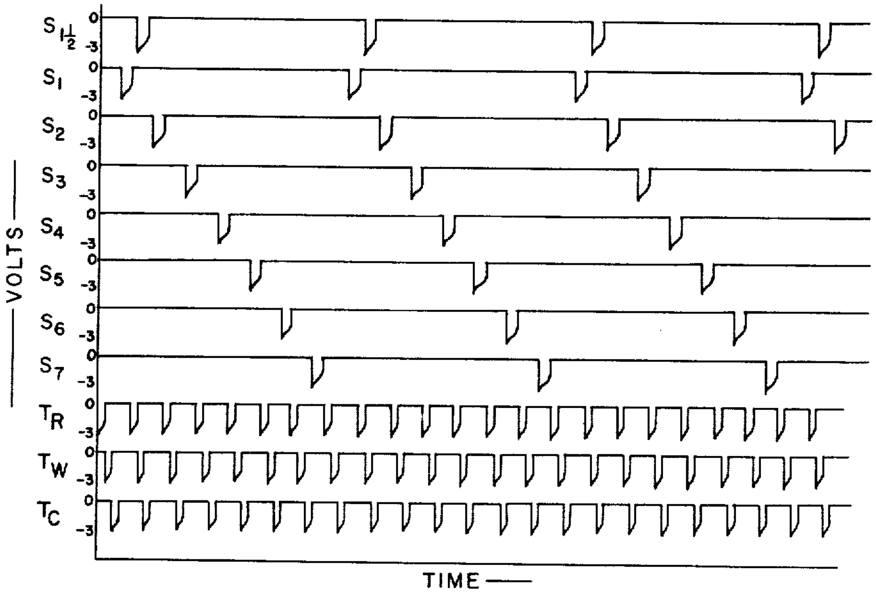

A series of signals $S_1$–$S_7$ are also developed in the computer, these signals being shown, for example, in FIGURE 1A. The signal $S_1$ has a negative pulse which occurs at the first bit time of each character, the signal $S_2$ has a series of negative pulses which occur at the second bit time of each character, and so on. A signal $S_{1\frac{1}{2}}$ is also developed, and this latter signal has pulses which occur between the first and second bit times of each character, as shown in FIGURE 1A.

Figure 1D:
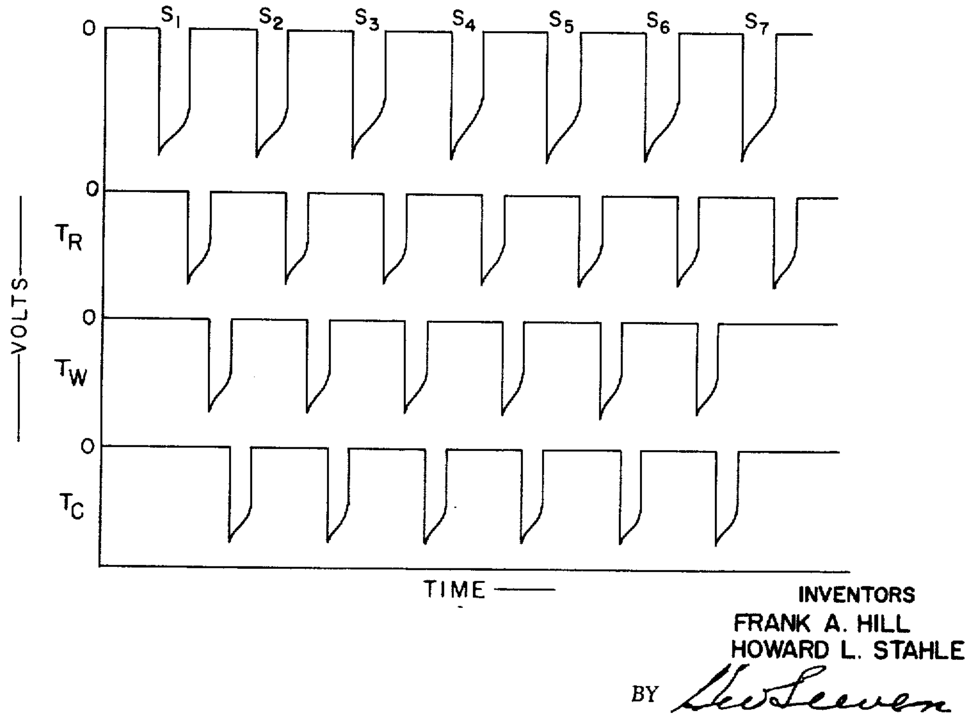

The relation between the different S signals and the $T_R$, $T_W$ and $T_C$ signals is shown in FIGURE 1D. It will be observed from FIGURE 1D that the $T_R$ signal has the leading edge of each of its negative pulses corresponding to the trailing edge of the corresponding S signal pulse, whereas the $T_W$ signal has the leading edge of each of its pulses corresponding to the trailing edge of the corresponding $T_R$ pulse. Finally, the $T_C$ pulses have their leading edges occurring in time coincidence with the trailing edges of the respective $T_W$ pulses, and the trailing edges of the $T_C$ pulses occur in time coincidence with the leading edge of the next S pulse.

Figure 1B:
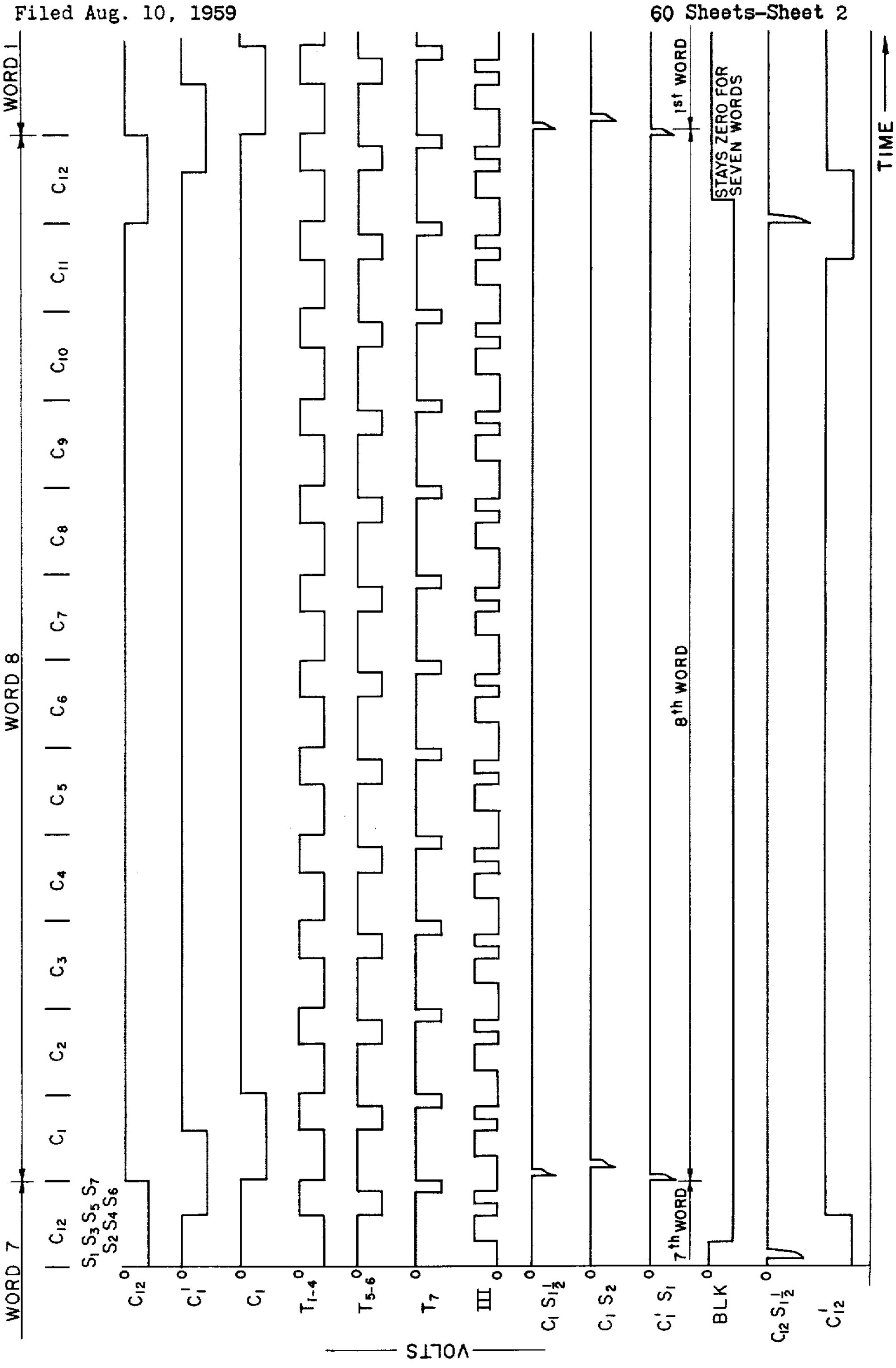

The curves of FIGURE 1B show a series of timing signals as they occur, for example, during the eighth word time of a block of data. It will be remembered that each word is made up of twelve characters, and the signal $C_{12}$ has a negative pulse component which occurs at the time of the twelfth character of each word. In like manner, the signal ($C_1$) has a negative component which occurs at the first character time of each word. The signal ($C'_1$) is similar to the signal ($C_1$) with the exception that the former is shifted forward in time by several bits with respect to the latter.

A signal ($C_1.S_{1\frac{1}{2}}$) is also developed, and this signal has a negative spike between the first and second bit times of the first character of each word. Likewise, the signal ($C_1S_2$) has a negative spike during the second bit time of the first character of each word, and the signal ($C'_1S_1$) has a negative spike which occurs just before the first bit time of the first character of each word. Likewise, the signal $C_{12}S_{1\frac{1}{2}}$ has a negative spike that occurs between the first and second bit times of the twelfth character of each word.

As illustrated in FIGURE 1B, the signal (BLK) goes negative between the second and third bit time of the twelfth character of the seventh word and returns to zero between the second and third bit time of the twelfth character of the eighth word. The signal BLK then stays zero for seven words to return negative during the twelfth character of the seventh word.

A signal $T_{1-4}$ is also developed, and this signal goes negative from the first to the fourth bit time of each character of each word. Likewise, a signal $T_{5-6}$ is produced in the computer, and this latter signal goes negative for the fifth and sixth bit times of each character of each word. A signal $T_7$ is developed which goes negative for the seventh bit time of each character of each word. A decimal zero signal III is also developed and this signal is controlled to be negative for a first and second bit times of each character of each word and for the fifth bit time of each character of each word.

A character count signal is also developed within the computer, and this signal is represented by the table of FIGURE 1C. This signal is designated as the "CA" signal and it is used to identify each character of each word in the block. The character count signal CA is produced in a manner to be described. This signal is constituted by a 7-bit code, and the signal has a negative component for each bit when that particular bit is a one. The four bits to the right of each component of the CA signal, as represented by the table of FIGURE 1C, represent the character number of the corresponding character, and the three bits to the left of the table represent the word in which the particular character is located.

For example, at the beginning of each block of data, the first character of the first word is designated by the term 1000110. Of this term, the portion 0110 represents the first character of any word, and the portion 100 represents the first word. In like manner, the second character of the first word is represented by the designation 1001110, and so on. It will be seen, therefore, that each chartcer of the CA signal has a different designation corresponding with the different characters of the different words throughout the 8-word block. In each instance, however, the four right-hand bits are the same for any particular character regardless of the word in which that character happens to appear, and the three left-hand bits are the same for any particular word regardless of the character time in that word. However, the shift from one word to the next is made between the eleventh and twelfth characters of the preceding word. The reason for this will become evident as the description proceeds.

The code designations of the table of FIGURE 2 of the number commands and addresses used in the computer of the invention are merely an arbitrary allocation of certain 6-bit binary numbers. Certain ones of the binary numbers of the code of FIGURE 2 are used to control the input and output units which are used in conjunction with the computer. For example, and as indicated, certain of the multi-digit binary numbers listed in the table of FIGURE 2 represent characters such as "line feed," "space," "carriage return," "EOM," "void," "tabulate," "U.C.," "L.C."

The "line feed" character is entered on the paper tape of a paper tape reader input device, for example, when the platen of the line typewriter is turned; and this symbol is used to control the platen of a usual typewriter type of output reading device. Likewise, the "space" character is used to indicate or control a "space" movement of the input or output device, and the "carriage return" symbol indicates or controls the return of the carriage of the associated input or output device. In like manner, the "void" symbol will void all the characters of the preceding word into the computer, and this symbol is punched into the paper tape upon the depression of the "void" key of the input device. Whenever the input device is recording lower case symbols on the tape, these are identified by the "L.C." character. In like manner, the upper case symbols are identified by the "U.C." character. The "L.C." and "U.C." characters are also used to exert a control on the output reading device so that the controlled symbols of the output device appear either as upper case, which ever is desired.

In like manner, the symbol for "tabulate" serves as an "end of word" marker on the paper tape whenever the "tab" key of the input device is actuated, and the "EOM" symbol is used as an end of message marker. The "number" commands and addresses range from $\phi$ to 9, and an additional address or command represented by the symbol "%" is also included.

The "alpha" command and address code is represented by the table of FIGURE 3. The symbols for different ones of these addresses and commands extend through the normal alphabet, and in order to extend the code, other symbols usually found on a typewriter keyboard are also utilized. It will be noted that the alpha commands extend through the alphabet and also include the symbols ., —, $, @, and ,.

In the table of FIGURE 3, different 6-bit multi-digit binary numbers are used to indicate each of the different alpha addresses or commands, and in each instance the least significant bit of corresponding binary number is at the right.

As mentioned briefly above, all the internal storage of the embodiment of the invention which will be described is achieved by magnetostrictive delay line assemblies. For an eight-word register block, for example, a pair of magnetostrictive delay lines, each with an eight-word delay, is used; with appropriate circulating logic being provided to maintain the data in the register until new data is fed into the register or until the present data is removed from the register. In like manner, the one-word revolvers include a one-word pair of magnetostrictive delay lines (each with a 1-word delay time) and associated circuitry to permit one word of data to circulate, or to allow data to be inserted into the revolver or to be removed from the revolver.

A typical magnetostrictive delay line assembly for use as the various registers and equivalent components of the invention is shown in FIGURE 4. Certain minor differences appear in the differential assemblies depending upon the different uses to which they are put. For example, the circuitry of FIGURE 4 includes a read flip-flop. However, in certain ones of the eight-word block registers and in certain ones of the one-word revolvers, the read flip-flop appears elsewhere in the logic circuitry. However, with the exception of these and certain other minor differences, which will be brought as the description proceeds, the assembly of FIGURE 4 may be used in any of the registers or other storage components of the computer of the invention.

The assembly of FIGURE 4 includes a first magnetostrictive delay line 10 and a second magnetostrictive delay line 12. These delay lines may, for example, be composed of a nickel-iron wire, such as is presently marketed by the Sylvania Corporation and designated by them as their No. 4 type. The mechanical details of the delay lines 10 and 12, and the manner in which they may be appropriately supported, will be further discussed in conjunction with FIGURES 5 and 6.

A write head 14 is supported at one end of the delay line 10. This write head includes a usual coil which surrounds a portion of the delay line, and it also includes a permanent magnet 16. The permanent magnet is positioned adjacent the coil and extends parallel to the longitudinal axis of the coil. The magnet is longitudinally magnetized and functions as a biasing means. Only those pulses through the coil 14 having the proper amplitude and polarity to overcome the permanent magnet field, produce any effect in the delay line 10. Such pulses which have the appropriate polarity and amplitude, produce an additional magnetism in the delay line which, in the manner described, causes a compression pulse to be formed in the delay line and to travel down the delay line from the left to the right in FIGURE 4.

One side of the coil of the write head 14 is connected to the common junction of a resistor 18 and of a grounded capacitor 20. The resistor is connected to the negative terminal of a direct voltage source of a value of, for example, 3 volts. The resistor may have a resistance of 2.2 kilo-ohms, and the capacitor may have a capacity of .04 microfarad. The other side of the coil of the write head 14 is connected to the collector of a transistor 22. The transistor and its associated circuitry constitute the write amplifier 23 for the delay line 10. The emitter of the transistor 22 is grounded, and the base of the transistor is connected to an input terminal 24.

A circuit similar to that described in the preceding paragraph, and including a transistor 26, is associated with the delay line 12. The transistor 26 is connected as the write amplifier 27 for the latter delay line, and its base is connected to an input terminal 28. The emitter of the transistor 26 is grounded, and the collector of the transistor is connected to a write head 30. The write head 30 may be constructed and connected in a manner similar to the write head 14, and its coil surrounds the end portion of the delay line 12.

A pair of transistors 32 and 34 are connected into a usual flip-flop circuit 33. Flip-flops are well known to the electronic computer art. These units are in the form of bi-stable relaxation oscillators. Each flip-flop has a pair of input terminals and a pair of output terminals. A negative-going pulse applied to the left input terminal of the flip-flop triggers it to a true, or one, state so that zero voltage appears at its left output terminal and a negative voltage appears at its right output terminal. In like manner, a negative-going pulse applied to the right input terminal of the flip-flop triggers it to a false, or zero, state in which zero voltage appears at its right output terminal and a negative voltage appears at its left output terminal. The flip-flop is bi-stable in that it will remain in either of its true or false states until it is triggered to the other.

The flip-flop 33 is triggered to a true state under the control of a transistor 36 whose collector is connected to the base of the transistor 32. Likewise, the flip-flop is triggered to a false state under the control of a transistor 38 whose collector is connected to the base of the transistor 34. The transistors 36 and 38 are connected into an "and" gate network with a transistor 40, and are effective only when the transistor 40 is conductive. The collector of the transistor 40 is connected to each of the emitters of the transistors 36 and 38, and the emitter of the transistor 40 is grounded.

Only upon the occurrence of a negative-going clock pulse $T_W$ introduced to the base of the transistor 40 are the emitter circuits of the transistors 36 and 38 completed. Therefore, when a binary write signal $W_0^1$ introduced to the base of the transistor 36 goes negative to indicate a binary 1, the next negative-going clock pulse $T_W$ introduced to the base of the transistor 40 will cause the flip-flop 33 to be triggered to a true state. The write signal is introduced with inverted phase ($W_1^0$) to the base of the transistor 38 to cause the flip-flop 33 to be triggered from a true state to a false state as timed by the clock pulses $T_W$, each time the original write signal remained at zero to represent a binary zero. The collector of the transistor 34 is connected to the input terminal 24, and the collector of the transistor 32 is connected to the input terminal 28.

The write signal introduced to the base of the transistor 36, and to the base of the transistor 38, will go negative in correspondence with each binary one and will go zero for each binary zero of the characters fed serially into the write flip-flop 33. Then, and at times dictated by the clock pulses $T_W$ introduced to the base of the transistor 40, for a binary one input, the transistor 32 is pulsed to trigger the flip-flop 33 to a true state in which the potential at the terminal 28 rises from a negative value to zero. It is apparent that succeeding binary one inputs will have no effect on the system because the flip-flop 33 remains in its true state until a binary zero occurs. When a binary zero input occurs, the resulting conduction of the transistors 38 and 40 at the proper clock time causes a negative signal to be introduced to the base of the transistor 34 to trigger the flip-flop 33 to a false state. This causes the potential at the terminal 28 to return to a negative value, and the potential at the terminal 24 to rise from a negative value to zero.

The write amplifiers 23 and 27 are constituted to pass currents through the coils of their associated write heads. These currents set up a flux which overcomes the bias flux of the associated permanent magnets and a current flows through one of the write heads whenever the potential introduced to the base of the transistor 22 or the transistor 26 drops to a negative value from zero so as to render the corresponding transistor conductive. Therefore, for a first binary one of the input signal, a compressive pulse is caused to travel down the delay line 12, but successive binary ones have no further effect until the occurrence of a binary zero. The first binary zero of the input data then causes a compressive pulse to travel down the delay line 10. In this manner, a group of pulses travel down the delay line 12 in correspondence to each binary one of the input data following a binary zero. Conversely, a plurality of compressive pulses travel down the delay line 10 in correspondence to each binary zero of the input data following a binary one.

A pair of read heads 50 and 52 are mounted at the other end of respective ones of the delay lines 10 and 12. Each of these read heads has its coil surrounding the end portion of its corresponding delay line, and one side of each of these coils is grounded.

An appropriate damping body 54 is placed at both extremities of each of the delay lines 10 and 12 to prevent any reflections of the compressive pulses from being introduced back into the delay lines. The read heads 50 and 52 are made adjustable along the respective delay lines 10 and 12 so that the pulses read by these heads may correspond to the occurrence of the corresponding clock pulse $T_R$.

The other side of the coil of each of the read heads is connected to an appropriate read amplifier. That is, a read amplifier 56 is associated with the head 50, and a read amplifier 58 is associated with the head 52. Both these read amplifiers may have a similar construction, so that only one will be described, namely the read amplifier 56.

The read amplifier 56 includes a first transistor 60 whose emitter is connected to the other side of the coil of the read head 50. The base of the transistor 60 is connected to the common junction of a resistor 62 and of a grounded capacitor 64. The capacitor may have a capacity of 1 microfarad, for example, and the resistor may have a resistance of 1 kilo-ohm. The collector of the transistor 60 is connected to a kilo-ohm resistor 66 which, in turn, is connected to the negative terminal of the 3 volt direct voltage source. The collector of the transistor 60 is also connected to the base of a grounded emitter transistor 68. The collector of the transistor 68 is connected to a 2 kilo-ohm resistor 70 which, in turn, connects with the negative terminal of the 3 volt direct voltage source.

The collector of the transistor 68 is connected to the base of a transistor 72. The emitter of this latter transistor is grounded, and the collector of the transistor 72 is connected to a resistor 74. The resistor 74 has a resistance of 2 kilo-ohms, for example, and it is connected to the negative terminal of the 3 volt direct voltage source. The collector of the transistor 72 is connected to the base of a transistor 76. The emitter of the latter transistor is grounded, and its collector is connected to one side of the primary winding of an output pulse transformer 78. The other side of the primary winding is connected back to the resistor 62. One side of the secondary winding of the pulse transformer is grounded, and the other is connected to an output terminal 80. In like manner, the pulse output transformer 82 of the read amplifier 58 has the ungrounded side of its secondary connected to an output terminal 84.

The transistors referred to subsequently, may all be of the usual PNP type. For example, transistors such as those presently being marketed by the Philco Corporation or Sprague Company and designated by them as SB102 may be used.

The output terminals 80 and 84 may be connected respectively to the right and left input terminals of a flip-flop 85 made up of a pair of transistors 86 and 88 and their usual associated flip-flop circuitry. This flip-flop, as noted above, is included with the read amplifier circuitry in some of the delay line assemblies of the computer, and this flip-flop is included in other logic circuits for other delay line assemblies. The emitters of the transistors 86 and 88 are connected together and to the collector of a transistor 90. The emitter of the latter transistor is grounded, and clock signal $T_R$ is applied to its base.

It is apparent that, whenever a compressive pulse corresponding to a binary one input travels down the delay line 12 and is read by the read head 52, such pulse is amplified by the read amplifier 58 and the amplified pulse triggers the flip-flop 85 to a true state as timed by the clock pulses $T_R$ at the base of the transistor 90. Likewise, a compressive pulse read by the read head 50 triggers the read flip-flop 85 to a false state.

The read heads 50 and 52 sense the compressive pulses in their delay lines because of the change in flux threading the coils of these read heads by their associated permanent magnets 92 and 94 when the compression of the respective delay lines changes. It follows therefore that each time the write flip-flop 33 is triggered to a true state, the read flip-flop 85 will be triggered to a true state after a predetermined time delay. Likewise, each time the write flip-flop 33 is triggered to a false state, the read flip-flop 85 will also be triggered to false after the predetermined delay. In certain of the delay line assemblies used in the computer, this delay corresponds precisely to eight-word times, and in others the delay corresponds precisely to one-word time. As will be described, logical circuitry is connected to the write and read flip-flops 33 and 85 in each delay line assembly to permit either a circulation of data already in the delay line assembly, or to permit the shifting in of new data or the read out of the data in the assembly.

The output signals from the read flip-flop 85 are designated as $W_R$ from the left output terminal as $\overline{W}_R$ from the right output terminal.

The mechanical details of one suitable embodiment of the delay line assembly of FIGURE 4 are shown in FIGURES 5, 6, 6A, 6B, 6C, 6D, 6E and 6F. The assembly of FIGURES 5, 6 and 6A–6F includes an elongated base 100 composed of any suitable material such as, for example, an aluminum alloy. The base 100 may have a rectangular cross section and it has a plurality of extremely thin longitudinal channels extending, for example, from a base line X to a base line Y. The thickness of the base 100 may, for example, be of the order of ½", and the depth of the channels may be of the order of ⅜". Moreover, the channels may have a thickness of 1/32". In the illustrated embodiment, there are twenty of these 1/32" channels; with nine of the channels being used for the delay line 10, and with nine of the channels being used for the delay line 12. The first group of channels is indicated as 102 (FIGURE 6), and the second group is indicated as 104 (FIGURE 6). In addition, the base has a first outer channel, designated as 106, which may have a width of 1/16", and the base has a second outer channel 108 which also may have a width of 1/16". Moreover, the base has a first inner channel 110 on the same side as the channels 102 of the center line, and it has a second inner channel 112 on the other side of the center line. The channels 110 and 112 also may have a width of 1/16".

All the channels in the base may have the same depth, and they are all parallel to one another. As noted above, the delay lines 10 and 12 may be composed of Sylvania No. 4 soft nickel-iron wire, and these lines may have a diameter of .016 inch.

The delay line 10, for example, has a first length extending from the left in FIGURE 5 along the outer channel 106 and through the write head 14. This first length of the delay line is welded to a second length of delay line, and this second length extends down the adjacent channel 102 back to the left in FIGURES 5 and 6. This second length is welded to a third length of delay line, and the third length extends back through the next adjacent channel to the right in FIGURES 5 and 6. In like manner other lengths are welded at their ends to one another and extend back and forth through the channels 102.

The second-to-last length of the delay line extends to the left in FIGURES 5 and 6 through the one of the channels 102 which lies adjacent the channel 110. This length of the delay line extends through the read head 50, and it is then welded to a last length which extends to the right in FIGURE 5 along the inner channel 110 to be secured at its right extremity to the right hand end of the base.

Likewise, the first length of the delay line 10 which extends through the channel 106 is secured at its left extremity to the left hand end of the delay line base. It will be noted that the walls between adjacent pairs of the channels 102 are terminated at the base lines X and Y. This permits the adjacent pairs of delay line lengths to be brought out in double channels beyond these base lines and welded together in the illustrated manner.

A felt pad 116 (FIGURE 6C) composed, for example, of 50% rayon and 50% wool, is placed under the delay line in each of the double channels to the left of the base line X. Similar felt pads are placed under the delay line in the double channels to the right of the base line Y. In like manner, felt pads 120 are placed at spaced positions in each of the channels 102 and 104 underneath the corresponding delay line lengths in those channels. In addition, felt pads, such as the pads 122 in FIGURE 6B are placed at spaced positions over the delay lines in these channels 102 and 104.

The channels 106 and 110 are filled with a potting compound 107 (FIGURE 6A) which functions as a damping means 54 (FIGURE 4) for the lengths of delay line in these channels. This, as discussed above, is to provide an appropriate damping medium for the compression waves set up in the delay line so as to prevent reflections of these waves from being introduced into the delay lines. A suitable compound for this purpose is the one presently being marketed by the Dow Corning Corporation and designated by them as their No. 4 compound.

In the same manner as described above in conjunction with the delay line 10, successive lengths of the delay line 12 extend back and forth through the channels 104 in the base 100 and are supported by felt pads, similar to the pads 122 and 120 in FIGURE 6B in those channels. Also, the outer and inner lengths of the delay line 12 extend respectively in the channels 108 and 112, and these grooves also are filled with a damping potting compound.

As noted previously, the read heads 50 and 52 are movable with respect to their respective delay lines 10 and 12 so that the pulses read by them may be made to correspond to the corresponding clock pulse $T_R$ in each instance. These read heads are composed, for example, of an aluminum alloy casing which, in the case of the read head 50 is designated as 150 in FIGURES 6D, 6E, and 6F. This casing is supported on a bracket 152 by means of a screw 155. The bracket is supported on the base 100 by means of a pair of screws which extend through holes 155 and 156, and the bracket is so oriented on the base that the screw 154 extends in spaced parallel relation with the length of delay line 12 extending through the read head.

The screw 154 is threaded into the casing 150 and is rotatable by means of a knurled knob 158. When this knob is rotated, the casing 150 of the read head is moved back and forth along the screw 154. A leaf spring 160 is riveted to the bottom of the casing 150 by means of an appropriate rivet 162. This spring has a pair of legs which resiliently engage the lower portion of the bracket 152, and the spring serves to bias the casing 150 and to cause it to be supported in a firm but resilient manner.

The coil assembly 164 of the read head 50 is wound on an appropriate tubing 166 which may be composed of any suitable insulating substance such as Teflon. The tubing 166 is supported in the casing 150 in coaxial relationship with the length of delay line 12 which extends through the read head. As the casing 150 is moved back and forth due to the rotation of the screw 154 by the knob 158, the tubing 166 and its supported coil assembly 164 are caused to move back and forth on the delay line 12. It is clear, therefore, that the position of the coil assembly 164 may be adjusted with respect to the delay line 12 by rotating the knob 158. The permanent magnet of the read head is designated as 168 in FIGURE 6, and this permanent magnet is supported by the casing 150 in spaced parallel relationship from the coil assembly 164.

It will be understood that the read head 52 may be constructed in a manner similar to the construction of the read head 50 described in the preceding paragraphs.

The circuitry and components of the read amplifier 56 and the circuitry and components of the read amplifier 58, as well as the transistors and circuitry of the read flip-flop 85 of FIGURE 4, are supported on a printed circuit panel 170 (FIGURES 5 and 6). This printed circuit panel is fabricated in accordance with well known printed circuit methods and techniques. The panel is supported on the base 100 at the left hand end of the delay line assembly in FIGURES 5 and 6. The appropriate connections are made between the printed circuit panel 170 and the read heads 50 and 52 as shown in FIGURES 5 and 6.

A terminal strip assembly 176 in the form of a receptacle is mounted at the left extremity of the unit in FIGURE 5. This receptacle includes a plurality of individual contacts 178 which are supported in a terminal board 180. All the electrical connections for the unit are brought to this terminal board, and convenient connection is made by a mating plug which serves to connect the components of the unit to the logic control circuitry of the computer.

As noted previously, the write heads 14 and 30 are fixed, and these write heads are supported on the base 100 in the positions shown in FIGURES 5 and 6. The write heads 14 and 30 are similar in their construction to the read heads and, for that reason, are not shown in detail. However, the write heads do not include the adjustable mechanism of the read heads. Each write head may include a casing of aluminum alloy, and this casing serves to support an insulating tube in coaxial relation with the corresponding length of delay line 12. The coil assembly of the head is mounted on this insulating tube, and its permanent magnet is supported by the casing in spaced relationship with the coil assembly.

The transistors 22 and 26 and their associated circuitry, as well as the write flip-flop transistors and circuitry are supported on a printed circuit panel assembly 192 (FIGURES 5 and 6.) This latter assembly is supported to the extreme right of the delay line unit. The required electrical connections are made to the write heads 14 and 30 from the printed circuit panel assembly 192, as shown in FIGURES 5 and 6. Necessary connections also extend through the unit from the terminal strip 176 to the circuitry of the printed circuit panel 192.

The components which provide the inner storage for the computer of the invention are shown in block form in FIGURE 7. These components include a plurality of 8-word input and output buffers 250 which will be described in more detail in conjunction with FIGURE 8. Also, the computer includes a plurality of eight-word register blocks which are represented by the block 252 and which will be described in conjunction with FIGURE 9. The computer also includes a plurality of one-word revolvers, designated by the block 254, which are shown in more detail in FIGURE 10. Finally, the computer includes an expandable storage memory 256 shown in FIGURE 11.

As will become evident as the present description proceeds, each of the storage components listed above may be made up of a delay line assembly similar to the assembly described in conjunction with FIGURES 4, 5 and 6. The input and output buffers 250, for example, may include a plurality of eight-word delay line assemblies, and the number of these assemblies as mentioned above may be tailored to the individual needs of the different constructed embodiments of the computer. The eight-word block registers 252 include eight of the eight-word delay line assemblies, and the one-word revolvers 254 include six of the one-word delay line assemblies. Also, the expandable memory 256 includes a variable number of eight-word delay line assemblies, some of which may have a particular construction, as will become evident from the description of FIGURE 11.

As shown in FIGURE 8, the input and output buffers may include a plurality of eight-word delay line assemblies and any number up to thirty-two, for example, may be used. For a normal installation, however, seven or eight of these buffers will be used. Each of the eight-word delay lines of the input and output buffers is designated by a different alpha address, and each address is designated by a different binary number in accordance with the code tabulated in FIGURE 3.

The input and output buffers are controlled in a manner to be described to have a "computer mode" whereby they are placed in a state in which they are able to feed data into the computer or receive data from the computer. The input and output buffers also have an "input-output mode" whereby they are placed in a state in which they are adapted to receive information from an associated input device, or to feed information to an associated output device. An "H" command, for example, in the computer to be described given with the address of a particular buffer, will cause the eight-word delay line of that buffer to be cleared to decimal zeros, and will condition the selected buffer to its input mode. This starts the input device reading into the buffer. This input device may, for example, be a typical paper tape reader. A one-word delay line is usually interposed between the reader and the buffer. As each character from the paper tape reader is read, its seven bits are fed serially into the one-word delay line, with the previous contents of the 1-word delay line being shifted left one character position. This continues until an entire word is read into the 1-word delay line. Then when the character "tabulate" of the code shown in FIGURE 2 is read, the contents of the one-word delay line are transferred to the low order word position of the buffer into which the data is to be fed. The previous contents of low order position of the buffer are shifted to the left by one-word position. The one-word delay line is then filled with twelve decimal zeros and is ready to receive the next word. The "tabulate" character itself is not recorded in the buffer.

A system for carrying out the above operation is described and claimed in co-pending application S.N. 22,465, filed April 15, 1960, in the name of Frank A. Hill, et al. The described system permits a word-by-word transfer from the input device into the eight-word buffer, even though a particular word does not have a complete complement of twelve characters. A shift takes place from the one-word delay line into the corresponding input buffer upon receiving the "tabulate" designation, even though the particular word does not have a full twelve characters, with the void characters each being represented by a decimal zero. Then, the next word to enter the input buffer shifts the previous word to the adjacent word position and occupies the next word position. When the input device feeds words with a complete twelve-character complement into the computer, the tabulate signal does not appear and the shift from the one-word delay line into the corresponding input buffer is automatic.

At the completion of a full block of data from the tape reader input device and when the selected input buffer is loaded, the carriage of the tape reader returns and this produces the "carriage return" character (FIGURE 2) which stops the tape. The return of the tape reader carriage also changes the loaded buffer from its "input" mode to the "computer" mode, and the receipt of the proper instruction will load the block of data from the buffer into a designated one of the eight-word block registers 252. This does not destroy the contents of the input buffer. However, a subsequent command "H" together with the address of that buffer will return the buffer to its input-output mode and also clear it to decimal zero.

It should be pointed out that in the embodiment of the invention to be described, an excess III correction is used and decimal zero is made equal to binary 1010011.

As noted, each input and output buffer can be loaded from an eight-word transfer block register (to be described) in the unit 252, and the contents of each buffer can be transferred back to that register. Therefore, the input and output buffers can be used as an additional memory if so desired.

An "H" command with the address of the desired buffer will cause an output device associated with that buffer to start punching or typing. The first character punched is the most significant of the last word, followed by the rest of the characters of that word and by the character of other words of the buffer in descending order. As each character is punched, it is erased from the buffer and every other character in the buffer is advanced one character position toward the high order end. The "carriage return" symbol is inserted in the low order character position of the last word in the buffer.

If the first character of the first word in the buffer is a zero, it will automatically be changed to a space on the output device, as will all succeeding zeros until some character other than zero is punched out. After the first significant character, all zeros will be punched until a tabulate symbol causes the output device to return to the leading zero suppression manner of operation. Punching a carriage return symbol by the output device will stop further punching and change the mode of the buffer to "computer." If no carriage return symbol had originally been stored in the buffer, all ninety-six characters of the block would be punched out by the output device, followed by an automatically inserted carriage return symbol, before the buffer would be returned to the computer mode. The operations discussed briefly above are more fully described in the aforementioned co-pending application S.N. 22,465.

As shown in the table of FIGURE 2, the symbols U.C. and L.C. are also used to cause the output device to type, for example, in lower case or upper case.

The eight-word block registers which make up the unit 252 of FIGURE 7 are shown in FIGURE 9. As illustrated in FIGURE 9, this unit includes eight block registers, and each of these registers is constituted by an eight-word delay line assembly of the type described above. Each of the registers is designated by a different numeric address, and each word within an individual register is designated by an alpha address. A desired word is derived from a selected block register by temporal means, as will be described.

The different 8-word registers of the unit 252 are capable of transferring an entire block of data by way of the block register 8, which is designated the transfer block, to and from the input and output buffers of FIGURE 8. Also, a selected word of data in any of the registers in FIGURE 9 may be transferred, as will be described, to the 1-word revolvers of the unit 254 of FIGURE 7. Therefore, any of the registers of the unit 252 may be used to store any desired data in the programming of the computer. However, the individual registers of this unit have certain primary functions which will now be described.

The block register 1 of the unit 252 is designated the "memory block" in FIGURE 9. This block, as will be described in conjunction with FIGURE 11, is associated with the expandable memory of the computer, and its prime purpose is to receive blocks of data from the expandable memory. The different words stored in the memory block 1 are, for purposes of the present description, allocated the alpha addresses ., A, B, C, D, E, F and G, these addresses being designated by different binary numbers in accordance with the code schedule of FIGURE 3.

The block registers designated "2" and "3" in the unit 252 of FIGURE 9 have the primary purpose of storing different address words. The words stored in the address block "2" are allocated the individual addresses of H, I, J, K, L, M, —, and $, and the individual addresses of the words in the address block "3" have the allocation @, N, O, P, Q, R, S, T. These latter addresses also are designated by binary numbers in accordance with the table of FIGURE 3.

The block registers "4" and "5" of the unit 252 are designated as the "command blocks," and these registers serve primarily to store macro command words. The individual addresses of the command words in the command block register "4" are designated as H, I, J, K, L, M, — and $, and the individual addresses of the general command words in the command block register "5" are designated @, N, O, P, Q, R, S, and T.

In like manner, the block registers "6" and "7" (FIGURE 9) of the unit 252 are used primarily to store operands or data. The allocated addresses for the individual words in the data block register "6" are H, I, J, K, L, M, —, $, and the individual addresses of the different words in the data block register "7" are designated @, N, P, Q, R, S and T. All these addresses have binary number equivalents in accordance with the table of FIGURE 3.

The block register "8" in the component 252 is designated as the "transfer block," and this register is controllable to receive a block of data from an addressed input and output buffer or to feed a block of data to an addressed input and output buffer. The transfer block register "8" is allocated the following addresses for its individual words, U, V, W, X, Y, Z, and %. These latter addresses are also identified by corresponding multidigit binary numbers in accordance with the table of FIGURE 3.

As noted above, any block register in FIGURE 9 is selected for an eight-word block transfer upon an appropriate command followed by the numeric address of that register. For single word transfers out of any addressed block register, however, temporal means are used. At the exact moment when the addressed word circulates in the register to a selected gating point, that word alone is transferred, for example, into one of the 1-word revolvers of FIGURE 10. The access time to any of the eight-word block registers of FIGURE 9 is 2 milliseconds in the constructed embodiment of the invention.

The 1-word revolvers of FIGURE 10, as mentioned previously, are constituted by one-word delay lines, and each revolver has an access time of ¼ of a millisecond. Each of the revolvers of FIGURE 10 which make up the unit 254 of FIGURE 7 is capable of being put to any use as determined by the programmer. However, these revolvers are allocated certain typical uses for purposes of the present description, and these uses will now be described.

The revolvers 1, 2, 3 of FIGURE 10 are designated the "data" revolvers. The primary use for these revolvers is in arithmetic operations, such as, addition, subtraction, multiplication, and division. The revolver 1, for example, stores the multiplicand in multiplication, and it stores the dividend and remainder in division. The revolver 2, for example, stores the product in multiplication, and the divisor in division. The revolver 3, on the other hand, holds the multiplier in multiplication, and the quotient in division.

The revolver 5 is intended primarily to hold the unexecuted characters of a general command word. Likewise, the revolver 6 is intended to hold the unexecuted characters of an address word. As described briefly above, these characters are shifted out of the revolvers 5 and 6 so that successive instructions can be executed. As will be described, as each character is shifted out of a revolver, it is shifted into a six flip-flop "order holder." Such a shift occurs upon the receipt of a right shift signal, as will be described. The redundancy or parity bit is then lost and only the six significant bits of the character being executed remain in the order holder. Upon the receipt of a "go" signal, the binary number in the order holder is shifted to a gate driver network and is then executed.

The component designated as the revolver 7 is actually a register in a special tape memory equipment which is intended to be used in conjunction with the computer of the present invention. This register in the tape memory is designated the "desired address register," and the insertion of a desired address into this register causes the tape memory to feed an addressed block of data into a designated one of the buffers of FIGURE 8 for processing by the computer. Such tape memory equipment is described, for example, in co-pending application U.S. S.N. 737,862, filed May 26, 1958, inventor, Lothar M. Schmidt, for "High Speed Tape Memory System." Suitable tape memory equipment is also described, for example, in co-pending application S.N. 21,764, filed April 12, 1960, in the name of Frank A. Hill et al.

The component designated as revolver 8 is actually a source of twelve decimal zeros. A transfer from this latter unit to any of the revolvers of FIGURE 10 clears the addressed revolver and sets it to decimal zero. As noted above, for the constructed embodiment of the invention, decimal zero was chosen as being equal to binary 1010011.

As will be described in more detail, as each character of a general command word is shifted out of the command revolver 5, it is replaced by a "null" as designated by the binary number 111111 shown in the table of FIGURE 3. Likewise, when each address character of an address word is shifted out of the address revolver 6, it is replaced by a ".", designated by the binary number 100000 in the table of FIGURE 3. The reason for this will become more apparent as the description proceeds.

The expandable memory of FIGURE 11 is shown as including a plurality of eight-word memory blocks, eight in number, and which are designated $A_1$, $A_2$, $A_3$, $A_4$, $A_5$, $A_6$, $A_7$ and $A_8$. Each of these blocks are in reality a plurality of one-word delay lines of the type described which are connected together, in each instance, to constitute an eight-word delay line assembly. The memory block 1 (which is included in the unit 252 of FIGURE 9), likewise, is composed of eight one-word delay line assemblies which are connected to constitute the eight-word block register. These individual one-word delay lines are controllable to read data from one and write the data into another for circulation purposes, so that eight words of data may be circulated through the memory block register. Also, these individual one-word delay lines are controllable to read data from corresponding one-word lines in the blocks $A_1$, $A_2$, $A_3$, $A_4$, $A_5$, $A_6$, $A_7$ and $A_8$.

The addresses of the individual words in the blocks $A_1$–$A_8$ are provided with the same designation as the addresses of the individual words in the memory block 1. That is, these words are designated as ., A, B, C, D, E, F and G. Upon the receipt of a command (@), for example, followed by a first alpha address, the addressed word in each of the blocks $A_1$–$A_8$ is exchanged on a temporal basis with a corresponding one of the eight words in the memory block 1.

This permits the memory block 1 to store not only its original eight words, but also to store an additional eight words from each of the blocks $A_1$–$A_8$. That is, the memory block 1 is capable of storing sixty-four additional words. Also, this is achieved rapidly because all the data from the delay lines $A_1$–$A_8$ are simultaneously fed on a 1-word basis into the memory block 1, with the selected word from each of the blocks $A_1$–$A_8$ flowing into a corresponding one-word delay line which makes up the memory block 1 at the same time as the selected words from the others of the blocks $A_1$–$A_8$ are flowing into their corresponding one-word delay lines of the memory block 1. As soon as the exchange has been effectuated, the memory block 1 is placed into a circulating condition, as are the blocks $A_1$–$A_8$ to preserve the new data in these blocks.

As mentioned above, each of the blocks $A_1$–$A_8$ may be composed of one-word delay lines similar to the composition of the memory block 1. In like manner, the blocks $A_1$–$A_8$ may also each have a bank of eight second level eight-word blocks. These banks are designated respectively as $B_1$, $B_2$, $B_3$, $B_4$, $B_5$, $B_6$, $B_7$ and $B_8$ in FIGURE 11. It will be noted that there are seven blocks to each of these second level banks, and that there is no transfer between a block of the second level bank and the extreme right hand one-word delay line of the blocks $A_1$–$A_8$ respectively.

Now to address the second level of eight-word blocks without increasing the number of bits required for any particular address, the concept of partial addressing is used. For example, the command @ followed by a first address and a second address, each selected from the group ., A, B, C, D, E, F, and G, will first cause an exchange of a word in each of the blocks $A_1$–$A_8$, as addressed by the first address with respective ones of the words in the memory block 1. Also, this instruction will exchange a word in each of the blocks of the second level banks $B_1$–$B_8$, as addressed by the first address, with all the other words in the blocks $A_1$–$A_8$. Then, the second address from the group ., A, B, C, D, E, F, G, will exchange the addressed word in each of the blocks $A_1$–$A_8$ with respective words in the memory block 1, this latter addressed word being originally derived from a block of each bank in the second level $B_1$–$B_8$.

Therefore, by the use of six-bit addresses, for example, and by the utilization of the described partial address technique, the words that may be derived from the memory block 1 are expanded from the original sixty-four additional words, to an additional 448 that can be derived from the banks of memory blocks in the second level. It is evident that further banks can be added in like manner and partial addresses be used in the described manner to derive any number of words from the expandable memory and cause them to appear in the memory block 1.

FIGURES 12–18 are intended to show schematically the various transfers of data that may be made within the computer of the invention. These transfers are in accordance with a plurality of instructions which are arbitrarily selected for purposes of the present description, and which are designated by the binary numbers of the code tables of FIGURES 2 and 3.

As noted above, all the block transfers between the buffers ., A, B, etc., and the block registers 1–7 are made through the transfer block register 8. The input and output buffers are designated in FIGURE 12 as ., A, B, C, D, E, . . ., %, respectively. As noted above, an instruction H (. to %) means to change the mode of the addressed buffer from its compute mode to an input or output mode. Then, a command J followed by a selected address from the group (. to %) will transfer the eight-word contents of the addressed buffer into the transfer block register 8. This instruction is, of course, for input operation. On the other hand, an I command followed by an address selected from the group (. to %) will cause the contents of the transfer block register 8 to be transferred to the addressed buffer for output operation. A more general command K followed by an address selected from the group (. to %) will cause the contents of the addressed buffer to be exchanged with the contents of the transfer block register 8.

Therefore, as a first input step, and as a final output step, the entire block contents of an addressed input and output buffer are either fed into the transfer block register 8, or the contents of the transfer block 8 are fed to the addressed buffer. For input operation, it is now desirable that the contents of the transfer block 8 be transferred to selected ones of the block registers 1–7. It will be remembered that these transfers take place on a serial manner, with the words of each block being read from one to another on a bit-by-bit and character-by-character basis until the entire block of data has been transferred from one block to another.

The same J, I and K commands are used to transfer data between the transfer block 8 and the other blocks 1–7. However, the address portions of these instructions are now numeric, rather than alphabetic as was the case where the buffers were involved. An instruction I (7), for example, will transfer the contents of the transfer block register 8 into the data block register 7. Likewise, an instruction J (7) will transfer the block contents of the data block register 7 into the transfer block register 8 for subsequent transfer to an input and output buffer for output operation. As before, the command K is an exchange command; and the instruction K (7), for example, will cause the contents of the transfer block register 8 to be exchanged with the contents of the data block register 7. In like manner, the commands J, I and K followed by the appropriate addresses can be used to control the exchange of data between the transfer block register 8 and selected ones of the memory block 1, the address block registers 2 and 3, the command block registers 4 and 5, and the data block register 6.

The commands I, J and K, therefore, effect block transfers between the transfer block 8 and the different block registers and buffers. The commands F, D, C, A, G and E of FIGURE 13, on the other hand, are one-word commands which effect one-word transfers between the registers and the data revolver 1 and between the other revolvers and the data revolver 1.

As indicated in FIGURE 13, an E command followed by an appropriate alpha address will cause the contents of the revolver 1 to be exchanged with the addressed word in the block registers 1, 6, 7 and 8. It will be noted that the word addresses of all of these blocks are different, so that a selected address will bring one word from these blocks and on the E command will exchange that word with the contents of the data revolver 1. A "G" command followed by a selected alpha address, on the other hand, will place the contents of the data revolver 1 in the addressed word position of the block registers 1, 6, 7 and 8, and will replace the contents of the data revolver 1 with twelve decimal zeros derived from the source 8.

As noted above, and as will be described in more detail, the computer of the invention is capable of masking operations by which certain characters only of selected words are used. As indicated in FIGURE 13, a "D" command followed by a selected alpha address, will transfer certain unmasked characters only of the addressed word in the blocks 1, 6, 7 and 8 into the revolver 1. An "F" command, on the other hand, will transfer all the characters of an addressed word in these blocks into the revolver 1, a "C" command will transfer the contents of the revolver 1 into the addressed word position of these blocks, whereas an "A" command will transfer certain unmasked characters only of the contents of the revolver 1 into the addressed word position of the block registers 1, 6, 7 and 8.

It is evident, therefore, that the A, C, D, E and F commands followed by an alpha address are used as word exchanges between the block registers 1, 6, 7 and 8, and the data revolver 1. These same commands can also be used to effect word transfers between the other revolvers and the revolver 1, when these commands are followed by a numeric address. For example, the "C" command followed by the address (2) will cause the contents of the data revolver 1 to be inserted in the revolver 2. It will be noted that a D (8) instruction will cause the unmasked characters only of the data revolver 1 to be replaced by decimal zeros from the source 8, whereas the instruction F (8) will cause the word in the data revolver 1 to be replaced with twelve decimal zeros. It will also be noted that the address (7) will effectuate a desired transfer between the desired address register of the tub tape equipment of the copending application referred to above.

A "Y" command is used, as shown in FIGURE 14, to effectuate one-word transfers of data into the data revolver 2. For example a Y command followed by a selected alpha address will transfer a designated word from the block registers 1, 6, 7 and 8 into the revolver 2. Likewise, a Y command followed by a designated numeric address will transfer the contents of the addressed one of the revolvers 1, 3, 5, 6, 7 and 8 into the data revolver 2.

The effect of the command "Z" is shown in FIGURE 15. This command, followed by a selected alpha address will transfer the selected word from the blocks 1, 6, 7 and 8 into the data revolver 3. Likewise, the Z command followed by a numeric address will transfer the contents of the revolvers 1, 2, 5, 6, 7 or 8 into the data revolver 3.

Certain arithmetic instructions are represented pictorially in FIGURE 16. For example, A "U" command followed by an addressed word in the data block register 6 or in the transfer block register 8 will cause that word to be added to the contents of data revolver 1, with the sum appearing in revolver 1. In like manner, a "V" command followed by a selected word address of the block registers 6 and 8 will cause the selected word to be subtracted from the contents of the revolver 1 with the difference being left in the revolver 1. The "B" command, on the other hand, followed by an appropriate alpha address directed to the block registers 6 or 8, causes the contents of revolver 1 to be added to the word of the designated address with the sum being left in the designated address in the block registers 6 or 8.

The command U followed by the numeric address (2) causes the contents of revolver 1 to be added with the contents of revolver 2, with the sum being left in revolver 1. Also, V (2) causes the contents of revolver 2 to be subtracted from the contents of the revolver 1 with the difference being left in revolver 1. Likewise, the instruction B (2) causes the contents of revolver 1 to be added to the contents of revolver 2 with the sum being left in revolver 2.

A numeric command "5" (or "Mult" as it will sometimes be referred to) followed by the address (2) causes the contents of revolver 1 to be multiplied by the contents of revolver 3 and the product added to the contents of revolver 2. After multiplication, revolver 3 will contain twelve decimal zeros, and the original contents of revolver 1 will have been shifted left by a number of character positions equal to the number of significant digits originally in revolver 3. Also a command 6 (or "Div" as it will sometimes be called) followed by the address (2) will cause the contents of revolver 1 to be divided by the contents of revolver 2 with the quotient being formed in revolver 3. The number of digits in the quotient is predetermined by the number of consecutive L's stored, from the left (most significant) side, in revolver 3 prior to division; the character after the last L must be a zero. The least significant digit of the quotient will occupy the $C_2$ position; a zero will always be automatically inserted in the $C_1$ (right side, least significant) position of revolver 3. The relative character positions of the dividend in revolver 1, and of the divisor in revolver 2, must be so arranged that the dividend will always be less than ten times as great as the divisor. After division, revolver 2 will still contain the divisor unchanged, and revolver 1 will then contain the remainder shifted left one character position for each L originally in revolver 3.

The instruction feeding commands (., $\theta$, P and %) are shown in FIGURES 17 and 18. FIGURE 17, for example, shows the typical instructions which load the address revolver 6, and FIGURE 18 shows the typical instructions which load the command revolver 5.

The general command for the address revolver is ". ". This command with an appropriate alpha address will transfer the addressed word from the designated block register 1, 2, 3 or 8 into the address revolver 6. Likewise, this command with a numeric address will transfer the contents from the addressed one of the revolvers 1, 2, 3, 5, 7 or 8. When a new address is brought into the address revolver 6, each character in the command revolver 5 is set to null (111111). This corresponds to the command (%) to transfer an addressed word into the command revolver. Then, and in a manner to be more fully described, as the first address character is shifted out of the address revolver 6 for execution, a "null" or "%" character is simultaneously shifted out of the command revolver 5. The first address character will be directed at an addressed general command word, and the "%" character will cause that word to be transferred into the command revolver 5.

The computer of the invention also includes a comparator which will be decribed. An "$\theta$" command will transfer an addressed word out of the designated one of the block registers 1, 2, 3, or 8, if followed by an alpha address; or out of the revolvers 1, 2, 3, 5, 7 and 8, if followed by a numeric address; the word being fed into the address revolver 6. This occurs in response to an "$\theta$" command only if the comparator is true. If the comparator is false, this command is ignored. Conversely, a "P" command will transfer similarly addressed words into the address revolver 6 only if the comparator is false, and the "P" command will be ignored if the comparator is true.

As noted previously, the "%" command is used to transfer general command words into the command revolver 5. As shown in FIGURE 18, the "%" command with an alpha address will transfer the addressed word from the designated one of the block registers 1, 4, 5, or 8 into the command revolver, and the "%" command followed by a numeric address will transfer the contents of the addressed one of the revolvers 1, 2, 3, 6, 7 or 8 into the command revolver 5.

The computer of the invention is capable of executing further miscellaneous instructions. For example, in a particular instance, a "W" command causes a specified number of immediately following steps to be skipped. However, this W command is followed only if the comparator is in a true state, and it is ignored if the comparator is in a false state. The characters used to specify the number of steps to be skipped are as follows.

| Character: | Skip |
|---|---|
| (G) | 1 step |
| (F) | 2 steps |
| (E) | 3 steps |
| (D) | 4 steps |
| (C) | 5 steps |
| (B) | 6 steps |
| (A) | 7 steps |
| (.) | 8 steps |

The comparator also may use an "X" command which is similar to the "W" command, the only difference being that the "X" command is followed if the comparator is in a false state and is ignored if the comparator is in a true state.

In like manner, an H (7) instruction causes the computer program to stop, and the next program step will not be executed until a step switch on the computer panel is depressed. The command "N" followed by an alpha address designates that nothing is to be done until the word time after the designated address time. The same command (N) followed by a numeric address means to do nothing for one word time.

In addition to the instructions described above, certain shift and insert commands are used. For example, the command "," means to shift the contents of the data revolver 1 to the left by one character position. This causes the most significant character ($C_{12}$) to be lost and causes a designated address character to be shifted into the low order character position (C). Likewise, the command "—" followed by an alpha address causes the contents of the revolver No. 1 to be shifted to the right the specified number of character positions. This is similar to the command W insofar as particular addresses represent a specified number of character positions. The specified number of characters on the right of the previous word in the revolver will be lost, and zeros will be inserted in place of the specified number of characters. The command "$" is similar to the command "—", except that it causes the contents of the revolver 1 to be shifted to the left rather than to the right. The command "L" is similar to the command "—", except that it effects the revolver 3 and shifts its contents to the right a specified number of characters. Likewise, the command "M" causes the contents of the revolver 3 to be shifted to the right the specified number of character positions, with L's instead of zeros being inserted on the left to replace the shifted characters.

The significance of these instructions, and those described above, will become more apparent as the present description proceeds.

The various components which make up the logic and other control circuitry of the computer of the invention are appropriately supported on a plurality of standardized connector cards. These connector cards may be constructed, for example, in a manner similar to that disclosed and claimed in copending application Serial No. 569,341, filed March 5, 1956, in the name of Frank A. Hill et al. A connector card such as the one disclosed in this copending application will now be described in conjunction with FIGURES 19–25. In the subsequent description of the portions of the logic and other control circuitry of the computer, the circuitry shall be grouped in accordance with its appropriate mounting on different ones of these connector cards.

By using standard connector cards, the over-all design of the relatively complex equipment is simplified, from the standpoint of construction, servicing, testing and packaging of the equipment. Furthermore, the costs of constructing and maintaining the equipment is minimized. The connector card 210 disclosed in FIGURES 19–25 has a pair of faces 212 and 214 separated from one another. A first plurality of conductive leads extends along one face 212 of the card to provide connections to elements corresponding to the collectors of the transistors supported on the card. A second plurality of conductive leads extends along the other face 212 of the card in transverse relationship with the first plurality, and the second plurality of leads provides connections for the bases and emitter electrodes of the different transistors used in the control circuitry.

Conductive pins are inserted through the card 210 at selected positions to interconnect particular leads on one face of the card with leads on the other face, so that the collectors of certain transistors, for example, can be electrically connected in appropriate manner to the bases and emitters of other transistors. The pattern of connections between the collector of each transistor and the bases and emitters of the other transistors depends, of course, on the particular circuit on the card.

The connector card 210 may be formed from a suitable insulating material such as a plastic made from epoxy glass. These faces 212 and 214 are separated from one another by a relatively thin width of the card which may be of the order of one-sixteenth of an inch. The card 210 may have a rectangular configuration, and a suitable dimension for the card is approximately nine inches by six inches. A tab 215 extends outwardly from one edge of the card 210. This tab serves as a terminal connection, and it may have a rectangular configuration with dimensions of approximately one-half inch by 3 inches. It is contemplated that the connector card 210, and other similar cards, will be supported in spaced parallel positions, with the individual cards extending upwardly and their lower tabs 215 extending into a suitable supporting and connecting bracket or receptacle.

A first plurality of leads 216 (FIGURE 19) are printed or otherwise formed on the face 212 of the card 210. The leads 216 are preferably formed so as to be substantially flush with the face 212 of the card. This may be accomplished by means of any known printed circuit process or technique. The leads 216 are preferably formed from a suitable material such as platinum which has good electrical conductivity and which resists wear and oxidation. The leads may have a width of approximately one-sixteenth inch, and each of these leads may start from a position at the left edge of the card 210. The leads 216 may then extend from this edge inwardly and upwardly toward the upper edge of the card 210 in FIGURE 19 to form an angle of substantially 45 degrees with the left and upper edges of the card.

The leads 216 may extend in this manner for a distance of approximately three-eighths of an inch to form the portions 218. The portions 218 of the leads 216 may be separated from one another by a distance of approximately one-quarter of an inch. By way of illustration, approximately twenty portions 218 of the leads 216 may be formed on the card 210. The lead 216 extends from the inward ends of their portions 218 to form respective further portions 220. Each of the portions 220 may be substantially parallel to the upper and lower edges of the card 210 in FIGURE 19, and each of these portions may have a length of approximately three-eighths inch. As may best be seen in FIGURES 19 and 22, a pair of eyelets 222 and 224 extend through holes in the card 210 in contact with each of the portions 220 of the leads 216.

The eyelest 222 and 224 may be made from a suitable conductive material, and each of these eyelets is provided with a cylindrical portion and with a pair of flange portions which extend for a short distance along the faces 212 and 214 of the connector card to maintain the eyelet in a fixed position on the card 210. The eyelets 222 contact the portions 220 of the leads 216 at their position of contiguity with the portions 128. The eyelets 224 contact the lead portions 220 at a position interior to the eyelets 222 and near the inner end of the lead portions 220.

The lead 216 then extends obliquely from their portions 220 toward the upper edge of the card of FIGURE 19 to form the portions 226. The portions 226 of the leads 216 extend upwardly at an angle of approximately 60 degrees with respect to the upper and lower edges of the card 210. The lead portions 226 are separated from one another by a suitable distance such as approximately one thirty-second inch. The lead portions 226 may extend upwardly to a position near the upper edge of the card 210 in FIGURE 19.

A plurality of leads 230 are formed on the face 212 of the card 210 in a manner similar to the leads 216. The leads 230 extend from the right edge of the face 212 in FIGURE 19. The leads 230 each have a first portion 232 which corresponds to the portion 218 of the leads 216. Each of the leads 230 also has a second portion 234 corresponding to the portions 220 of the leads 216. Pairs of eyelets 236 and 238 are inserted through the card 210 to contact each of the lead portions 234. The eyelets 236 and 238 contact the lead portions 234 at positions corresponding to the positions in which the eyelets 222 and 224 contact the lead portions 220. Lead portions 240 extend downwardly from the lead portions 234 at an oblique angle with respect to the edges of the card 210 and in substantially parallel relationship with the lead portions 226 of the leads 216.

In addition to the leads 216 and 230, certain other leads are formed on the face 212 of the card 210. These further leads include a plurality of leads 244 which are disposed in contiguous relationship with the leads 216. The leads 244 extend in substantially parallel relationship along the face 212 to positions near the upper and lower edges of the card 210. For example, five leads 244 may be formed on the face 212. These leads are included to perform certain supplementary functions which will be described in detail subsequently.

A plurality of leads 246 are also disposed in contiguous and parallel relationship to the leads 240 to perform further supplementary functions. For example, eight leads 246 may be included, and these leads extend at their upper ends to a position contiguous the upper edge of the card 210 in FIGURE 19. At their lower ends, the leads 246 flare outwardly from one another to establish electrical continuity with certain leads 248, the latter leads extending upwardly in parallel relationship with one another from the bottom edge of the tab 50. The leads 248 may, for example, be composed of platinum and coated with solder.

A plurality of leads 250 are disposed between and in substantially parallel relationship with the leads 244 throughout most of their length. For example, approximately twenty leads 250 may be included. The portions of the leads 250 parallel to the leads 244 and 246 extend in a direction from the lower left corner to the upper left corner of the card 210 in FIGURE 19. At their upper end, the leads 250 are bent sharply at one position to extend toward the upper left corner of the card 210 in FIGURE 19, this being indicated at 252 in FIGURE 19. The portions 252 of the leads 50 have a relatively thin width and are substantially parallel to one another. At their lower ends, the leads 50 flare outwardly from one another to meet particular ones of the leads 248 extending upwardly from the bottom edge of the tab 215.

A plurality of leads 256 (FIGURE 20) extend upwardly along the tab 215 from the bottom edge of the tab. The leads 256 are disposed on the face of the tab in substantially parallel relationship to one another. The leads 256 correspond in position on the tab to the disposition of the leads 248 on the other side of the tab. The leads 256 may also be formed of platinum and coated with solder. A plurality of holes extends through the card 210 from respective ones of the leads 248 to the leads 256. A corresponding plurality of conductive eyelets 258 extend through these holes to provide electrical contact between respective ones of the leads 248 and 256.

The lead 256 at the left of the card in FIGURE 20 is connected with first and second leads 260 and 262 on the face 212 of the card. The lead 260 extends toward the left in FIGURE 20 for a distance of approximately one-half inch, and the lead 262 extends toward the right for a distance of approximately three and a quarter inches. The leads 260 and 262 are included so that electrical connections can be made from these leads to introduce a suitable voltage to the circuitry formed by the leads on the connector card 210 and to the associated components including, for example, transistors and resistors. The introduction of direct voltage from the leads 260 and 262 to the various components can be made by wires which extend through holes 263 (FIGURE 23) in the card.

A plurality of leads 264 extend along the face 214 from the left edge of the card 210 in FIGURE 20. Approximately twenty leads 264 may be included, and these leads are disposed in substantially parallel relationship with one another and are separated from one another by a distance of the order of three-eighths inch. The leads 264 extend upwardly toward the right in FIGURE 20 at an angle of approximately 15 degrees with respect to the upper and lower edges of the card in FIGURE 20. The leads 264 on the face 214 are substantially perpendicular to the leads 216, 230, 244, 246 and 250 on the face 212. Each of the leads 264 on the face 214 is disposed in intersecting relationship with a plurality of the leads 216, 230, 244, 246 and 250 on the face 12. Of course, the leads 264 are separated from these other leads by the thickness of the card 210.

A hole is provided in the card 210 in intersecting relationship with each of the leads 264 at a distance of approximately three-eighths inch from the left edge of the card in FIGURE 2. A conductive eyelet 266 extends through each of the holes in the leads 264 and has flange portions which engage the faces 212 and 214 to hold the eyelet in fixed position within the hole. Each eyelet 266 meets the face 212 at a position removed from the leads on the face by a sufficient distance, such as approximately one-sixteenth inch, so as to be electrically insulated from the leads on that face.

In like manner, a plurality of leads 270 extend along the face 214 from the right edge of the card 210 in FIGURE 20. Approximately twenty leads 270 may be provided, and these leads are disposed in substantially parallel relationship to the leads 264 and are separated from one another by approximately ⅜ inch. The leads 270 are disposed in alternate relationship with the leads 264 and are separated from the adjacent leads 264 by approximately $\frac{3}{32}$ inch. Eyelets 272 (FIGURE 21) extend through the card 210 in intersecting relationship with the leads 270 at a position on these leads corresponding to the position of the eyelets 266 with respect to the leads 264.

A plurality of leads 276 are disposed on the face 214 of the card 210 and in substantially parallel relationship to the leads 264 and 270. Each of the leads 276 is disposed between a different pair of the leads 264 and 270 and is positioned a relatively short distance such as approximately one-sixteenth inch from its adjacent lead 264. The leads 276 extend to a position approximately ⅝ inch away from the left edge of the card in FIGURE 20 and to a position approximately ½ inch away from the right edge of the card in that figure. Eyelets 278 extend through the card 210 and contact the leads 276 at the right end of the leads. The eyelets 278 contact the face 10 at positions separated from any of the leads 216, 230, 244, 246, and 250.

Leads 280 extend along the face 212 of the card 210 in substantially parallel relationship with the leads 264, 270 and 276. The leads 280 are disposed between and in spaced relationship with the leads 270 and 276. The leads 280 extend to a position approximately one-half inch away from the left edge of the card 210 in FIGURE 20 and to a position approximately five-eighths inch away from the right edge of the card in that figure. Eyelets 282 are disposed on the card 210 in contact with the leads 280 at the left end of the leads in FIGURE 20. The eyelets 282 contact the face 212 at positions separated from any of the leads 216, 230, 244, 246 or 250.

Certain other leads are also included on the face 214 in addition to the leads 264, 270, 276 and 280. These leads include leads 284 disposed in parallel relationship between successive pairs of the leads 264 and 280 near the top of the card in FIGURE 20. The leads 284 extend to a position approximately five-eighths inch from the left edge of the card in FIGURE 20 and to a position of the order of approximately one inch from the right edge of the card in that figure. In like manner, the leads 286 are disposed in parallel relationship between successive pairs of the leads 270 and 276 near the bottom of the card 210 in FIGURE 20. The leads 286 have a sufficient length to be separated from the right end of the card 210 in FIGURE 20 by a distance of approximately five-eighths inch. The leads 286 are separated from the left end of the card 210 in FIGURE 20 by a distance of several inches.

A pair of retainers 290 (FIGURES 19, 21, 22 and 23) are suitably attached by screws 294 to the face 212 of the card 210. Each of these retainers 290 is made from a preferably non-conductive material such as methylmethacrylate polymer designated commercially by the trade name of "Lucite." Each of the retainers 290 may have a width of approximately one-half inch, a vertical length of approximately nine inches and a depth of approximately three-eighths inch. The retainers 290 are disposed in parallel relationship to the left and right edges of the card 210 in FIGURE 19 and may be respectively separated from the left and right edges of the card 210 by a distance of approximately 1⅛ inches.

Sockets 296 (FIGURES 19 and 21) are provided along the vertical length of each of the retainers 290 at spaced intervals such as approximately three-eighths inch. The sockets 296 may be provided with an annular configuration having a suitable diameter such as approximately 5/32 inch. The sockets 296 extend for a suitable distance such as approximately 3/8 inch in the lateral direction in FIGURE 19.

The sockets 296 may extend laterally toward the right from the left edge of the left retainer 290 in FIGURE 19 and toward the left from the right edge of the right retainer. The sockets 296 are adapted to hold semiconductors such as transistors 298 such as those shown in FIGURE 21. Each of the transistors 298 may be provided with elements corresponding to an emitter, a base and a collector. Sockets 300 (FIGURES 19 and 22) are also provided in the retainers 290 in alternate relationship with the sockets 296. The sockets 300 extend laterally across the full width of the retainers 290 and preferably have an annular configuration with a diameter of approximately three thirty-seconds inch. The sockets 300 are adapted to hold components which may be connected to the transistors 298. For example, resistances 302 may be supported within the sockets 300 in a manner similar to that shown in FIGURE 22.

Conductive bus bars 304 (FIGURES 21, 22 and 23) are supported within grooves in the retainers 290. The bus bars may be made from suitable material such as brass having a thickness of approximately 1/32 inch and having a depth of approximately 5/32 inch. The bus bars 304 extend along the complete length of the retainers 290 in the vertical direction in FIGURE 19. The bus bars 304 are disposed in flush relationship with the side surfaces of the retainers 290, the particular side surfaces of the retainers 290 being the ones closest to each other.

The bus bars 304 are adapted to receive voltage such as a direct voltage from a suitable source for introduction to the resistances 302 and to certain of the leads on the connector card 210. Electrical connections are made from the leads 260 and 262 (best seen in FIGURE 23) to the bus bars 304 by wires extending through the eyelets 263 so that voltage can be applied to the bus bars. Holes 306 are provided in the bus bars 304 so that wires from the resistors 302 may be passed through the holes and soldered to the bus bars as shown in FIGURE 22.

As has been previously described and as may best be seen in FIGURES 19 and 21, the transistors 298 are supported within the sockets 296 in the retainers 290. The collectors of the transistors 298 supported by one of the retainers 290 are connected to the leads 216. The collectors are connected to the leads 216 by disposing the collector wires in the eyelets 22 and applying solder to the eyelets to fill the eyelets and maintain the collector wires fixedly positioned within the eyelets. In like manner, the collectors of the transistors 298 supported by the second retainer 290 are connected to the leads 230. Since there are twenty leads 216 and twenty leads 230 in the described embodiment, and since there are twenty sockets in each of the retainers 290, the collectors of as many as forty transistors can be connected to the leads 216 and 230. In like manner, the bases of the transistors 298 are connected to the leads 264 and 270 by connecting wires from the bases of the transistors to the eyelets 266 and 272 and by soldering the wires in the eyelets. This may best be seen in FIGURE 21. The emitters of the transistors 298 are connected in a similar manner to the leads 276 and 280 by disposing the wires from the emitters in the eyelets 278 and 282 and applying solder to the eyelets. In this way, connections are alternately made to the bases and emitters of successive transistors. The connections are made alternately at the left side of the card in FIGURE 20 and at other times at the right side of the card.

Since the leads 264 and 270 and the lead 276 and 280 are disposed in intersecting relationship to the leads 16 and 20, connections may be made from the collector from each transistor 298 to the emitters and bases of a plurality of transistors. A plurality of such connections may be made since each of the leads 216 and 230 on the face 212 crosses a plurality of the leads 264, 270, 276 and 280 on the face 214. The connections from the leads 216 and 230 to the leads 264, 270, 276 and 280 are made by driving conductive rivets 310 (FIGURES 19 and 24) or pins through the card to provide an electrical connection between the leads.

Because of the physical limitations in the disposition of the leads 216 and 230 and of the leads 274, 270, 276 and 280, the base and emitter of each transistor 298 cannot be directly connected through these leads to the collector of every other transistor. However, connections can be made from the leads 216 and 230 to the auxiliary leads 284 and 286 which are respectively disposed on the face 214 near the top and bottom of the card in FIGURE 20. Connections can be made from the leads 216 and 230 to the leads 284 and 286 by passing rivets similar to the rivets 310 through the cards to provide electrical connections between these leads. Auxiliary connections can also be made from the leads 264, 270, 276 and 280 to the leads 244 on the face 212, to produce an increased flexibility in the electrical coupling from the collectors to the bases and emitters of the different transistors 298.

In addition to the connections described above, certain other connections generally necessary to complete the formation of electrical circuits can be made. For example, in most circuits connections are made from the collectors and bases of transistors to first terminals of various resistors. Such connections can easily be made on the card 210 because the resistors 302 are disposed within the sockets 300 in the retainers 290. The connections are made in a manner similar to that shown in FIGURE 22. As shown in FIGURE 22, wires from the resistors 302 extend into the eyelets 224 to provide electrical connections from the collectors of the different transistors 298. The wires from the resistors 302 may also extend into the eyelets 266, 272, 278 and 282 (FIGURE 20) to provide electrical connections to the bases and emitters of the different transistors 298.

Just as the first terminals of the resistors 302 are connected to the various elements in the different transistors, the second terminals of the resistors generally have voltage applied to them. This is especially true when the transistors and the resistors are included in circuits in which the transistors are directly coupled to one another.

Voltages applied to the resistors 302 by passing the wires from the resistors through the holes 306 in the bus bar 304 and by soldering the wires to the bus bars. A typical connection between a wire from one of the resistors 302 and one of the bus bars 304 is shown in FIGURE 22. By providing such connections, electrical continuity is established through elements including the left lead 256 in FIGURE 20 and the right lead 248 in FIGURE 19, the leads 260 and 262 in FIGURE 20, and the bus bars 304 to the resistors 302. Since the left lead 256 in FIGURE 20 is adapted to receive voltage from an external source, voltage can be easily applied to any of the resistors 302. The left lead 256 is adapted to receive voltage from an external source since the tab 215 holding the lead is adapted to fit into a standard 28-position receptacle, as mentioned above. Such a receptacle is normally used in electrical equipment and especially with circuitry printed on cards to provide input and output connections to that circuit.

Generally, certain input signals are applied to the electrical circuitry formed on the card 210. The characteristics of the input signals depend, of course, upon the type of operation being performed by the circuitries. The input signals can be applied through the leads 248 and 256 since these leads are disposed on the tab 215. In like manner, output voltages from the circuitry formed on the card 210 can be applied to certain of the leads 248 and 256 for introduction to different terminals of the receptacle.

As described previously, corresponding pairs of leads 248 and 256 communicate with each other through the eyelets 258. Although the leads 248 would be sufficient to provide electrical connections, the leads 256 are included to insure that the proper input signals are obtained from different terminals in the standard receptacle. Both the leads 248 and 256 are also included to insure that the voltages at proper positions in the card 210 are introduced to different terminals in the standard receptacle. The leads 246 and 250 communicate with the leads 248 and extend to the top of the card 210 in FIGURE 1 in a manner similar to that described above so as to facilitate checks which it may be desired to make as the various input and output voltages.

Generally only the emitters and bases of transistors are connected to receive the input voltages. Such connections can easily be made by driving rivets or pins through the card 210 to provide a communication between the leads 246 and 250 on the face 212 and the leads 264, 270, 276 and 280 on the face 214. As previously described, the leads 246 and 250 communicate electrically with the leads 248 and 256 on the tab 215.

As indicated above, connector cards such as the card 210 of FIGURES 19–25 are preferably utilized in the computer of the present invention to support the components and circuitry which make up the various logic and other control circuits of the computer.

The circuit of FIGURE 26 represents the logic necessary to produce a term 60. This term represents the contents of a specified address, and it may represent the eight-word contents of an addressed block or the one-word contents of an addressed revolver or an addressed block. When this term is paired with a corresponding command, the contents are inserted into the destination specified by the command.

The term 60 may be represented by the following logic equation:

$$60=(Q+R)\overline{6R}+(\overline{Q+R})[(J+K)(\alpha\cdot 60\times g+HA\cdot 60\#g)+(\overline{J+K})(\alpha A\cdot 60WC+\#A\cdot 60\#gA)]$$

Q and R are test commands, and each of these commands will set a comparator, which will be described, to a true state if the described condition is true and to a false state if the described position is false. The command "Q" compares a designated address character in the address revolver 6 with the character in the high order ($C_{12}$) position of the data revolver 1, and the "R" command compares a designated address character in the address revolver 6 with the low order ($C_1$) character in the data revolver 1.

The term $\overline{6R}$ is one when the read flip-flop of the address revolver is a one, and this term causes the contents of the address revolver to be read so long as either the test command "Q" or the test command "R" is a one. The commands "J" and "K" were discussed in conjunction with FIGURE 12, and these commands cause the contents of an addressed buffer or block register to be transferred to the transfer block register 8. The designation "αA" represents any alpha address designating a buffer transfer, and 60#*g* represents the contents of the addressed buffer; the term 60#*g* going to ground whenever a binary one is read out of the addressed buffer. The term #A represents any numeric address designating a block transfer from any of the eight-word contents of the addressed block register, this term going to ground whenever a binary one is read out of the addressed register. The term 60WC represents the specified one-word contents of an addressed block register for a one-word transfer from such a register, as described, for example, in conjunction with FIGURES 13, 14, 15, 16, 17 and 18. The term 60#*g*A represents the contents of an addressed revolver, this latter term going to ground whenever a a binary one is read out of the revolver.

The network of FIGURE 26 includes a transistor 400. The emitter of this transistor is grounded, and the collector is connected to a 1.5 kilo-ohm resistor 402. The other terminal of this resistor is connected to the negative terminal of the 3 volt direct voltage source. The collector of the transistor 400 is also connected to an ouput terminal at which the term "60" appears.

A transistor 404 has its collector connected to the collector of the transistor 400. The emitter of the transistor 404 is connected to the collector of a transistor 406. The emitter of the transistor 406 is grounded. An input terminal which receives the $Q+R$ term is connected to the base of the transistor 404, and an input terminal which receives the $\overline{6R}$ is connected to the base of the transistor 406.

Therefore, when either of the test commands Q or R is true, the transistor 404 permits the read flip-flop of the address revolver 6 to introduce its states to the output terminal "60."

The network also includes a transistor 408 whose collector is connected to the base of the transistor 400. The emitter of the transistor 408 is grounded, and the base of this transistor is connected to an input terminal designated $(Q+R)$. When either of the commands Q or R is true, the transistor 408 becomes conductive and establishes the base of the transistor at zero potential to cut off the latter transistor. Therefore, in the presence of either of the test commands Q or R, the remainder of the network of FIGURE 28, which will now be described, is rendered ineffective.

A transistor 410 has its collector connected to the base of the transistor 400 and to a 5.6 kilo-ohm resistor 412. The other terminal of this resistor is connected to the negative terminal of the 3-volt direct voltage source. The base of the transistor 410 is connected to an input terminal designated $(J+K)$. As mentioned above, this term represents the J or K block transfer commands, and the transistor 410 is rendered conductive only when one or the other of these block transfer commands is true. The emitter of the transistor 410 is connected to the collector of a transistor 414 and to the collector of a transistor 416. The base of the transistor 414 is connected to an input terminal which receives the αA term. The emitter of the transistor 414 is connected to an input terminal which receives the 60α*g* term. The base of the transistor 416 is connected to an input terminal which receives the "#A" term, and the emitter of that transistor is connected to an input terminal which receives the 60#*g* term.

Therefore, whenever the command "J" or the command "K" is true, designating a block transfer, and upon the application of a signal corresponding to a selected alpha address to the base of the transistor 414, the entire block contents of the addressed buffer are read into the transistor 414 and pass through the transistor 410 and 400 to the output terminal 60. Alternately, upon the introduction of a selected numeric address to the base of the transistor 416, the contents of the addressed eight-word block register of FIGURE 9 is read into the transistor 416 and is passed by the transistors 410 and 400 to output terminal 60.

The base of the transistor 400 is also connected to the collector of a transistor 418. The base of the transistor 418 is connected to the collector of a transistor 420, the emitter of the latter transistor being grounded, and the connector being connected to a resistor 422 having a resistance of 3.9 kilo-ohms and being connected to the negative terminal of the 3-volt voltage source. The base of the transistor 420 is connected to an input terminal designated $(J+K)$. Therefore, whenever either of the block transfer commands J or K is true, the transistor 420 is rendered conductive which, in turn, renders the transistor 418 non-conductive. Therefore, the transistor 418 is conditioned to conduct only when neither of the block transfer commands J or K is true and when the transistor 410 is accordingly rendered non-conductive.

The emitter of the transistor 418 is connected to the collector of a transistor 424 and to the collector of a transistor 426. The emitter of the transistor 424 is connected to an input terminal designated 60W*g*#A, and the base of the transistor 424 is connected to the input terminal designated #A. The emitter of the transistor 426 is connected to the collector of a transistor 428, and the emitter of the latter transistor is grounded. The base of the transistor 428 is connected to the collector of a transistor 430. The emitter of the transistor 430 is grounded, and the collector is connected to a resistor 432. This resistor has a resistance of 3.9 kilo-ohms and is connected to the negative terminal of the 3 volt direct voltage source. The base of the transistor 426 is connected to an input terminal designated $\alpha$A and the base of the transistor 430 is connected to an input terminal designated $\overline{60WC}$.

Therefore, when a numeric address #A is introduced to the base of the transistor 424 and in the absence of a block transfer command J or K, the contents 60#*g*A of an addressed revolver are read into the transistor 424, and through the transistors 418 and 400 to the output terminal 60. Alternately, in the presence of an alpha address $\alpha$ introduced to the base of the transistor 426, the one-word contents 60WC of an addressed word in an addressed block are read into the transistor 428 and are passed through the transistors 426, 418 and 400 to the output terminal 60.

Therefore, and as stated above, the output signal appearing at the output terminal 60 corresponds to the contents of an addressed block or revolver. These contents may then be directed to the appropriate destination selected by the command given in correspondence with the particular address.

The circuitry associated with the command revolver 5 is shown in FIGURE 27. As noted above, this revolver includes a pair of delay lines 440 and 442 constructed in the manner described in conjunction with FIGURES 5 and 6. The delay line assembly includes a write flip-flop 444, as explained above.

The write flip-flop 444 includes a pair of transistors 446 and 448 cross-connected in known manner to constitute a usual flip-flop circuit. The left output terminal of the flip-flop 444 is connected to the input terminal of the delay line 440 and introduces a signal $5W_0^1$ to that delay line. The right output terminal of the flip-flop 444 is connected to the input terminal of the delay line 442 and introduces a signal $5W_1^0$ to the latter delay line. This right output terminal of the flip-flop 444 is also connected to an order holder circuit to be described in conjunction with FIGURE 28, and this output terminal is designated as "NC" representing the "next command."

The left input terminal of the flip-flop 444 is connected to the collector of a transistor 450, and the right input terminal of the flip-flop is connected to the collector of a transistor 452. The emitters of the transistors 450 and 452 are connected to one another and to the collector of a transistor 454. The emitter of the transistor 454 is grounded, and the base of the transistor is connected to an input terminal designated $T_W$. The base of the transistor 450 is connected to the collector of a transistor 456, and the collector is also connected to one terminal of a resistor 458. The other terminal of the resistor is connected to the negative terminal of a 3 volt direct voltage source, and the resistor may have a resistance of 1.5 kilo-ohms.

The emitter of the transistor 456 is grounded, and the base of the transistor is connected to an input terminal designated 5W. This input terminal is also connected to the base of the transistor 452. It is evident that whenever the input terminal 5W goes negative representing a binary one, the base of the transistor 452 goes negative to condition that transistor for conduction. Alternately, whenever the input terminal 5W goes to zero representing a binary zero, the transistor 456 becomes non-conductive conditioning the transistor 450 for conduction.

The term $T_W$ represents the write clock signal, which goes negative for every bit time as described above. The next swing negative of this signal after a binary one or a binary zero at the input terminal 5W causes either the transistor 452 or the transistor 450 to conduct. This, in turn, causes the write flip-flop 444 to be triggered to a true state for a binary one input and to a false state for a binary zero input. This triggering of the read flip-flop occurs in correspondence with the corresponding clock pulses $T_W$.

As noted, the delay lines 440 and 442 are adapted to contain one word which corresponds to twelve characters, with each character corresponding to seven binary bits. The write flip-flop 444 is controlled to write one word into the delay lines, and this one word is circulated around the revolver 5 in a manner to be described until it is needed. The word is then shifted out of the revolver in a character-by-character sequence.

The input terminal 5W is connected to a common lead 460. This lead, in turn, is connected to a resistor 462 having a resistance of 3.9 kilo-ohms and which is connected to the negative terminal of the 3 volt direct voltage source. A transistor 464 has its collector connected to the lead 460, and the emitter of this transistor is connected to the collector of a transistor 466. The emitter of the latter transistor is grounded. The base of the transistor 464 is connected to an input terminal designated (%+null). The base of the transistor 466, on the other hand, is connected to an input terminal designated 60.

It will be remembered from the discussion of FIGURE 18 that the "%" command causes the addressed word to be introduced to the command revolver 5. Such a command causes the transistor 464 to become conductive, and permits the contents of the addressed block or revolver from the network of FIGURE 26 which are introduced to the transistor 466 to be passed to the input terminal 5W. Its contents are, therefore, fed into the delay line assembly of the command revolver 5 through the write flip-flop 444 and at times controlled by the clock pulses $T_W$.

The lead 460 is also connected to the collector of a transistor 468. The base of this transistor is connected to an input terminal designated "85," and the emitter of the transistor is connected to an input terminal designated WA.61#*g*.

The term WA.61#*g* is derived in a manner to be explained in conjunction with FIGURE 44. The term "WA" is common to a group of commands to transfer the contents of revolver 1 or the adder to a specified address. These commands include the command B described in FIGURE 16, and the commands A, C, E and G described in conjunction with FIGURE 13. The term 61 represents the contents of certain sources as directed to a specified address. The term 61#*g* represents such contents only when a numeric address is specified. When such is the case, the term 61#*g* goes to ground for each binary one of the transferred data. The term "85" goes negative whenever the revolver 5 is addressed in correspondence with the WA command.

The lead 460 is also connected to the collector of a transistor 470 for branch operations. The base of this transistor is connected to an input terminal designated "BRANCH," and the emitter of this transistor is connected to the collector of a transistor 472 and to the collector of a transistor 474. The term "BRANCH" is derived in a manner to be described in conjunction with the network of FIGURE 31.

The emitter of the transistor 474 is connected to ground, and the base of this transistor is connected to an input terminal designated $\overline{GD_4}$. The base of the transistor 472 is connected to an input terminal designated $GD_4$, and the emitter of this transistor is connected to the collector of a transistor 476. The terms $GD_4$ and $\overline{GD_4}$ are derived from a gate driver network to be described in conjunction with FIGURE 29D. The term $GD_4$ is one and the term $\overline{GD_4}$ is zero when the fourth bit of a command character being executed is a one, and vice versa.

The emitter of the transistor 476 connects with the collector of a transistor 478 and the emitter of the latter transistor is grounded. The base of the transistor 476 is connected to an input terminal designated $\overline{C_{12}}$. The term $\overline{C_{12}}$ is derived from a timing signal, and this term is negative except for the twelfth character of each word. The base of the transistor 478 is connected to an input terminal designated ($5R$—7). The latter term is derived in the command revolver circuitry of FIGURE 27, as will be described.

For branching operation, the term BRANCH becomes true and the transistor 470 becomes conductive. This term is derived in a manner to be described in conjunction with FIGURE 31. As will be described, the commands ., O, P, W, or X are all capable of forming the BRANCH term. It will be remembered that the command (.) causes a new address word to be brought into the address revolver 6. The command (O) is similar except that it is followed only if the comparator is in a true state. Likewise, the command (P) will cause a new address word to be brought into the address revolver 6 if the comparator is in a false state, but will be ignored if the comparator is in a true state. The execution of a ., O or P command is followed by a (%) command which causes a new general command word to be brought into the command revolver 5. This is accomplished by the transistors 470 and 474. For the ., O or P commands, the fourth digit is a zero and in a manner to be described, this causes the term $\overline{GD_4}$ to be a one. Therefore, in the presence of these commands the term BRANCH is true and the term $\overline{GD_4}$ is true so that the circuit through the transistors 470 and 474 is completed. This causes a series of ones to be read through the write flip-flop 444 instead of the command which normally would be circulated through that flip-flop. This corresponds, as shown by the table of FIGURE 2, to the % command. Therefore, the next command to be executed is a % command which brings a new general command word into the command revolver 5.

As noted, the W and X commands also cause the BRANCH term to become true. The fourth bit of the W and of the X command is a one. Therefore, as will be described, for these commands the $GD_4$ term is true and $\overline{GD_4}$ is false. This causes the transistor 472 to be conditioned for conduction, along with the transistor 470. Therefore, for all characters except $\overline{C_{12}}$, each time a W or X command is executed, a circuit is completed to the transistor 478 so that a shift occurs. This, in a manner to be described, causes the next character to be skipped. Therefore, whenever a W or an X command occurs, and when the comparator is in the corresponding true or false state so as to cause that command to be effective, the command that otherwise would be executed next is skipped.

The output terminal of the delay line 440 is connected to the base electrode of a transistor 480, and the output terminal of the delay line 442 is connected to the base of a transistor 482. The collectors of the transistors 480 and 482 are respectively connected to the left and right input terminals of a flip-flop 485. This flip-flop is the first read flip-flop of the command revolver. The output signal introduced to the base of the transistor 480 is designated $\overline{5R_R}$, and the output signal introduced to the base of the transistor 482 is designated $5R_R$. A signal 5R is obtained at the right output terminal of the read flip-flop 485. This signal corresponds to the signal from the right output terminal of the write flip-flop 444 delayed by one word time. The emitters of the transistors 480 and 482 are connected together and to the collector of a transistor 484. The emitter of the transistor 484 is grounded, and the signal $T_R$ is introduced to the base of that transistor. The signal $T_R$ is the read clock pulse signal described above and it swings negative each bit time, like the write clock pulse signal $T_W$. However, as mentioned, the read clock pulse signal $T_R$ is advanced slightly with respect to the write clock pulse signal $T_W$ to permit operations to be performed on signals derived from the command revolver 5 so that corresponding signals can be fed into the revolver within the same clock interval.

The delay lines 440 and 442 have second output terminals which are spaced from the end of the delay line by a distance corresponding to one character or seven binary bits. This intermediate terminal of the delay line 440 is connected to the base of a transistor 486, and the intermediate terminal of the delay line 442 is connected to the base of a transistor 488. The collector of the transistor 486 is connected to the left input terminal of a second read flip-flop 490. The collector of the transistor 488, on the other hand, is connected to the right input terminal of the flip-flop 490. The signal introduced to the base of the transistor 486 is designated $\overline{(5R_R—7)}$, the signal introduced to the base of the transistor 488 is designated ($5R_R$—7).

The emitters of the transistors 486 and 488 are connected together and to the collector of a transistor 492. The emitter of the transistor 492 is grounded, and its base is connected to an input terminal designated $T_R$. The read clock signal is introduced to this input terminal. It is evident, therefore, that the flip-flop 490 is triggered at read clock times $T_R$, similarly to the triggering of the flip-flop 485. However, the flip-flop 490 is triggered one character time before the triggering of the flip-flop 485.

The lead 460 is also connected to the collector of a transistor 500. The emitter of the transistor 500 is connected to the collector of a transistor 502, and the emitter of the transistor 502, in turn, is connected to the collector of a transistor 504. The emitter of the transistor 504 is grounded. The base of the transistor 502 is connected to the right output terminal of the read flip-flop 485, and a signal $\overline{Sh_2}$ is introduced to the base of the transistor 504. The collector of the transistor 502 is connected to the collector of a transistor 512. The signal ($Sh_2$) is introduced to the base of the transistor 512, and the emitter of the transistor is connected to the collector of the transistor 476.

As indicated, when the characters in the command revolver are to be shifted to the right by one character, the term ($Sh_2$) becomes true. This causes the transistor 504 to become non-conductive to break the circulating loop from the read flip-flop 485, and it causes the transistor 512 to become conductive to close a circulating loop to the read flip-flop 485. The instant that the term ($Sh_2$) becomes true, the output of the read flip-flop 485 is read into the write flip-flop 444. This is because the path through the transistor 504 is broken, and a path is established through the transistors 487, 476, 512 and 500 to the write flip-flop 444. The shift signal remains true for one character time, and the result is that the character to the extreme right of the delay lines 440 and 442, which has already been executed, as will be explained, is shifted out of the revolver and the next character passes to the extreme right position in the delay lines but also circulates back to the write flip-flop and is placed in the extreme left position. As the subsequent character passes through the write flip-flop 444, the output at the terminal NC is introduced to the order holders so that this character may be placed in the order holders to be executed upon next. This action continues until each of the twelve characters in the command revolver have been executed. It will be remembered that the character $C_{12}$ in the command revolver is a blank, and at that time the transistor 476 is rendered non-conductive so that seven binary zeros pass through the write flip-flop 444 for that character.

The signal ($Sh_2$) is a shift signal which is derived in a manner to be described. This term is true for one character time, and when the term is true it causes the word in the delay lines 440 and 442 effectively to be shifted to the right by one character. However, when the term ($Sh_2$) is false, the term $\overline{Sh_2}$ is true and the circuit to the transistor 502 is completed. The output signal 5R from the read flip-flop 485 is then passed through the transistor 500 and circulated back to the write flip-flop 444.

Therefore, as long as the shift term ($Sh_2$) is false, the re-circulating loop of the command revolver 5 is closed, and the contents of the command revolver circulate around the loop and are retained in the revolver. The transistor 476 prevents the unused character $C_{12}$ to appear as anything but a series of binary zeros during a shift or branch operation.

Whenever any of the terms BRANCH, WA (%+Null) are true, the recirculating loop described in the preceding paragraph must be broken. This is done in the following manner.

The base of the transistor 500 is connected to the collectors of each of a plurality of transistors 506, 508 and 510. The emitters of the transistors 506 and 510 are grounded, the emitter of the transistor 508 is connected to an input terminal designated WA#*g*. The collectors of the transistors 506, 508 and 510 are connected together and to a resistor 512. This resistor may have a resistance of 3.9 kilo-ohms, and it is connected to the negative terminal of the 3 volt direct voltage source. The term (%+Null) is introduced to the base of the transistor 506, so that the transistor becomes conductive whenever the "%" term or the "Null" term is one. When the transistors 506, 508 or 510 become conductive, the transistor 500 is rendered non-conductive so that the recirculating loop of the command revolver 5 is broken, this being desired while the other commands are being executed to feed new data into the command revolver. In like manner, the "BRANCH" signal is introduced to the base of the transistor 510 to make that transistor conductive and so to break the recirculating loop during the execution of the "BRANCH" command. The transistor 508 becomes conductive during the execution of the WA command plus the occurrence of the 85 address.

The input to the command revolver 5, as described above, may therefore be represented by the following logic equation:

$$\begin{aligned}5W=&\mathrm{BRANCH}(GD_4\cdot\overline{C_{12}}\cdot(5R-7)+\overline{GD_4})\\&+85\cdot\overline{WA}\cdot 61\#g+60(\%+\mathrm{Null})\\&+[\overline{(\%+\mathrm{Null})}\cdot\overline{WA}\cdot\overline{\mathrm{BRANCH}}][5R\cdot Sh_2\\&+\overline{C}_{12}\cdot Sh_2\cdot(5R-7)]\end{aligned}$$

As described above, the commands in the command revolver 5 are read out of the revolver character by character, with each character representing a different command. Whenever a character is read out of the command revolver 5 of FIGURE 27, the six bits constituting that command are shifted serially into the order holders of FIGURE 28, and they are then shifted from the order holders in a parallel manner to be described to the gate drivers of FIGURES 29A–29F, upon the occurrence of a "GO" signal at which time the command is executed. Upon the execution of a command in the gate drivers, the next command from the revolver is introduced to the order holders during the immediately following character time.

The order holder circuitry of FIGURE 28 includes a transistor 520. The emitter of this transistor is grounded, and the collector is connected to a head 522 and to one terminal of a resistor 524. The other terminal of this resistor is connected to the negative terminal of the 3 volt direct voltage source, and the resistor may have a resistance of 1.5 kilo-ohms. The base of the transistor 520 is connected back to the right output terminal of the write flip-flop 444 of FIGURE 27.

A transistor 526 has its collector connected to the lead 522, and the emitter of the transistor 526 is grounded. The base of the transistor 526 is connected to a terminal designated $\overline{C_1\cdot Sh_2}$. Therefore, during the occurrence of the "$Sh_2$" term and at character time $C_1$ corresponding to the first character normally in the command revolver, the transistor 526 is non-conductive so that the output from the write flip-flop 444 of FIGURE 27 may be introduced to the lead 522. This output is designated as $\overline{C}$ and is expressed by the following equation:

$$\overline{C}=\overline{NC}\cdot C_1\cdot Sh_2$$

The lead 522 is connected to the base of a transistor 528. The emitter of this latter transistor is grounded, and the collector is connected to one terminal of a resistor 530. This resistor may have a resistance of 1.5 kilo-ohms, and it is connected to the negative terminal of the 3 volt direct voltage source. A transistor 532 has its emitter grounded, and the collector of this latter transistor is connected to a lead 534 which, in turn, is connected to the collector of the transistor 528. The base of the transistor 532 is connected to a terminal to which the term $\overline{C_1\cdot Sh_2}$ is introduced. Therefore, the signal C appearing on the lead 534 may be expressed as:

$$C=NC\cdot C_1\cdot Sh_2$$

Therefore, upon the occurrence of the shift term ($Sh_2$) the contents of the write flip-flop 444 of the command revolver in FIGURE 27 appear on the leads 522 and 534 for a full character time $C_1$. So long as the shift signal ($Sh_2$) persists, the circulating loop of the command revolver is reduced by one character time. Therefore, the character time ($C_1$) will represent a different character each time it occurs. Therefore, for each successive word time, and during the character time ($C_1$), a new character is fed from the command revolver of FIGURE 27 into the order holders of FIGURE 28.

Therefore, when a character is being shifted from the command revolver 5 into the order holders of FIGURE 28, the various binary bits of the character appear on the leads 522 and 534. The first bit is merely the parity bit, and this bit does not appear in the order holders. However, the second bit which occurs at a time corresponding to $S_2$ is introduced to a flip-flop 534 at the proper time to trigger that flip-flop to a state corresponding to that particular bit. Likewise, the third bit is introduced to a flip-flop 536, the fourth bit of the character is introduced to a flip-flop 538, the fifth bit to a flip-flop 540, the sixth bit to a flip-flop 542 and the seventh bit to a flip-flop 544. Therefore, the flip-flops 534, 536, 538, 540, 542 and 544 are triggered into operational states corresponding to the different digits of the particular character corresponding to the next command to be executed.

This shift of the character into the order holder flip-flops is accomplished by means of the circuitry illustrated in FIGURE 28. The flip-flop 534, for example, includes a transistor 546 whose collector is connected to the left input terminal of the flip-flop and it includes a transistor 548 whose collector is connected to the right input terminal of the flip-flop. The emitters of these transistors are connected together and to the collector of a transistor 550. The emitter of the transistor 550 is grounded, and the base is connected to a terminal designated as ($S_2$). This terminal receives the timing signal referred to previously which has a negative component in coincidence with the second bit of each character. The lead 522 is connected to the base of the transistor 546 and the lead 534 is connected to the base of the transistor 548. Therefore, as the various bits of the character being read into the order holders appear on the leads 522 and 534, only the second bit triggers the flip-flop 534 because the transistor 550 is rendered conductive to complete the input circuit to that flip-flop only during the time $S_2$.

The flip-flop 536 is connected in a manner similar to the flip-flop 534, and the flip-flop 536 includes a transistor 552 corresponding to the transistor 550. The transistor 552 is rendered conductive during the third bit of each character due to the signal ($S_3$) introduced to its base. Therefore, the flip-flop 536 is triggered to an operational state corresponding to the third bit of the character.

Likewise, the flip-flop 538 includes a transistor 554 corresponding to the flip-flop 550 and which is rendered conductive by a signal ($S_4$) during the fourth bit interval of each character. The flip-flop 540 has a transistor 556 which is rendered conductive during the fifth bit interval, the flip-flop 542 includes a transistor 558 which is rendered conductive during the sixth bit interval, and the flip-flop 544 includes a transistor 560 which is rendered conductive during the seventh bit interval. The signals $S_5$, $S_6$ and $S_7$ are respectively introduced to the transistors 556, 558 and 560 to render these transistors conductive at the proper intervals. As above, the transistors 556, 558 and 560 correspond to the transistor 550 in the flip-flop circuit 534.

The flip-flop 534 has a left output terminal designated $\overline{OH_1}$ and it has a right output terminal designated $OH_1$. Likewise, the flip-flop 536 has a left output terminal designated $\overline{OH_2}$ and it has a right output terminal designated $OH_2$. The flip-flop 538 has a left output terminal designated $\overline{OH_3}$ and it has a right output terminal designated $OH_3$. The flip-flop 540 has a left output terminal designated $\overline{OH_4}$ and it has a right output terminal designated $OH_4$. The flip-flop 542 has a left output terminal designated $\overline{OH_5}$ and it has a right output terminal designated $OH_5$. The left output terminal of the flip-flop 544 is designated $\overline{OH_6}$ and the right output terminal of the flip-flop is designated $OH_6$. As in the case of the flip-flop 534, the lead 522 is connected to the left input terminal of the flip-flops 536, 538, 540, 542 and 544, and the lead 534 is connected to the right input terminal of these flip-flops.

Figure 29A:
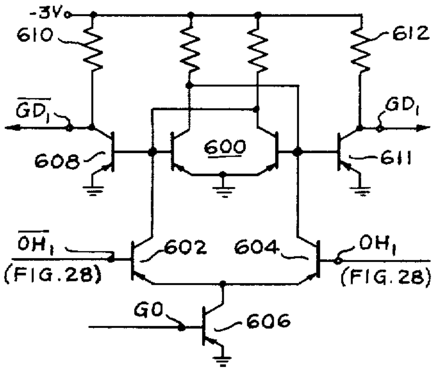

FIGURE 29A illustrates the gate driver which is connected to the flip-flop 534 of the order holder of FIGURE 28. The gate driver flip-flop is indicated generally as 600. A transistor 602 has its collector connected to the left input terminal of the flip-flop 600, and a flip-flop 604 has its collector connected to the right input terminal of the flip-flop. The base of the transistor 602 receives the signal $\overline{OH_1}$ from the flip-flop 534, and the base of the transistor 604 receives the signal $OH_1$ from that flip-flop. The emitters of the transistors 602 and 604 are connected together and to the collector of a transistor 606. The emitter of the transistor 606 is grounded, and the base of this transistor is connected to an input terminal designated "GO." Therefore, upon the occurrence of the "GO" signal, the flip-flop 600 is triggered to a state corresponding to the state of the flip-flop 534 and the digit corresponding to $OH_1$ is transferred into the flip-flop 600.

The right output terminal of the flip-flop 600 is connected to the base of a transistor 608. The emitter of this transistor is grounded, and its collector is connected to a resistor 610. This resistor may have a resistance of 1.5 kilo-ohms and is connected to the negative terminal of the 3 volt direct voltage source. The collector of the transistor 608 is connected to an output terminal designated $\overline{GD_1}$. Likewise, the left output terminal of the flip-flop 600 is connected to the base of a transistor 611. The emitters of the transistors 608 and 611 are grounded, and the collector of the transistor 611 is connected to a resistor 612. The resistor 612 may have a resistance of 1.5 kilo-ohms, and is connected to the negative terminal of the 3 volt direct voltage source. The collector of the transistor 611 is connected to an output terminal designated $GD_1$.

Figure 29D:
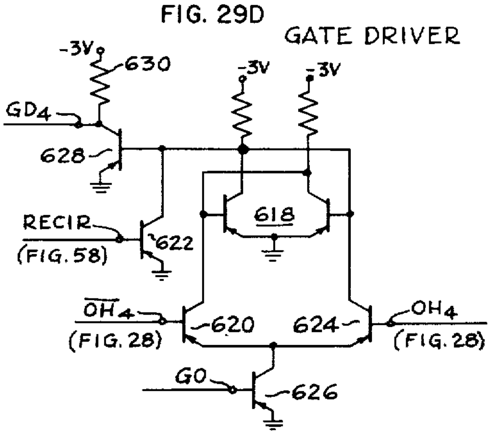
Figure 29B:
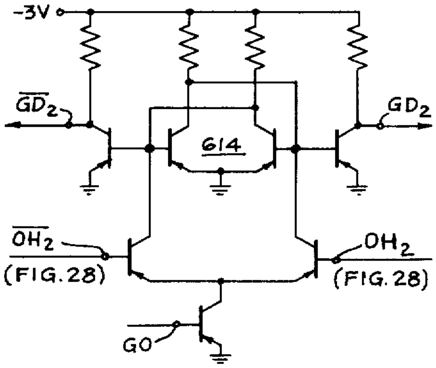

FIGURE 29B represents a flip-flop 614 which is connected in a manner similar to the flip-flop 600 of FIGURE 29A. The flip-flop 614 is connected to the output terminals of the flip-flop 536 of the order holder circuitry of FIGURE 28. The flip-flop 614 develops a signal $\overline{GD_2}$ at its left output terminal and it develops a signal $GD_2$ at its right output terminal. The flip-flop 614 receives the digit corresponding to the term $OH_2$ and is triggered to a state corresponding to that of the flip-flop 536 upon the occurrence of the "GO" signal.

Figure 29E:
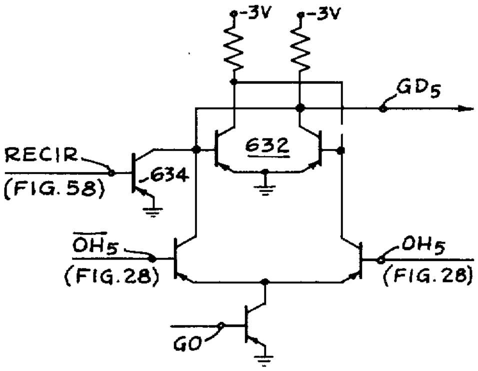
Figure 29C:
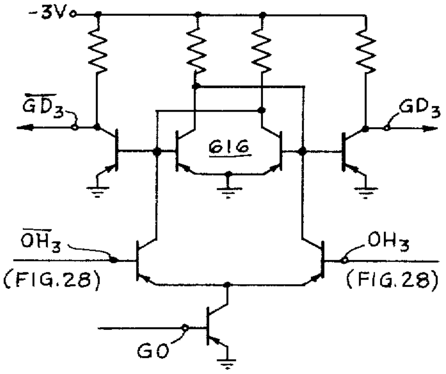

In like manner, the gate driver flip-flop 616 of FIGURE 29C receives the digit corresponding to the term $OH_3$ and is triggered to a state corresponding to the state of the flip-flop 538 of FIGURE 28 upon the occurrence of the "GO" signal. The latter flip-flop develops an output signal $\overline{GD_3}$ at its left output terminal and an output signal $GD_3$ at its right output terminal.

FIGURE 29D represents a gate driver flip-flop 618. The left input terminal of the flip-flop is connected to the collector of a transistor 620, and the right input terminal of the flip-flop is connected to the collector of a transistor 624. The emitters of the transistors 620 and 624 are connected to the collector of a transistor 626, and the emitter of the transistor 626 is grounded. The "GO" signal is also introduced to the base of the transistor 626. The signal $\overline{OH_4}$ from the flip-flop 540 of FIGURE 28 is introduced to the base of the transistor 620, and the term $OH_4$ from that flip-flop is introduced to the base of the transistor 624. The emitter of the transistor 622 is grounded and a signal RECIR is introduced to the base of the latter transistor.

At the signal "GO" and in the absence of the signal RECIR, the flip-flop 618 is triggered to a state corresponding to the flip-flop 540 of the order holder of FIGURE 28. The signal "RECIR" is constituted in a manner to be described and it serves to hold the flip-flop 618 in its false state upon the recirculation of an original signal to prevent an erroneous repetitious triggering of the flip-flop.

The left output terminal of the flip-flop 618 is connected to the base of a transistor 628. The emitter of this transistor is grounded, and its collector is connected to a resistor 630. The resistor 630 may have a resistance of 1.5 kilo-ohms and is connected to the negative terminal of a 3 volt direct voltage source. An output terminal designated $GD_4$ is connected to the collector of the transistor 628.

FIGURE 29E represents a gate driver flip-flop 632. The input connections of the flip-flop 632 are similar to those of the flip-flop 618 of FIGURE 29D. The flip-flop is connected back to the output terminals $OH_5$ and $OH_5$ of the flip-flop 632 of FIGURE 28 and is triggered to a state corresponding to the state of that flip-flop upon the appearance of the "GO" signal. The left input terminal of the flip-flop 632 is also connected to the collector of a transistor 634 which has a grounded emitter. The flip-flop 632 develops a term $GD_5$ at its right output terminal. The "RECIR" signal is introduced to the base of the transistor 634. Upon occurrence of the "RECIR" term, therefore, the flip-flop 632 like the flip-flop 618 is held in its false state regardless of the states of the other input terms.

Figure 29F:
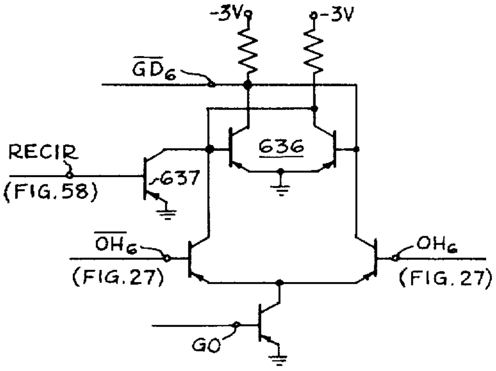

The flip-flop 636 of FIGURE 29F is connected in a manner similar to the flip-flops of FIGURE 29E. The input terminals of the flip-flop 636 are connected to the output terminals $OH_6$ and $\overline{OH_6}$ of the flip-flop 544 of the order holders of FIGURE 28. Again, upon the occurrence of the "GO" signal, the flip-flop 636 is triggered to a state corresponding to the state of the flip-flop 544 in the order holder. The flip-flop 636 has a left output terminal at which the signal $\overline{GD_6}$ appears.

Therefore, in the internal following the occurrence of the $Sh_2$ term, and during the next character time $C_1$, a selected character from the command revolver which occurs at character time $C_1$ is shifted bit-by-bit into the order holders of FIGURE 23. The flip-flops which make up the order holders are triggered into their one or zero states depending upon whether their corresponding bit is one or zero. When the flip-flops of the order holders have been set to a state corresponding to the character to be executed, the "GO" term becomes a one, and the gate driver flip-flops of FIGURES 29A–29F are simultaneously actuated to take on states corresponding respectively to the different bits representing that character, and the corresponding micro command is executed.

The different commands listed in FIGURES 2 and 3 are established by the different states of the gate driver flip-flops of FIGURES 29A–29F. The output terminals of the gate drivers are connected to the logic circuitry of FIGURES 30–45 to set up the different paths in the computer in response to the different commands used by the computer.

The logic network of FIGURE 30 includes an input terminal which is connected to the $GD_3$ output terminal of FIGURE 29C. This input terminal is connected to the base of a transistor 640 and to the base of a transistor 642. The collector of the transistor 640 is connected to a 2.2 kilo-ohm resistor 644 which in turn is connected to the negative terminal of the 3 volt direct voltage source. The collector of the transistor 642 is likewise connected to a 2.2 kilo-ohm resistor 646 which also is connected to the negative terminal of the 3 volt direct voltage source. The collector of the transistor 642 is connected to an output transistor 640 is connected to an output terminal designated ($\overline{GD_2}+\overline{GD_3}$). The collector of the transistor 640 is connected to an output terminal designated ($GD_2+\overline{GD_3}$).

The network of FIGURE 30 also includes an input terminal designated $\overline{GD_2}$ which is connected to corresponding output terminal of the gate driver flip-flop of FIGURE 29B. This terminal is connected to the base of a flip-flop 648. The emitter of the flip-flop 648 is grounded, and its collector is connected to the emitter of the transistor 640 and to the base of a transistor 650. The emitter of the transistor 650 is grounded, and the collector of this transistor is connected to the emitter of the transistor 642 and to a resistor 652. The resistor 652 may have a resistance of 2.2 kilo-ohms and is connected to the negative terminal of a 3 volt direct voltage source.

The network of FIGURE 30 has an input terminal designated $\overline{GD_3}$ which is connected to the corresponding output of FIGURE 29C, and the network has an input terminal designated $GD_2$ which is connected to the corresponding output terminal of FIGURE 29B. The input terminal $\overline{GD_3}$ is connected to the base of a transistor 654, and the input terminal $GD_2$ is connected to the base of a transistor 656. The emitter of the transistor 656 is grounded, and the collector of this transistor is connected to the emitter of the transistor 654. The collector of the transistor 654 is connected to a resistor 658 having a resistance of, for example, 5.6 kilo-ohms. This resistor is connected to the negative terminal of the 3 volt direct voltage source. The collector of the transistor 654 is also connected to an output terminal designated ($\overline{GD_2}+GD_3$).

The network of FIGURE 30 includes an input terminal designated $\overline{GD_3}$. This input terminal is connected to the corresponding output terminal of the gate driver flip-flop of FIGURE 29C. The input terminal is connected to the base of a transistor 660. The emitter of this transistor is connected to the collector of the transistor 648, and the collector of the transistor 660 is connected to a resistor 662. This resistor may have a resistance of 2.2 kilo-ohms, and it is connected to the negative terminal of the 3 volt direct voltage source. The collector of the transistor 660 is also connected to an output terminal designated ($GD_2+GD_3$).

The network of FIGURE 30 has a pair of input terminals designated respectively, as $GD_4$ and $GD_5$. The input terminal $GD_4$ is connected to the corresponding output terminal of the flip-flop of FIGURE 29D, and the input terminal $GD_5$ is connected to the corresponding output terminal of the circuit of FIGURE 29E. The input terminal $GD_4$ is connected to the base of a transistor 664, and the input terminal $GD_5$ is connected to the base of a transistor 666. The collector of the transistor 664 is connected to a resistor 668, which may have a resistance of 2.2 kilo-ohms, and which is connected to the negative terminal of the 3 volt direct voltage source. The collector of the transistor 664 is also connected to an output terminal designated ($\overline{GD_4}+\overline{GD_5}$).

The emitter of the transistor 666 is grounded, and the collector of the transistor is connected to the emitter of the transistor 664, to the base of a transistor 670, and to the emitter of a transistor 672. The emitter of the transistor 670 is grounded, and the collector of the transistor is connected to a resistor 674, of, for example, 2.2 kilo-ohms, this resistor being connected to the negative terminal of the 3 volt direct voltage source. The collector of the transistor 670 is connected to an output terminal designated $\overline{GD_5}$, and the collector is also connected to the emitter of a transistor 676 and to the base of a transistor 678.

The input terminal $GD_4$ is further connected to the base of a transistor 680 and to the base of a transistor 682. The emitter of the transistor 680 is grounded, and the collector of the transistor is connected to a 2.2 kilo-ohm resistor 684 which is connected to the negative terminal of the 3 volt direct voltage source. The collector of the transistor 680 is also connected to an output terminal designated $\overline{GD_4}$, to the base of the transistor 672 and to the base of the transistor 676.

The collector of the transistor 676 is connected to a 2.2 kilo-ohm resistor 686 which is connected to the negative terminal of the 3 volt direct voltage source. The collector of the transistor 676 is also connected to an output terminal designated ($GD_4+GD_5$).

The collector of the transistor 672 is connected to a 2.2 kilo-ohm resistor 688 which in turn is connected to the negative terminal of the 3 volt direct voltage source. The collector of the transistor 672 is also connected to an output terminal designated ($\overline{GD_5}+GD_4$).

The network of FIGURE 30 includes a further input terminal designated $\overline{GD_6}$. This input terminal is connected to the corresponding output terminal of the gate driver circuitry of FIGURE 29F. The input terminal $\overline{GD_6}$ is connected to the base of a transistor 692. The emitter of the transistor 690 is grounded, and the collector of this transistor is connected to a resistor 694. The resistor 694 is connected to the negative terminal of the 3 volt direct voltage source. The collector of the transistor 690 is connected to the collectors of a pair of transistors 696 and 698, and all these collectors are connected to an output terminal designated ($GD_4 \cdot \overline{GD_5} \cdot GD_6$). The emitters of the transistors 696 and 698 are both grounded. The input terminal $GD_5$ is connected to the base of the transistor 696, and the collector of the transistor 680 is connected to the base of the transistor 698.

The emitter of the transistor 692 is grounded, and the collector of this transistor is connected to a resistor 700. The resistor 700 may have a resistance of 2.2 kilo-ohms, and is connected to the negative terminal of the 3 volt direct voltage source. The collector of the transistor 692 is connected to the base of a transistor 702. The emitter of the transistor 702 is grounded, and the collector of this transistor is connected to the emitter of the transistor 678. The collector of the transistor 678 is connected to the emitter of the transistor 682. The collector of the transistor 682 is connected to a resistor 704, which, in turn, is connected to the negative terminal of the 3 volt direct voltage source. The resistor 704 may have a resistance of 2.2 kilo-ohms. The collector of the transistor 682 is also connected to an output terminal designated $\overline{GD_4}+GD_5+\overline{GD_6}$. In a manner to be described, the various composite output signals developed by the logic network of FIGURE 30 are used in synthesizing the different command terms.

The BRANCH term is produced by the logic circuitry of FIGURE 31. The BRANCH term is used for BRANCH operation as mentioned in conjunction with the description of the command revolver circuitry of FIGURE 27.

The circuitry of FIGURE 31 includes an exclusive "or" network 704. This network is described and claimed in co-pending application S.N. 760,031, filed September 9, 1958.

The exclusive "or" network includes a first transistor 706 and a second transistor 708. The collectors of these transistors are connected together and to a 3.9 kilo-ohm resistor 709. The other terminal of this resistor is connected to the negative terminal of the 3 volt direct voltage source. These collectors are also connected to a terminal designated $$\overline{(\overline{GD_1}\cdot COMP+\overline{COMP}\cdot GD_1)}$$

The exclusive "or" network also includes a pair of transistors 710 and 712. The emitters of these transistors are grounded, and the collector of the transistor 710 is connected to the emitter of the transistor 706 and to the base of the transistor 708, whereas the collector of the transistor 712 is connected to the emitter of the transistor 708 and to the base of the transistor 706. The collector of the transistor 710 is also connected to a resistor 714. This resistor may have a resistance of 2.2 kilo-ohms and it is connected to the negative terminal of the 3 volt direct voltage source. The collector of the transistor 712, on the other hand, is connected to a 4.7 kilo-ohm resistor 716, and this latter resistor is also connected to the negative terminal of the 3 volt direct voltage source. The base of the transistor 710 is connected to an input terminal designated $\overline{GD_1}$, and this terminal is connected to the corresponding output terminal of the gate driver circuit of FIGURE 29A to derive the $\overline{GD_1}$ term.

The transistor 712, on the other hand, has its base connected to the output terminal $\overline{COMP}$ of the comparator, which will be described. This terminal goes negative whenever the comparator is in a false state so that the term $\overline{COMP}$ is one. The collector of the transistor 710 is also connected to an output terminal designated $GD_1$. This output terminal represents a convenient auxiliary source of the $GD_1$ term, in addition to the output terminal of the circuit of FIGURE 29A bearing the same designation.

The exclusive "or" network 704 is so constituted that when either of its input terms is zero, it will translate the other to the terminal $$\overline{(\overline{GD_1}\cdot COMP+\overline{COMP}\cdot GD_1)}$$

However, when both the input terms are one or zero, the network is rendered non-conductive. For example, when the input term $\overline{COMP}$ is one, the transistor 712 conducts to complete a circuit to the transistor 708 but to cut off the transistor 706. Then, when $\overline{GD_1}$ is zero, the transistor 710 is rendered non-conductive so that the base of the transistor 708 is swung negative to render the latter transistor conductive and complete the path through the transistors 712 and 708. Likewise, when the term $\overline{GD_1}$ is one and the term $\overline{COMP}$ is zero, a circuit is completed to the output terminal through the transistors 710 and 706. However, when both the input terms $\overline{GD_1}$ and $\overline{COMP}$ are one, the resulting conductivity of the transistors 710 and 712 causes the transistors 706 and 708 to be cut off. Likewise, when both the input terms $\overline{GD_1}$ and $\overline{COMP}$ are zero, the resulting non-conductivity of the transistors 710 and 712 interrupts the circuit through the exclusive "or" network.

The exclusive "or" network therefore functions in a manner usual of networks of this general type. The network is advantageous in that it accomplishes the desired result with fewer components than most of the prior art networks. Also, it provides a convenient source for the converse of the input signals at the collectors of the transistors 710 and 712 respectively, this being illustrated by the production of the signal $GD_1$ at the corresponding output terminal.

The output terminal from the exclusive "or" network 704 is connected to the base of a transistor 718. The collector of the transistor 718 is connected to a 3.9 kilo-ohm resistor 720 which, in turn, is connected to the negative terminal of the 3 volt direct voltage source. The network includes a transistor 722. The emitter of this transistor is grounded and its base is connected to an input terminal designated $GD_5$. This input terminal is connected to the corresponding output terminal of the gate driver circuit of FIGURE 29E. The network further includes a transistor 724 whose emitter is grounded, and whose base is connected to an input terminal designated $(\overline{GD_2}+GD_3)$. This latter input terminal is connected to the corresponding output terminal of the network of FIGURE 30.

The collector of the transistor 722 and the collector of the transistor 724 are both connected to a resistor 723 and to the base of a transistor 726. The resistor 723 is connected to the negative terminal of the 3 volt direct voltage source. The emitter of this latter transistor is grounded, and the collector is connected to the emitter of the transistor 718.

The network of FIGURE 31 includes an input terminal designated $(GD_4+GD_5)$ which is connected to a corresponding output terminal of the network of FIGURE 30. This input terminal is connected to the base of a transistor 728. The emitter of the transistor 728 is grounded, and the collector of the transistor is connected to a 3.9 kilo-ohm resistor 730. This resistor is connected to the negative terminal of the 3 volt direct voltage source.

The network of FIGURE 31 also includes an input terminal designated $(GD_2+GD_3)$. This input terminal is connected to the corresponding output terminal of FIGURE 30. The latter input terminal is connected to the base of a transistor 732. The emitter of this transistor is grounded, and the collector of the transistor, together with the collector of the transistor 728, is connected to the base of a transistor 734. The emitter of the transistor 734 is grounded, and the collector of this transistor is connected to the emitter of a transistor 736 and to the emitter of a transistor 738. The base of the transistor 736 is connected to an input terminal designated $\overline{GD_1}$. This input terminal is connected to the corresponding output terminal of FIGURE 29A. The base of the transistor 738, on the other hand, is connected to an input terminal designated $GD_1$. This input terminal may be connected to the output terminal of the exclusive "or" network 704 or to the corresponding output terminal of the circuitry of FIGURE 29A.

The collector of the transistor 736 is connected to the base of a transistor 740. The emitter of the transistor 740 is grounded, and the collector of this transistor is connected to one terminal of a resistor 742. The resistor 742 may have a resistance of 1.5 kilo-ohms, and this resistor is connected to the negative terminal of the 3 volt direct voltage source. The collector of the transistor 740 is also connected to an output terminal at which the "BRANCH" term is obtained.

The transistor 738 has its collector connected to a 3.9 kilo-ohm resistor 744. This resistor in turn connects with the negative terminal of the 3 volt direct voltage source. The collector of the transistor 738 is connected to an output terminal at which the term $\overline{A}$ is derived.

The logic equations for the terms BRANCH and $\overline{A}$ is given below:

$$BRANCH=(\overline{GD_1}\cdot COMP+GD_1\cdot \overline{COMP})\cdot GD_2\cdot \overline{GD_3}\cdot GD_5+\overline{GD_1}\cdot \overline{GD_2}\cdot \overline{GD_3}\cdot \overline{GD_4}\cdot \overline{GD_5}$$

$$\overline{A}=\overline{GD_1}+GD_2+GD_3+GD_4+GD_5$$

From the above equation it will be seen that the term BRANCH becomes one in the presence of the command O when the comparator is true, for the command P when the comparator is false, for the command W when the comparator is true, for the command X when the comparator is false, and for the command · regardless of the state of the comparator.

As noted, the network of FIGURE 31 is also used as a convenient source of the converse of the A command. As shown by the code table of FIGURE 3, the A command is represented by the binary number 100001. Therefore, the command A is formed when $GD_1=1$, $\overline{GD_2}=1$, $\overline{GD_3}=1$, $\overline{GD_4}=1$ and $\overline{GD_5}=1$. It follows therefore that the $\overline{A}$ term is formed when the above equation is satisfied, this being accomplished by the network of FIGURE 31.

Figure 32A:
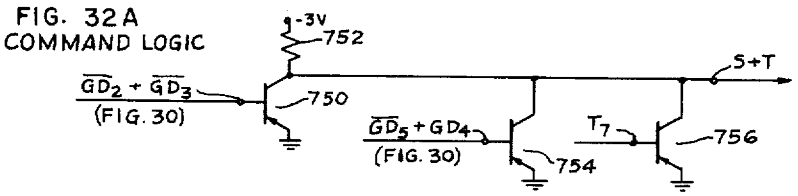

The circuit of FIGURE 32A develops a term which coincides either to the (S) command or to the (T) command. These commands, like the (Q) and (R) commands discussed in FIGURE 26, are test commands. The (S) command designates that the unmasked portion of the contents of a designated word is equal or greater than the contents of the corresponding portion of the word in the data revolver 1. The (T) command, on the other hand, designates that the unmasked portion of the contents of the designated word is equal to the contents of the corresponding portion of the revolver 1. As shown in the table of FIGURE 3, the (S) command is represented by the binary number 110110 and the (T) command is represented by the binary number 110111, the least significant digit being at the right.

The network of FIGURE 32A includes a transistor 750. The emitter of the transistor is grounded, and the collector of this transistor is connected to a resistor 752. The resistor 752 has a resistance of 3.9 kilo-ohms, and it is connected to negative terminal of the 3 volt direct voltage source. The base of the transistor 750 is connected to an input terminal which connects back to the corresponding output terminal of the network of FIGURE 30. This input terminal is designated $\overline{GD_2}+\overline{GD_3}$. The collector of the transistor 750 is also connected to an output terminal designated $(S+T)$, this term corresponds to either the (S) command or the (T) command.

The network of FIGURE 32A includes a transistor 754. The emitter of the transistor 754 is grounded, and the collector of this transistor is connected to the output terminal referred to above. The base of the transistor 754 is connected to an input terminal designated $(\overline{GD_5}+GD_4)$. This input terminal is connected to the corresponding output terminal of the network of FIGURE 30. The network of FIGURE 32A includes a third transistor 756. The emitter of the transistor 756 is grounded, and the collector of this transistor is connected to the output terminal referred to above. The base of the transistor 756 is connected to an input terminal designated $T_7$. A timing signal is introduced to this input terminal, and the timing signal goes negative in correspondence with the seventh or redundancy bit of each character.

The term $GD_1$ corresponds to the least significant digit of the character in the command being executed, and the term $GD_6$ corresponds to the most significant. For the term $(S+T)$ to be true, all the input terms must be false. That is, $GD_2=1$, $GD_3=1$, $GD_4=0$ and $GD_5=1$. Also $T_7=0$. Therefore, the digits of the output terms correspond either to the (S) command or the (T) command of the table of FIGURE 3. The use of a $GD_1$ term in conjunction with the output term of the network of FIGURE 32A provides the (S) command when the $GD_1$ is zero and the (T) command when the GD term is one.

Figure 32B:
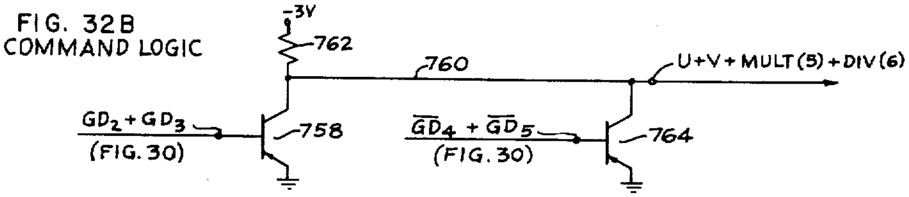

The network of FIGURE 32B provides an output term which corresponds to either of the commands U or V or multiply (5) or divide (6). The command "U" is to add the contents of the designated address to the contents of the data revolver 1, leaving the sum in the revolve 1. The command "V" is to subtract the contents of the designated address from the revolver 1, leaving the difference in the revolver 1.

The MULT or (5) command is to multiply the contents of the revolver 1 by the contents of the revolver 3, and to add the product to the previous contents of the revolver 2. After multiplication, the revolver 3 will contain twelve decimal zeros, and the original contents of the revolver 1 will have been shifted to the left by a number of character positions equal to the number of significant digits originally in revolver 3. The only permissible address with this command is (2).

Likewise, the command DIV of (6) is to divide the contents of the revolver 1 by the contents of the revolver 2; the quotient will be formed in the revolver 3. The number of digits in the quotient is predetermined by the number of consecutive L's stored in the revolver 3 from the left or most significant side, prior to division; the character after the last L must be zero. The least significant digit of the quotient will occupy the $C_1$ position; a zero will always automatically be inserted in the $C_1$ (right side) position of revolver 3. The relative character positions of the dividend, in revolver 1, and the divisor in revolver 2, must be so arranged that the dividend will always be less than ten times as great as the divisor. After division, the revolver 2 will still contain the divisor, unchanged; and the revolver 1 will then contain the remainder, shifted left one character position for each "L" originally in the revolver 3. The significance of these arithmetic operation terms will become more apparent as the description proceeds.

The network of FIGURE 32B includes a transistor 758. The base of this transistor is connected to an input terminal designated $(GD_2+GD_3)$. This input terminal is connected to a corresponding output terminal of the network of FIGURE 30. The emitter of the transistor 758 is grounded, and the collector of the transistor is connected to a lead 760 and to a resistor 762. The resistor 762 has a resistance of 2.2 kilo-ohms, and is connected to the negative terminal of the 3-volt direct voltage source.

The network of FIGURE 32B also includes a transistor 764. The base of the transistor 764 is connected to an input terminal designated $\overline{GD_4}+\overline{GD_5}$. This input terminal is connected to a like output terminal of the network of FIGURE 30. The emitter of the transistor 764 is grounded, and the collector of this transistor is connected to the lead 760. Lead 760 is connected to the output terminal of the network at which the term $$(U+V\ MULT+DIV)$$

is derived. Expressed as a logic equation:

$$U+V+MULT+DIV=\overline{GD_2}\cdot \overline{GD_3}\cdot GD_4\cdot GD_5$$

The term at the output terminal of the logic network of FIGURE 32B is one when $GD_2=0$, $GD_3=0$, $GD_4=1$ and $GD_5=1$. From the table of FIGURE 3 it will be appreciated that this pattern of the GD terms coincides to either the command (U) or the command (V). Also, reference to the table of FIGURE 2 will reveal that this pattern of the GD terms will also correspond to the command MULT or with the command DIV.

Figure 33:
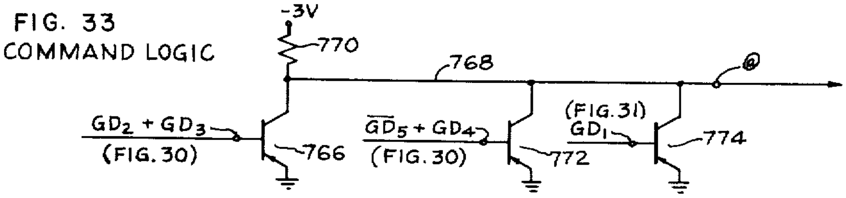

The @ command is derived by the logic network of FIGURE 33. It will be remembered that the @ command formed by the network of FIGURE 33 is used to transfer a block of data from the expandable memory of FIGURES 11A and 11B into the memory block register 1, this being discussed in conjunction with FIGURES 11A and 11B. Also, in the table of FIGURE 3 it will be noted that the command @ is represented by the binary number 11000, with the least significant digit being at the right.

The network of FIGURE 33 includes a transistor 766. The emitter of this transistor is grounded, and its base is connected to an input terminal which is designated $(GD_2+GD_3)$. This input terminal is connected to a corresponding output terminal of FIGURE 30. The collector of the transistor 766 is connected to a lead 768 and to a resistor 770. The resistor may have a resistance of 1.5 kilo-ohms, and it is connected to the negative terminal of the 3 volt direct voltage source. The network also includes a transistor 772 having a grounded emitter, and having a collector connected to the lead 768. The base of the transistor 772 is connected to an input terminal which is designated $(\overline{GD_5}+GD_4)$. This input terminal is connected to a corresponding output terminal of the network of FIGURE 30.

The network of FIGURE 33 additionally includes a transistor 774. The emitter of the latter transistor is grounded, and the collector of this transistor is connected to the lead 768. The base of the transistor 774 is connected to the terminal $GD_1$ of FIGURE 31 or to the similar terminal of the circuit of FIGURE 29A. Expressed as a logical equation:

$$@=\overline{GD_1}\cdot\overline{GD_2}\cdot\overline{GD_3}\cdot\overline{GD_4}\cdot\overline{GD_5}$$

The command @ is formed when $GD_1=0$, $GD_2=0$, $GD_3=0$, $GD_4=0$ and $GD_5=1$. This corresponds to the designation of that command in the table of FIGURE 3. It will be noted that there is no need for the GD term, because the five lesser significant terms fully identify that command, regardless of whether the most significant digit is one or zero. This occurs because there is no other command in the table of FIGURE 2 having the same first five digits.

Figure 34A:
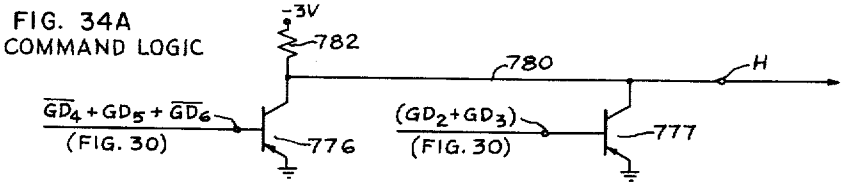

The H command is formed by the network of FIGURE 34A. As shown by the table of FIGURE 3, this command is represented by the binary number 101000, the least significant digit being at the right. When the H command is used with an alpha address, and as noted above, it will clear the addressed input-output buffer and set it to its input mode. The H command is also a test command, and when this command is used with the addresses 1, 2 or 3, it represents that the designated panel switch is in the true position. When this command is used with the address 4, it designates that a "missed record switch" in the tub tape unit is in the true position; this instruction will also reset this switch to the false position.

The network of FIGURE 34A includes a transistor 766 and a transistor 777. The emitters of all these transistors are grounded, and the collectors of these transistors are connected to a lead 780. The lead 780 in turn is connected to a resistor 782 and to an output terminal designated H. The resistor 782 may have a resistance of 2.2 kilo-ohms, and this resistor is connected to the negative terminal of the 3 volt direct voltage source.

The base of the transistor 776 is connected to an input terminal designated $\overline{GD_4}+GD_5+\overline{GD_6}$. This input terminal is connected to the corresponding output terminal of the circuit of FIGURE 30. The base of the transistor 777 is connected to an input terminal designated $GD_2+GD_3$. This input terminal is connected to the corresponding output terminal of the circuitry of FIGURE 30. The command H is true when $GD_1=0$, $GD_2=0$, $GD_3=0$, $GD_4=1$, $GD_5=0$, and $GD_6=1$. This corresponds to the binary designation of that command in the table of FIGURE 3.

Figure 34B:
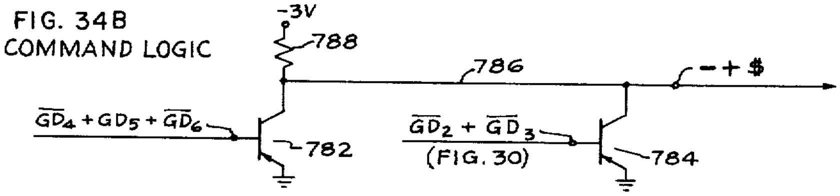

The formation of the term (— + $) is accomplished by the logic circuitry of FIGURE 34B. From the table of FIGURE 3, it will be seen that the command — is represented by the binary number 1011110, and the command $ is represented by the binary number 101111, the least significant digit being at the right.

The command "—" means to shift the contents of the data revolver 1 to the right by the specified number of character positions (similar to the table of command W). The specified number of characters on the right of the previous word will be lost, and the specified number of zeros will be inserted on the left. The command "$" is similar to the command "—" except that it specifies that the contents of data revolver 1 be shifted to the left the specified number of character positions. The specified number of characters on the left of the previous word will be lost, and the specified number of zeros will be inserted on the right.

The network of FIGURE 34B includes a pair of transistors 782 and 784. The emitters of these transistors are grounded, and their collectors are connected to a common lead 786. The lead 786 is connected to a resistor 788 and to an output terminal designated (— + $). The resistor 788 has a resistance of 2.2 kilo-ohms, and is connected to the negative terminal of the 3 volt direct voltage source.

The base of the transistor 782 is connected to an input terminal designated $\overline{GD_4}+GD_5+\overline{GD_6}$. This input terminal is connected to a corresponding output terminal of the network of FIGURE 30. The base of the transistor 784 is connected to an input terminal designated $\overline{GD_2}+\overline{GD_3}$. This input terminal is connected to a corresponding output terminal of the network of FIGURE 30.

The term (— + $) is true when $GD_2=1$, $GD_3=1$, $GD_4=1$, $GD_5=0$ *and* $GD_6=1$. This corresponds with the binary number equivalent of the — and $ commands of the table of FIGURE 3. This term can be expressed by the following logic equation:

$$(-)+(\$)=GD_2\cdot GD_3\cdot GD_4\cdot\overline{GD_5}\cdot GD_6$$

Figure 35:
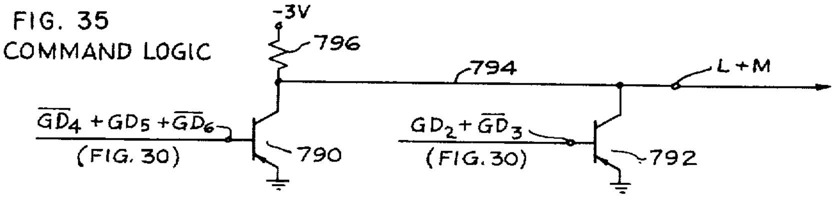

The circuit of FIGURE 35 is used to form the term $(L+M)$. This term corresponds to either the L command or to the M command. The L command designates a shift in the contents of the revolver 3 to the right the specified (as for command W) number of character positions. The specified number of characters on the right will be lost, and the specified number of zeros will be inserted on the left. The M command is similar to the L command and will cause a shift in the contents of the revolver 3 to the right the specified number of character positions. The specified number of characters on the right will be lost, and the specified number of L's will be inserted on the left.

As shown by the table of FIGURE 3, the command L is represented by the binary number 101100, and the command M is represented by the binary number 101101, the least significant digit being on the right.

The network of FIGURE 35 includes a first transistor 790 and a second transistor 792. The emitters of these two transistors are grounded, and their collectors are connected to a common lead 794. The lead 794 is connected to a resistor 796 and to an output terminal designated $(L+M)$. The resistor 796 may have a resistance of 2.2 kilo-ohms, and this resistor is connected to the negative terminal of the 3 volt direct voltage source. The base of the transistor 790 is connected to an input terminal designated $\overline{GD_4}+GD_5+\overline{GD_6}$. This input terminal is connected to an equivalent output terminal of the circuit of FIGURE 30. The base of the transistor 792 is connected to an input terminal designated $(GD_2+\overline{GD_3})$. This input terminal is connected to the corresponding output terminal of the network of FIGURE 30.

The term $(L+M)$ is true when $GD_2=0$, $GD_3=1$, $GD_4=1$, $GD_5=0$, $GD_6=1$. This corresponds to the designation of the L and M commands in the table of FIGURE 3. The term $(L+M)$ may be expressed by the following logical equation:

$$L+M=\overline{GD_2}\cdot GD_3\cdot GD_4\cdot \overline{GD_5}\cdot GD_6$$

Figure 36:
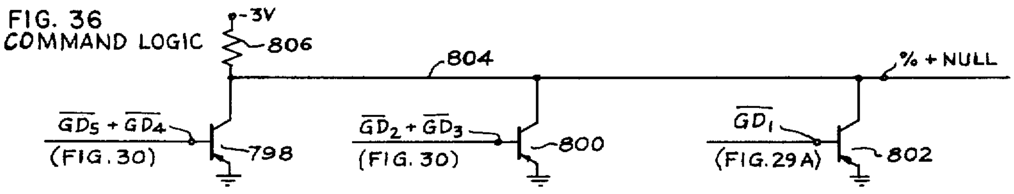

The (%+NULL) term is formed by the network of FIGURE 36. As shown in the tables of FIGURES 2 and 3, the % and NULL commands differ only in that the most significant digit of the NULL command is one and the most significant digit of the % command is zero, all the other digits of these commands are ones. These commands, as discussed in conjunction with the representation of FIGURE 18 cause a general command word to be introduced to the command revolver 5.

The network of FIGURE 36 includes a transistor 798, a transistor 800, and a transistor 802. The emitters of all these transistors are grounded, and their collectors are connected to a common lead 804. The lead 804 is connected to a resistor 806 and to an output terminal designated (%+NULL). The resistor 806 may have a resistance of 1.5 kilo-ohms, and this resistor is connected to the negative terminal of the 3 volt direct voltage source. The base of the transistor 798 is connected to an input terminal designated $\overline{GD_5}+\overline{GD_4}$. This input terminal is connected to the corresponding output terminal of the network of FIGURE 30. In like manner, the base of the transistor 800 is connected to an input terminal designated $\overline{GD_2}+\overline{GD_3}$. This input terminal is also connected to the equivalent output terminal of the network of FIGURE 30. The base of the transistor 802, on the other hand, is connected to an input terminal designated $\overline{GD_1}$. This input terminal is connected to the equivalent output terminal of the gate driver shown in FIGURE 29A.

The term (%+NULL) is a one when $GD_1=1$, $GD_2=1$, $GD_3=1$, $GD_4=1$, and $GD_5=1$. This corresponds to the binary designation of the tables of FIGURES 2 and 3. This may be expressed by the following logic equation:

$$(\%+\text{NULL})=GD_1\cdot GD_2\cdot GD_3\cdot GD_4\cdot GD_5$$

Figure 37:
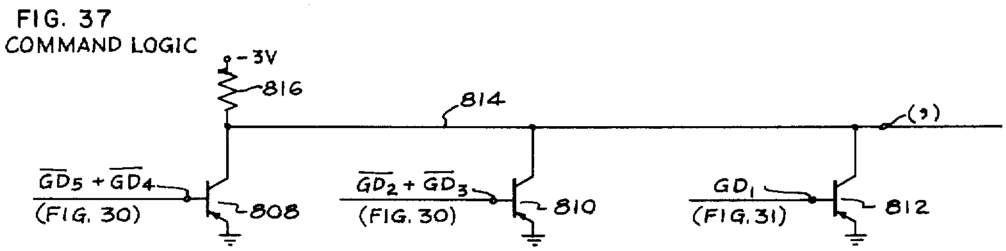

The "," command is obtained by the network of FIGURE 37. This command causes the contents of revolver 1 to be shifted left one character position, losing the high order ($C_{12}$) character, and inserts the designated address character into the low order ($C_1$) character position. As shown in the table of FIGURE 3, the "," command is identified by the binary number 11110, the least significant digit being on the right. There is no necessity for the most significant digit of this command, because there is no equivalent binary number in the table of FIGURE 2. Therefore, the "," command may be fully identified without the need for the most significant digit.

The network of FIGURE 37 includes a transistor 808, a transistor 810 and a transistor 812. The emitters of all these transistors are grounded, and their collectors are connected to a common lead 814. The lead 814 is connected to a resistor 816 and to an output terminal designated as ",". The resistor 816 may have a resistance of 1.5 kilo-ohms, and this resistor is connected to the negative terminal of the 3 volt direct voltage source.

The base of the transistor 808 is connected to an input terminal designated $(\overline{GD_5}+\overline{GD_4})$. This input terminal is connected to the corresponding output terminal of the network of FIGURE 30. The base of the transistor 810 is connected to an input terminal designated $(\overline{GD_2}+\overline{GD_3})$. This input terminal, likewise, is connected to a similar output terminal of the network of FIGURE 30. The base of the transistor 812, on the other hand, is connected to an input terminal designated $GD_1$. This input terminal may, for example, be connected to the equivalent output terminal of the exclusive "or" network of FIGURE 31.

The command "," is true when $GD_1=0$, $GD_2=1$, $GD_3=1$, $GD_4=1$, and $GD_5=1$. This corresponds to the binary designation of that command in the table of FIGURE 3. This may be expressed by the following equation:

$$,=\overline{GD_1}\cdot GD_2\cdot GD_3\cdot GD_4\cdot GD_5$$

Figure 38:
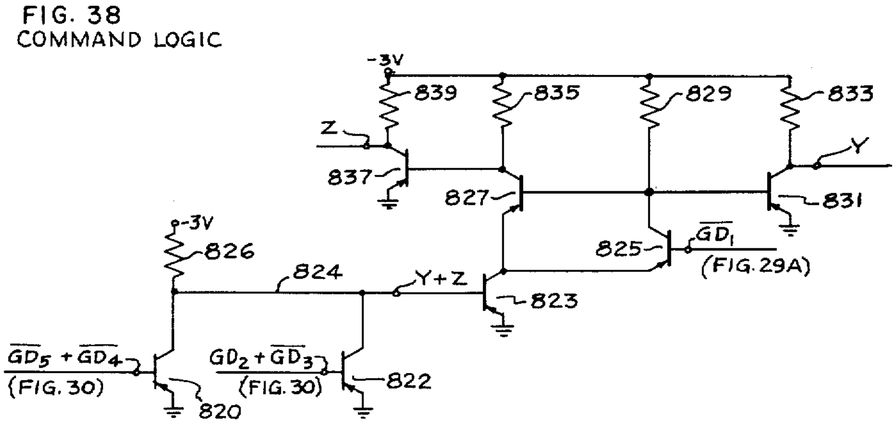

The term $(Y+Z)$ is derived by the network of FIGURE 38, and this network is also used to produce the individual Y and Z terms. The Y command was discussed in conjunction with FIGURE 14 and involved the transfer of an addressed word into the data revolver 2. The Z command, on the other hand, was discussed in conjunction with FIGURE 15, and this command involved the transfer of an addressed word into the data revolver 3. In the case of the Y command, unmasked characters only were transferred to the data revolver Z. The Y command is represented in the table of FIGURE 3 by the binary number 111100, and the Z command is represented by the binary number 111101. Therefore, these commands differ only in their least significant digit. Also, there is no need for a representation of the most significant digit $GD_6$ because of a lack of a similar number in the table of FIGURE 2.

The network of FIGURE 38 includes a transistor 820 and a transistor 822. The emitters of these transistors are grounded, and their collectors are connected to a common lead 824. Lead 824 connects with a resistor 826 and with an output terminal designated $(Y+Z)$. The resistor 826 may have a resistance of 3.9 kilo-ohms, and this resistor is connected to the negative terminal of the 3 volt direct voltage source.

The base of the transistor 820 is connected to an input terminal designated $(\overline{GD_5}+\overline{GD_4})$. This input terminal is connected to the equivalent output terminal of the network of FIGURE 30. The transistor 822, on the other hand, is connected to an input terminal designated $(GD_2+\overline{GD_3})$. This latter input terminal is connected to the equivalent output terminal of the network of FIGURE 30.

The term $(Y+Z)$ is 1 when $GD_2=0$, $GD_3=1$, $GD_4=1$ and $GD_5=1$. This corresponds to the designation of these terms in the table of FIGURE 3. This may be expressed by the following logic equation:

$$Y+Z=\overline{GD_2}\cdot GD_3\cdot GD_4\cdot GD_5$$

The output terminal designated $(Y+Z)$ in FIGURE 38 is connected to the base of a transistor 823. This transistor has a grounded emitter, and its collector is connected to the emitter of a transistor 825 and to the emitter of a transistor 827. The term $\overline{GD_1}$ derived from the gate driver circuit of FIGURE 29A is applied to the base of the transistor 825. The collector of the transistor 825 is connected to a resistor 829 and to the base of a transistor 831. The resistor 829 has a resistance of 3.9 kilo-ohms, and is connected to the negative terminal of the three volt direct voltage source.

The transistor 831 has a grounded emitter, and its collector is connetced to an output terminal designated Y and to a resistor 833. The resistor 833 has a resistance of 2.2 kilo-ohms, and is connected to the negative terminal of the three volt direct voltage source.

The collector of the transistor 827 is connected to a resistor 835 and to the base of a transistor 837. The resistor 835 is connected to the negative terminal of the three volt direct voltage source, and this resistor has a resistance of 3.9 kilo-ohms.

The emitter of the transistor 837 is grounded, and its collector is connected to an output terminal designated (Z) and to a resistor 839. The resistor 839 has a resistance of 2.2 kilo-ohms, and is connected to the negative terminal of the three volt direct voltage source. The term (Z) is derived at the output terminal designated (Z).

As noted above, the terms (Y) and (Z) are similar except that the least significant bit for (Y) is zero and for (Z) is a one. Therefore, when the term $(Y+Z)$ is true, the transistor 823 is conditioned for conduction. If the term $\overline{GD_1}$ is also true, the transistor 825 becomes conductive so that the transistor 831 is rendered non-conductive and the output terminal (Y) goes high. On the other hand, if the term $\overline{GD_1}$ is false, the transistor 827 is rendered conductive in the presence of the $(Y+Z)$ term so that the transistor 837 is cut off and the output terminal (Z) goes high.

Figure 39A:
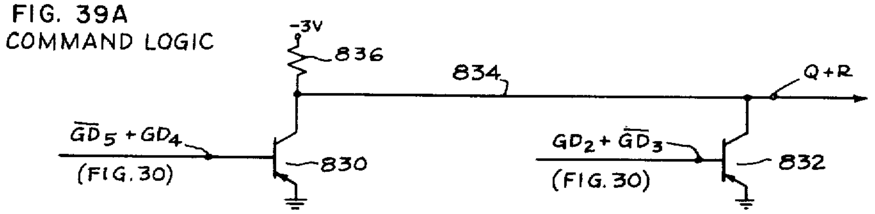

The derivation of the term $(Q+R)$ is made by the logic circuitry of FIGURE 39A. It will be remembered that this term is used in the circuitry of FIGURE 26, and that (Q) and (R) are test commands described above. The command (Q) is represented in the table of FIGURE 3 by the binary number 110100, and the command (R) is represented by the binary number 110101, the least significant digit in both instances being at the right.

The network of FIGURE 39A includes a transistor 830 and a transistor 832. The emitters of both these transistors are grounded, and their collectors are connected to a common lead 834. The lead 834 is connected to a resistor 836 and to an output terminal designated $(Q+R)$. The resistor 836 has a resistance of 2.2 kilo-ohms, and this resistor is connected to the negative terminal of the 3-volt direct voltage source. The base of the transistor 830 is connected to an input terminal designated $\overline{GD_5}+GD_4$. This terminal is connected to the equivalent output terminal of the network of FIGURE 30. The base of the transistor 832, on the other hand, is connected to an input terminal designated $GD_2+\overline{GD_3}$ This latter input terminal is also connected to its equivalent output terminal of the network of FIGURE 30. The term $Q+R$ is true when $GD_2=0$, $GD_3=1$, $GD_4=0$, and $GD_5=1$. This corresponds to the designation of the (Q) or (R) commands in the table of FIGURE 3.

Figure 39B:
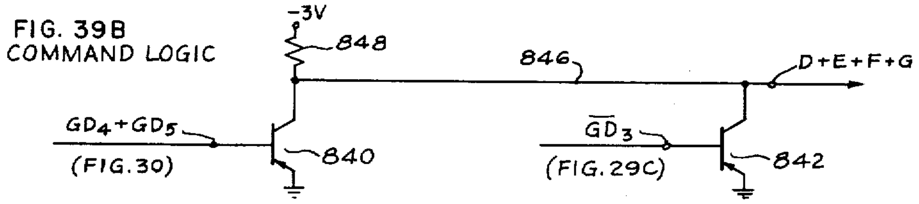

The network of FIGURE 39B is used to derive a term $(D+E+F+G)$. The D, E, F and G commands were described in conjunction with FIGURE 3, and these commands involve transfers into the data revolver 1. The command (D) is represented, as shown in the table of FIGURE 3, by the binary number 100100, the command (E) by the binary number 100101, the command F by the binary number 100110, and the command G by the binary number 100111, the least significant digit being at the right.

The network of FIGURE 39B includes a transistor 840 and a transistor 842. The emitters of these transistors are grounded, and their collectors are connected to a common lead 846. Lead 846 is connected to a resistor 848 and to an output terminal designated $(G+E+F+G)$. The resistor 848 may have a resistance of 2.2 kilo-ohms and is connected to the negative terminal of the 3 volt direct voltage source.

The base of the transistor 840 is connected to an input terminal designated $GD_4+GD_5$. This input terminal is connected to the equivalent output terminal of the network of FIGURE 30. The base of the transistor 842 is connected to an input terminal designated $\overline{GD_3}$. This input terminal is connected to the equivalent output terminal of the gate driver circuit of FIGURE 29C.

The output term $(D+E+F+G)$ is formed when $GD_3=1$, $GD_4=0$, and $GD_5=0$. This corresponds to the included terms of the commands D, E, F, or G of the table of FIGURE 3. This may be expressed by the following logical equation:

$$D+E+F+G=GD_3\cdot\overline{GD_4}\cdot\overline{GD_5}$$

Figure 40:
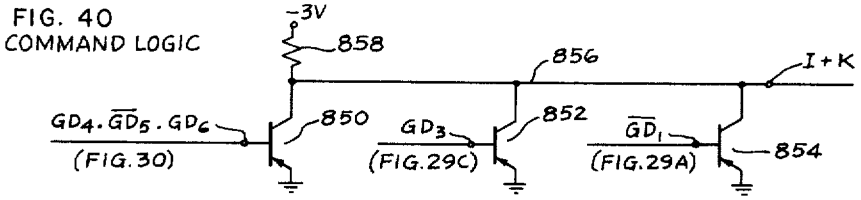

An $(I+K)$ term is formed by the network of FIGURE 40. Both these commands are block transfer commands and were described in conjunction with FIGURE 12. The command I in FIGURE 3 is represented by the binary number 101001, and the command K is represented by the binary number 101011, the least significant digit being at the right. The network of FIGURE 40 includes a transistor 850, a transistor 852 and a transistor 854. The emitters of all these transistors are grounded, and their collectors are connected to a common lead 856. The lead 856 is connected to a resistor 858 and to an output terminal designated $(I+K)$. The value of the resistor 858 is 2.2 kilo-ohms, and this resistor is connected to the negative terminal of the 3 volt direct voltage source.

The base of the transistor 850 is connected to an input terminal designated $GD_4\cdot\overline{GD_5}\cdot GD_6$. This input terminal is connected to the equivalent output terminal of the network of FIGURE 30. The base of the transistor 852 is connected to an input terminal designated $GD_3$. This input terminal is connected to the equivalent output terminal of the gate driver of FIGURE 29C. The base of the transistor 854 is connected to an input terminal designated by $\overline{GD_1}$. This latter input terminal is connected to the equivalent output terminal of the gate driver of FIGURE 29A.

The term $(I+K)$ is true when $GD_1=1$, $GD_3=0$, $GD_4=1$, $GD_5=0$, and $GD_6=1$. This corresponds to the binary designation of the commands I or K in FIGURE 3. This may be expressed by the logical equation:

$$(I+K)=GD_1\cdot\overline{GD_3}\cdot GD_4\cdot\overline{GD_5}\cdot GD_6$$

Figure 41:
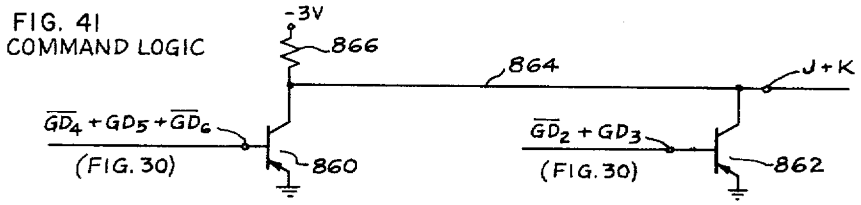

The term $(J+K)$ is derived by the network of FIGURE 41. The commands (J) and (K) were also described in conjunction with FIGURE 12. The command J is represented in the table of FIGURE 3 by the binary number 101010, the least significant digit being at the right.

The network of FIGURE 41 includes a transistor 860 and a transistor 862. The emitters of these transistors are grounded, and their collectors are connected to a common lead 864. Lead 864 is connected to a resistor 866 and to an output terminal designated $(J+K)$. The resistor 866 has a resistance of 5.6 kilo-ohms, and this resistor is connected to the negative terminal of the 3 volt direct voltage source.

The base of the transistor 860 is connected to an input terminal designated $\overline{GD_4}+GD_5+\overline{GD_6}$. This input terminal is connected to the equivalent output terminal of the circuit of FIGURE 30. The base of the transistor 862 is connected to an input terminal designated $\overline{GD_2}+GD_3$. This latter input terminal is connected to the corresponding output terminal of the network of FIGURE 30.

The $(J+K)$ term is true when $GD_2=1$, $GD_3=0$, $GD_4=1$, $GD_5=0$ and $GD_6=1$. This corresponds to the designation of the equivalent digits in FIGURE 3. This may be expressed by the following logical equation:

$$(J+K)=GD_2\cdot\overline{GD_3}\cdot GD_4\cdot\overline{GD_5}\cdot GD_6$$

Figure 42:
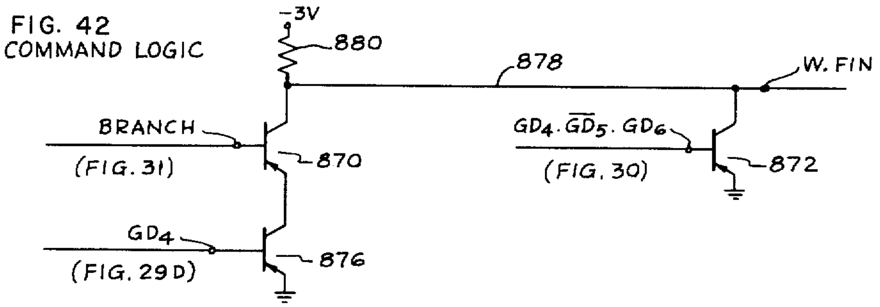

A term (W.FIN) is derived by the network of FIGURE 42. This term corresponds to all the commands which end in one word time. The network of FIGURE 42 includes a transistor 870 and a transistor 872. The emitter of the transistor 870 is connected to the collector of a transistor 876. The emitters of the transistors 872 and 876 are grounded. The collectors of the transistors 870 and 872 are connected to a common lead 878. The lead 878 is connected to a resistor 880 having a resistance of 5.6 kilo-ohms. The resistor 880 is connected to the negative terminal of the 3-volt direct voltage source. The lead 878 is also connected to the output terminal designated (W.FIN).

The base of the transistor 870 is connected to an input terminal designated BRANCH. This input terminal is connected to the equivalent output terminal of the network of FIGURE 31. The base of the transistor 876 is connected to an input terminal designated $GD_4$. This latter input terminal is connected to the equivalent output terminal of the network of FIGURE 29D.

The base of the transistor 872 is connected to an input designated $GD_4$ $\overline{GD_5}$ $GD_6$. This input terminal is connected to the equivalent output terminal of the network of FIGURE 30.

The term (W.FIN) may be represented by the following logical equation:

$$(W.FIN)=(\overline{BRANCH}+GD_4)(\overline{GD_4}+GD_5+\overline{GD_6})$$

The network for deriving the 61 term and the WA term is shown in FIGURE 43. This network includes a transistor 900 having a grounded emitter and having a collector connected to an output terminal designated 61, the term 61 appearing at that output terminal. The collector of the transistor 900 is connected to a 3.9 kilo-ohm resistor 902, and the other terminal of this resistor is connected to negative terminal of the 3 volt direct voltage source.

The base of the transistor 900 is connected to the collector of a transistor 904 and to the collector of a transistor 906. The base of the transistor 904 is connected to an input terminal designated 1R. This input terminal is connected to the output terminal of the read flip-flop of the data revolver assembly 1 which will be described in conjunction with FIGURE 74. The base of the transistor 906 is connected to an input terminal designated SUM. This input terminal is connected to the adder network of the computer which will be described in conjunction with FIGURES 77, 78 and 79.

The emitter of the transistor 904 is connected to the collector of a transistor 908, and the emitter of the transistor 906 is connected to the collector of a transistor 910. The emitter of the transistor 910 is grounded, and its base is connected to the collector of a transistor 912. The emitter of the latter transistor is grounded and its base is connected to the base of the transistor 908. The emitter of the transistor 908 is also grounded. The collector of the transistor 912 is connected to a 3.9 kilo-ohm resistor 914, and this resistor is connected to the negative terminal of the 3 volt direct voltage source.

The base of the transistor 912 is connected to the collectors of a pair of transistors 916 and 918. These collectors are also connected to a 3.9 kilo-ohm resistor 920, the resistor being connected to the negative terminal of the 3 volt direct voltage source. The emitter of the transistor 918 is grounded, and the base of this transistor is connected to an input terminal designated $$(U+V+MULT+DIV)$$

This term is derived from the network of FIGURE 32B, and it is a one when an arithmetic operation is being performed.

The emitter of the transistor 916 is connected to the collector of a transistor 922, and the emitter of the latter transistor is connected to the collector of a transistor 924. The emitter of the transistor 924 is grounded. The base of the transistor 916 is connected to an input terminal designated $\overline{GD_1}$, this term being derived from the network of FIGURE 29A. The base of the transistor 922 is connected to an input terminal designated $GD_2$, the latter term being derived from the network of FIGURE 29B. The base of the transistor 924 is connected to an input terminal designated $\overline{GD_3}$, this latter term being derived from the gate driver circuit of FIGURE 29C.

A transistor 901 has its collector connected to the collector of the transistor 900, and the emitter of the transistor 901 is connected to the collector of a transistor 903, the emitter of the latter transistor being grounded. The base of the transistor 901 is connected to an input terminal designated $T_7$. A timing signal is introduced to this input signal which is one at bit time $T_7$ of each character, this bit corresponding to the parity or redundancy bit. The base of the transistor 903 is connected to an input terminal designated $\overline{RED}$. This terminal is connected to a redundancy or parity bit generator which will be described in conjunction with FIGURE 45. This generator, in effect, counts the number of ones for each binary number in the computer and provides a one at the 7-bit position when the ones of any number are odd and a zero at the 7-bit position when the ones are even.

A further transistor 905 has its collector connected to the collector of the transistor 906 and to a 3.9 kilo-ohm resistor 907. The resistor is connected to a negative terminal of the three-volt direct voltage source, and the emitter of the transistor 905 is grounded. The base of the transistor 905 is also connected to the input terminal designated $T_7$.

Therefore, during the seventh bit time of any binary number, the transistor 905 becomes conductive to render the network described above ineffective, with the exception of the transistors 901 and 903. The transistor 901 is conductive, and if the redundancy bit generator is a zero at the seventh bit time, the term 61 goes to one to provide a redundancy bit of one. Alternately, when the term $\overline{RED}$ is a one, the resulting flow of current through the transistors 901 and 903 causes the term 61 to go to zero at the seventh bit time.

For all other bits of each binary number, however, the transistor 901 and the transistor 905 are both nonconductive. At times other than the seventh bit time, the term 61 represents either the contents from the adder of the computer as represented by the (SUM) term introduced to the base of the transistor 906, or by the contents of the data revolver 1 as represented by the term 1R introduced to the base of the transistor 904.

During an arithmetic operation, the term $$(U+E+MULT+DIV)$$

is true, and the transistor 918 is rendered conductive. This causes the transistor 912 to become nonconductive and the transistor 910 to become conductive. Therefore, the output from the adder is translated through the transistors 906 and 900 to the output terminal 61. At the same time, the transistor 908 is rendered nonconductive to break the circuit to the transistor 904. Therefore, during an arithmetic operation, the output from the data revolver 1 is not read to the output terminal 61.

In like maner, when the term $\overline{GD_1}\cdot GD_2\cdot\overline{GD_3}$ is a one, the transistors 916, 922 and 924 are rendered conductive. This has the same effect as the arithmetic operation commands described above, so that the output of the adder rather than the data revolver one is read to the output terminal 61. The term $\overline{GD_1}.GD_2.\overline{GD_3}$ is a one during the command B, and during several other commands. For all other commands, the transistor 908 rather than the transistor 910 is rendered conductive so that the output from the data revolver one is read to the output terminal 61.

Expressed logically:

$$61=T_7\overline{RED}+SUM(\overline{GD_1}GD_2\overline{GD_3}+U+V+MULT+DIV)+1R(GD_1+GD_2+GD_3+\overline{U}\cdot\overline{V}\cdot\overline{MULT}\cdot\overline{DIV})$$

The collector of the transistor 912 is connected to the base of a transistor 930. The emitter of the transistor 930 is grounded, and the collector of this transistor is connected to the emitter of a transistor 932. The collector of the transistor 932 is connected to a terminal of a 3.9 kilo-ohm resistor 934, and this resistor is connected to the negative terminal of the 3 volt direct voltage source. The collector of the transistor 932 is connected to the base of a transistor 936. The emitter of the latter transistor is grounded, and the collector is connected to a resistor 938. The resistor 938 may have a resistance of 2.2 kilo-ohms, and this resistor is connected to the negative terminal of the 3 volt direct voltage source. The collector of the transistor 936 is also connected to an output terminal designated WA and at which the WA term appears.

The collector of the transistor 930 is also connected to the collector of a transistor 940. The base of the latter transistor is connected to an input terminal designated $GD_1$ to which the term $GD_1$ is introduced. This term is derived from the network of FIGURE 31.

The emitter of the transistor 940 is connected to the collector of a transistor 942 and to the collector of a transistor 944. The emitters of both these transistors are grounded. The base of the transistor 942 is connected to an input terminal which receives the term $\overline{A}$ which is the converse of the A command. This term is produced by the network described in conjunction with FIGURE 31. The transistor 944, on the other hand, has its base connected to a terminal which receives a term MSK. This latter term is produced by a network which will be described in conjunction with FIGURE 73.

The base of the transistor 932 is connected to the collector of a transistor 946. The emitter of the latter transistor is grounded and its collector is further connected to a resistor 948. The resistor 948 may have a resistance of 3.9 kilo-ohms, and this resistor is connected to the negative terminal of the 3 volt direct voltage source. The base of the transistor 946 is connected to an input terminal which receives the term $GD_4+GD_5$. This term is produced by the network described in conjunction with FIGURE 30.

The term WA may be expressed by the following logical equation:

$$WA=B+ARITH+GD_1(\bar{A}+MSK)$$

where:

$$B=GD_1\overline{GD_2}\cdot\overline{GD_3}\cdot\overline{GD_4}\cdot\overline{GD_5}$$

$$ARITH=U+V+MULT+DIV$$

It is evident, therefore, that the term WA represents a group of commands. This group includes all the commands whose least significant digit is a one, with the exception of the A command. For the A command, the masked term MSK which is derived in a manner to be described, must also be a one. That is, the WA term is a one only for the unmasked characters during an A command. The WA term, therefore, includes the commands C, E, G, I, K, etc., from the table of FIGURE 3. The WA term also includes the command B, as shown by the equation and it includes the arithmetic commands U, V, MULT and DIV.

The network of FIGURE 44 is used to produce the terms $WA\cdot\#g$, $WA\cdot61\#g$, WA61*g*, and WA*g*. The network includes a transistor 950 whose collector is connected to an output terminal designated $WA\cdot\#g$. The base of the transistor 950 is connected to an input terminal designated #A, and this term is a one for any numeric address. The term #A is derived from the network to be described in conjunction with FIGURE 48E.

The emitter of the transistor 950 is connected to the collector of a transistor 952, and the emitter of the latter transistor is grounded. The base of the transistor 952 is connected to an input terminal which receives the term WA from the network of FIGURE 43. A transistor 953 with a grounded emitter is also provided, and its base also receives the term WA. The collector of the transistor 953 is connected to an output terminal designated $WA\cdot g$.

The output terminal $WA\cdot g$ goes to ground whenever the term WA is one, and the terminal $WA\cdot\#g$ goes to ground when the term WA introduced to the transistor 952 is a one, and for any numeric address because the term #A introduced to the transistor 950, is then a one.

The term 61 from the network of FIGURE 43 is introduced to the base of a transistor 954. The emitter of this transistor is connected to the collector of the transistor 953, and the collector of the transistor 954 is connected to an output terminal $WA\cdot61g$ and to the emitter of a transistor 956. The output terminal $WA\cdot61g$ reads out the contents 61 when WA is a one, this terminal going to ground for each binary one.

The base of the transistor 956 is connected to the input terminal which receives the term #A, and this latter transistor is rendered conductive in the presence of a numeric address. The collector of the transistor 856 connects with an output terminal $WA\cdot61\#g$, and this output terminal goes to ground in the presence of each binary 1 as it reads the contents of the term 61. This is possible, however, only when the term WA is one and in the presence of a numeric address rendering #A one. It will be remembered that the term $WA\cdot61\cdot\#g$ was used in the logic circuitry of the command revolver 5 described in conjunction with FIGURE 27.

The terms ERROR' and BC are derived from the network of FIGURE 45. The term ERROR' is used to produce an indication that an error has occurred. This network includes an exclusive "or" circuit 960. The exclusive "or" circuit includes a transistor 962 and a transistor 964. The collector of the transistor 962 is connected to the emitter of a transistor 966 and to the base of a transistor 968, and this collector is also connected to a resistor 970. The resistor 970 may have a resistor of 4.7 kilo-ohms, and this resistor is connected to the negative terminal of the 3 volt direct voltage source.

In like manner, the transistor 964 has its collector connected to the emitter of the transistor 968 and to the base of the transistor 966, and this latter collector is also connected to a resistor 972. The resistor 972 has a resistance of 4.7 kilo-ohms, and this resistor also is connected to the negative terminal of the 3 volt direct voltage source.

Both the collectors of the transistors 966 and 968 are connected to a common output terminal at which the ERROR' term is produced. These collectors are also connected to a 2.2 kilo-ohm resistor 974, this resistor being connected to the negative terminal of the 3 volt direct voltage source. The emitters of the transistors 962 and 964 are grounded.

The collector of a transistor 976 is connected to the resistor 974, and the emitter of the latter transistor is grounded. The term $\overline{RED}$ is (described above) applied to the base of the transistor 962, and a term TBR is applied to the base of the transistor 964. The latter term represents the output of the transfer block 8 of FIGURE 9.

The base of the transistor 976 is connected to the collector of a transistor 984 whose base is connected to the collector of a transistor 978 and to the collector of a transistor 980. The emitters of the transistors 978, 980, and 984 are grounded, and the collectors of the transistors 978 and 980 are further connected to a 3.9 kilo-ohm resistor 982. The resistor 982 is connected to the negative terminal of the 3 volt direct voltage source.

The term WA from the network of FIGURE 43 is introduced to the base of the transistor 978, and the term $U+V+MULT+DIV$ is introduced to the base of the transistor 980. This latter term is derived from the network of FIGURE 33. This is to prevent the ERROR term from becoming effective during any of the WA commands or during an arithmetic operation.

The ERROR' term can be expressed by the following logical equation:

$$ERROR'=\overline{WA}\cdot\overline{U}\cdot\overline{V}\cdot\overline{MULT}\cdot\overline{DIV}(RED\cdot TBR+\overline{RED}\cdot\overline{TBR})$$

The emitter of the transistor 984 is grounded, as noted, and the collector of this transistor is connected to the emitter of a transistor 986 and to the base of a transistor 988. The output TBR of the transfer block is applied to the base of the transistor 986, and the collector of this transistor is connected to a resistor 989. The resistor 989 has a resistance of 3.9 kilo-ohms and is connected to the negative terminal of the 3 volt direct voltage source. The collector of the transistor 986 is also connected to the base of a transistor 990. The emitter of the latter transistor is grounded, and the collector is connected to the output terminal at which the term BC appears. This collector is also connected to a 2.2 kilo-ohm resistor 992, the resistor being connected to the negative terminal of the 3 volt direct voltage source.

The emitter of the transistor 988 is grounded, and its collector is connected to the emitter of the transistor 991. The collector of the latter transistor is connected to the base of the transistor 990. The base of the transistor 991 is connected to an input terminal which receives the term 61 from the network of FIGURE 43.

When the transistor 984 is conductive, the output TBR from the transfer block is translated through the transistor 986 and through the transistor 990 to the output terminal (BC). The transistor 984 is conductive only if there is no command of the group (WA), and only if there is no arithmetic operation ($U_1V_1$MULT or DIV) taking place. When this occurs, each binary one in the output from the transfer block appears as a corresponding one at the output terminal BC to be counted by a bit counter circuit, as will be described. However, during a WA command, or during an arithmetic operation, the transistor 988 becomes conductive so that the term (61) instead of the term (TBR) is passed to the output terminal. Therefore, the bit counter receives signals corresponding to the contents 61 during a WA command, or during an arithmetic operation. The term BC may, therefore, be expressed by the following logical equation:

$$BC=TBR\cdot\overline{WA}\cdot\overline{U}\cdot\overline{V}\cdot\overline{MULT}\cdot\overline{DIV}+61(WA+U+V+MULT+DIV)$$

The output terminal BC is connected to the base of a transistor 961. The emitter of this transistor is connected to the collector of a transistor 963, and the emitter of the latter transistor is grounded. The clock timing signal $T_C$ is introduced to the base of the transistor 963.

The collector of the transistor 961 is connected to the emitter of a transistor 965 and to the emitter of a transistor 967. The collector of the transistor 965 is connected to the left input terminal of a flip-flop 969, and the collector of the transistor 967 is connected to the right input terminal of the flip-flop. The term ($b$) appears at the right output terminal of the flip-flop 969 and is introduced to the base of a transistor 971. The term ($\bar{b}$) appears at the left output terminal of the flip-flop 969 and is applied to the base of a transistor 973. The emitters of the transistors 971 and 973 are both connected to the collector of a grounded emitter transistor 975. The timing signal ($T_R$) is applied to the base of the latter transistor.

The collector of the transistor 971 is connected to the right input terminal of a flip-flop 977, and the collector of the transistor 973 is connected to the left input terminal of that flip-flop. The term (RED) appears at the right output terminal of the flip-flop 977 and is applied to the base of the transistor 967. The term ($\overline{RED}$) appears at the left output terminal of the flip-flop 977 and is applied to the base of the transistor 965. The term ($\overline{RED}$) is also applied to the base of the transistor 962, as noted above.

During a WA command or during an arithmetic operation, either the transistor 978 or the transistor 980 is conductive so that the transistor 984 is non-conductive. This causes the transistor 976 to hold the output terminal (ERROR′) at zero so that this output terminal cannot go negative, regardless of the state of the flip-flop 960. For other commands, the transistor 984 is conductive, which permits the output (TBR) from the transfer block to be led through the transistors 986 and 990 to the output terminal (BC), as noted above. This output is then fed bit-by-bit to the base of the transistor 961.

Each character of each word read out of the transfer block TBR contains seven binary bits, as described above, with the seventh bit being the parity bit. If no error has occurred, the parity bit is 1 or 0 depending upon whether the number of binary ones in each character is odd or even. Therefore, if there is no error, each character from the transfer block contains an even number of binary ones. This output is read through the BC output terminal to the transistor 961, as described above, and each binary one causes the transistor 961 to become conductive. Assuming that at the beginning of a character, the flip-flop 969 is true and the flip-flop 977 is false, the first one in the term BC will trigger the flip-flop 969 to a false state at the time $T_C$. Shortly thereafter, at the next $T_R$ time, the flip-flop 977 will be triggered to a true state so that the term RED becomes true. The next binary one in the character which causes the transistor 961 to become conductive, will cause the flip-flop 969 to be triggered to the opposite state, because of the reversal of states of the flip-flop 977 which establishes the conductivity of the other one of the transistors 965 and 967. The flip-flop 977 will also reverse at the time $T_R$ following. The net result is that if there is no error, the flip-flop 977 will be triggered in each character an even number of times by the time $T_7$ if the parity bit should be a 0 so that $\overline{RED}$ is true, and the flip-flop 977 is triggered an odd number of times at the time $T_7$ if the parity bit is to be a 1 so that $\overline{RED}$ is false.

The exclusive "or" network 960 causes its output terminal ERROR′ to go high negative when the term $\overline{RED}$ is the same as the term TBR from the transfer block. At time $T_7$, in each character the term RED is a 1 when the parity bit of the term TBR is a 1 only if an error has occurred. Likewise, the term RED is a 0 at time $T_7$ when the parity bit of TBR is a 0 only if an error has occurred. Therefore, the term (ERROR′) is high negative at time $T_7$ only if an error has occurred.

The output terminal designated (ERROR′) is connected to the base of a transistor 979. The emitter of the transistor 979 is connected to the collector of a transistor 981, and the emitter of the transistor 981 is connected to the collector of a grounded emitter transistor 983. The timing signal $T_7$ is applied to the base of the transistor 981 and the clock timing signal $T_W$ is applied to the base of the transistor 983.

The collector of the transistor 979 is connected to the right input terminal of a flip-flop 985. A manual reset error switch on the panel of the computer is connected to the left input terminal of the flip-flop 985.

The right output terminal of the flip-flop 985 is designated (ERROR′) and is connected to an error indicator 987. This indicator may be in the form of a lamp on the panel of the computer which glows when an error has been made. The flip-flop 985 remains in its true state, and the indicator 987 continues to indicate an error, until the manual reset error switch on the panel is actuated to return the flip-flop 985 to its false state. The flip-flop will remain in its false state, of course, only if the error has been cleared.

The error signal from the right output terminal of the flip-flop 985 is also applied to the base of a transistor 989. The emitter of this transistor is connected to the collector of a transistor 991, and the emitter of the latter transistor is grounded. The timing signal $C_1S_{1\frac{1}{2}}$ is applied to the base of the transistor 991. The collector of the transistor 989 is connected to the right input terminal of a flip-flop 993. When an error has occurred, the flip-flop 993 is triggered to a true state at the beginning of the next word time, as determined by the timing signal $C_1S_{1\frac{1}{2}}$. This causes the term (BREAK) at the right output terminal of the flip-flop 993 to go true. As will be described, this (BREAK) signal prevents the temporal detector circuit of FIGURE 55 from being held in a true state so that the next command cannot be executed until the error has been cleared.

A transistor 995 also has its collector connected to the right input terminal of the flip-flop 993, and the emitter of this latter transistor is connected to the collector of a grounded emitter transistor 997. A term designated (GO) which is derived in a manner to be described in conjunction with FIGURE 58 is applied to the base of the transistor 995, and the base of the transistor 997 is connected to a "step mode switch" on the panel of the computer. The term (GO) is true as each command is executed. Therefore, to place the computer in a manual step mode, the "step mode switch" is closed to render the transistor 997 conductive. Therefore, as each command is executed, causing the (GO) signal to become true, the transistor 995 becomes conductive and triggers the break flip-flop 993 to a true state so that the next command cannot be executed until that flip-flop is returned to a false state. When that is done, the next command is executed and again the flip-flop 993 is triggered to a true state by the (GO) signal.

A transistor 999 has its collector connected to the left input terminal of the flip-flop 993, and the emitter of this latter transistor is connected to the collector of a grounded emitter transistor 1001. The timing signal $C_1S_2$ is applied to the base of the transistor 999, and the base of the transistor 1001 is connected to a manual step switch on the panel of the computer. Therefore, after an error has been cleared, the error reset switch is first actuated momentarily to return the flip-flop 985 to a false state, and the manual step switch is actuated to cause the (BREAK) flip-flop 993 to be returned to a false state at the beginning of the next word time, as timed by the timing signal $C_1S_2$. When the "step mode switch" is closed to render the transistor 997 conductive, each closure of the manual step switch causes one command only to be executed, the flip-flop 993 causing the (BREAK) term to be true after each (GO) signal.

The circuitry associated with the address revolver 6 is shown in FIGURE 46. This revolver includes a pair of delay lines 1040 and 1042 constructed in the manner described in conjunction with FIGURES 5 and 6. The delay line assembly includes a write flip-flop 1044, as explained above.

The write flip-flop 1044 includes a pair of transistors 1046 and 1048 which are cross-connected in known manner to constitute a usual flip-flop circuit. The left output terminal of the flip-flop 1044 is connected to the input terminal of the delay line 1040 and introduces a signal $6W_1^0$ to the delay line. The right output terminal of the flip-flop 1044 is connected to the input terminal of the delay line 1042 and introduces a signal $6W_0^1$ to the latter delay line. This right output terminal of the flip-flop 1044 is also connected to an address holder circuit to be described in conjunction with FIGURE 47, and this output terminal is designated as NA representing the "next address."

The left input terminal of the flip-flop 1044 is connected to the collector of a transistor 1050 and the right input terminal of the flip-flop is connected to collector of a transistor 1052. The emitters of the transistors 1050 and 1052 are connected to another and to the collector of a transistor 1054. The emitter of the transistor 1054 is grounded, and the base of that transistor is connected to an input terminal designated $T_W$. The base of the transistor 1050 is connected to the collector of a transistor 1056, which collector is connected to one terminal of a resistor 1058. The other terminal of the resistor 1058 is connected to the negative terminal of a 3 volt direct voltage source, and this resistor may have a resistance of 1.5 kilo-ohms.

The emitter of the transistor 1056 is grounded, and the base of the transistor is connected to an input terminal designated 6W. This input terminal is also connected to the base of the transistor 1052. It is evident that whenever the input terminal 6W goes negative representing a binary one, the base of the transistor 1052 goes negative to condition that transistor for conduction. Alternately, when the input terminal 6W goes to zero representing a binary zero, the transistor 1056 becomes non-conductive conditioning the transistor 1050 for conduction.

The term $T_W$ represents the write clock signal, and this signal goes negative for every bit time as described above in conjunction with FIGURE 10. The negative swing of this signal after a binary one or a binary zero at the input terminal 6W causes either the transistor 1052 or the transistor 1050 to conduct. This, in turn causes the write flip-flop 1044 to be triggered to a true state for a binary one input and to a false state for a binary zero input.

As noted, the delay lines 1040 and 1042 are adapted to contain one word which corresponds to twelve characters, with each character corresponding to seven binary bits. The write flip-flop 1044 is controlled to write one word into the delay lines, and this word is circulated around the revolver 6, in a manner to be described, until it is needed. The word is then shifted out of the revolver in a character-by-character sequence, with each character being executed as the word is so shifted.

The input terminal 6W is connected to a common lead 1060. This lead in turn is connected to a resistor 1062 having a resistance of 3.9 kilo-ohms and which is connected to the negative terminal of the 3 volt direct voltage source.

An input terminal (60) is connected to the base of a transistor 1066. This input terminal is connected back to the network of FIGURE 26, and the term 60 introduced to that input terminal represents the contents of a specified address. The emitter of the transistor 1066 is grounded, and the collector is connected to the emitter of a transistor 1074. The base of the transistor 1074 is connected to an input terminal designated $\overline{GD_4}$ which is connected back to the gate driver circuit of FIGURE 29D. The collector of the transistor 1074 is connected to the emitter of a transistor 1070, and the collector of the latter transistor is connected to the common lead 1060.

The base of the transistor 1070 is connected to an input terminal which received the (BRANCH) term from the network of FIGURE 31. The emitter of the transistor 1070 is further connected to the collector of a transistor 1072, and the base of the latter transistor is connected back to the network of FIGURE 29D to derive the $GD_4$ term. The emitter of the transistor 1072 is connected to the collector of a transistor 1076, and the emitter of the latter transistor is grounded. The base of the transistor 1076 receives the timing term ($C_{12}$).

A transistor 1078 has its emitter grounded, and the collector of that transistor is connected to the collector of the transistor 1076, to the emitter of the transistor 1072, and to the emitter of a transistor 1111. The base of the transistor 1078 receives a signal ($6R-7$) from a read flip-flop associated with the address revolver and which will be described. The base of the transistor 1111 receives the shift signal ($Sh_2$). The collector of the transistor 1111 is connected to the emitter of a transistor 1100, and the collector of the latter transistor is connected to the common lead 1060. The shift term ($\overline{Sh_2}$) is introduced to the base of a transistor 1104. The emitter of the latter transistor is grounded, and its collector is connected to the emitter of a transistor 1102. The collector of the transistor 1102 is connected to the emitter of the transistor 1100. The signal 6R is applied to the base of the transistor 1102, and this signal is derived from a read flip-flop in the address revolver circuitry which will be described.

A transistor 1068 has its collector connected to the common lead 1060, and the base of this transistor is connected to a term designated "86." The term "86" represents the address of the address revolver so that the signal introduced to the emitter of the transistor 1068 is introduced into the address revolver whenever the term "86" is a one. The term $WA \cdot 61\#g$ is applied to the emitter of the transistor 1068, this latter term representing the contents of a specified address when the term WA is a one and when the address is numeric.

A common lead 1110 is connected to the base of the transistor 1100. A transistor 1112 has its collector connected to the lead 1110. The term $WA \cdot \#g$ is applied to the emitter of the transistor 1112, and the term "86" is applied to its base. A 3.9 kilo-ohm resistor 1114 connects the lead 1110 to the negative terminal of a 3 volt direct voltage source. The lead 1110 is also connected to the collector of a transistor 1116, the emitter of this transistor being grounded. The (BRANCH) term is applied to the base of the transistor 1116.

The output terminal of the delay line 1040 is connected to the base electrode of a transistor 1130, and the output terminal of the delay line 1042 is connected to the base electrode of a transistor 1132. The signal introduced to the base of the transistor 1130 is designated by $\overline{6R_R}$, and the signal applied to the base of the transistor 1132 is designated $6R_R$.

The collectors of the transistors 1130 and 1132 are respectively connected to base electrodes of a pair of transistors 1134 and 1136. These transistors are connected in known manner to constitute the read flip-flop 1138 of the address revolver. The right output terminal of the flip-flop 1138 is designated (6R) and the left output terminal of this flip-flop is designated by ($\overline{6R}$).

The emitters of the transistors 1130 and 1132 are connected together and to the collector of a transistor 1140. The emitter of the transistor 1140 is grounded and the base receives the timing signal $T_R$.

The address revolver delay lines 1040 and 1042 have additional output terminals which are designated $\overline{(6R_R-7)}$ and $(6R_R-7)$ respectively. These latter output terminals are displaced one character time ahead of the output terminals referred to above. The output terminal $\overline{(6R_R-7)}$ is connected to the base of a transistor 1142, and the output terminal $(6R_R-7)$ is connected to the base of a transistor 1144. The collector of the transistor 1142, is connected to the base of a transistor 1146 and the collector of the transistor 1144 is connected to the base of a transistor 1148. The transistors 1146 and 1148 are connected as a read flip-flop 1150. The left output terminal of this flip-flop is designated as ($\overline{6R-7}$) and the right output terminal is designated as $(6R-7)$.

The emitters of the transistors 1142 and 1144 are connected together and to the collector of a transistor 1150. The emitter of the transistor 1150 is grounded, and its base receives the clock pulse signal $T_R$.

During the normal circulating operation of the address revolver, the term ($\overline{Sh_2}$) is true so that the transistor 1104 is conditioned to be conductive, and the terms (86) and (BRANCH) are zero so that the transistor 1100 is conditioned to be conductive. When these conditions obtain, the output (6R) from the read flip-flop 1138 is fed back into the write flip-flop 1044 by way of the input terminal (6W) and the common lead 1060. When the shift term ($Sh_2$) becomes true, the transistor 1104 is rendered nonconductive and the transistor 1111 becomes conductive. This causes the $(6R-7)$ output from the read flip-flop 1150 to pass through the transistor 1078, through the transistor 1111, and through the transistor 1100 to the input terminal 6W of the write flip-flop 1044. This, in the manner described in conjunction with the command revolver, causes the address word in the address revolver to be shifted by one character so that the successive characters of the address may be read out of the address revolver and into the address holder network of FIGURE 47.

New information is read into the address revolver only during the (BRANCH) operation and when the (BRANCH) term becomes true. When this occurs, the resulting conductivity of the transistor 1116 causes the transistor 1100 to be nonconductive so that the circulating loop of the address revolver is broken. At the same time, the transistor 1070 becomes conductive. During the branch commands O, P or (.), the term $\overline{GD_4}$ is a one, as mentioned above, so that the contents (60) of the specified address can be read through the transistor 1066, and through the transistors 1074 and 1070 to the input terminal 6W of the address revolver.

During the skip commands (W) or (X), the term ($GD_4$) becomes a one and the term ($\overline{GD_4}$) becomes a zero. This breaks the connection to the input terminal (60) so that no information is read into the address revolver. Instead, the $(6R-7)$ term is introduced through the transistor 1078 to the input terminal 6W so that the contents of the address revolver are shifted to the right by one character with the address character at the extreme right being lost.

At the character time $C_{12}$, the transistor 1076 becomes conductive to establish the lead 1060 at zero potential. This causes the write flip-flop 1044 to write a series of zeros into the address revolver for the $C_{12}$ character.

Likewise, during the WA command, the circulating loop is broken if a numeric address is indicated. This is because the term $WA \cdot \#g$ causes the transistor 1112 to become conductive to cut off the transistor 1100 in the presence of the 86 address term. Then, the transistor 1068 drives the contents from the revolver 1 or from the adder and feeds them into the input terminal 6W to be brought into the address revolver.

As each address is shifted out of the address revolver 6 of FIGURE 46, in response to the shift signal ($Sh_2$), the address is shifted into an address holder which is shown in FIGURE 47. This address holder is similar to the order holders of FIGURE 28, and it includes a plurality of flip-flops 1200, 1202, 1204, 1206, 1208 and 1210. The flip-flop 1200 is activated by the character signal $S_2$ and the first bit of the next address to be executed is stored in that flip-flop. In like manner, the second bit of the next address to be executed is placed in the flip-flop 1202, the third bit in the flip-flop 1204, the fourth bit in the flip-flop 1206, the fifth bit in the flip-flop 1208 and the sixth bit in the flip-flop 1210. The seventh bit, which is merely the parity bit, is lost. The tables of FIGURES 2 and 3 show that for "α" addresses, the sixth bit is a "1" and for numeric (#) addresses, the sixth bit is a "0." Therefore, the flip-flop 1210 is true for alpha addresses and false for numeric addresses. The term αA' is therefore derived from its right output terminal, and the term #A' is obtained from its left output terminal.

Each address character is held in the address holder of FIGURE 47 until the occurrence of the (GO) signal. When this occurs, the address is shifted into the spacial gate drivers of FIGURES 48A–48E and executed. The spacial gate drivers, like the gate drivers of FIGURES 29A–29F, are individual flip-flops which are connected to the left and right output terminals of corresponding ones of the address holders of FIGURE 47.

Figure 48A:
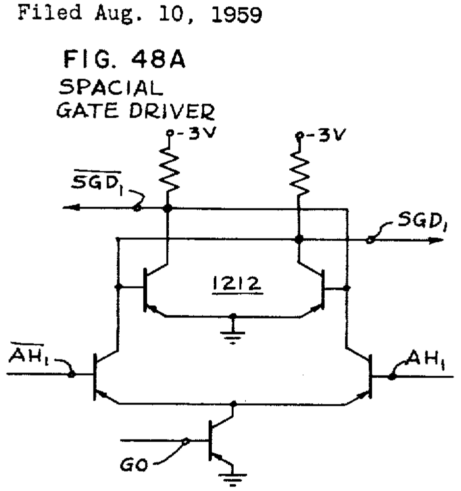

For example, the spacial gate driver 1212 of FIGURE 48A is a flip-flop whose left input terminal is connected to the left output terminal ($\overline{AH_1}$) of the flip-flop 1200 of FIGURE 47, and whose right input terminal is connected to the right output terminal ($AH_1$) of the flip-flop 1200. The flip-flop 1212 has a left output terminal designated ($\overline{SGD_1}$) and it has a right output terminal designated ($SGD_1$). As in the case of the gate drivers of FIGURES 29A–29F, the spacial gate drivers of FIGURES 48A–48E each receive the (GO) signal to be activated.

Figure 48B:
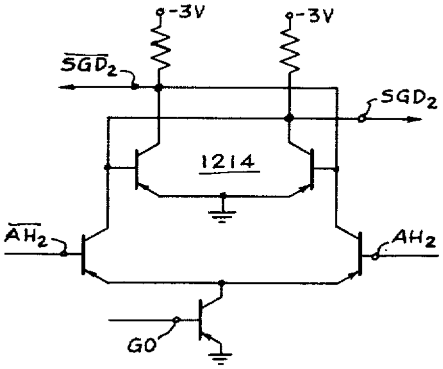

Likewise, the spacial gate driver of FIGURE 48B includes a flip-flop 1214 whose left input terminal is connected to the left output terminal ($\overline{AH_2}$) of the address holder of FIGURE 47 and whose right input terminal is connected to the output terminal ($AH_2$) of the corresponding address holder flip-flop. The flip-flop 1214 has a left output terminal designated ($\overline{SGD_2}$) and it has a right output terminal designated ($SGD_2$).

Figure 48C:
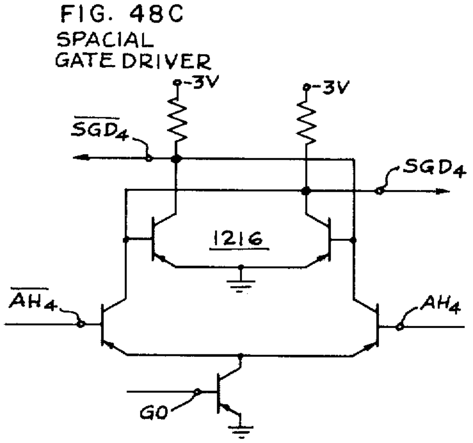

The spacial gate driver of FIGURE 48C includes a flip-flop 1216. This flip-flop is controlled by the ($AH_4$) and ($\overline{AH_4}$) terms of the order holder flip-flop 1206. The flip-flop 1216 has a left output terminal designated ($\overline{SGD_4}$) and it has a right output terminal designated ($SGD_4$).

Figure 48D:
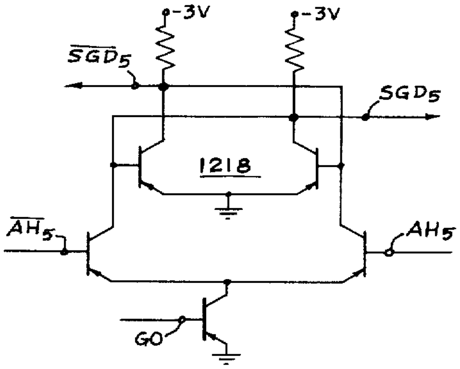

Likewise, the spacial gate driver of FIGURE 48D includes a flip-flop 1218 which is controlled by the flip-flop 1208 of the address holder of FIGURE 47. The flip-flop 1218 has a left output terminal designated ($\overline{SGD_5}$) and it has a right output terminal designated ($SGD_5$).

Figure 48E:
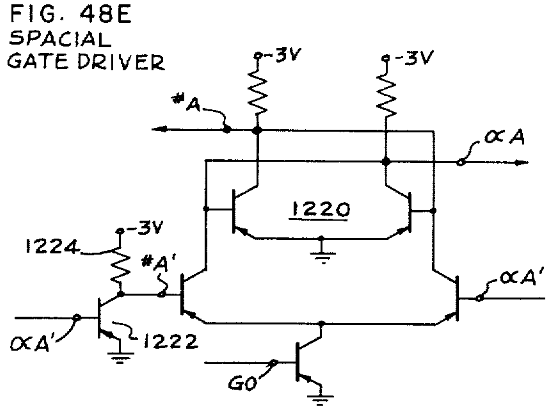

The spacial gate driver of FIGURE 48E has a term αA' introduced to its right input terminal and it has a term #A' introduced to its left input terminal, this driver including a flip-flop 1220. The term #A′ introduced to the left input terminal of the flip-flop 1220 is derived from the circuit of a transistor 1222. This transistor has its emitter grounded, and it has its collector connected to a resistor 1224. The resistor is connected to the negative terminal of a three-volt direct voltage source, and it may have a resistance of 2.2 kilo-ohms. The term #A′ is introduced to the base of the transistor 1222. It stands to reason that since any address is either numeric or an alpha address, that if it is not an alpha address it is a numeric address. For this reason, the term $\alpha A'$ introduced to the base of the transistor 1222 results in the production of the term $\alpha A'$ introduced to the left input terminal of the flip-flop 1220.

The flip-flop 1220 produces the term #A at its left output terminal and it produces the term $\alpha A$ at its right output terminal.

From the tables of FIGURES 2 and 3, it will be appreciated that the alpha addresses have a one at the most significant digit, and that the numeric addresses have a zero. For this reason, and as noted above, the flip-flop 1210 of the address holder of FIGURE 47 which is controlled to be activated at S7 time, will indicate whether or not the address to be executed is a numeric address or an alpha address, this flip-flop being triggered to a one state for an alpha address and being triggered to a zero state for a numeric address.

The address logic circuitry is shown in FIGURES 49 and 50. This circuitry responds to the different addresses derived from the spacial gate drivers of FIGURES 48A–48E to produce gating terms which complete the paths to the designated addresses. In FIGURES 49 and 50, the terms 81–88 correspond to the revolvers 1–8 of FIGURE 10 when a numeric address is specified, and to the block registers 1–8 of FIGURE 9 when an alpha address is specified. These addresses all provide for a one-word transfer.

The logic circuitry of FIGURES 49 and 50 includes a transistor 1250. This transistor has an emitter which is grounded, and it has a collector which is connected to a 2.2 kilo-ohm resistor 1252 and to an output terminal designated 81. The resistor 1252 is connected to the negative terminal of the three-volt direct voltage source. The base of the transistor 1250 is connected back to the collector of a transistor 1254. This collector is also connected to a resistor 1256 having a resistance of 3.9 kilo-ohms. The resistor is connected to the negative terminal of the three-volt direct voltage source.

The emitter of the transistor 1254 is connected to the emitter of a transistor 1258, and these common emitters are connected to the collector of a transistor 1260. The emitter of the transistor 1260 is connected to the emitter of a transistor 1262, and these last two emitters are connected to the collector of a transistor 1264. The emitter of the latter transistor is grounded. The bases of the transistors 1254, 1260 and 1264 respectively receive the terms $\overline{SGD_2}$, $\overline{SGD_1}$, and $\overline{SGD_4}$.

The base of the transistor 1258 receives the term $SGD_2$. The collector of this transistor is connected to a 3.9 kilo-ohm resistor 1266 and this resistor is connected to the negative terminal of the three-volt direct voltage source. The collector of the transistor 1258 is connected to the base of a transistor 1268, and the emitter of the latter transistor is grounded. The collector of the transistor 1268 is connected to an output terminal designated 83 and to a resistor 1270. The resistor 1270 may have a resistance of 2.2 kilo-ohms, and this resistor is connected to the negative terminal of the three-volt direct voltage source.

The term 81 may be expressed logically by the equation:

$$81=\overline{SGD_1}.\overline{SGD_2}.\overline{SGD_4}$$

The term 83 may be expressed logically by the equation:

$$83=\overline{SGD_1}.SGD_2.\overline{SGD_4}$$

The transistor 1262 receives the term $(SGD_1)$ at its base, and the collector at this transistor is connected to the emitters of a pair of transistors 1272 and 1274. The transistor 1272 receives the term $(\overline{SGD_2})$ at its base electrode, and the transistor 1274 receives the term $SGD_2$ at its base electrode. The (SGD) terms, of course, are derived from the special gate drivers of FIGURES 48A–48E.

The collector of the transistor 1272 is connected to a resistor 1276 and the collector of the transistor 1274 is connected to a resistor 1278. The resistors 1276 and 1278 are each connected to the negative terminal of the three-volt direct voltage source. The collectors of the transistors 1272 and 1274 are also connected respectively to the bases of a pair of transistors 1280 and 1282. The emitters of the transistors 1280 and 1282 are grounded, and their collectors are respectively connected to a pair of resistors 1284 and 1286. Each of these resistors may have a resistance of 2.2 kilo-ohms, and they are connected to the negative terminal of the three-volt direct voltage source. The term (82) is obtained at the collector of the transistor 1280 and the term (84) is obtained at the collector of the transistor 1282. These terms may be expressed by the following equations:

$$82=SGD_1.\overline{SGD_2}.\overline{SGD_4}$$

$$84=SGD_1.SGD_2.\overline{SGD_4}$$

The collector of the transistor 1264 is connected to the emitter of a transistor 1288. The base of the latter transistor receives the term $\alpha A$ from the gate driver circuit of FIGURE 48E. The collector of the transistor 1288 is connected to the emitters of a pair of transistors 1290 and 1292. The collectors of these latter two transistors are respectively connected to a pair of resistors 1294 and 1296. These resistors may each have a resistance of 3.9 kilo-ohms, and they are connected to the negative terminal of the three-volt direct voltage source. The base of the transistor 1290 receives the term $(\overline{SGD_5})$ from the circuit of FIGURE 48D, and the transistor 1292 receives the term $(SGD_5)$ from that circuit.

The collectors of the transistors 1290 and 1292 are respectively connected to the base electrodes of a pair of transistors 1298 and 1300. The emitters of both these transistors are grounded. The collector of the resistor 1298 is connected to a 2.2 kilo-ohm resistor 1302, and a collector of the transistor 1300 is connected to a 2.2 kilo-ohm resistor 1304. The resistors 1302 and 1304 are connected to the negative terminal of the three-volt direct voltage source. A first output terminal designated $(B_1)$ is connected to the collector of the transistor 1298, and a second output terminal designated $(B_3)$ is connected to the collector of the transistor 1300.

The terms $(B_1)$ and $(B_3)$ may be expressed by the following logical equations:

$$B_1=\overline{SGD_4}.\alpha A.\overline{SGD_5}$$

$$B_3=\overline{SGD_4}.\alpha A.SGD_5$$

The logic circuitry of FIGURE 50 includes a transistor 1320 having a grounded emitter, and having a base connected to an input terminal designated $SGD_4$. This input terminal derives the $SGD_4$ term from the circuit of FIGURE 48C. The collector of the transistor 1320 is connected to the emitters of a group of transistors 1322, 1324 and 1326. The base of the transistor 1322 receives the term $(\alpha A)$ from the circuit of FIGURE 48E, the base of the transistor 1324 receives the term $(\overline{SGD_1})$ from the circuit of FIGURE 48A, and the base of the transistor 1326 receives the term $(SGD_1)$ from that circuit.

The collector of the transistor 1322 is connected to he emitters of a pair of transistors 1328 and 1330. The ransistor 1328 receives the term ($\overline{SGD_5}$) at its base elecrode, and the transistor 1330 receives the term ($SGD_5$) it its base electrode. These two latter terms are derived rom the gate driver circuit of FIGURE 48D.

The collector of the transistor 1324 is connected to he emitters of a pair of transistors 1332 and 1334. The base electrode of the transistor 1332 receives the term ($\overline{SGD_2}$) from the circuit of FIGURE 48B and the base of the transistor 1334 receives the term $SGD_2$ from that circuit. The collector of the transistor 1326 is connected to the emitters of a pair of transistors 1336 and 1338. The base of the transistor 1336 receives the term ($\overline{SGD_2}$) from the network of FIGURE 48B, and the transistor 1338 receives the term $SGD_2$ from that network.

The collectors of the transistors 1332, 1334, 1336 and 1338 are respectively connected to a group of resistors 1340, 1342, 1344 and 1346, and the collectors of the transistors 1328 and 1330 are connected to a corresponding pair of resistors 1348 and 1350. These resistors may have a resistance of 3.9 kilo-ohms, and are connected to the negative terminal of the three-volt direct voltage source.

The collectors of the transistors 1328, 1330, 1332, 1334, 1336 and 1338 are respectively connected to the base electrodes of a group of transistors 1352, 1354, 1356, 1358, 1360 and 1362. The emitters of all these transistors are grounded, and their collectors are respectively connected to a plurality of resistors 1364, 1366, 1368, 1370, 1372 and 1374. All of these resistors are connected to the negative terminal of the three-volt direct voltage source.

The terms $B_2$, $B_4$, 85, 87, 86 and 88 are respectively derived at the collectors of the transistors 1352, 1354, 1356, 1358, 1360 and 1362. These terms may be expressed by the following logical equations:

$$B_2=\overline{SGD_5}\cdot\alpha A\cdot SGD_4$$
$$B_4=SGD_5\cdot\alpha A\cdot SGD_4$$
$$85=\overline{SGD_2}\cdot\overline{SGD_1}\cdot SGD_4$$
$$87=SGD_2\cdot\overline{SGD_1}\cdot SGD_4$$
$$86=SGD_1\cdot\overline{SGD_2}\cdot SGD_4$$
$$88=SGD_1\cdot SGD_2\cdot SGD_4$$

It will be seen that the terms $B_1$, $B_2$, $B_3$ and $B_4$ depend upon an alpha address before they can become one. These terms are usually used for word transfers from the block registers of FIGURE 9. Each of the terms is directed to a different quarter of the alphabet. For example, $B_1$ will select the addresses dot, A, B, C, D, E, F, G; these addresses appearing in the memory block register 1 of FIGURE 9. The term $B_2$ is directed to the quarter of the alphabet including the letters and symbols H, I, J, K, L, M, —, $; and this latter term is used as a general address for the words in the data block 6 of FIGURE 9, for example. The term $B_3$, on the other hand, is directed to the quarter of the alphabet including the letters and terms @, N, O, P, Q, R, S, T; and this term is used as an address for the data block 7 of FIGURE 9, for example. In like manner, the term $B_4$ constitutes a general address for the last quarter of the alphabet which includes the letters and terms U, V, W, X, Y, Z, %; and this $B_4$ is used, for example, as a general address for the transfer block 8 of FIGURE 9.

The terms 81, 82, 83, 84, 85, 86, 87 and 88 are used mainly for number addresses, and these latter addresses are used for block transfers between the transfer block 8 of FIGURE 9 and the other block registers of that figure; and these terms are also used for one word transfers between the different revolvers.

The logic circuits of FIGURES 51, 52 and 53 are used to derive certain prime functions. It will be remembered that these prime functions correspond to like unprimed functions but occur slightly before the latter.

The (EOM) symbol is used for the general address word when any micro command of the corresponding general command word is not to be executed. This address symbol is designated as ($EOM\cdot A$), and its occurrence as an address causes the corresponding command not to be executed. The symbol ($EOM\cdot A$) is represented by the binary number 001001, with the least significant digit being at the right. The term would normally be derived from the spacial gate drivers of FIGURES 48A–48E. The prime function is attained, however, from the address holders of FIGURE 47 and before the "go" signal causes the stored address to be shifted into the spacial gate drivers.

The circuit of FIGURE 51 includes a transistor 1400 having a grounded emitter, and having a collector connected to an output terminal designated ($EOM'\cdot A$). The collector of the transistor 1400 is also connected to a resistor 1402 having a resistance of 2.2 kilo-ohms and connected to the negative terminal of the three-volt direct voltage source. The circuit also includes a transistor 1404 having its collector connected to the base of the transistor 1400 and to a 5.6 kilo-ohm resistor 1406, the other terminal of the resistor being connected to the negative terminal of the three-volt direct voltage source. A transistor 1408 has its collector connected to the emitter of the transistor 1404 and has its emitter connected to the collector of a transistor 1410. The emitter of the transistor 1410 is connected to the collector of a transistor 1412, and the emitter of the transistor 1412 is grounded.

The term #A' is introduced to the base of the transistor 1404, this term being derived from the circuit of FIGURE 47 and designating a number address. A term $\overline{AH_5}$ is introduced to the base of the transistor 1408, and this term is also derived from the address holder of FIGURE 47. Likewise, a term $\overline{AH_3}$ is introduced to the base of the transistor 1410, this latter term also being derived from the circuit of FIGURE 47.

A transistor 1414 has its emitter grounded and its collector connected to the base of the transistor 1412. Likewise, a grounded emitter transistor 1416 has its collector connected to the base of the transistor 1412 and to a 3.9 kilo-ohm resistor 1418, this resistor being connected to the negative terminal of the three-volt direct voltage source. The terms $\overline{AH_1}$ and $\overline{AH_4}$ from the address holder circuitry of FIGURE 47 are respectively applied to the base electrodes of the transistors 1416 and 1414.

It will be seen from the logic circuitry of FIGURE 51 that:

$$EOM'\cdot A=A'\cdot\overline{AH_5}\cdot AH_4\cdot\overline{AH_3}\cdot AH_1$$

The circuit of FIGURE 51 also produces the (%'Ag) which is used in the described manner in the address holder circuit 1210 of FIGURE 47. The circuit of FIGURE 51 includes a transistor 1420 whose emitter is connected to the collector of the transistor 1412. The term ($AH_3$) from the address holder of FIGURE 47 is applied to the base of the transistor 1420, and the term (%'Ag) is derived at its collector. It will be seen that the term (%'Ag) is derived in accordance with the following equation:

$$\%'Ag=AH_1\cdot AH_3\cdot AH_4$$

The purpose for deriving the term %'Ag is that the % address is received from the paper tape with the sixth digit a zero, as shown in the table of FIGURE 2. However, when this term is used as an address, it is so used as an alpha address in the computer. Therefore, it is necessary to convert this sixth digit to a 1 whenever percent is received as an address. This is achieved by the circuit of FIGURE 51, with the terms $AH_1$, $AH_3$ and $AH_4$ being sufficient to identify the percent address. Whenever these terms occur, it is desirable to create an alpha address. These terms produce the term (%'Ag), which, as described above, is introduced through the address holder 1210 of FIGURE 47 to trigger that address holder 201 and thereby establish the term signifying an alpha address.

The terms ($B_2'$) and ($B_4'$) are derived by the logic circuit of FIGURE 52. These terms correspond to the $B_2$ and $B_4$ terms of FIGURE 50, but precede those terms in time by a slight amount.

The circuit of FIGURE 52 includes a pair of transistors 1430 and 1432. The term (#A') is introduced to the base electrodes of each of these transistors, and their emitters are grounded. The collector of the transistor 1430 is connected to a resistor 1434 and the collector of the transistor 1432 is connected to a resistor 1436. Each of these resistors is connected to the negative terminal of a three-volt direct voltage source, and each may have a resistance of 2.2 kilo-ohms.

The collector of the transistor 1430 is connected to an output terminal designated ($B'_4$), and the collectors of a pair of transistors 1438 and 1440 are each connected to that output terminal. The emitters of these latter transistors are grounded, and the terms ($\overline{AH_5}$) and ($\overline{AH_4}$) are respectively introduced to the base electrodes of the transistors 1438 and 1440.

Likewise, the collector of the transistor 1432 is connected to an output terminal designated ($B'_2$). This output terminal is also connected to the collectors of a pair of transistors 1442 and 1444. The emitters of these transistors are both grounded, and a pair of signals ($AH_5$) and ($\overline{AH_4}$) are respectively introduced to the base electrodes of these transistors. The signals ($B'_2$) and ($B'_4$) may be expressed logically as follows:

$$B'_4=\overline{\#A'}.AH_4.AH_5$$

$$B'_2=\overline{\#A'}.AH_4.\overline{AH_5}$$

The term $(H'+I'+J'+K')$ is produced by the circuitry of FIGURE 53. This term is true shortly before the occurrence of any of the block transfer commands (I), (J) or (K), or the command (H) which changes the mode of an addressed input and output buffer.

The circuits of FIGURE 53 includes an output terminal designated $(H'+I'+J'+K')$, and the collectors of each of a group of transistors 1446, 1448 and 1450 are connected. The emitters of all these transistors are grounded, and a common resistor 1452 is connected between the collectors and the negative terminal of a three-volt direct voltage source. This resistor may have a resistance of 2.2 kilo-ohms. The terms ($OH_3$), ($\overline{OH_4}$), ($OH_5$) from the order holder circuitry of FIGURE 28 are respectively applied to the base electrodes of the transistors 1446, 1448 and 1450.

Expressed logically, the term:

$$(H'+I'+J'+K')=\overline{OH_3}.OH_4.\overline{OH_5}$$

The command logic circuitry of FIGURE 32B produces the general arithmetic command $(U+V+MULT+DIV)$, and this general arithmetic command is separated into individual arithmetic commands in the circuitry of FIGURE 54.

The circuitry of FIGURE 54 includes a transistor 1460 having a grounded emitter, and the general term $(U+V+MULT+DIV)$ is applied to its base. The collector of the transistor 1460 is connected to the emitter of a transistor 1462 and to the emitter of a transistor 1464. The collector of the transistor 1462 is connected to a resistor 1466 and the collector of the transistor 1464 is connected to a resistor 1468. Both of these resistors may have a resistance of 4.7 kilo-ohms, and both are connected to the negative terminal of the three-volt direct voltage source. The term $\overline{GD_6}$ from the gate driver circuit of FIGURE 29F is introduced to the base of the transistor 1464, and the collector of that transistor is connected to the base of the transistor 1462.

The collector of the transistor 1464 is connected to an output terminal designated $(\overline{MULT+DIV})$ at which that term is produced. This output terminal is also connected to the base of a transistor 1470, the latter transistor collector connected to a resistor 1472, which, in turn, is connected to the negative terminal of the three-volt direct voltage source. The resistance 1472 may have a resistance of 2.2 kilo-ohms. The collector of the transistor 1470 is also connected to an output terminal designated $(MULT+DIV)$ at which that term appears.

The collector of the transistor 1462 is connected to the base of a transistor 1474, and the emitter of the latter transistor is grounded. The collector of the transistor 1474 is connected to a resistor 1476, which in turn is connected to the negative terminal of the three-volt direct voltage source. The resistor 1476 may have a resistance of 2.2 kilo-ohms. The collector of the transistor 1474 is connected to an output terminal designated $(U+V)$ at which that term appears.

The collector of the transistor 1464 is also connected to the emitters of a pair of transistors 1480 and 1482. The term $\overline{GD_1}$ from the gate driver circuit of FIGURE 29A is introduced to the base of the transistor 1480. The collector of the transistor 1480 is connected to the base of the transistor 1482 and to a resistor 1484. The resistor 1484 may have a resistance of 4.7 kilo-ohms, and this resistor is connected to the negative terminal of the three-volt direct voltage source.

The collector of the transistor 1482, on the other hand, is connected to a resistor 1486, to the base of a transistor 1488, and to an output terminal designated ($\overline{DIV}$). The resistor 1486 may have a resistance of 4.7 kilo-ohms, and this resistor is connected to the negative terminal of the three-volt direct voltage source. The term ($\overline{DIV}$) is produced at the output terminal.

The emitter of the transistor 1488 is grounded, and its collector is connected to a resistor 1490 and to an output terminal designated (DIV) at which that term is produced. The resistor 1490 may have a resistance of 2.2 kilo-ohms, and this resistor is connected to the negative terminal of the three-volt direct voltage source.

The collector of the transistor 1480 is also connected to the base of a transistor 1492, and the emitter of the latter transistor is grounded. The collector of the transistor 1492 is connected to a resistor 1494, this resistor having a resistance of 2.2 kilo-ohms and being connected to the negative terminal of the three-volt direct voltage source. The collector of the transistor 1492 is also connected to an output terminal designated MULT.

The output terms of the circuitry of FIGURE 54 may be expressed by the following logical equations:

$$(MULT+DIV)=(U+V+MULT+DIV)\overline{GD_6}$$

$$(U+V)=(U+V+MULT+DIV)GD_6$$

$$DIV=(U+V+MULT+DIV).\overline{GD_6}.GD_1$$

$$MULT=(U+V+MULT+DIV).\overline{GD_6}.\overline{GD_1}$$

An examination of the code tables of FIGURES 2 and 3 will reveal that the above logic corresponds to the multi-digit binary designation of these terms. As shown in the table of FIGURE 3, U is represented by the multi-digit binary number 111000, the least significant digit being at the right, and V is represented by the multi-digit binary number 111001, with the least significant digit being at the right. The term MULT is represented by the numeral 5 in the table of FIGURE 2, and this term is designated by the multi-digit binary number 011000. Similarly, the term DIV is represented by a numeral 6 in the table of FIGURE 2, which in turn is represented by the multi-digit number 011001. In each instance, the least significant digit is at the right.

The temporal detector of FIGURE 55 is used in conjunction with a specified address to assure that the contents of the addressed unit are transferred at the proper time. For example, in the presence of a block transfer command, such as the commands I, J or K, the temporal detector causes the term TD to become true just before the beginning of a block of data so that the entire block may be transferred, and this term is caused to go false at the end of the block to terminate that transfer. Likewise, for a number address in which a revolver is involved, and which involves a one-word transfer, the detector of FIGURE 55 causes the term TD to be true just before the beginning of a word time, and to be returned false at the end of the word time. Likewise, for an alpha address which involves the transfer of an address word out of a block register, the detector circuit of FIGURE 55 causes the term TD to be true just before the particular word time only, and to return false at the end of that word time. The temporal detector, therefore, serves to control the transfer of data and to provide that the data is transferred at the proper times so that only the words or blocks involved will be transferred and in the proper manner.

It will be seen subsequently that the term (GO) is made true after the term (FIN) is true, the latter term (FIN) indicating that the execution of instruction now in the gate drivers of FIGURES 29A–29F and FIGURES 48A–48E is completed. The term ($Sh$) becomes true at the same time the term (FIN) becomes true to shift the next instruction from the address and command revolvers into the address and order holders.

Considering now an address in the address holders of FIGURE 47 and an order in the order holders of FIGURE 28, and assuming that the previous instruction has been executed, both command and address now wait for the "GO" signal to cause them to be transferred into the gate drivers for execution. There are three different situations under which the "GO" signals must occur so that the execution of the instruction in the order holders and address holders may be properly timed. These are as follows:

For a numeric address in the absence of a block transfer command, it has been seen that a one word transfer into or out of a one-word revolver is indicated. Therefore, the only important thing is that the transfer start at the beginning of a word time. Therefore, for numeric addresses in the absence of a block transfer command, the (GO) signal is timed to occur at the beginning of a word time.

When a block transfer is indicated, however, it is important that the transfer commence at the beginning of a block time. The block transfer is represented by the commands H, I, J or K, and in the presence of such commands, the (GO) signal is timed to occur at the precise beginning of a block time.

Finally, for an alpha address and in the absence of a block transfer command, a one word transfer is involved from one of the block registers. For this latter class of transfers, it is not sufficient that the (GO) signal be timed to occur at the beginning of a word time or at the beginning of a block time; rather, the (GO) signal must then be timed to occur at the beginning of a particular word time within the block time, as indicated by the particular address. This causes a selected word to be transferred from the block registers into a selected revolver, for example.

The latter instructions are executed, as will be described, by comparing the particular address in the address holder with the (CA) counter signal described above. The actual comparison is with three of the digits of the CA signal, which digits represent the different word times within a block. For the present comparison, the (CA) signal is used to count each word in the block, and the (GO) signal is timed to occur when the address in the address holder corresponds to a particular count of the (CA) signal, which, in turn, corresponds to a particular word time in the block.

As a first step in accomplishing the transfers discussed in the preceding paragraph, the temporal detector circuit of FIGURE 55 is used. This circuit produces a term (TD) and when this term is true, it indicates that the (GO) signal can occur at the beginning of the following word time.

The temporal detector circuit includes a flip-flop 1500 having a right output terminal at which the term (TD) appears, and this flip-flop also has a left input terminal and a right input terminal. The flip-flop is triggered to a true state when the signal introduced to the right input terminal goes negative.

A transistor 1502 has its collector connected to the right input terminal of the flip-flop 1500, and a transistor 1504 has a grounded emitter and has its collector connected to the emitter of the transistor 1502. A transistor 1506 also has its collector connected to the right input terminal of the flip-flop 1500, and a grounded emitter transistor 1508 has its collector connected to the emitter of the transistor 1506.

In like manner, a transistor 1518 has its collector connected to the left input terminal of the flip-flop 1500, and a transistor 1520 has its collector connected to the emitter of the transistor 1518. A grounded emitter transistor 1522 has its collector connected to the emitter of the transistor 1520. A transistor 1510 has its collector connected to the right input terminal of the flip-flop 1500, and a transistor 1516 has its collector connected to the left input terminal of the flip-flop. A transistor 1512 has its collector connected to the emitters of the transistors 1510 and 1516, and a grounded emitter transistor 1514 has its collector connected to the emitter of the transistor 1512.

The timing signal ($C_1 \cdot S_2$) is introduced to the base of the transistor 1502, and, as described, this timing signal has a negative spike at the ($S_2$) time of the first character time. The term $CA=NA$ is introduced to the base of the transistor 1504. This term is derived in a manner to be described when the count of the CA signal corresponds to the address in the address holder at any particular time.

The term (#A′) is applied to the base of the transistor 1506. This term is derived from the flip-flop 1210 of the address holder of FIGURE 47, and it is true in the presence of any number address. The timing signal ($C'_{12}$) is introduced to the base of the transistor 1508. This timing signal corresponds to the timing signal ($C_{12}$) of FIGURE 1B, but has its negative components occurring several bit times before the negative components of the timing signal ($C_{12}$).

The timing signal (BLK) is impressed on the base of the transistor 1510. This is described in conjunction with FIGURE 1B. The signal (BLK) goes negative during ($C_{12}$) time of the seventh word in each block and stays negative, and the signal returns to zero during $C_{12}$ time of the eighth word in each block.

The $\overline{BLK}$ signal is applied to the base of the transistor 1516, and the $\overline{CA=NA}$ term is applied to the base of the transistor 1518. This latter term is true whenever the (CA) count is different from the address in the address holder. The timing signal ($C_1$) is applied to the base of the transistor 1520, and this signal is negative during the twelfth character time of each word. The signals $S_2$, $S_3$ and $S_4$ of FIGURE 1A are applied to the base of transistor 1522, these signals being negative during the second, third and fourth bits of each character.

It should be noted that because the (NA) term is derived from the write flip-flop of the address revolver of FIGURE 46, and because this flip-flop is triggered by the ($T_W$) clock pulses of FIGURE 1C, the signals $S_2$, $S_3$ and $S_4$ actually coincide with the first, second and third bit times of each character passing through that flip-flop. Therefore, insofar as the (NA) term is concerned, $S_2$, $S_3$ and $S_4$ represent the first, second and third bit times.

The timing signal ($C_{12}S_{1\frac{1}{2}}$) of FIGURE 1B is applied to the base of the transistor 1512. This timing signal goes negative between the first and second bit times of each twelfth character of each word. Finally the term ($H'+I'+J'+K'$) derived from the network of FIGURE 53 is applied to the base of the transistor 1514.

Assume now that there is a particular command in the order holder of FIGURE 28 and a particular address in the address holder of FIGURE 47, and that the command and address are waiting for the "GO" signal so that they may be transferred into the gate drivers and spacial detectors for execution. A first possibility is that the command in the order holder is a block transfer command I, J or K. If that is the case the transistor 1514 of the temporal detector is rendered conductive. As shown in FIGURE 1B, the term (BLK) is negative during the eighth word of each block until a time during the twelfth character of that word. Therefore, the transistor 1510 is held conductive during the eighth word of each block until a time during the twelfth character of that word. Before that time, at which the term (BLK) returns to zero, and as shown in FIGURE 1B, the signal $(C_{12}S_{1\frac{1}{2}})$ goes negative to render the transistor 1512 conductive. Therefore, the flip-flop 1500 is triggered true just before the first word time of the block.

This triggering of the flip-flop 1500 sets up the condition whereby the "GO" signal can be caused to occur at the beginning of the next word time which is the first word of the block and which is the required timing for a block transfer. The temporal detector is then returned to a zero state by the term $(\overline{BLK})$ during the first word time of the block if the next command shifted into the order holder is also a block transfer command. This provides that the next block transfer command will have no effect until the next $(C_{12})$ time of the (H) word in the block.

During the block transfer operations described in the preceding paragraph, the transistors 1506 and 1508 have no effect on the flip-flop 1500. This is because, even though the block transfer command is accompanied by a number address, which causes the flip-flop 1500 to be triggered to a true state by the transistors 1506 and 1508 at $(C'_{12})$ time, the flip-flop is immediately returned to a false state by the signal $(C_{12}S_{1\frac{1}{2}})$ applied to the base of the transistor 1512 so long as the term $\overline{BLK}$ is true. The term TD, is therefore, false before the following word time.

Consider now the possibility of the address in the address holder being a number address, but the command in the order holder being a word transfer command other than a block transfer command. The corresponding instruction is, therefore, directed to a one word transfer, and our only concern is that the (GO) signal occurs at the beginning of a word time. This is accomplished by the transistors 1506 and 1508. The transistor 1506 is rendered conductive by the number command in the address holder, and the transistor 1508 goes conductive at $(C_{12}')$ time, which is just before the last character of the word to be transferred.

The third possibility is that of an alpha address in the address holder and a command in the order holder which is not a block transfer command. This, as described in conjunction with FIGURE 13, for example, involves a transfer of a selected word from a transfer block into a revolver.

As described above in conjunction with FIGURE 46, a selected address is shifted from the address revolver into the address holder from the right output terminal of the write flip-flop 1044. This address, however, is also read into the delay line and is circulating through the write flip-flop at $(C_1)$ time. This circulating address is compared with the (CA) signal in the circuit of FIGURE 56. When the first digit of the address signal corresponds to the first digit of the corresponding (CA) signal at $C_1$ time, both the flip-flops 1502 and 1504 are rendered conductive to trigger the flip-flop 1500 to a true state. Then, if the second and third digits of the address signal at the $C_1$ time still correspond to the corresponding digits of the (CA) signal, the transistor 1518 will not be rendered conductive and the flip-flop 1500 will remain in a true state. Otherwise, the transistor 1518 is conductive and the flip-flop 1500 is returned to a false state.

Only at the particular word time at which the (CA) digits correspond to the three least significant NA digits, will the flip-flop 1500 remain in a true state. Therefore, the term TD is set to one when the three least significant digits of the circulating components of the address in the address holder correspond to the corresponding three digits of the (CA) signal. This is known to occur during the word time preceding the word indicated by that address by the appropriate timing of the (CA) signal. Then, at the beginning of the next word time, the term "GO" can be set true to shift the address and command into their respective spacial detector and gate driver circuits at the beginning of the word time corresponding to the word to be transferred.

Upon the occurrence of the (GO) signal, the (S) signal is set true which shifts the next address and command into the respective address holder and command holder circuits. During this time the term $\overline{CA=NA}$ becomes true to return the flip-flop 1500 to the false state.

A transistor 1501 has its collector connected to the left input terminal of the flip-flop 1500. The emitter of the transistor 1501 is connected to the collector of a transistor 1503, and the emitter of the transistor 1503 is connected to the collector of a grounded emitter transistor 1504. The term (BREAK) from FIGURE 45 is applied to the base of the transistor 1501, the timing signal $(S_4)$ is applied to the base of the transistor 1503, and the timing signal $(C_{12})$ is applied to the base of the transistor 1504.

Therefore, when the (BREAK) term is true, the flip-flop 1500 is triggered to a false state at the fourth bit time of the twelfth character of the word. This means that the flip-flop 1500 cannot be maintained in a true state for the following word, so that the following word is not executed. Only when the (BREAK) term becomes false, can the flip-flop 1500 be triggered to a true state to permit the next word to be executed.

As mentioned above, the term $CA=NA$ is formed by the network of FIGURE 56. This is an "exclusive or" network of the type disclosed and claimed in copending application S.N. 760,031 for the "Exclusive Or Network," filed September 9, 1958, in the name of Frank A. Hill, and the "exclusive or" network is designated 1520.

The "exclusive or" network 1520 includes a pair of grounded emitter transistors 1522 and 1524. The collector of the transistor 1522 is connected to the emitter of a transistor 1526 and to the base of a transistor 1528. The collector of the transistor 1524, on the other hand, is connected to the base of the transistor 1526 and to the emitter of the transistor 1528. The emitters of the transistors 1526 and 1528 are connected to respective resistors 1530 and 1532. These resistors, in turn, are connected to the negative terminal of the three-volt direct voltage source. The resistor 1530 may have a resistance of 1.7 kilo-ohms, and the resistor 1532 may have a resistance of 3.9 kilo-ohms.

The collector of the transistor 1526 and the collector of the transistor 1528 are connected to a resistor 1534 and to the base of a transistor 1536. The latter transistor has a grounded emitter, and its collector is connected to a resistor 1538. The resistors 1534 and 1538 are both connected to the negative terminal of the three-volt direct voltage source, and each of these resistors may have a resistance of 2.2 kilo-ohms.

The term $\overline{CA}$ is applied to the base of the transistor 1522, and the term NA is applied to the base of the transistor 1524. The term NA is derived from the write flip-flop 1044 of the address revolver of FIGURE 46, and the term CA is derived from the count signal of FIGURE 1C after an appropriate inversion.

The "exclusive or" network 1520 operates in the described manner so that whenever the term $\overline{CA}$ is different from the term NA, the term $CA=NA$ which is derived at the collector of the transistor 1536 is negative. Otherwise, the term $\overline{CA=NA}$ derived at the collector of the transistor 1526 is negative.

Therefore, for each digit of the signal CA having a corresponding digit in the signal NA, the term $CA=NA$ is true. Conversely, any digit in the signal CA which is not the same as the corresponding digit of the signal NA causes the term $\overline{CA=NA}$ to be true. The term $\overline{NA}$ is conveniently derived after the collector of the transistor 1522 and is used subsequently in the computer circuitry.

Before the (GO) signal can be set to true, even if the (TD) term is a one, the term (FIN) must be true. This latter term is true only after the preceding instruction has been completely executed. The term (FIN) is produced by the circuitry of FIGURE 57.

The circuitry of FIGURE 57 includes a flip-flop 1550 having a right output terminal at which the term (FIN) is derived. This right output terminal is also connected to a grounded emitter transistor 1552, and the collector of the transistor 1552 is connected to the emitter of a transistor 1554. The collecter of the transistor 1554 is connected to a resistor 1556, which, in turn, is connected to the negative terminal of the three-volt direct voltage source. The resistor 1556 may have a resistance of 2.2 kilo-ohms.

The timing signal ($C_{12}$) of FIGURE 1B is applied to the base of the transistor 1554, and the term $(\overline{C_{12}}\cdot\overline{FIN})$ is derived at the collector of that transistor. The flip-flop 1550 has a right input terminal, and the collectors of a group of transistors 1560, 1562, 1564 and 1566 are all connected to that input terminal. The flip-flop 1550 also has a left input terminal, and the collectors of a pair of transistors 1568 and 1570 are conneteced to the latter input terminal.

The emitters of the transistors 1560 and 1562 are connected to the collector of a transistor 1572 and the emitters of the transistors 1564 and 1566 are connected to the respective collectors of a pair of transistors 1574 and 1576. The emitters of the transistors 1572, 1574 and 1576 are all connected to the collector of a grounded emitter transistor 1578.

The base of the transistor 1560 is connected to the collector of a transistor 1580 and to the collector of a transistor 1582. The emitters of both the transistors 1580 and 1582 are grounded, and their collectors are connected to one terminal of a 3.9 kilo-ohm resistor 1584. The other terminal of the resistor 1584 is connected to the negative terminal of the three-volt direct voltage source.

The emitter of the transistor 1568 is grounded and the emitter of the transistor 1570 is connected to the collector of a transistor 1586. The emitter of the latter transistor is grounded. The term (WAIT) is introduced to a base of the transistor 1568. As long as this term is true, the flip-flop 1550 cannot be triggered to a true state and the term (FIN) remains false. Therefore, when for any reason the program of the computer is to be held in abeyance until the happening of a certain condition, the term (WAIT) is true and the following instruction cannot be executed.

The term ($Sh_2$) which is derived in a manner to be described from the network of FIGURE 59, together with the timing signal $C_1S_2$ of FIGURE 1B are introduced to the respective bases of the transistors 1570 and 1586. These terms cause the flip-flop 1550 to be returned to the false state at the $S_2$ time of the first character following a shift.

The term ($W.FIN$) is introduced to the base of the transistor 1582 and to the base of the transistor 1562. This term is derived from the logic circuitry of FIGURE 42, and it is represented by the following logic:

$$W.FIN-\overline{branch.GD_4+GD_4.GD_5.GD_6}$$
$$\overline{W.FIN}-branch.GD_4+GD_4.\overline{GD_5}.GD_6$$

The term ($\overline{BLK}$) is introduced to the base of the transistor 1580. Therefore, if the term $\overline{BLK}$ is false and if ($W.FIN$) is false, the right input terminal of the flip-flop 1550 goes negative due to conduction through the transistor 1560, and a flip-flop 1550 is triggered to a true state to make the term (FIN) true.

As seen from the above equations, the term ($W.FIN$) is false when the term branch .$GD_4$ is true, this latter term representing a W or an X command of the skip commands; or for the term ($GD_4.\overline{GD_5}.GD_6$) which represents the block transfer commands. Therefore, for the block transfer commands, the term (FIN) is true only when the signal (BLK) goes negative. This occurs at $C_{12}$ time of the seventh word of the block.

For all other transfers ($W.FIN$) is true so that the transistor 1552 is conditioned for conduction. The term $\overline{mult+div}$ is introduced to the base of the transistor 1572, and the timing signal ($C'_{12}$) is applied to the base of the transistor 1578. All transfers except block transfers, and all arithmetic operations except multiplication and division, are terminated in one word time. Also, during the absence of a block transfer when the transistors 1580 and 1582 are both nonconductive, and the transistor 1562 is conductive; and in the absence of a multiplication or division so that the transistor 1572 is conductive; the flip-flop 1550 is triggered to a true state just before the twelfth character time of the word being executed so that the term (FIN) is true at that time.

It should be noted that when both the transistors 1580 and 1582 are nonconductive, the right input terminal of the flip-flop 1550 is set negative so that the remainder of the circuitry connected to the right input terminal is ineffective.

The term (MULT) is introduced to the base of the transistor 1564, this term being derived by the circuit of FIGURE 54. A term III.D′ is introduced to the base of the transistor 1574. This latter term is derived in a manner to be described and is true at the end of a multiplication operation. Then, during the time $C'_{12}$, the flip-flop 1550 is triggered to a true state so that the term (FIN) becomes true.

The term DIV.$ds$ is applied to the base of the transistor 1566, and a term MSK is applied to the base of the transistor 1576. These terms are derived in a manner to be described during a division operation, and at the completion of that operation, both the transistors 1566 and 1576 are conditioned for conduction so that the flip-flop 1550 may be triggered to a true state at the next $C'_{12}$ time.

The "GO" signal is produced by the circuitry of FIGURE 58. This circuit also produces the circulating term (RECIR) which is introduced to the flip-flop gate driver circuits of FIGURES 29D, 29E and 29F. As noted previously, a grounded emitter transistor 622 in FIGURE 29D has its collector connected to the base of the transistor 628, a grounded emitter transistor 634 in FIGURE 29E has its collector connected to the left input terminal of the flip-flop 632, and a grounded emitter transistor in FIGURE 29F has its collector connected to the left input terminal of the flip-flop 636.

The (RECIR) term is introduced to the bases of the transistors 622, 634 and 637; and when the (RECIR) term is true, the flip-flops 618, 632 and 636 of the gate drivers of FIGURES 29D, 29E and 29F are held in a one-zero-zero state. This state of the order holder flip-flops does not correspond to any commands used within the computer and it prevents the previous command from being re-executed in the presence, for example, of the ($EOM'.A$) address term of FIGURE 51 which indicates that the following command in the order holder is to be skipped. The network of FIGURE 58 also produces the ($Sh'$) term, which, in turn, is used to trigger a flip-flop 1650 to be described in conjunction with FIGURE 59 to produce the ($Sh_2$) shift term.

The circuitry of FIGURE 58 includes a grounded emitter transistor 1600 whose collector is connected to the emitters of a pair of transistors 1602 and 1604. The collector of the transistor 1602 is connected to the emitter of a transistor 1606, and the collector of the transistor 1604 is connected to the base of a transistor 1608 and to a 3.9 kilo-ohm resistor 1610. The resistor 1610 is connected to the negative terminal of the three-volt direct voltage source, and the emitter of the transistor 1608 is grounded. The circuitry of the transistor 1608 is connected to a 3.9 kilo-ohm resistor 1612, and this resistor is also connected to the negative terminal of the three-volt direct voltage source. The collector of the transistor 1608 is also connected to an output terminal designated ($Sh'$) at which the ($Sh'$) term is derived.

The collector of the transistor 1606 is connected to the base of a grounded emitter transistor 1614 and to one terminal resistor 1616. The collector of the transistor 1614 is connected to a resistor 1618. Both these resistors are connected to the negative terminal of the three-volt direct voltage source. The resistor 1616 may have a resistance of 3.9 kilo ohms, and the resistor 1618 may have a resistance of 1.5 kilo ohms. The collector of the transistor 1614 is connected to an output terminal designated (RECIR), and the circulating signal described above is derived at this output terminal.

The circuitry of FIGURE 58 includes a grounded emitter transistor 1620, and the collector of the transistor 1620 is connected to the emitter of a transistor 1621. The collector of the latter transistor is connected to the emitter of a transistor 1622, and the collector of the transistor 1622 is connected to an output terminal designated ($\overline{GO}$).

The output terminal ($\overline{GO}$) is connected to a base of a transistor 1624, the emitter of the latter transistor being grounded. The collector of the transistor 1624 is connected to the primary winding of a transformer 1626. The other terminal of the primary winding is connected to a 220 ohm resistor 1628, which, in turn, is connected to the negative terminal of the three-volt direct voltage source. The transformer 1626 has a 50:10 term ratio. One terminal of the secondary winding of the transformer 1626 is grounded, and the other terminal is connected to an output terminal designated GO at which the term (GO) is produced.

The collector of the transistor 1621 is connected to a 6.3 ohm resistor 1630 and the collector of the transistor 1622 is connected to a 3.9 kilo-ohm resistor 1632. Both these resistors are connected to the negative terminal of the three-volt direct voltage source. The term (TD) is derived from the circuit of FIGURE 55 and is introduced to the base of the transistor 1604, and the term (FIN) derived from the circuitry of FIGURE 57 is applied to the base of the transistor 1600. When both these terms are true, the base of the transistor 1608 drops to zero and the term ($Sh'$) becomes true. This permits the shift signal ($S_2$) to be true at the following ($C_1'.S_1$) spike of the curve of FIGURE 1B, as will be described in conjunction with FIGURE 59.

The timing signal ($C_1'.S_1$) of FIGURE 1B is applied to the base of the transistor 1602, the term ($EOM'.A$) is applied to the base of the transistor 1621, and the term ($Sh'$) is applied to the base of the transistor 1620. Therefore, when a command is to be skipped as designated by the corresponding address ($EOM'.A$), as described in conjunction with FIGURE 51, the occurrence of the terms (TD) and (FIN) produces the term ($Sh'$) in the manner described above. Then, so long as the term ($EOM'.A$) is true, the base of the transistor 1606 is brought to zero upon the appearance of the ($Sh'$) term to render that transistor nonconductive.

However, when the term ($EOM'.A$) is true, the transistor 1621 is rendered nonconductive so that the transistor 1606 is rendered conductive. Then, at the time ($C_1'.S_1$), the transistor 1602 becomes conductive to establish the base of the transistor 1614 at zero potential. This causes the transistor to become nonconductive so that the term (RECIR) becomes true. When the term (RECIR) is true, and as described above, certain flip-flops in the order holder are triggered to a state corresponding to no command used in the computer so that the command which would otherwise have been executed is skipped. It should be noted that even for the skip command, the ($Sh'$) signal is produced so that the next instruction is shifted into the order holder and address holder circuitry with the preceding instruction being shifted out but not executed.

Only when the skip address ($EOM'.A$) is false, is there a path established through the transistor 1622 upon the appearance of the ($Sh'$) term. The timing signal ($S_1.C_1'$) is applied to the base of the transistor 1622 so that the term ($\overline{GO}$) goes to zero at ($S_1C_1'$) time upon the occurrence of the shift prime term and if there is no skip address $EOM'.A$. When the term ($\overline{GO}$) goes to zero, the transistor 1624 is cut off and the resulting current flows through the primary of the transformer 1626 producing a pulse at the output terminal (GO) corresponding to the (GO) signal. Therefore, the (GO) signal is produced a little after the ($S_1C_1'$) time, and this is made to correspond exactly to the beginning of the first bit of the following word.

The network of FIGURE 59 includes the flip-flop 1650 referred to above. The flip-flop has a right output terminal at which the term ($Sh_2$) is produced, and it has a left output terminal at which the term ($\overline{Sh_2}$) is produced. A transistor 1652 has its collector connected to the right input terminal of the flip-flop 1650, and a transistor 1654 has its collector connected to the left input terminal of the flip-flop. The emitters of the transistors 1652 and 1654 are connected to the collector of a transistor 1656. The emitter of the transistor 1656 is grounded.

The term ($Sh'$) is derived from the collector of the transistor 1604 of FIGURE 58, and this term is applied to the base of the transistor 1654. Likewise, the term ($Sh'$) derived from the collector of the transistor 1608 of FIGURE 58 is applied to the base of the transistor 1652. The timing signal ($S_1C_1'$) of FIGURE 1B is applied to the base of the transistor 1656. It is clear that whenever the term ($Sh'$) is true at time ($S_1C_1'$), the flip-flop 1650 is triggered to a true state to make the term ($Sh_2$) true. Conversely, whenever the term ($Sh'$) is true at ($S_1C_1'$) time, the flip-flop 1650 is triggered to a false state to make the term ($\overline{Sh_2}$) true.

The ($\overline{Sh'}$) term depends on the (TD) term, which, in turn depends upon the state of the temporal detector 1500 of FIGURE 55. It will be remembered that the (TD) term becomes true before the word to be transferred, and it becomes false some time before the end of a word time following the triggering of the flip-flop to a true state. The flip-flop 1650 of FIGURE 59 is actuated at times ($S_1C_1'$) so that the term ($Sh_2$) becomes true at exactly the start of the word to be executed. This causes the next command and address to be shifted serially into the order holder and address holder circuitry beginning at the particular word time. Then, at precisely the end of the word time, the next occurrence of the ($S_1C_1'$) signal causes the flip-flop 1650 to terminate the shift of the command and address words.

Figure 60:
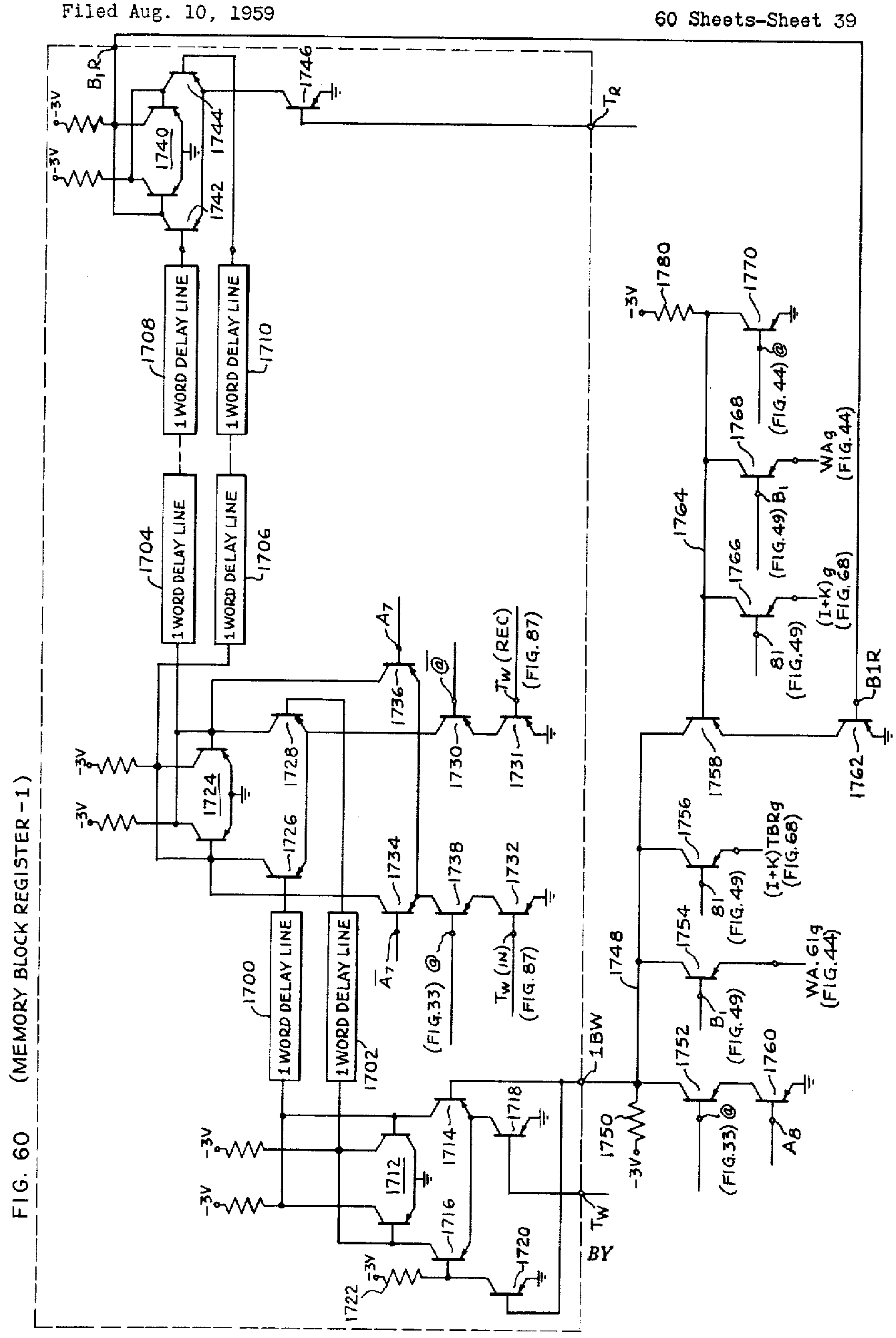

The memory block register 1 of FIGURES 9 and 11A, 11B is shown with its associated circuitry in FIGURE 60. It will be remembered that this block register is made up of a series of eight pairs of one-word delay lines so that upon the @ command, data may be read from the second bank of block registers in the expandable memory into the memory block in the described manner. As shown in FIGURE 60, the memory block register is made up of eight pairs of one word delay lines, three of the pairs being actually illustrated, and these pairs being designated respectively as 1700, 1702 and 1704, 1706, 1708 and 1710.

The memory block register assembly includes a write flip-flop 1712. The left output terminal of the flip-flop is connected to the input terminal of a delay line 1700, and the right output terminal of the flip-flop 1712 is connected to the input terminal of the delay line 1702.

The right input terminal of the flip-flop 1712 is connected to the collector of a transistor 1714, and the left input terminal of the flip-flop 1712 is connected to the collector of a transistor 1716. The emitters of the transistors 1714 and 1716 are connected to the collector of a transistor 1718. The emitter of the transistor 1718 is grounded, and the timing signal $T_W$ of FIGURE 1A is applied to the base of that transistor.

The base of the transistor 1716 is connected to the collector of a transistor 1720. The emitter of the latter transistor is grounded and its base is connected to an input terminal designated 1BW. This input terminal is also connected to the base of the transistor 1714. The collector of the transistor 1720 is also connected to a resistor 1722, which, in turn, is connected to the negative terminal of the three-volt direct voltage source.

Control circuitry including a flip-flop 1724 is included between the delay lines 1700, 1702 and the delay lines 1704, 1706. It is to be understood that similar control circuitry is included between each of the pairs of delay lines which make up the memory block register.

The flip-flop 1724 has a left output terminal which is connected to the input terminal of the delay line 1704, and the flip-flop has a right output terminal which is connected to the input terminal of the delay line 1706. The output terminal of the delay line 1700 is connected to the base of a transistor 1726, and the output terminal of the delay line 1702 is connected to the base of a transistor 1728. The collector of the transistor 1726 is connected to the left input terminal of the flip-flop 1724 and the collector of the transistor 1728 is connected to the right input terminal of that flip-flop.

The emitters of the transistors 1726 and 1728 are connected to the collector of a transistor 1730, and the emitter of the latter transistor is connected to the collector of a transistor 1731. The transistor 1731 has a grounded emitter, and its base receives the timing signal $T_W$ (REC) produced by the circuit of FIGURE 87. The term $\overline{(@)}$ is introduced to the base of the transistor 1730, this term being the converse of the (@) term derived by the circuitry of FIGURE 33.

The left input terminal of the flip-flop 1724 is connected to the collector of a transistor 1734 and the right input terminal of the flip-flop is connected to the collector of a transistor 1736. The emitters of the transistors 1734 and 1736 are connected to the collector of a transistor 1738. The transistor 1738 has its emitter connected to the collector of a transistor 1732 and the base of the transistor 1738 receives the (@) term derived by the circuitry of FIGURE 33. The emitter of the transistor 1732 is grounded and a timing signal $T_n$ (in) is applied to its base. This timing signal is produced by the circuit of FIGURE 87.

The left output terminal of the read flip-flop of the $A_7$ block register in the expandable memory of FIGURE 11B is connected to the base of the transistor 1734, and the right output terminal of that flip-flop is connected to the base of the transistor 1736. In like manner, the left and right output terminals of the read flip-flops associated with the block registers $A_7$, $A_6$, $A_5$, $A_4$, $A_3$, $A_2$ and $A_1$ in the expandable memory of FIGURES 11A and 11B are connected to the corresponding transistors of the flip-flop circuits interposed between the other pairs of one word delay lines in the block register 1 in FIGURE 60.

Whenever the (@) command is true, and at times $T_W$, the flip-flop 1724 and the other corresponding flip-flops between the other pairs of delay lines, will respond to the signals $A_8$, $\overline{A_8}$ and $A_7$, $\overline{A_7}$, etc. so that a word may be read from each of the block registers $A_1$–$A_8$ of the expandable memory of FIGURES 11A and 11B into the memory block register. At other times, and when the (@) command is false, and the term $\overline{(@)}$ is true, the signals from the block registers $A_1$–$A_8$ of the expandable memory will be ineffective, and data from the output of each pair of delay lines in the memory block register 1 will be introduced to the next pair for normal circulation.

The memory block register 1 of FIGURE 60 has a read flip-flop 1740, and this flip-flop has a right output terminal at which the signal B1R appears. This latter signal corresponds digit-by-digit to the block contents of the memory block register 1.

The left input terminal of the read flip-flop 1740 is connected to the collector of a transistor 1742, and the right input terminal of the read flip-flop is connected to the collector of a transistor 1744. The output terminal of the delay line 1708 is connected to the base of the transistor 1742, and the output terminal of the delay line 1710 is connected to the base of the transistor 1744. The emitters of the transistors 1742 and 1744 are connected to the collector of a transistor 1746. The emitter of the transistor 1746 is grounded, and the timing signal (TR) of FIGURE 1A is applied to the base of that transistor. Therefore, the read flip-flop 1740 is triggered in correspondence with the block of data circulated through the memory block register 1.

The input terminal (1BW) is connected to a common lead 1748. This lead connects with a 3.9 kilo-ohm resistor 1750 which is connected to the negative terminal of the three-volt direct voltage source. A group of transistors 1752, 1754, 1756 and 1758 have all their collectors connected to the lead 1748. The emitter of the transistor 1752 is connected to the collector of a transistor 1760, and the emitter of the latter transistor is grounded.

The emitter of the transistor 1758 is connected to the collector of a grounded emitter transistor 1762. The base of the transistor 1758 is connected to a common lead 1764, and a group of three transistors 1766, 1768 and 1770 each has its collector connected to the lead 1764. The emitter of the transistor 1770 is grounded, and its collector is further connected to a resistor 1780 having a resistance of 3.9 kilo-ohms and connected to the negative terminal of the three-volt direct voltage source.

The (@) command of FIGURE 33 is introduced to the base of the transistor 1752, and the $A_8$ term from the right output terminal of the flip-flop associated with the block register A8 of the expandable memory of FIGURE 11 is applied to the base of the transistor 1760. In the presence of an (@) command, and as discussed above, the contents of the registers $A_7$–$A_1$ of the expandable memory are shifted into individual one-word segments of the memory block register 1. A one-word portion of the contents of the A8 block register of the expandable memory is introduced by way of the transistors 1760 and 1752 to the write flip-flop 1712 so that the selected contents may be introduced into the first pair of delay lines 1702 and 1700 of the memory block register.

The (@) command is timed in a manner similar to that described above in conjunction with the other alpha commands to occur precisely at the time corresponding to a delayed word in each of the block registers $A_1$–$A_8$ of the expandable memory. The (@) command then remains true for a single word time so that the desired word from each of these blocks is exchanged with the original contents of the memory block. The new data then circulates through the memory block for subsequent use.

The (@) command is also introduced to the base of the transistor 1770, and when that command is true, the transistor 1758 is rendered nonconductive. The output (BIR) from the memory block register 1 is introduced to the base of the transistor 1762 to be circulated to the input (1BW) as long as the transistor 1758 is conductive. Therefore, the presence of the (@) command breaks the circulating loop and permits the new data to be introduced into the memory block register from the expandable memory.

The address term $B_1$ from the logic circuitry of FIGURE 49 is introduced to the base of the transistor 1754, and the term ($WA\cdot 61g$) from the circuitry of FIGURE 44 is introduced to the emitter of the transistor 1754. The term ($B_2$) is also introduced to the base of the transistor 1768, and the term (WA$g$) is applied to the emitter of the latter transistor, so that the circulating loop of the memory block register is broken whenever the address ($B_1$) occurs in conjunction with the term (WA$g$).

It will be remembered that the term (WA) is true for a certain group of commands, and when that term is true, it permits the contents for a specified address to be placed in a common feed path. These contents are designated, as explained, as (61$g$) this ($g$) designating that (61) goes to ground in the presence of each binary one. Therefore, the contents (61) are read into the memory block register (1) when the term ($B_1$) is true.

It should be noted that the term ($B_1$) is true only when a particular word in the memory block is addressed. Under the control of the temporal detector described in conjunction with FIGURE 55, the term ($B_1$) becomes a one at a time corresponding to the position corresponding to the addressed word would be circulating through the write flip-flop 1712. This permits the particular word to be written at the proper position in the memory block register.

The term (81) of FIGURE 49 is applied to the base of the transistor 1756, and a term $(I+K)TBRg$ is applied to the emitter of the transistor 1756. The term (81) is also applied to the base of the transistor 1766. The terms $(I+K)TBRg$ and $(I+K)g$ are both derived from logic circuitry which will be described in conjunction with FIGURE 68.

It will be remembered from the discussion of FIGURE 12 that the commands I and K both involve block transfers from the transfer block 8 to the other block registers of the computer or to the input buffer. The term (81) is produced by the circuitry of FIGURE 49 in response to a number address (1) representing the memory block. The term (TBI) represents the output from the transfer block, and this output is introduced to the emitter of the transistor 1756 in the presence of an (I) command or a (K) command. The output is then passed on to the input terminal 1BW of the memory block register in the presence of the (1) address which renders the term (81) true.

When the term (81) is true, in the presence of an I or K command, the resulting conductivity of the transistor 1766 breaks the circulating loop of the memory block register 1 so that the new contents can be read into that register. It will be remembered that the I and K commands are block transfer commands, and the temporal detector of FIGURE 55 is controlled so that data is read into the memory block register 1 at the beginning of the block time and continues until the end of the block time.

Figure 61:
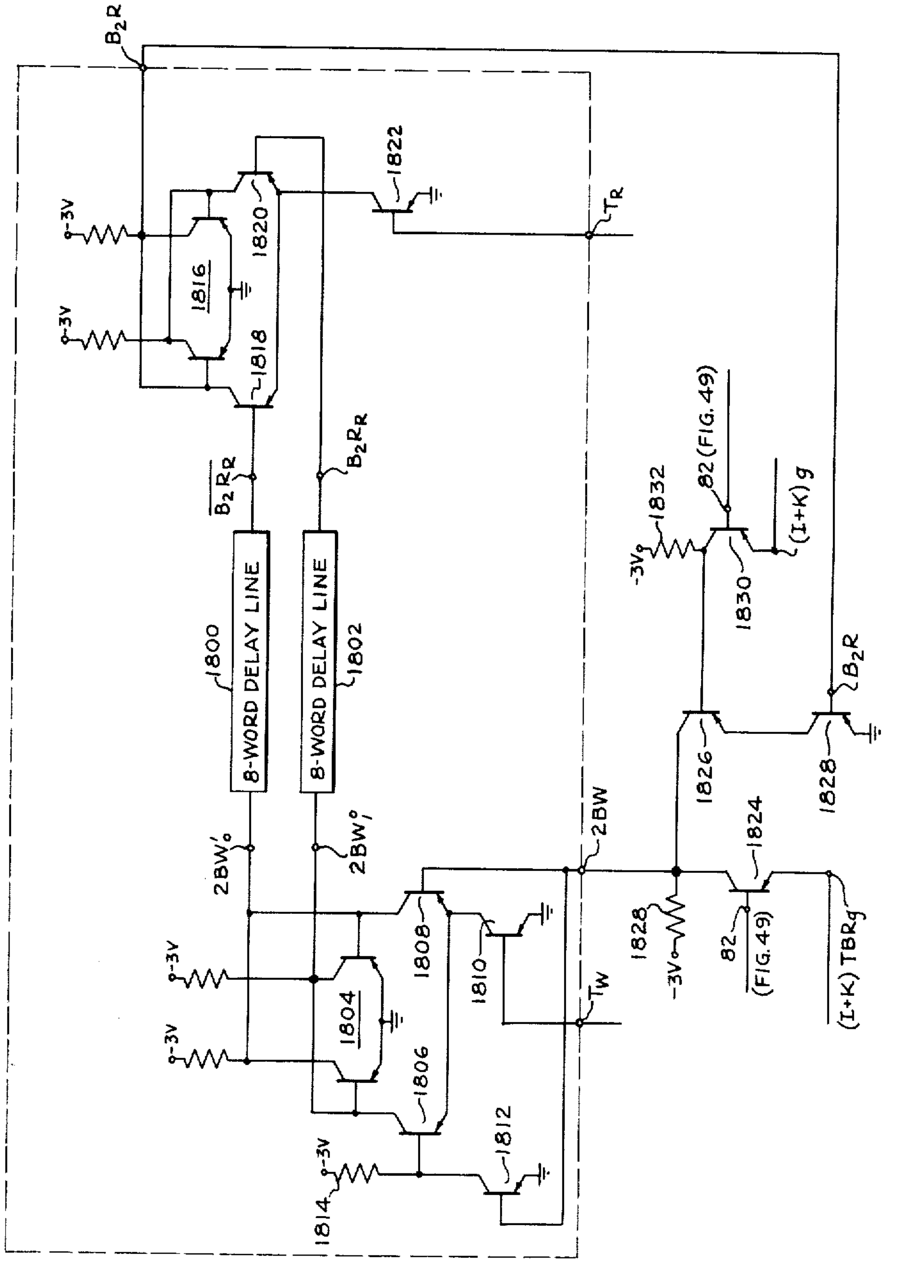

The address block register 2 of FIGURE 9 is disclosed in more detail in FIGURE 61. This address block register includes a pair of eight word delay lines similar to the delay line assembly described previously in conjunction with FIGURES 5 and 6, these delay lines being designated as 1800 and 1802. The address block register assembly of FIGURE 61 includes a write flip-flop 1804. This flip-flop has a left output terminal which is connected to the input terminal ($2BW_0^1$) of the delay line 1800, and it has a right output terminal connected to the input terminal ($2BW_1^0$) of the delay line 1802.

The left input terminal of the flip-flop 1804 is connected to the collector of a transistor 1806, and the right input terminal of the flip-flop is connected to the collector of a transistor 1808. The emitters of the transistors 1806 and 1808 are connected to the collector of a transistor 1810. The emitter of the latter transistor is grounded and its base receives the timing signal $T_W$ of FIGURE 1A.

The base of the transistor 1806 is connected to the collector of a grounded emitter transistor 1812. This collector is also connected to a 1.5 kilo-ohm resistor 1814, and the resistor is connected to the negative terminal of the three-volt direct voltage source. An input terminal designated 2BW is connected to the base of the transistor 1812 and to the base of the transistor 1808.

It is evident that whenever the terminal 2BW goes negative, the flip-flop 1804 is triggered to a true state and whenever that terminal goes to zero, the flip-flop is triggered to a false state.

The address block register 2 includes a read flip-flop 1816 which is triggered to follow the state of the right flip-flop 1804, but after a delay of eight words. The output terminal of the delay line 1800 is connected to the base of a transistor 1818, and the output terminal of the delay line 1802 is connected to the base of a transistor 1820. The collector of the transistor 1818 is connected to the left input terminal of the read flip-flop 1816, and the collector of the transistor 1820 is connected to the right input terminal of that flip-flop. The emitters of the transistors 1818 and 1820 are connected to the collector of a transistor 1822, and the emitter of the transistor 1822 is grounded. The timing signal ($T_R$) of FIGURE 1A is applied to the base of the transistor 1822 to time the operation of the flip-flop 1816. The right output terminal of the flip-flop 1816 is connected to an output terminal designated (B2R) which the output of the address block register 2 appears.

The circuitry associated with the block register 2 includes a transistor 1824 and a transistor 1826. The collectors of both these transistors are connected to the input terminal 2BW and to a 3.9 kilo-ohm resistor 1828. This resistor is connected to the negative terminal of the three-volt direct voltage source. The emitter of the transistor 1826 is connected to the collector of a transistor 1828 and the emitter of the latter transistor is grounded. The base of the transistor 1826 is connected to the collector of a transistor 1830, and to one terminal of a resistor 1832. The resistor 1832 may have a resistance of 3.9 kilo-ohms, and this resistor is connected to the negative terminal of the three-volt direct voltage source.

The term (82) from the logic control circuitry of FIGURE 49 is applied to the base of the transistor 1824, and this term is also applied to the base of the transistor 1830. The term $(I+K)TBRg$ from the circuit of FIGURE 68 is applied to the emitter of the transistor 1824, and the term $(I+K)g$ is applied to the emitter of the transistor 1830.

In the absence of an (I) command or a (K) command, the transistor 1826 is conductive and the output of the address block register 2 is circulated through the transistors 1828 and 1826 back into its input. However, a block transfer can take place between the transfer block and the address block 2 upon the designation of the term 82 which corresponds to the address of the address block. When either of the commands (I) or (K) is true, and when the address term (82) is true, the circulating loop is broken due to the resulting conductivity of the transistor 1830 and the nonconductivity of the transistor 1826. Also, the contents of the transfer block are then fed into the input of the address block register 2 through the transistor 1824. It will be remembered that the commands (I) or (K) control the temporal detector of FIGURE 55 in such a manner that the transfer begins exactly at the beginning of a block time and terminates at the end of a block time. After the termination, normal circulation of the new block of data through the address block register 2 is made possible by the resulting nonconductivity of the transistor 1840 and conductivity of transistor 1826 which reestablishes the circulating loop.

Figure 62:
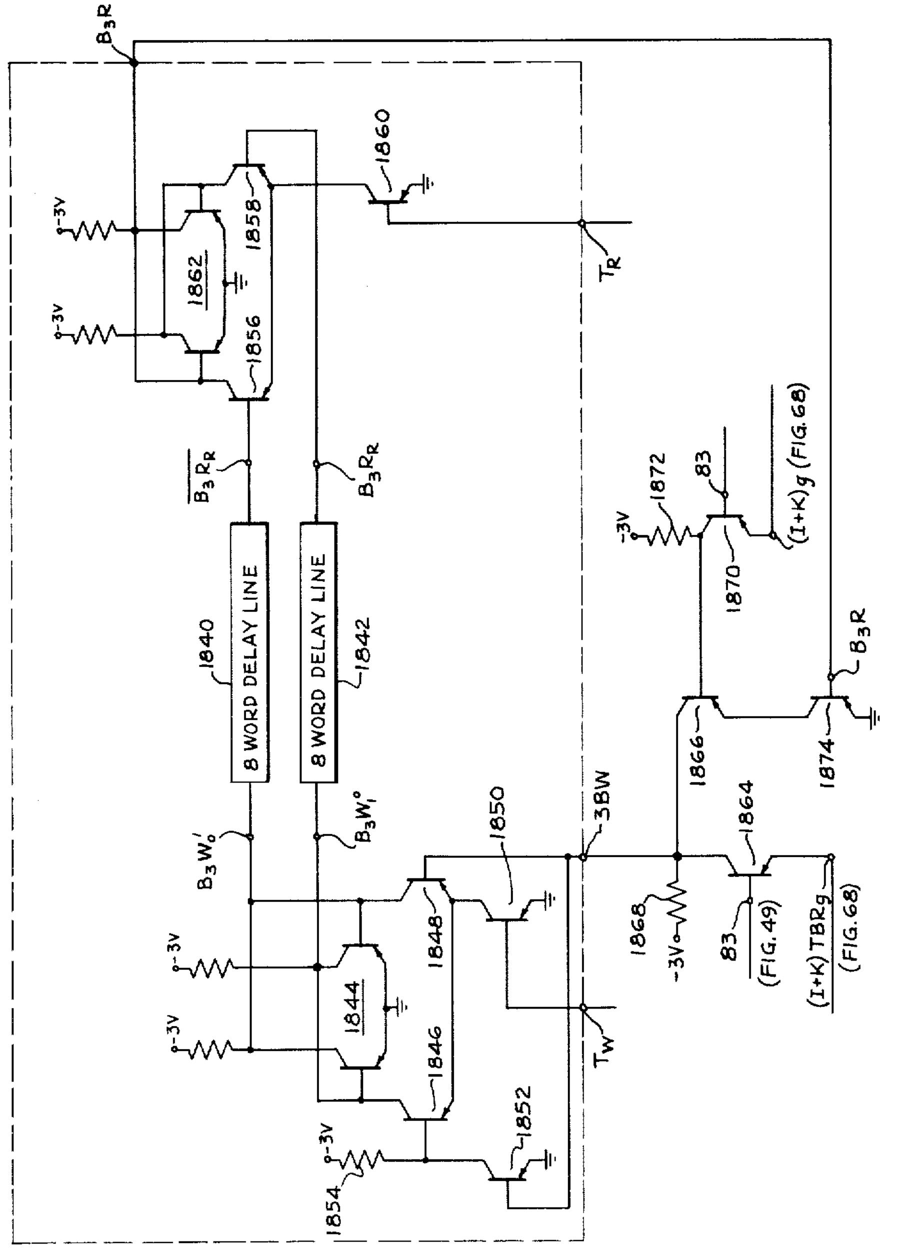

The address block register 3 of FIGURE 9 is disclosed in more detail in FIGURE 62. This latter address block register includes a pair of 8-word delay lines similar to the delay line assembly described in conjunction with FIGURES 5 and 6, these delay lines being designated as 1840 and 1842. The address block register assembly of FIGURE 62 includes a write flip-flop 1844. This write flip-flop has a left output terminal which is connected to the input terminal ($B_3W_0^1$) of the delay line 1840, and it has a right output terminal connected to the input terminal ($B_3W_1^0$) of the delay line 1842.

The left input terminal of the flip-flop 1844 is connected to the collector of a transistor 1846, and the right input terminal of the flip-flop 1844 is connected to the collector of a transistor 1848. The emitters of the transistors 1846 and 1848 are connected to the collector of a transistor 1850. The emitter of the latter transistor is grounded and its base receives the timing signal ($T_W$) of FIGURE 1A.

The base of the transistor 1846 is connected to the collector of a grounded emitter transistor 1852. This collector is also connected to a 1.5 kilo-ohm resistor 1854 and the resistor is connected to the negative terminal of the 3-volt direct voltage source. An input terminal designated (3BW) is connected to the base of the transistor 1852 and to the base of the transistor 1848.

It is evident that whenever the terminal (3BW) goes negative, the flip-flop 1844 is triggered to a true state, and whenever that terminal goes to zero, the flip-flop is triggered to a false state.

The output terminal ($\overline{B_3R_R}$) of the delay line 1840 is connected to the base of a transistor 1856 and the output terminal ($B_3R_R$) of the delay line 1842 is connected to the base of a transistor 1858. The emitters of the transistors 1856 and 1858 are connected to a collector of a grounded emitter transistor 1860. The timing signal ($T_R$) of FIGURE 1A is applied to the base of the transistor 1860.

The collector of the transistor 1856 is connected to the left input terminal of a read flip-flop 1862, and the collector of the transistor 1858 is connected to the right input terminal of the read flip-flop. The right output terminal of the read flip-flop is connected to an output terminal designated ($B_3R$).

The circuitry associated with the block register 3 of FIGURE 62 includes a transistor 1864 and a transistor 1866. These transistors have their collectors connected to the input terminal 3BW and to a resistor 1868. The resistor 1868 may have a resistance of 3.9 kilo-ohms, and this resistor is connected to the negative terminal of the three-volt direct voltage source.

The base of the transistor 1866 is connected to the collector of a transistor 1870 and that collector is also connected to a resistor 1872. The resistor 1872 may have a resistance of 3.9 kilo-ohms, and the resistor is connected to the negative terminal of the three-volt direct voltage source. The emitter of the transistor 1866 is connected to the collector of a transistor 1874. The transistor 1874 has a grounded emitter and the base of that transistor is connected back to the output terminal $B_3R$.

A circulating loop for the block register 3 is established through the transistors 1874 and the transistor 1866 to the input terminal (3BW). However, upon the occurrence of either the command I or the command K for providing a block transfer from the transfer block, and upon the occurrence of the address term (83) corresponding to the address of the number 3 block register, the circulating loop is broken. This is because the address term 83 is introduced to the base of the transistor 1870, and the term $(I+K)g$ is applied to the emitter of that transistor. Therefore, in the presence of either the (I) command or the (K) command, and when the address term (83) is true, the resulting conductivity of the transistor 1870 causes the transistor 1866 to be nonconductive to break the circulating loop.

The term (83) is also applied to the base of the transistor 1864, and the term $(I+K)TBRg$ is applied to the emitter of the transistor 1864. Therefore, in the presence of an (I) command or a (K) command, and when the address (83) is true, the transistor 1864 feeds the contents of the transfer block into the addressed block register 3. As mentioned above, the temporal detector of FIGURE 55 assures that this transfer begins at the beginning of a block and ends at the end of a block.

Figure 63:
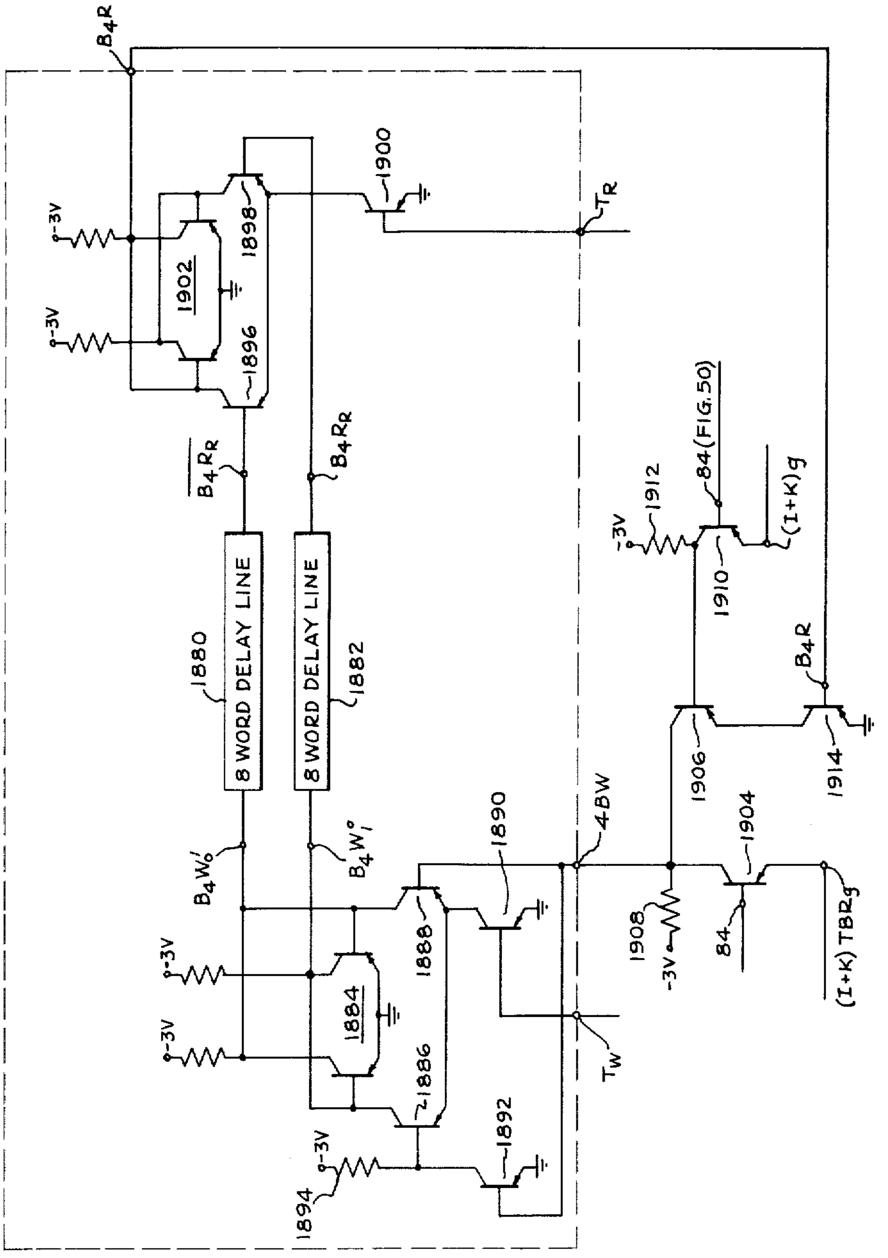

The command block register 4 of FIGURE 9 is shown in more detail in FIGURE 63. This block register includes a pair of delay lines 1880 and 1882. The assembly also includes a write flip-flop 1884 and the left output terminal of the flip-flop is connected to the input terminal ($B_4W_0^1$) of the delay line 1880; whereas the right output terminal of the flip-flop is connected to the input terminal ($B_4W_1^0$) of the delay line 1882.

The flip-flop 1884 has its left input terminal connected to the collector of a transistor 1886 and the right input terminal of the flip-flop is connected to the collector of a transistor 1888. The emitters of the transistors 1886 and 1888 are connected to the collector of a transistor 1890. The transistor 1890 has a grounded emitter and the base of this transistor receives the timing signal ($T_W$) of the timing signal of FIGURE 1A.

The assembly includes an input terminal designated (4BW) and this input terminal is connected to the base of the transistor 1888 and to the base of a grounded emitter transistor 1892. The collector of the transistor 1892 is connected to the base of the transistor 1886 and to a resistor 1894. The resistor 1894 has a resistance of 1.5 kilo-ohms and is connected to the negative terminal of the three-volt direct voltage source.

The output terminal ($B_4R_R$) of the delay line 1880 is connected to the base of a transistor 1896, and the output terminal ($B_4R_R$) of the delay line 1882 is connected to the base of a transistor 1898. The emitters of the transistors 1896 and 1898 are connected to the collector of a transistor 1900. The emitter of the transistor 1900 is grounded and its base is connected to an input terminal designated ($T_R$). This input terminal receives the timing signal ($T_R$) discussed in conjunction with FIGURE 1A.

The collector of the transistor 1896 is connected to the left input terminal of a read flip-flop 1902 and the collector of the transistor 1898 is connected to the right input terminal of that flip-flop. The right output terminal of the flip-flop 1902 is connected to an output terminal designated ($B_4R$).

A transistor 1904 and a transistor 1906 have their collectors connected to a 3.9 kilo-ohm resistor 1908 and to the input terminal (4BW). The resistor 1908 is connected to the negative terminal of the three-volt voltage source. The base of the transistor 1906 is connected to the collector of a transistor 1910 and to a resistor 1912. The resistor 1912 has a resistance of 3.9 kilo-ohms and is connected to the negative terminal of the three-volt direct voltage source.

The emitter of the transistor 1906 is connected to the collector of a transistor 1914. The emitter of the transistor 1914 is grounded and its base is connected back to the output terminal ($B_4R$).

The transistor 1906 is normally conductive to complete the circulating loop for a command block register 4. However, the address term 84 is applied to the base of the transistor 1910, this term being derived from the address logic circuitry of FIGURE 50. Also, the term $(I+K)g$ is applied to the emitter of that transistor. Therefore, in the presence of an I command or a K command, and when the command block register 4 address term 84 is true, the transistor 1910 conducts to render the transistor 1906 nonconductive and so break the circulating loop.

The term 84 is also introduced to the base of the transistor 1904, and the term $(I+K)TBRg$ is introduced to the emitter of that transistor. Therefore, the (I) or (K) command together with the (84) address causes the contents of the transfer block register to be fed into the command block register 4. As in the previous cases the temporal detector of FIGURE 55 causes the transfer to begin at the beginning of a word time and to end at the precise end of a word time.

Figure 64:
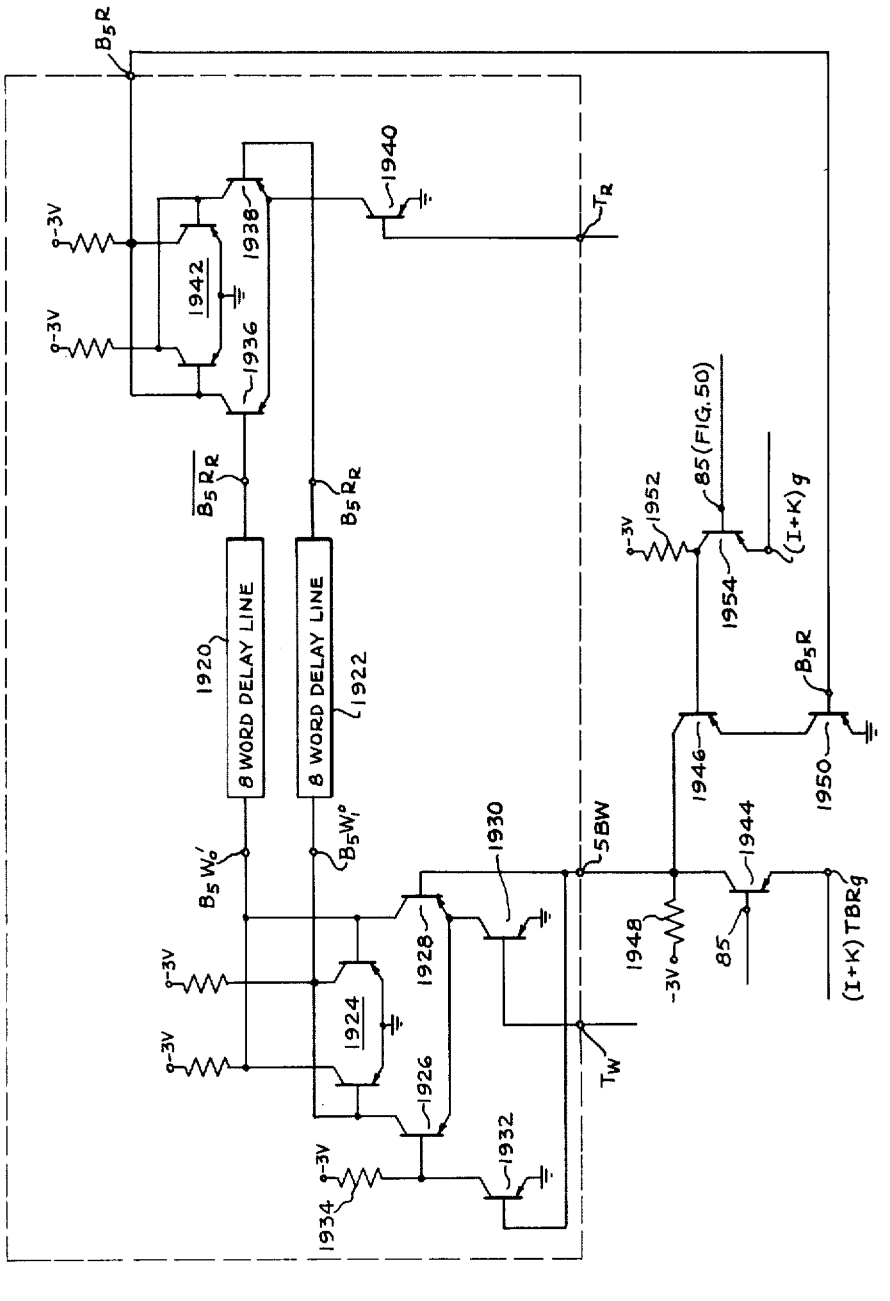

The command block register 5 of FIGURE 9 is shown in more detail in FIGURE 64. This latter block register includes a pair of delay lines 1920 and 1922. These delay lines are constructed in the manner described in conjunction with FIGURES 5 and 6, and they provide an eight word delay for the data translated through them.

The block register assembly includes a write flip-flop 1924, and the left output terminal of the flip-flop is connected to the input terminal ($B_5W_0^1$) of the delay line 1920 and its right output terminal is connected to the input terminal ($B_5W_1^0$) of the delay line 1922.

The left input terminal of the write flip-flop 1924 is connected to the collector of a transistor 1926 and its right input terminal is connected to the collector of a transistor 1928. The emitters of the transistors 1926 and 1928 are connected to the collector of a grounded emitter transistor 1930. A timing signal ($T_W$) is applied to the base of the transistor 1930, this timing signal being described previously in conjunction with FIGURE 1A.

The command block register 5 includes an input terminal (5BW) which is connected to the base of a transistor 1932 and to the base of the transistor 1928. The transistor 1932 has a grounded emitter and the collector of the transistor is connected to the base of the transistor 1926 and to a resistor 1934. The resistor 1934 has a resistance of 1.5 kilo-ohms, and is connected to the negative terminal of a three-volt direct voltage source.

The output terminal ($\overline{B_5R_R}$) of the delay line 1920 is connected to the base of a transistor 1936, and the output terminal ($B_5R_R$) of the delay line 1922 is connected to the base of a transistor 1938. The emitters of the transistors 1936 and 1938 are connected to the collector of a transistor 1940. The transistor 1940 has a grounded emitter and the timing signal ($T_R$) of FIGURE 1A is impressed on the base of this transistor.

The collector of the transistor 1936 is connected to the left input terminal of a read flip-flop 1942 and the collector of the transistor 1938 is connected to the right input terminal of that flip-flop. The right output terminal of the read flip-flop 1942 is connected to an output terminal designated ($B_5R$).

The collector of a transistor 1944 and the collector of a transistor 1946 are connected to the input terminal 5BW and to a resistor 1948. The resistor 1948 has a resistance of 3.9 kilo-ohms and is connected to the negative terminal of the three-volt direct voltage source.

The emitter of the transistor 1946 is connected to the collector of a transistor 1950, and the emitter of that transistor is grounded. The output terminal $B_5R$ is connected to the base of the transistor 1950, and the transistors 1946 and 1950 form the circulating loop for the command block register 5. The base of the transistor 1946 is connected to a 3.9 kilo-ohm resistor 1952 and to the collector of a transistor 1954, the resistor being connected to the negative terminal of the three-volt direct voltage source.

The term $(I+K)g$ is applied to the emitter of the transistor 1954, and the address term (85) of FIGURE 50 is applied to the base of that transistor. The address term (85) corresponds to the address of the command block register 5, and when this term is true in the presence of a block transfer command (I) or a block transfer command (K), the resulting conductivity of the transistor 1954 breaks the circulating loop.

The address term 85 is also applied to the base of the transistor 1944 and the term $(I+K)TBRg$ is applied to the emitter of that transistor. Therefore, in the presence of the block transfer command (I) or the block transfer command (K), and when the address term (85) is true, the contents of the transfer block are fed into the command block register 5.

Figure 65:
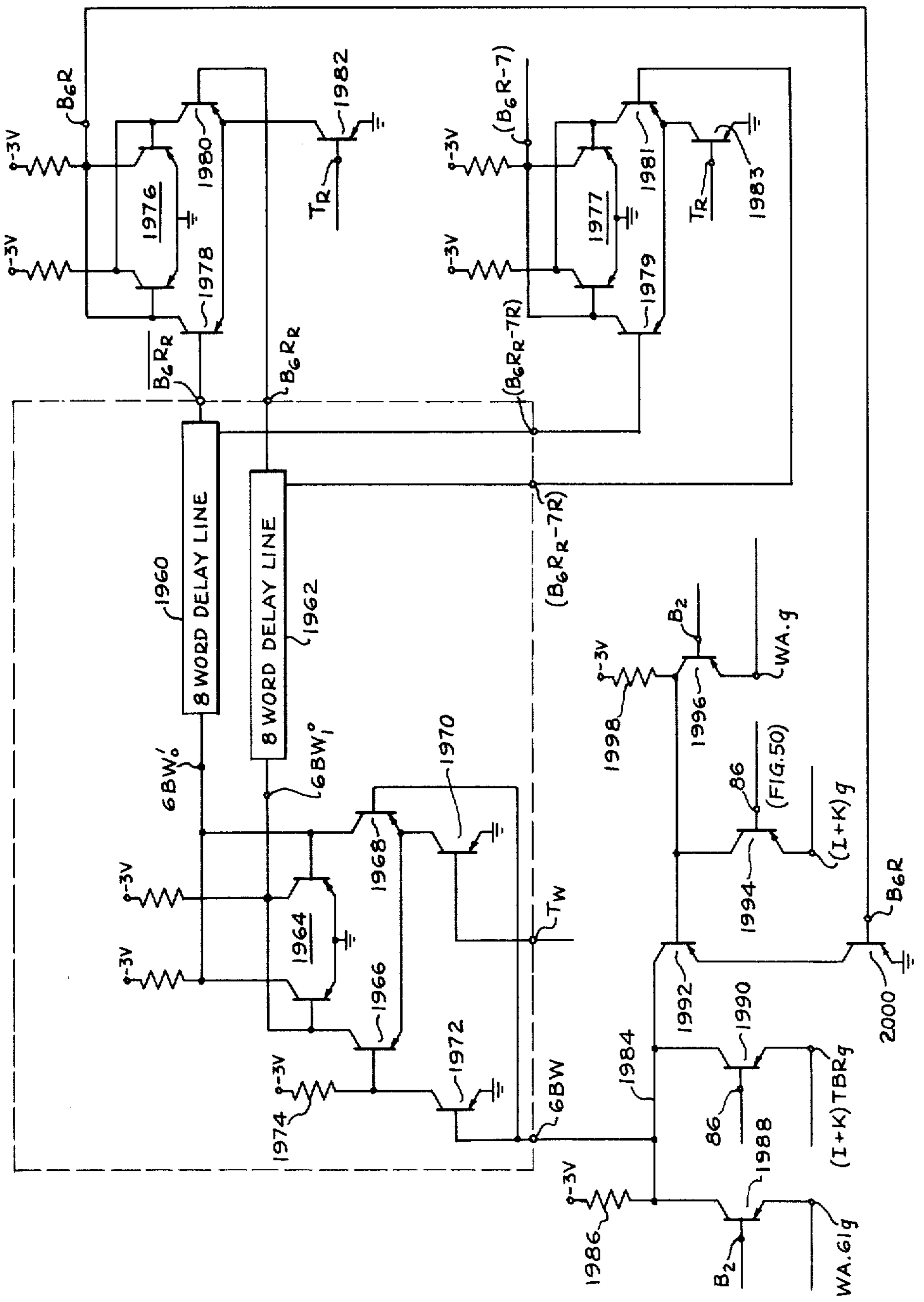

The circuitry associated with the data block register 6 is shown in FIGURE 65. The data block register 6 includes an eight word delay line 1960 and an eight word delay line 1962. Both these delay lines may be constructed in the manner described in conjunction with FIGURES 5 and 6. The assembly includes a write flip-flop 1964 and a left output terminal of this flip-flop is connected to the input terminal ($6BW_0^1$) of the delay line 1960; whereas the right output terminal of the flip-flop is connected to the input terminal ($6BW_1^0$) of the delay line 1962.

The left input terminal of the flip-flop 1964 is connected to the collector of a transistor 1966 and the right input terminal of the flip-flop 1964 is connected to the collector of a transistor 1968. The emitters of the transistors 1966 and 1968 are connected to the collector of a transistor 1970. The emitter of the transistor 1970 is grounded and its base is connected to an input terminal ($T_W$). The input terminal ($T_W$) receives the timing signal ($T_W$) described in conjunction with FIGURE 1A.

The assembly includes an input terminal designated (6BW). This input terminal is connected to the base of the transistor 1968 and to the base of a transistor 1972. The collector of the transistor 1972 is connected to the base of the transistor 1966 and to a resistor 1974. The resistor 1974 may have a resistance of 1.5 kilo-ohms and this resistor is connected to the negative terminal of the three-volt direct voltage source. The emitter of the transistor 1972 is grounded.

The circuitry associated with the data block register 6 includes a first read flip-flop 1976. This read flip-flop has a right output terminal designated ($B_6R$), and it has a left input terminal connected to the collector of a transistor 1978 and a right input terminal connected to the collector of a transistor 1980. The output terminal ($\overline{B_6R_R}$) of the delay line 1960 is connected to the base of the transistor 1978, and the output terminal ($B_6R_R$) of the delay line 1962 is connected to the base of the transistor 1980. The emitters of the transistors 1978 and 1980 are connected to the collector of a transistor 1982. The emitter of the transistor 1982 is grounded and its base receives the timing signal ($T_R$) of FIGURE 1A.

The delay line 1960 has a second output terminal which precedes the output terminal described above by one character time. The term ($\overline{B_6R_R}$) is produced at the output terminal described above, and the term ($\overline{B_6R_R-7_R}$) is produced by the second output terminal. The delay line 1962 also has a second output terminal which is displaced one character time from the output terminal described above. The first output terminal is designated ($B_6R_R$) and the second output terminal is designated ($B_6R_R-7_R$).

The circuitry associated with the data block register 6 includes a second read flip-flop 1977. This read flip-flop has a right output terminal designated ($B_6R-7$), and it has a left input terminal connected to the collector of a transistor 1979 and a right input terminal connected to the collector of a transistor 1981. The output terminal ($\overline{B_6R_R-7_R}$) of the delay line 1960 is connected to the base of the transistor 1979, and the output terminal ($B_6R_R-7_R$) of the delay line 1962 is connected to the base of the transistor 1981. The emitters of the transistors 1979 and 1981 are connected to the collector of a transistor 1983. The emitter of the transistor 1983 is grounded, and its base receives the timing signal ($T_R$) of FIGURE 1A.

It is apparent that when the read flip-flop 1976 is reading any particular character of any particular word in the delay lines 1960 and 1962, the flip-flop 1977 will be reading the preceding character.

The circuitry associated with the data block register 6 includes a common lead 1984 which is connected to a resistor 1986 and to the collectors of a group of three transistors 1988, 1990 and 1992. The resistor 1986 may have a resistance of 3.9 kilo-ohms, and this resistor is connected to the negative terminal of the three-volt direct voltage source.

The base of the transistor 1992 is connected to the collector of a transistor 1994 and to the collector of a transistor 1996. The base of the transistor 1992 is also connected to a resistor 1998, this resistor having a resistance of 3.9 kilo-ohms and being connected to the negative terminal of the three-volt direct voltage source. The emitter of the transistor 1992 is connected to the collector of a transistor 2000, the emitter of the latter transistor being grounded. The output symbol $B_6R$ from the read flip-flop 1976 is applied to the base of the transistor 2000 for circulation through the transistor 1992 to the write flip flop 1964 of the data block register 6. The address term (86) of FIGURE 50 is applied to the base of the transistor 1994, and the term $(I+K)g$ is applied to the emitter of that transistor. Therefore, when the data block register 6 is addressed, causing the term (86) to be true in the presence of an I command or a K command, the resulting conductivity of the transistor 1994 causes the transistor 1992 to become nonconductive to break the circulating loop.

The address term (86) is also applied to the base of the transistor 1990, and the term $(I+K)(TBRg)$ is applied to the emitter of that transistor. Therefore, in the presence of an I command or a K command, and when the data block register 6 is addressed, the contents of the transfer block register are read into the data block register 6.

A command of the group (WA), together with an alpha address from the group ($B_2$) can provide a word transfer to the data block register 6 in the manner described above. The term ($B_2$) is applied to the base of the transistor 1996 and the term (WA$g$) is applied to the emitter of that transistor. When these terms occur, the resulting conductivity of the transistor 1996 breaks the circulating loop.

The term ($B_2$) is also applied to the base of the transistor 1988, and the term $(WA \cdot 61g)$ is applied to the emitter of that transistor. Therefore, the presence of a command in the (WA) group, together with the address designation ($B_2$), causes a word to be read into a selected addressed position in the data block register 6.

Figure 66:
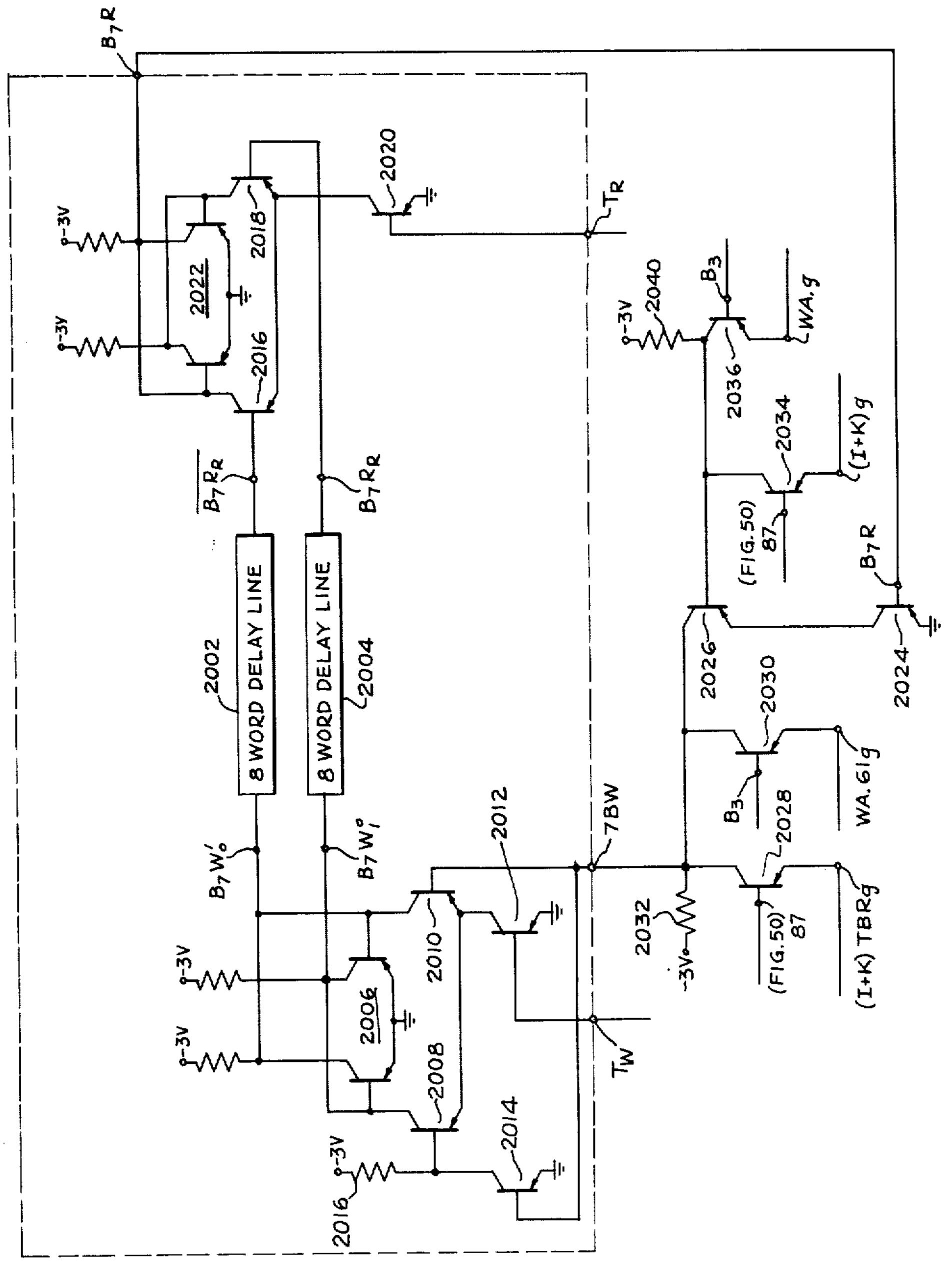

The data block register 7 is shown in more detail in FIGURE 66. This latter block register includes a pair of delay lines 2002 and 2004. These delay lines are of the eight-word type, and may be similar to the delay lines described above.

The data block register 7 includes a write flip-flop 2006. The left output terminal of the write flip-flop is connected to an input terminal ($B_7W_0^1$) of the delay line 2002, and the right output terminal of the flip-flop is connected to the input terminal ($B_7W_1^0$) of the delay line 2004.

The left input terminal of the flip-flop 2006 is connected to the collector of a transistor 2008 and the right input terminal of the flip-flop 2006 is connected to the collector of a transistor 2010. The emitters of the transistors 2008 and 2010 are connected to the collector of a grounded emitter transistor 2012. The base of the grounded emitter transmitter 2012 receives the timing signal ($T_W$) of FIGURE 1A.

The data block register 7 includes an input terminal (7BW) which is connected to the base of the transistor 2010 and to the base of a grounded emitter transistor 2014. The collector of the transistor 2014 is connected to the base of the transistor 2008 and to a 1.5 kilo-ohm resistor 2016, the resistor being connected to the negative terminal of the three-volt direct voltage source.

The output terminal ($\overline{B_7R_R}$) of the delay line 2002 is connected to the base of a transistor 2016, and the output terminal of the delay line 2004 ($B_7R_R$) is connected to the base of a transistor 2018. The emitters of the transistors 2016 and 2018 are connected to the collector of a transistor 2020. The emitter of the transistor 2020 is grounded and its base receives the timing signal ($T_R$) of FIGURE 1A.

The collector of the transistor 2016 is connected to the left input terminal of a read flip-flop 2022, and the collector of the transistor 2018 is connected to the right input terminal of that flip-flop. The right output terminal of the flip-flop 2022 is connected to an output terminal designated ($B_7R$).

The output terminal ($\overline{B_7R}$) is connected back to the base of a transistor 2024. The emitter of the transistor 2024 is grounded and its collector is connected to the emitter of a transistor 2026. The collector of the transistor 2026, together with the collectors of a pair of transistors 2028 and 2030 are connected to the input terminal 7BW and to a resistor 2032. The resistor 2032 may have a resistance of 3.9 kilo ohms and is connected to the negative terminal of a three-volt direct voltage source.

The base of the transistor 2026 is connected to the collector of a transistor 2034 and to the collector of a transistor 2036. The collector of the transistor 2036 is also connected to a 3.9 kilo-ohm resistor 2040 which is connected to the negative terminal of a three-volt direct voltage source.

A circulating loop for the data block register 7 is normally established through the transistors 2024 and 2026. The address term (87) from the address circuit of FIGURE 50 is applied to the base of the transistor 2034 and the term $(I+K)g$ is applied to the emitter of that transistor. In the presence of an I command or a K command, and upon the address term (87) which corresponds to the address of the block register 7 being true, the conductivity of the transistor 2034 breaks the circulating loop.

The address term (87) is also applied to the base of the transistor 2028 and the term $(I+K)TBRg$ is applied to the emitter of that transistor. Also, for an (I) or (K) command, and when the data block register 7 is addressed, the contents of the transfer block are read into the data block register 7.

The term ($B_3$) from the address logic circuitry of FIGURE 50 is applied to the base of the transistor 2030, and the term $(WA \cdot 61g)$ is applied to the emitter of that transistor. Therefore, for a command from the (WA) group, and upon an alpha address of the ($B_3$) class, a word transfer will occur into the addressed word position of the data block register 7 in the manner described. The term ($B_3$) is applied to the base of the transistor 2036 and the term $(WA \cdot g)$ is applied to the emitter of that transistor to break the circulating loop while this particular transfer is being carried out.

Figure 67:
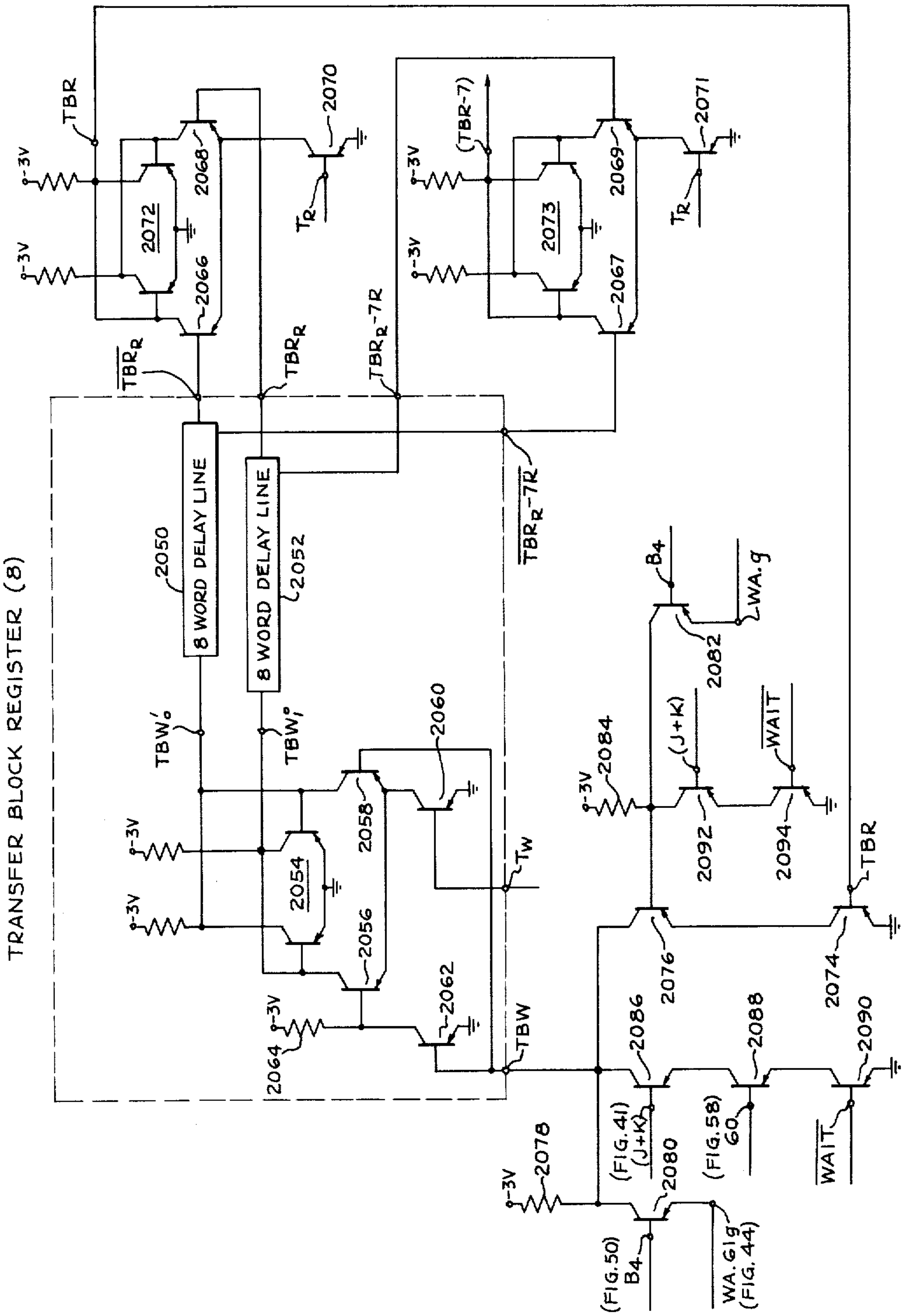

The transfer block register 8 is shown in detail in FIGURE 67. The transfer block includes an eight-word delay line 2050 and an eight-word delay line 2052, these lines being constructed in the manner described above. A write flip-flop 2054 is associated with the transfer block register, the left output terminal of this flip-flop being connected to the input terminal ($TBW_9^1$) of the delay line 2050, and the right output terminal of this flip-flop being connected to the input terminal ($TBW_1^0$) of the delay line 2052.

The left input terminal of the flip-flop 2054 is connected to the collector of a transistor 2056, and the right input terminal of the flip-flop 2054 is connected to the collector of a transistor 2058. The emitters of the transistors 2056 and 2058 are connected to the collector of a grounded emitter transistor 2060. The timing signal ($T_W$) of FIGURE 1A is applied to the base of the transistor 2060.

The assembly has an input terminal designated (TBW). This input terminal is connected to the base of the transistor 2058 and to the base of a grounded emitter transistor 2062. The collector of the transistor 2062 is connected to the base of the transistor 2056 and to a resistor 2062. The resisor 2064 has a resistance of 1.5 kilo-ohms, and is connected to the negative terminal of the three-volt direct voltage source.

The output terminal designated $(\overline{TBR_R})$ of the delay line 2050 is connected to the base of a transistor 2066, and the output terminal $(TBR_R)$ of the delay line 2052 is connected to the base of a transistor 2068. The emitters of the transistors 2066 and 2068 are connected to the collector of a grounded emitter transistor 2070. The latter transistor receives the timing signal $T_R$ of FIGURE 1A.

The collector of the transistor 2066 is connected to the left input terminal of a read first flip-flop 2072, and the collector of the transisotr 2068 is connected to the right input terminal of that flip-flop. The read flip-flop 2072 develops the signal (TBR) at its right output terminal which is introduced to the base of a transistor 2074. This signal is produced at the right output terminal of the flip-flop 2072.

The delay line 2050 has a second output terminal designated $(\overline{TBR_R-7R})$ which is displaced one character time from the output terminal by $(TBR_R)$. The second output terminal of the delay line 2050 is connected to the base of a transistor 2067. The delay line 2052 has a second output terminal $(TBR_R-7R)$ which is displaced one character time from the output terminal described above. This second output terminal of the delay line 2052 is connected to the base of a transistor 2069. The emitters of the transistors 2067 and 2069 are connected to the collector of a grounded emitter transistor 2071. The latter transistor receives the timing signal $(T_R)$ of FIGURE 1A.

The collector of the transistor 2067 is connected to the left input terminal of a second read flip-flop 2073, and the collector of the transistor 2069 is connected to the right input terminal of that flip-flop. The second read flip-flop 2073 develops a signal $(TBR-7)$.

The transistor 2074 has a grounded emitter, and the collector of this transistor is connected to the emitter of a transistor 2076. The transistor 2076 has its collector connected to the input terminal (TBW) to complete the circulating loop. This collector is also connected to a resistor 2078 having a resistance of 3.9 kilo-ohms, then the resistor is connected to the negative terminal of the three-volt direct voltage source.

A transistor 2080 has its collector connected to the input terminal (TBW) and the emitter of the transistor 2080 receives the term $(WA\cdot 61g)$ of FIGURE 44. The term $(B_4)$ of FIGURE 50 is applied to the base of the transistor 2080. Therefore, in the presence of a command from the (WA) group and for an alpha address of the $B_4$ group, the contents (61) are read into a selected word position of the transfer block register 8 in the manner described above.

During the transfer operation described in the preceding paragraph, the circulating loop is broken. This is achieved by a transistor 2082, whose collector is connected to the base of the transistor 2076 and to a resistor 2084. The resistor is connected to the negative terminal of the three-volt direct voltage source and it has a resistance of 3.9 kilo-ohms. The term $(B_4)$ is applied to the base of the transistor 2082, and the term (WA*g*) is applied to the emitter of that transistor. The conductivity of the transistor 2082 in the presence of these terms breaks the circulating loop by rendering the transistor 2076 nonconductive.

A group of three transistors 2086, 2088 and 2090 are included in the circuitry associated with the transfer block register 8. The emitter of the transistor 2090 is grounded and its collector is connected to the emitter of the transistor 2088. The collector of the transistor 2088 is connected to the emitter of the transistor 2086, and the collector of the latter transistor is connected to the input terminal (TBW). The term $(J+K)$ derived from the logic circuitry of FIGURE 41, is applied to the base of the transistor 2086 and the term (60) derived from the circuitry of FIGURE 58, is introduced to the base of the transistor 2088. Moreover, the term $(\overline{WAIT})$ is applied to the base of the transistor 2090. Therefore, in the presence of the block transfer commands J or K, which constitute block transfers into the transfer block 8, and in the absence of a (WAIT) term, the contents 60 are read into the transfer block register 8.

A transistor 2092 has its collector connected to the base of the transistor 2076, and the emitter of the transistor 2092 is connected to the collector of a grounded emitter transistor 2094. The $(\overline{J+K})$ term is applied to the base of the transistor 2092, and the $(\overline{WAIT})$ term is applied to the base of the transistor 2094. Therefore, in the presence of the J or K command, and in the absence of a (WAIT) signal, the block contents of an input buffer or of a block address register are read into the transfer block register.

The circuit of FIGURE 68 is used to derive the term $\overline{60WC}$ which represents the contents from an alpha address for a word transfer, and this circuit is also used for deriving the term 60#*g* which represents a block transfer from a number address. In like manner, the logic circuitry of FIGURE 69 develops the term 60W*g*#A which represents a word transfer from a number address. The circuitry of FIGURE 69 also produces the term $60\alpha g$ which represents the contents of an alpha address for a block transfer.

The circuit of FIGURE 68 includes a common lead 2100 at which the term $\overline{60WC}$ is formed, and it also includes a common lead 2102 at which the term 60#*g* is formed. The lead 2100 is connected to a 3.9 kilo-ohm resistor 2104, which in turn is connected to the negative terminal of the three-volt direct voltage source. A transistor 2106 has its collector connected to the lead 2100, and a transistor 2108 has its collector connected to the emitter of the transistor 2106. A grounded emitter transistor 2110 has its collector connected to the emitter of the transistor 2108.

The base of the transistor 2108 is connected to the collector of a transistor 2112 and to the collector of a transistor 2114. These collectors are also connected to a 3.9 kilo-ohm resistor 2116, and the resistor is connected to the negative terminal of the three-volt direct voltage source. The emitters of the transistors 2112 and 2114 are both grounded. The collector of the transistor 2110 is connected to the emitter of a transistor 2118. The collector of the transistor 2118 is connected to the common lead 2102.

The common lead 2100 is also connected to the collector of a transistor 2120. A transistor 2122 has its collector connected to the emitter of the transistor 2120 and to the emitter of a transistor 2124. The emitter of the transistor 2122 is grounded. The common lead 2100 is connected to the collector of the transistor 2125. The emitter of the transistor 2125 is connected to the collector of a transistor 2126 and the emitter of the transistor 2126 is connected to the collector of a transistor 2128 and to the emitter of a transistor 2130. The emitter of the transistor 2128 is grounded and the collector of the transistor 2130 is connected to the common lead 2102.

A transistor 2132 has its emitter grounded and this transistor has its collector connected to the emitters of a pair of transistors 2134 and 2136. The collector of the transistor 2134 is connected to the emitter of a transistor 2138 and the collector of the latter transistor is connected to the common lead 2100. The collector of the transistor 2136, on the other hand, is connected to the common lead 2102.

The common lead 2100 is connected to the collector of a transistor 2140, and the common lead 2102 is connected to the collector of a transistor 2142. The emitter of the transistor 2140 is connected to the collector of a transistor 2144 and the emitters of the transistors 2142 and 2144 are connected to the collector of a grounded emitter transistor 2146.

A transistor 2148 has a grounded emitter, as has a transistor 2150. The collectors of both these transistors are connected to the base of a transistor 2152 and to one terminal of a resistor 2154. The resistor 2154 has a resistance of 3.9 kilo-ohms, and this resistor is connected to the negative terminal of the three-volt direct voltage source.

A grounded emitter transistor 2156 has its collector connected to the emitter of the transistor 2152 and to the emitter of a transistor 2158. The collector of the transistor 2152 is connected to the emitter of a transistor 2160 and the collector of the latter transistor is connected to the common lead 2100. The collector of the transistor 2158, on the other hand, is connected to the common lead 2102.

The grounded emitter transistor 2162 has its collector connected to the emitters of a pair of transistors 2164 and 2166. The collectors of these transistors are connected respectively to the emitter of a transistor 2168 and to the common lead 2102, the collector of the transistor 2168 being connected to the common lead 2100.

A grounded emitter transistor 2170 has its collector connected to the emitters of a pair of transistors 2172 and 2174. The collector of the transistor 2172 is connected to the lead 2100 and the collector of the transistor 2174 is connected to the lead 2102.

The term (BRANCH) and the command (%) are respectively applied to the bases of the transistors 2112 and 2114. The output of the data block 6 is applied to the transistor 2110 and the general address designation ($B_2$) is introduced to the base of the transistor 2106. Therefore, when the address designation $B_2$ is true, and in the presence of a (BRANCH) command or a (%) command, the contents of the data block 6 are read to the common lead 2100. Likewise, the general address designation (86) is applied to the base of the transistor 2118, and this causes the contents of the data block 6 to be read onto the common lead 2102.

The general address designation ($B_4$) is applied to the base of the transistor 2120, and the output of the transfer block is applied to the transistor 2122. The commands (I) and (K) are both applied to the base of the transistor 2124. Therefore, in the presence of a general ($B_4$) address, the contents of the transfer block are read onto the common lead 2100. Also, in the presence of an (I) command or a (K) command, the contents of the transfer block appears at the collector of the transistor 2124 as the term $(I+K)TBRg$.

The general address designation ($B_2$) is applied to the base of the transistor 2125, the (BRANCH) term is applied to the base of the transistor 2126, and the output of the address block 2 is applied to the base of the transistor 2128. Therefore, in the presence of a (BRANCH) command and for a general address designation ($B_2$), the contents of the address block 2 are read onto the common lead 2100. Likewise, the general address term 82 is applied to the base of the transistor 2130, and in the presence of such an address, the contents of the address block 2 are read onto the common lead 2102.

The general address designation ($B_3$) is introduced to the base of the transistor 2138, and the (BRANCH) term is applied to the base of the transistor 2134. The output of the address block 3 is applied to the base of the transistor 2132, and the general address designation 83 is applied to the base of the transistor 2136. Therefore, upon a (BRANCH) command and a ($B_3$) address designation, the contents of the address block 3 are read onto the common lead 2100. Likewise, in the presence of an address designation (83), the contents of the data block 3 are read onto the common lead 2102.

The general address designation ($B_2$) is applied to the base of the transistor 2140, and the command (%) is applied to the base of the transistor 2144. The output from the command block 4 is applied to the base of the transistor 2146, and the general address designation (84) is introduced to the base of the transistor 2142. Therefore, in the presence of the (%) command and for a ($B_2$) address designation, the contents of the command block are read onto the lead 2100. Likewise, in the presence of an (84) address, the contents of the command block are read onto the lead 2102.

It will be remembered that the address designations $B_2$, $B_3$, $B_4$, etc. are timed by the temporal detector of FIGURE 55 so that a single word may be selected from the addressed block for transfer on the lead 2100. It will also be remembered that the terms 82, 83, 84, 85, 86, etc. are timed to provide a full block transfer when a block register is addressed by a number address.

The term (BRANCH) is applied to the base of the transistor 2148 and the term (%) is applied to the base of the transistor 2150. The output of the data block 7 is introduced to the base of the transistor 2156, the general address designation B3 is applied to the base of the transistor 2160, and the address designation 87 is impressed on the base of the transistor 2158.

Therefore, in the absence of a (BRANCH) command or a (%) command, and in the presence of a ($B_3$) general address designation, the contents of the data block 7 are read onto the common lead 2100. Likewise, in the presence of an address designation (87), the contents of the data block 7 are read onto the common lead 2102.

The general address term ($B_3$) is applied to the base of the transistor 2168, the command (%) is applied to the base of the transistor 2164, the output of the command block (5) is introduced to the base of the transistor 2162, and the general address designation 85 is applied to the base of the transistor 2166.

Therefore, in the presence of a (%) command, and with a general address designation ($B_3$), the designated word from the command block 5 is read onto the common lead 2100. Likewise, upon the presence of the address 85, the entire contents of the command block 5 are read onto the common lead 2102.

The general address $B_1$ is applied to the base of the transistor 2172 and the output from the memory block 1 is applied to the base of the transistor 2170. Also, the general address 81 is applied to the base of the transistor 2174.

Therefore, upon the address designation B1, an addressed word of the memory block 1 is read onto the common lead 2100. Likewise, in the presence of the address designation 81, the entire contents of the number 1 data revolver are read onto the common lead 2102.

As noted above, the circuitry for deriving the terms $60\alpha g$ and $60Wg\#A$ is shown in FIGURE 69. This circuitry includes a first common lead 2200 which is connected to an output terminal designated $60Wg\#A$, and it includes a common lead 2202 connected to an output terminal designated $60\alpha g$.

A group of transistors 2204, 2206, 2208, 2210, 2212 and 2214 each have their collector connected to the common lead 2202. Similarly, a group of transistors 2216, 2218, 2220, 2222, 2224 and 2226 each have their collector connected to the common lead 2200. A further group of transistors 2228, 2230, 2232, 2234 and 2236 have their emitters grounded and the collectors of this latter group of transistors are connected respectively to the emitters of the transistors 2204, 2206, 2208, 2216 and 2218.

A transistor 2238 has its collector connected to the emitters of the transistors 2210 and 2220 and the emitter of the transistor 2238 is grounded. A transistor 2240 has its emitter grounded, and the collector of this transistor is connected to the emitter of the transistor 2222. A transistor 2242 has its emitter grounded and has its collector connected to the emitters of the transistors 2224 and 2212. Finally, a transistor 2244 has its collector connected to the emitters of the transistors 2214 and 2226, and has its emitter grounded.

The equipment under consideration is assumed to have six input and output buffers of the type described in conjunction with FIGURE 8. The outputs of these buffers are designated respectively as $E_R$, $F_R$, $G_R$, $D_R$, $H_R$ and $A_R$. The output ($E_R$) is applied to the base of the transistor 2228, the output ($F_R$) is applied to the base of the transistor 2230, the output ($G_R$) is applied to the base of the transistor 2232, the output ($D_R$) is applied to the base of the transistor 2210, the output ($H_R$) is applied to the base of the transistor 2212, and the output ($A_R$) is applied to the base of the transistor 2214.

The address terms 82, 83 and 84 are respectively introduced to the bases of the transistors 2204, 2206 and 2208. When any selected one of these address terms is true, the corresponding block contents of the associated buffer is read into the common lead 2202 to form the (60W*g*#A).

The output (2R) from the revolver 2 is fed to the base of the transistor 2216 and the output (3R) from the revolver 3 is fed to the base of the transistor 2218. The address term (82) is applied to the base of the transistor 2234, and the term 83 is applied to the base of the transistor 2236. When these addresses are individually true, the contents of the revolver 2 or of the revolver 3 are introduced to the common lead 2200 to form the term (60W*g*#A).

The output (1R) of the revolver 1 is applied to the base of the transistor 2220, and the address term (81) is applied to the base of the transistor 2238. Therefore, when the term 81 is true, the block contents of the input-output buffer ($D_R$) are applied to the output lead 2202 and the word contents of the revolver 1 are simultaneously applied to the common output lead 2200.

Likewise, the output (5R) of the revolver 5 is applied to the transistor 2224, and the address term (85) is applied to the transistor 2242. Therefore, when the address term (85) is true, the contents of the revolver 5 are introduced to the lead 2200 to form the term 60W*g*#A, and at the same time the block contents of the ($H_R$) buffer are applied to the lead 2202 to form the term (60$\alpha g$).

The output (6R) from the command revolver 6 is applied to the base of the transistor 2226 and the address term (86) is applied to the base of the transistor 2244. Therefore, when the address term (86) is true, the contents of the revolver 6 are applied to the lead 2200 to form the term 60W*g*#A, and the contents of the buffer $A_R$ are applied to the lead 2202 to form the term 60$\alpha g$.

In the preceding discussion the term "60" was explained to represent the contents from a specified address. Also, circuitry has been described in detail for deriving the contents (60) from an addressed data revolver, block register, or input and output buffer. FIGURE 70 is a schematic flow chart showing pictorially the flow of data from an addressed element in response to a particular command into the element specified by that command.

The chart of FIGURE 70 clearly shows the means by which a minimum of address designations are used in the computer of the invention to address a maximum of elements. This chart also shows how common paths are used for a plurality of transfers which occur at different times but which have common characteristics.

For example, the general address designations 81, 82, 83, 84, 85 and 86 are used to complete respective paths from individual ones of the input and output buffers. These address designations are individually controlled to provide for a block transfer of the contents from the designated input and output buffer to the commanded designation. The same address designations are used in conjunction with the block registers to provide for a block transfer from those registers. In addition, the same address designations are used in conjunction with the revolvers to provide for a word transfer from the revolvers.

Therefore, when any particular one of the address designations 81–85, for example, becomes true, a particular input and output buffer is addressed for a block transfer, a particular block register is addressed for a block transfer and a particular data revolver is addressed for a word transfer. This causes the terms 60$\alpha g$, 60#*g* and 60W*g*#A to coincide with the data read out of the corresponding addressed elements. However, if the particular address is an alpha address, as shown by the code table of FIGURE 3, only the 60$\alpha g$ term would reach the term $(J+K)$. Then, only if the J or K commands were true, would the term 60 be formed and would that term be read into the transfer block register 8. This is as desired, for from the schematic representation of FIGURE 12, it will be seen that the J and K commands are the only commands which provide for a block transfer from the input and output buffers into the transfer block register.

If, on the other hand, the 81–87 address designation occurred in response to a number address from the table of FIGURE 2, the term 60#*g* would reach the $(J+K)$ term, and the term 60W*g*#A would reach the $(\overline{J+K})$ term. Again, if the J command or K command is true, the term (60#*g*) would appear as the contents 60 to be read into the transfer block register 8. This is the desired situation, because from the representation of FIGURE 12, only the (J) and (K) commands provide for a block transfer from the block registers into the transfer block register 8. On the other hand, if both the commands J and K are false, the term (60*g*#A) forms the 60 term. This term may then be read into the revolvers 1, 2, 3, 5 and 6, depending upon the different commands.

From the representation of FIGURE 13, it will be remembered that the commands B, E, F and G all provide for a one-word transfer from the different revolvers into the data revolver 1. This is shown schematically in the diagram of FIGURE 70. Likewise, the command Y provides for a transfer of the contents 60 into the data revolver 2, as shown in FIGURE 70, and as described in conjunction with FIGURE 14. In like manner, the command 2 provides for a transfer of the contents 60 into the revolver 3, as shown in FIGURE 70, and as described in conjunction with FIGURE 15. The command (%) provides for a one-word transfer into the command revolver 5, as shown in FIGURE 70, and as described in conjunction with FIGURE 18. Any of the BRANCH commands . , $\phi$ or P provide for a transfer into the address revolver 6, as shown in FIGURE 70, and as described in conjunction with FIGURE 17. In addition, the address revolver produces the term "60" directly for either a "Q" command or an "R" command. The term "60" for either the "Q" or "R" commands, is used by the comparator of the computer, as will be described. The term (60) is also introduced to the comparator in response to the "S" or "T" commands, and the term 60 is introduced directly to the adder, as will be described.

It will be seen, therefore, that by the use of cascading, a large number of transfers are effected in the computer of the invention with a minimum of circuitry and circuit components. Also, one-word transfers are possible from the block registers in the described manner and in accordance with the invention by the production of the $B_1$, $B_2$, $B_3$ and $B_4$ address designations, and by the use of the temporal detector described above in conjunction with FIGURE 55.

In accordance with the invention, each of these address designations corresponds to a different quarter of the alphabet corresponding to the alphabetic addresses utilized for the different words in the block registers. Therefore, the term $B_1$ addresses the block register 1 which contains addresses corresponding to the first quarter of the alphabet, as described in FIGURE 9. The address designation $B_2$, on the other hand, is used to designate the address block register 2, the command block register 4, and the data block register 6, because each of these block registers contains addresses corresponding to the second quarter of the alphabet. In like manner, the address designation $B_3$ is used to designate the address block register 3, the command block register 5 and the data block register 7, because each of these block registers contains word addresses corresponding to the third quarter of the alphabet. Finally, the address designation $B_4$ is used to designate the transfer block register 8 of FIGURE 9, and it will be remembered that the transfer block contains alpha addresses corresponding to the fourth quarter of the alphabet.

Therefore, when any of the address designations $B_1$—$B_4$ is true, any one of a group of block registers may be chosen. However, and in the manner described in detail, any one of these address designations is placed on a temporal basis, so that it becomes true at a particular time corresponding exactly to the passage of a desired word address through the read flip-flop of the addressed block.

It will be noted that the term $B_2$ addressed to the address block register 2 is also accompanied by the term (BRANCH) so that a path is completed for the derived word only when the term (BRANCH) is true, and this occurs only when the transfer is to be made into the address revolver 6. Likewise, when the address block register 3 is addressed, its term is also accompanied by the term BRANCH, so that the address is not read out unless the transfer is to be made to the address revolver. The block registers 4 and 5 are both command block registers and they require the (%) term to be true before the word contents are read out. This occurs only when the transfer is to be made to the command revolver number 5.

Conversely, the data block registers 6 and 7 are addressed only when the (BRANCH) and (%) terms are false. Therefore, for example, when a command such as the commands D, E, F, G, Y, Z, % are accompanied by the term (BRANCH), and such a branch command is accompanied by an alpha address, the term $(\overline{J+K})$ is true, the term $\alpha$A is true, and depending upon the command, a single selected word only is read out of the selected one of the block registers 2 and 3 to form the term $\overline{60WC}$, so that the addressed word forms the contents 60 to be read into the address revolver 6.

It will be remembered from the preceding discussion that the contents "61" represented the output from either the data revolver "1" or from the adder, and this output is to be fed to a specified address. It should be noted that this is the converse to the contents "60" which represents the contents derived from a specified address. The path of the contents 61 is shown in the flow chart of FIGURE 71. As described above, the contents 61 represent the contents of the data revolver "1" in the presence of any one of the commands (.), A, C, D, E, F, G, H, I, J, K, L, M, N, dash, $, @, P, Q, R, S, T, X, Y, Z, (,), %, 1, 2, 3, 4, 7, 8, 9, $\theta$. Conversely, the contents 61 represents the contents of the adder in the presence of the commands B, J, O, W, U, V, Mult (5), Div (6).

Then, the contents 61 are fed to a specified address only in the presence of a command of the group WA. These commands include the following: (A, MSK), C, E, G, I, K, M, S, N, P, R, T, V, X, Z, %, B, Mult, (5) Div, (6) $\phi$, 2, 4, 8. Therefore, in the presence of a WA command and for a numeric address, the term $WA \cdot 61g\#A$ is formed. Conversely, in the presence of a WA command and for an alpha address, the term $WA \cdot 61g$ is formed. The term $WA.61.g\#A$, in conjunction with a selected one of the addresses, 82, 83, 85 and 86, will cause the contents of the data revolver "1" or of the adder, to be fed into the addressed one of the revolvers 2, 3, 5 and 6. Conversely, an alpha address $B_1$, $B_2$, $B_3$ and $B_4$ will cause the contents of the data revolver "1" or of the adder, to be fed into the proper word address position of the transfer block register 8, or of the block registers 1, 6 and 7, depending upon the particular address designation. As will be described, a "U" or a "V" command will send the "61" term to the revolver "1."

As will become more evident, this particular grouping of the WA commands and the term 61 permits a simplification in the circuitry of the computer of the invention in an area where a large amount of transfers are usually involved.

The comparator of the computer and its associated circuitry is shown in FIGURE 72. The computer program includes several test commands which set the comparator to a true state if the described condition is true, and which set the comparator to a false state if the described condition is not true.

These test commands include the command (Q) which compares the first character in the revolver 6 with the twelfth character in the revolver "1." If these characters are equal, the comparator will be set to its true state. The command "R" on the other hand, compares the first character in the revolver 6 with the first character in the revolver 1. If these two characters are the same, the comparator is set true. The command (S) causes a designated word of any specified address to be compared with the contents of the revolver 1. If the designated word is equal to or smaller than the contents of the revolver 1, the comparator will be set true. The command (T), on the other hand, is more restrictive than the command (S) and will set the comparator true only if the addressed word is equal to the contents of the revolver 1.

The comparator includes a flip-flop 2300. The right output terminal of the flip-flop is connected to an output terminal designated (COMP). The term (COMP) is true when the flip-flop 2300 is in a true state. The right input terminal of the flip-flop 2300 is connected to the the collector of a transistor 2302 and to the collector of a transistor 2304. The base of the transistor 2302 is connected to the collector of a grounded emitter transistor 2306 and to a resistor 2308. The resistor 2308 has a resistance of 3.9 kilo-ohms and is connected to the negative terminal of the three volt direct voltage source.

The base of the transistor 2306 is connected to the collector of a transistor 2310 and to a resistor 2312. The resistor 2312 has a resistance of 3.9 kilo-ohms and is connected to the negative terminal of the three-volt direct voltage source. The base of the transistor 2310 is connected to the collector of a transistor 2314, and the emitter of the transistor 2310 is connected to the emitter of that transistor and to the collector of a transistor 2316. The term $\overline{GD_1}$ derived from the circuit of FIGURE 29A is introduced to the base of the transistor 2316, and the term 60 discussed in conjunction, for example, with FIGURE 70 is introduced to the base of the transistor 2314.

The emitter of the transistor 2316 is connected to the collector of a transistor 2318. The emitter of the latter transistor is grounded, and its collector is also connected to a resistor 2320 and to the base of a grounded emitter transistor 2322. The resistor 2320 has a resistance of 6.8 kilo-ohms, and this resistor is connected to the negative terminal of the three-volt direct voltage source. The term $(S+T)$, derived from the network of FIGURE 32A is applied to the base of the transistor 2318.

The collector of the transistor 2322 is connected to a resistor 2324 and to the collector of a transistor 2326 and to the base of a transistor 2328. The resistor 2324 has a resistance of 3.9 kilo-ohms, and this resistor is connected to the negative terminal of the three volt direct voltage source. The term $(\overline{GD_1})$ derived from the circuit of FIGURE 29A is applied to the base of the transistor 2326, and the emitter of that transistor is grounded. The collector of the transistor 2328 is connected to the left input terminal of the flip-flop 2300.

The emitter of the transistor 2328 is connected to the emitter of the transistor 2302 and to the collector of a transistor 2330. The emitter of the transistor 2330 is connected to the collector of a transistor 2332 and the emitter of the latter transistor is grounded. The timing tignal ($T_w$) of FIGURE 1D is introduced to the base of the transistor 2332. A term ($\overline{60=1}$) derived in a manner to be explained is applied to the base of the transistor 2330. This term is also applied to the base of a transistor 2333. The emitter of the latter transistor is grounded, and its collector is connected to a resistor 2334 and to the base of the transistor 2304. The resistor 2334 has a resistance of 2.2 kilo-ohms and this resistor is connected to the negative terminal of the three-volt direct voltage source. The transistor 2333 applies the term (60=1) to the base of the transistor 2304.

The collector of the transistor 2314 is connected to a resistor 2336. This resistor has a resistance of 3.9 kilo-ohms and it is connected to the negative terminal of the three-volt direct voltage source. The collector of the transistor 2314 is also connected to the base of a grounded emitter transistor 2338. The collector of the latter transistor is connected to a resistor 2340 and to the base of a transistor 2342. The resistor 2340 has a resistance of 3.9 kilo-ohms and is connected to the negative terminal of the three-volt direct voltage source. The collector of the transistor 2342 is connected to the left input terminal of the flip-flop 2300. The emitter of the transistor 2342 is connected to the collector of the transistor 2330 and to the emitter of a transistor 2344. The collector of the latter transistor is connected to the left input terminal of the flip-flop 2300. A term $(Q+R)C_1$ is applied to the base of the transistor 2344 and to the base of a transistor 2346. The emitter of the transistor 2346 is grounded and its collector is connected to the emitter of a transistor 2348 and to the collector of a grounded emitter transistor 2350. The term $(S+T)$ derived from the network of FIGURE 32A is applied to the base of the transistor 2350, and the timing signal ($C_1S_{11/4}$) of FIGURE 1B is applied to the base of the transistor 2348. The term $(Q+R)C_1$ is derived in a manner to be explained.

The circuitry associated with the comparator of FIGURE 72 includes a transistor 2352. The transistor has a grounded emitter and its collector is connected to a resistor 2354, to the emitter of a transistor 2356, and to the base of a transistor 2358. The term (60) discussed in FIGURE 70 is applied to the base of the transistor 2352. It will be remembered that for either a (Q) or an (R) command, this term corresponds to the contents of the address revolver 6.

The collector of the transistor 2356 is connected to a resistor 2359. The resistors 2354 and 2359 each have a resistance of 3.9 kilo-ohms, and each is connected to the negative terminal of the three-volt direct voltage source.

The collector of the transistor 2365 is also connected to the collector of a transistor 2360, to a resistor 2362 and to the collector of a transistor 2364. The resistor 2362 has a resistance of 4.7 kilo-ohms and is connected to the negative terminal of the three-volt direct voltage source. The emitter of the transistor 2358 is also connected to the base of the transistor 2356, and the collector of the transistor 2358 and the collector of the transistor 2356 are connected to the output terminal at which the term ($\overline{60=1}$) is produced. The term $(S+T)$ from the circuitry of FIGURE 32A is introduced to the base of a transistor 2365. The emitter of this transistor is connected to the emitter of the transistor 2364, and the collector of this transistor is connected to the resistor 2362.

The base of the transistor 2360 receives a term $(1R+7)$ from the circuitry associated with the data revolver "1" and which will be described in conjunction with FIGURE 74. The emitter of the transistor 2360 is connected to the collector of a transistor 2366. The emitter of the latter transistor is grounded and the command (Q) is introduced to the base of the transistor 2366 in a manner to be described. The emitter of the transistor 2364 is connected to the collector of a grounded emitter transistor 2368. The term (1W) from the write flip-flop associated with the data revolver "1" is applied to the base of the transistor 2368. The command (R), which is derived in a manner to be described, is applied to the base of the transistor 2364.

The circuitry associated with the comparator of FIGURE 72 also includes a transistor 2370. The emitter of this latter transistor is grounded and its collector is connected to the emitter of a transistor 2372, to the emitter of a transistor 2374 and to the emitter of a transistor 2376. The term $(Q+R)$ from the circuitry of FIGURE 39A is applied to the base of the transistor 2370 and the term ($\overline{GD_1}$) derived from the circuitry of FIGURE 29A is introduced to the base of the transistor 2376.

The collector of the transistor 2376 is connected to a resistor 2378, to the base of the transistor 2374 and to the base of a grounded emitter transistor 2380. The resistor 2378 has a resistance of 3.9 kilo-ohms, and this resistor is connected to the negative terminal of the three-volt direct voltage source.

The emitter of the transistor 2380 is grounded and its collector is connected to a resistor 2382. The resistor 2382 has a resistance of 2.2 kilo-ohms and is connected to the negative terminal of the three volt direct voltage source. An output terminal designated (Q) is connected to the collector of the transistor 2380 and the (Q) command is produced at that terminal for application to the base of the transistor 2366.

The collector of the transistor 2374 is also connected to a 3.9 kilo-ohm resistor 2384 which, in turn, is connected to the negative terminal of the three-volt direct voltage source. The collector of the transistor 2374 is also connected to the base of a grounded emitter transistor 2386. The collector of the latter transistor is connected to an output terminal designated (R) at which the (R) command is produced for application to the base of the transistor 2364. The collector of the transistor 2386 is also connected to a 2.2 kilo-ohm resistor 2388 which is connected to the negative terminal of the three-volt direct voltage source.

The timing signal ($C_1$) of FIGURE 1B is introduced to the base of the transistor 2372, and a collector of that transistor is connected to the base of a transistor 2389 and to a resistor 2390. The resistor 2390 has a resistance of 3.9 kilo-ohms and is connected to the negative terminal of the three-volt direct voltage source.

The emitter of the transistor 2389 is grounded and its collector is connected to a resistor 2392 and to the collector of a transistor 2394. The resistor 2392 has a resistance of 2.2 kilo-ohms and this resistor is connected to the negative terminal of the three-volt direct voltage source. The emitter of the transistor 2394 is grounded and the timing signal ($T_7$) of FIGURE 1B is applied to its base. The collectors of the transistors 2389 and 2394 are connected to an output terminal designated $(Q+R)C_1$, at which that term is produced for application to the base of the transistor 2344 and to the base of the transistor 2346.

The term $(1R+7)$ represents the twelfth character in the data revolver "1" when the contents (60) represents the first character in the revolver "6." Therefore, as the data circulates bit-by-bit around the data revolver circuitry, the term $(1R+7)$ is one or zero for each corresponding bit of the twelfth character in revolver "1," as the term (60) is one or zero for each corresponding bit of the first character in the revolver "6."

When the command (Q) is true, the transistor 2366 is conditioned for conduction. Now, if any bit of the term $(1R+7)$ is a one when a corresponding bit of the contents (60) is a zero, the transistor 2356 is conductive so that ($\overline{60=1}$) is true, which is the case because of the inequality of those particular bits. On the other hand, any time that a bit of the term $(1R+7)$ is a zero when the corresponding bit of the contents (60) is a one, the transistor 2358 becomes conductive and again ($\overline{60=1}$) is true. Therefore, (60=1) is false only when the bit-by-bit comparison of the contents (60) from the revolver "6" is the same as the bit-by-bit contents from the $(1R+7)$ term from the data revolver "1." This occurs only when the twelfth character in the data revolver "1" is identical to the first character in the revolver "6."

Likewise, upon the command (R), the transistor 2364 is conditioned for conduction, and the same comparison occurs. However, in the latter instance it is the (1W) term which is compared with the contents (60). For this situation the term $(\overline{60=1})$ is false only when the bit-by-bit comparison between the first character of the revolver "6," as represented by the contents 60, is equal to the first character in the data revolver "1."

The term $(\overline{60=1})$ is introduced to the base of the transistor 2330 and to the base of the transistor 2333. The latter transistor is connected as a phase inverter and it serves to introduce the term (60=1) to the base of the transistor 2304. For either a (Q) or an (R) command, it is desired to trigger the comparator true, only for the first character time. Therefore, the term $(Q+R)C_1$ is formed in the described manner and introduced to the base of the transistor 2346. When either (Q) or (R) is true, the latter term $(Q+R)C_1$ is true only at $C_1$ time.

Therefore, if the comparison for the (Q) command or (R) command is true at $C_1$ time, the transistors 2304 and 2346 are both conditioned for conduction. Then, immediately after the first bit time of the first character, the timing signal $(C_1S_{1\,1/2})$ renders the transistor 2348 conductive to trigger the comparator true. Therefore, at the beginning of the first character time the comparator is triggered to a true state. If any of the bits of the first character in the revolver 6 are different from the corresponding bits of the twelfth character in the data revolver "1" for a (Q) command, or are different from the corresponding bits of the first character in the revolver "1" for an (R) command, the $(\overline{60=1})$ term becomes true to condition the transistor 2330 for conduction. Then, the next timing signal $(T_W)$ of FIGURE 1D causes the transistors 2330, 2332 and 2344 to become conductive so that the comparator is returned false. The comparator is true at the end of the word time only if the conditions described above in response to the (Q) or the (R) commands are true.

The term $(Q+R)C_1$ is formed by the circuitry of the transistors 2370 and 2372. Both of these transistors are conductive only at $(C_1)$ time and only for a (Q) or an (R) command. The conduction of both these transistors drives the transistor 2388 nonconductive so that the output terminal $(Q+R)C_1$ goes negative.

The transistor 2394 assures that no comparison will be made during the parity bit time $T_7$. Even if the parity bits are different, as may sometimes occur, this will have no effect since both the transistors 2346 and 2344 are rendered nonconductive at that time.

The (Q) command is derived from the circuitry of the transistors 2370, 2376 and 2380. It will be remembered that the (Q) command differs from the (R) command, only in that its least significant bit is zero, whereas the least significant bit of the (R) command is one. For a zero at the least significant bit time, the term $(\overline{GD_1})$ is true, so that the transistors 2370 and 2376 become conductive to render the transistor 2380 nonconductive to make the command (Q) true. On the other hand, when the $(Q+R)$ term exists, and when the $(\overline{GD_1})$ term is false, an (R) command is produced. This is because the transistors 2374 and 2370 now become conductive to render the transistor 2386 nonconductive. When the transistor 2386 is nonconductive, the command R is true.

For an (S) or a (T) command, the transistor 2318 is conditioned for conduction, and for an (S) command, the transistor 2316 also is conditioned for conduction. The contents (60) now represents the contents of the designated address, and as these contents shifts between one and zero, the transistor 2314 causes its collector to shift between negative and zero volts. During this time the conductivity of the transistor 2365 causes the contents of the specified address to be compared with the contents of the data revolver "1." So long as the contents are equal, the term (60=1) will be true. Therefore, when the contents (60) is a "1" rendering the transistor 2314 conductive, and when $(\overline{60=1})$, it follows that the contents from the designated address must be one and the contents of the revolver "1" must be zero. For this condition, the comparator is triggered to a false state. However, when the contents (60) is a zero which renders the transistor 2314 nonconductive, and when $(\overline{60=1})$, it follows that the corresponding bit of the data revolver "1" must be a one. For this condition, the transistor 2302 is rendered conductive so that the comparator is triggered to a true state. For each condition in which the bit from the designated address is equal to the bit in the data revolver "1," the term (60=1) is true, and the comparator is triggered to a true state through the transistor 2350 and through the transistor 2348 at $(C_1S_{1\frac{1}{2}})$ time, the transistor 2304 being conductive.

Therefore, for an (S) command, the comparator is triggered true when each bit of the designated address (as represented by the word contents 60) is equal to or less than the contents of the word in the data revolver "1."

For the (T) command, the transistor 2320 is nonconductive and the resistor 2326 is nonconductive. Therefore, the resistor 2328 is conductive. Therefore, whenever (60=1) is true, representing an inequality between a bit in the designated address and the corresponding bit in the data revolver "1," the comparator is triggered false. This overcomes the triggering of the comparator to a true state at $(C_1S_{1\frac{1}{2}})$ time, should the first bits be the same, and due to the conduction of the transistors 2304, 2348 and 2350.

In brief, therefore, during an (S) or a (T) command, it is possible for the comparator to be triggered to a true state at $(C_1S_{1\frac{1}{2}})$ time, because the transistor 2348 is conditioned for conduction at that time. This also follows for a (Q) or an (R) command at (C1) time. The comparator will be triggered true at the $(C_1S_{1\frac{1}{2}})$ time if the first bits that are compared are equal. However, if any of the succeeding bits throughout the entire word for the (S) command or for the (T) command are not equal, the comparator will be false at the end of the word time. Also, if any of the bits of the first character for the (Q) command or from the (R) command do not coincide, the comparator will be triggered false at the end of the word time.

The masking signals are derived by the circuitry of FIGURE 73. To mask any particular character, a decimal zero is placed in the revolver "3" corresponding to that character. Decimal zero, as noted above, corresponds to the binary number 1100101, with the least significant digit being at the left. Then, for any character in the word under consideration which is not to be masked, the term $\overline{\theta}$ is placed in the revolver "3." This is almost equivalent to (L), with the exception of the parity bit. Since the binary designation of decimal zero as 1100101, the least significant digit being at the left, then for $\overline{\theta}$ the designation is 0011010, with the least significant digit at the left. The circuitry of FIGURE 92 generates the excess three term $\overline{III}$, which is the designation for decimal zero in the computer of the invention. The circuitry of FIGURE 92 is the revolver 8 referred to previously in conjunction with FIGURE 10 as the source of decimal zeros. This circuitry generates a decimal zero during each character time.

In the circuit of FIGURE 73 the term $\overline{III}$ is introduced to the base of a transistor 2400. This transistor has a grounded emitter and its collector is connected to a resistor 2404 and to the emitter of a transistor 2402. The resistor 2404 has a resistance of 4.2 kilo-ohms and this resistor is connected to the negative terminal of the 3-volt direct voltage source. The collector of the transistor 2402 is connected to a 2.2 kilo-ohm resistor 2406, and the resistor is connected to the negative terminal of the 3-volt direct voltage source. The collector of the transistor 2400 is also connected to the base of a transistor 2408. The collector of the latter transistor, together with the collector of the transistor 2402, is connected to the base of a transistor 2410 and to an output terminal designated $(\overline{MSK})$. The transistor 2410 has a grounded emitter and the collector of this transistor is connected to a resistor 2412 and to an output terminal designated (MSK). The resistor 2412 has a resistance of 2.2 kilo-ohms and is connected to the negative terminal of the 3-volt direct voltage source.

The term $\overline{3W}$ from the data revolver "3" of FIGURE 76 is introduced to the base of transistor 2414, the emitter of this transistor is connected to ground. The collector of this transistor is connected to the emitter of the transistor 2408 and to the base of the transistor 2402. This collector is also connected to a 4.2 kilo-ohm resistor 2416, which, in turn, connects with the negative terminal of the 3-volt direct voltage source.

The circuitry of FIGURE 73 causes the term (MSK) to be true for each character in the revolver 3 corresponding to $\overline{III}$ or decimal zero, and its causes the term (MSK) to be false for each character in the revolver corresponding to the $\overline{III}$. As noted above, the word in the revolver "3" from masking operations is so constituted that a $\overline{III}$ is placed in that revolver for each character to be masked and a term $\overline{III}$ or "1" is placed in the revolver for each character that is not to be masked.

The emitter of the transistor 2408 is connected to the base of the transistor 2402 and to the collector of the transistor 2414. The collector of the transistor 2414 is also connected to a resistor 2416. The resistor 2416 has a resistance of 4.7 kilo-ohms and this resistor is connected to the negative terminal of the three volt direct voltage source. The emitter of the transistor 2414 is connected to ground.

The term $(\overline{3W})$ is introduced to the base of the transistor 2414. This term represents the output from the left output terminal of the write flip-flop of the data revolver "3" which will be discussed in conjunction with FIGURE 76.

The circuitry of FIGURE 73 compares the contents of the revolver "3" with the output from the decimal zero generator, this output being designated $\overline{III}$ and introduced to the base of the transistor 2400. Whenever a decimal zero is derived from the data revolver 3 for any particular character, the term (MSK) is true for that character. However, whenever the converse of a decimal zero for a particular character is derived from the data revolver "3," the term $\overline{MSK}$ is true. This enables the programmer to cause a control word to be shifted into the data revolver "3" for making operations. This control word has a decimal zero for each masked character time, and it has the converse of decimal zero for each unmasked character time. Then, the resulting mask signals can be used in conjunction with the certain commands discussed above so that only certain characters of a particular word are actually processed.

The data revolver "1" and its associated circuitry are shown in detail in FIGURE 74. The revolver includes a pair of delay lines 2450 and 2452 which may be constructed in the manner described above. In this instance the delay lines 2450 and 2452 each exhibit a delay of one word plus one character, or thirteen characters. The delay lines each have an output terminal positioned at the end of the one word time for normal circulation, and the output signals derived at these output terminals are designated by $(\overline{1R_R})$ and $(1R_R)$. The delay lines also each have an output terminal positioned at the end of the thirteen character delay, these latter output terminals being designated respectively as $(\overline{1R_R+7R})$ and $(1R_R+7R)$. The delay lines 2450 and 2452 also each have a third output terminal which is displaced one character time before the $(1R_R)$ output terminals. These latter output terminals are designated by $(\overline{1R_R-7R})$ and $(1R_R-7R)$.

The output terminal $(\overline{1R_R+7R})$ is connected to the base of a transistor 2454, and the output terminal $(1R_R+7R)$ is connected to the base of a transistor 2456. The collector of the transistor 2454 is connected to the left input terminal of a read flip-flop 2458, and the collector of the transistor 2456 is connected to the right input terminal of that flip-flop.

The emitters of the transistors 2454 and 2456 are each connected to the collector of a transistor 2460. The emitter of the transistor 2460 is grounded and the timing signal $(T_R)$ of FIGURE 1D is applied to its base. The right output terminal of the read flip-flop 2458 is designated $(1R+7)$.

The output terminal $(\overline{1R_R})$ is connected to the base of a transistor 2462 and the output terminal $(1R_R)$ introduces its term to the base of a transistor 2464. The collector of the transistor 2462 is connected to the left input terminal of a read flip-flop 2466 and the collector of the transistor 2464 is connected to the right input terminal of that flip-flop. The term (1R) is produced at the right output terminal of the flip-flop 2466.

The emitters of the transistors 2462 and 2464 are both connected to the collector of a transistor 2468. The emitter of the transistor 2468 is grounded. The timing signal $(T_R)$ is applied to the base of the transistor 2468.

The output terminal $(\overline{1R_R-7R})$ of the delay line 2450 connects with the base of a transistor 2470. The output terminal $(1R-7R)$ of the delay line 2452 is connected to the base of a transistor 2472. The emitters of the transistor 2470 and 2472 are connected to the collector of a grounded emitter transistor 2474. The timing signal $(T_R)$ is applied to the base of the transistor 2474. The collector of the transistor 2470 is connected to the left input terminal of a read flip-flop 2476, and the collector of the transistor 2472 is connected to the right input terminal of that flip-flop. The term $(1R-7)$ is produced at the right output terminal of the read flip-flop 2476.

The delay lines 2450 and 2452 also have a write flip-flop 2478 associated with them. The right output terminal of the flip-flop 2478 is connected to the input terminal $(1W_1^0)$ of the delay line 2452, and the left output terminal of the flip-flop is connected to the input terminal $(1W_0^1)$ of the delay line 2450.

A transistor 2480 has its collector connected to the left input terminal of the flip-flop 2478 and a transistor 2482 has its collector connected to the right input terminal of that flip-flop. The emitters of the transistors 2480 and 2482 are connected to the collector of a transistor 2484. The emitter of the transistor 2484 is grounded and the timing signal $(T_W)$ of FIGURE 1D is applied to to its base.

The input signal to the write flip-flop 2478 is designated (1W), and this input signal is introduced to the base of the transistor 2482 and to the base of a transistor 2486. The transistor 2486 is connected as a phase inverter and its emitter is grounded, its collector is connected to the base of the transistor 2480 and its collector is also connected to a resistor 2490. The resistor 2490 has a resistance of 2.2 kilo-ohms and is connected to the negative terminal of the three volt direct voltage source. The flip-flop 2478 produces the signal $1W_0^1$ at its left output terminal and it produces the signal $1W_1^0$ at its right output terminal.

The input terminal 1W is connected to a common lead 2492. The lead 2492 is connected to a resistor 2494, this resistor having a resistance of 3.9 kilo-ohms and being connected to the negative terminal of the three-volt direct voltage source. A transistor 2496 has its collector connected to the lead 2492 and the emitter of this transistor is connected to the collector of a transistor 2498 and to the collector of a transistor 2500. The emitter of the transistor 2498 is connected to the collector of a grounded emitter transistor 2502. The emitter of the transistor 2500, on the other hand, is connected to the emitter of a transistor 2504 and to the collector of a grounded emitter transistor 2506. The transistor 2504 has its collector connected to the emitter of a transistor 2508 and the collector of the latter transistor is connected to the lead 2492.

The command (,) derived from the logic circuitry of FIGURE 37 is applied to the base of the transistor 2496, the timing signal ($C_1$) of FIGURE 1B is applied to the base of the transistor 2498 and its converse ($\overline{C_1}$) is applied to the base of the transistor 2500. The output (6*R*) from the read flip-flop of the address revolver 6 of FIGURE 46 is applied to the base of the transistor 2502. The output (1*R*+7) from the read flip-flop 2458 is applied to the base of the transistor 2506. An arithmetic term MULT.$\overline{III}$.D is applied to the base of the transistor 2508, and this term will be discussed subsequently in the discussion of FIGURE 82.

The collector of the transistor 2504 is also connected to the emitter of a transistor 2510 and to the collector of a transistor 2512. The collector of the transistor 2504 is further connected to the emitter of a transistor 2514. The collector of the transistor 2514 is connected to the emitter of a transistor 2516, and the collectors of the transistors 2510 and 2516 are both connected to the common lead 2492. The emitter of the transistor 2512 is connected to the emitter of a transistor 2518, to the collector of a transistor 2520 and to the emitter of a transistor 2522. The emitter of the transistor 2520 is grounded.

The term ($GD_1$) from the gate driver circuit of FIGURE 29A is introduced to the base of the transistor 2514. The term (— + $) derived from the circuitry of FIGURE 34B is introduced to the base of the transistor 2526. A term (DIV.*ds*) which is derived in a manner to be explained in conjunction with FIGURE 77 is applied to the base of the transistor 2510. The timing signal ($C_1$) of FIGURE 1B is applied to the base of the transistor 2512, and the timing signal ($C_{12}$) of FIGURE 1B is applied to the base of the transistor 2518. The term ($\overline{III}$) is applied to the base of the transistor 2520. This term is derived from the source of decimal zeros which will be described in conjunction with FIGURE 92. This source, as mentioned above, provides a binary designation 1100101 for each character, and which is used to represent decimal zero.

The collector of the transistor 2518 is connected to the emitter of a transistor 2524 and to the collector of a transistor 2526. The emitter of the transistor 2526 connects with the collector of a grounded emitter transistor 2528. The converse of the timing signal ($C_{12}$), namely ($\overline{C_{12}}$), is introduced to the base of the transistor 2526. The term (1*R*—7) derived from the read flip-flop 2476 is applied to the base of the transistor 2528.

The term ($GD_2$) derived from the gate driver of FIGURE 29B is introduced to the base of the transistor 2522. This transistor has its collector connected to the emitter of a transistor 2530 and to the collector of a transistor 2532. The collector of the transistor 2530 connects with the emitter of a transistor 2534 and the collector of the latter transistor is connected to the common lead 2492. The emitter of the transistor 2532 is connected to the collector of a grounded emitter transistor 2536 and to the emitter of a transistor 2538 and to the emitter of a transistor 2540. The term $\overline{GD_1}$ of FIGURE 29A is introduced to the base of the transistor 2524. The term (60) discussed in conjunction with FIGURE 70 is applied to the base of the transistor 2536. The term ($\overline{GD_2}$) derived from the gate driver of FIGURE 29B is applied to the base of the transistor 2532, and the term ($GD_1$) derived from the gate driver of FIGURE 29A is introduced to the base of the transistor 2530. The term (*D*+*E*+*F*+*G*) derived from the logic circuitry of FIGURE 39B is applied to the base of the transistor 2534.

A grounded emitter transistor 2542 receives the term (61) of FIGURE 43 at its base electrode and this transistor has its collector connected to the emitters of a pair of transistors 2544 and 2546. The collectors of both these latter transistors are connected to the common lead 2492.

The arithmetic commands (*U*+*V*) are applied to the base of the transistor 2546, and the arithmetic command (DIV.$\overline{ds}$) is applied to the base of the transistor 2544. The latter term is derived from the circuitry of FIGURE 77, which will be discussed.

The collector of the transistor 2538 is connected to the emitter of a transistor 2550 and the collector of the latter transistor is connected to the emitter of the transistor 2534 and to the collector of a transistor 2552. The term ($GD_2$) is applied to the base of the transistor 2538 and the term ($\overline{GD_1}$) is applied to the base of the transistor 2550. The term (MSK) which is derived from the circuit of FIGURE 73 is introduced to the base of the transistor 2540.

The collector of the transistor 2540 is connected to the emitter of the transistor 2552 and to the collector of a transistor 2556. The emitter of the transistor 2556 is connected to the collector of a grounded emitter transistor 2558. The base of the transistor 2556 receives the term ($\overline{MSK}$) and the transistor 2558 receives the output signal (1R) from the read flip-flop 2466 on its base electrode.

The base of the transistor 2552 is connected to a resistor 2560, to the collector of a transistor 2562 and to the collector of a transistor 2564. The resistor 2560 has a resistance of 2.2 kilo-ohms, and it is connected to the negative terminal of the three volt direct voltage source. The term ($GD_1$) of FIGURE 29A is applied to the base of the transistor 2562, and the term ($GD_2$) of FIGURE 29B is applied to the base of the transistor 2564.

The collector of the transistor 2558 is also connected to the emitter of a transistor 2566 and the collector of the latter transistor is connected to the common lead 2492. The base of the transistor 2566, on the other hand, is connected to a common lead 2570, and this lead connects with a resistor 2572. The resistor has a resistance of 3.9 kilo-ohms, and it is connected to the negative terminal of the three-volt direct voltage source.

A group of six grounded emitter transistors 2574, 2576, 2578, 2580, 2582 and 2584 each has its collector connected to the common lead 2570. The term (,) of FIGURE 37 is applied to the base of the transistor 2574, the term (— + $) of FIGURE 34B is applied to the base of the transistor 2576, the term (*D*+*E*+*F*+*G*) of FIGURE 39B is applied to the base of the transistor 2578, the term (*U*+*V*) of FIGURE 54 is applied to the base of the transistor 2580, the term (DIV) of FIGURE 54 is applied to the base of the transistor 2582, and the term (MULT.$\overline{III}$.D) of FIGURE 82 is applied to the base of the transistor 2584.

The normal circulating loop through the data revolver 1 is from the read flip-flop 2466 and through the transistors 2558 and 2566 to the input terminal (1W). The information introduced to the input terminal triggers the write flip-flop 2478 between its true and false states so that the data may be re-introduced to the one-word +1 character delay lines 2450 and 2452.

Whenever it is required to insert new data into the revolver, the circulating loop is broken by rendering any one of the transistors 2574, 2576, 2578, 2580, 2582 or 2584 conductive. When any one of these transistors is rendered conductive, the transistor 2566 is rendered non-conductive to break the circulating loop from the transistor 2558.

The (,) command is a shift command, and this command is to shift the contents of revolver 1 one character position to the left, losing the high order ($C_{12}$) character, and inserting a designated address character into the low order ($C_1$) character position. In response to this command, the transistor 2574 is rendered conductive to break the normal circulating loop, as described above. Also, the transistor 2496 is rendered conductive. Then, at all times for the entire word except during the first character time, the transistor 2500 is conditioned to be conductive so that the output from the read flip-flop 2458 is introduced to the input terminal (1W). This produces the desired shift to the left, with the high order ($C_{12}$) character being lost in the process. At $C_1$ time, the transistor 2498 is conditioned for conduction, so that the corresponding character of the address word in the address revolver 6 is passed from the transistor 2502 to the input terminal (1W). Therefore, the ($C_1$) character position now contains the corresponding character from the address revolver, and the requirements of the (,) command are fulfilled.

The arithmetic terms (MULT.$\overline{\text{III}}$.D) and (DIV.*ds*) will be discussed subsequently.

The (—) command is also a shift command, and it specifies to shift the contents of the revolver 1 to the right a specified number of character positions. This specified number of character positions is designated by the address character accompanying the command. The specified number of characters on the right of the previous word will be lost, and the specified number of zeros will be inserted on the left. The ($) command is similar to the (—) command, with the exception that the contents of the revolver 1 are shifted to the left, instead of to the right.

For either the (—) or ($) commands, the transistor 2576 is conductive to break the normal circulating loop through the transistors 2558 and 2566. Also, these commands cause the transistor 2516 to be conditioned for conduction. For the (—) command, the term ($\overline{GD_1}$) is true so that the transistor 2524 is also conditioned for conduction. Then, for all times except for the ($C_{12}$) time, the transistor 2526 is conditioned for conduction and the circulating loop is completed from the read flip-flop 2476 through the transistor 2528. This constitutes a shift to the right of the contents in the revolver 1 by one character. Then, for $C_{12}$ time, the transistor 2518 is conditioned for conduction so that the transistor 2520 inserts a decimal zero for the $C_{12}$ character. Therefore, for each word time that the (—) command exists, the contents of the revolver are shifted to the right by one character position, and the $C_{12}$ character is replaced by a decimal zero.

For the ($) command, the transistor 2514, rather than the transistor 2524, is conditioned for conduction. This completes a path through the transistor 2504 and 2506 for an effective shift to the left, and at ($C_1$) time, the transistor 2512 becomes conductive to insert a decimal zero for the ($C_1$) character. Therefore, for each word interval that the ($) command persists, the contents of the data revolver 1 are shifted to the left by one character, and the ($C_1$) character is replaced by a decimal zero.

The (—) or ($) commands can be made to last for from one to eight word times, depending upon the address character accompanying the command. That address character is fed through the circuit of FIGURE 56 to produce the term (*CA=NA*) when the address is the same as the character count. Only then will the temporal detector of FIGURE 55 be triggered true to produce the next shift signals from the circuits of FIGURES 58 and 59. Until this occurs, each word time produces another shift in the data revolver, either to the left or to the right, depending upon whether the command is a ($) or a (—), with a decimal zero being inserted in the place of each lost character during the shift. Therefore, by the appropriate choice of the address, any shift left or right of the data revolver 1 may be made up to eight shifts.

The control of the transistors 2544, 2546 and 2542 involves arithmetic operations and will be described subsequently.

For either the D, E, F or G commands, the transistor 2578 is rendered conductive to break the circulating loop of the data revolver 1. It will be remembered that these are all transfer commands involving single word transfers. The (F) command is to copy the contents of the addressed word into the data revolver 1, the (D) command is similar to the (F) command but involves masking. The (D) command is to copy only the unmasked characters of the addressed word into the data revolver 1. The (E) command is to exchange the contents of the addressed word with those of the revolver 1, and the G command is to copy the contents of the revolver 1 into the designated word address and to clear the revolver 1 to 12 decimal zeros.

For any of the D, E, F or G commands the transistor 2534 is conditioned for conductivity. The (F) command causes the transistors 2550 and 2538 to be also conditioned for conduction. Then, the contents (60) are read through the transistor 2536, and through the transistors 2538, 2550 and 2534 into the delay lines 2450 and 2452 to execute this command.

For the (D) command the transistor 2552 becomes conditioned for conduction and a path is completed from the transistor 2536 through the transistor 2540 when the term (MSK) is true, and through the transistor 2552 and the transistor 2534 to the input of the read flip-flop 2478. Therefore, the contents 60 are read into the delay lines 2450 and 2452 for each character for which the term (MSK) is true. When the term (MSK) is false, the transistor 2556 becomes conductive, so that the circulating loop from the transistor 2558 is re-established for each character in which the term ($\overline{\text{MSK}}$) is true.

For the (G) command the transistors 2530 and 2522 are conditioned for conduction to permit the decimal zeros from the transistor 2520 to be read into the write flip-flop 2478. This occurs as the contents of the read flip-flop 2466 are transferred to the accompanying address.

Finally, for the (E) command the transistors 2530 and 2532 become conductive to permit the contents (60) to be read into the write flip-flop 2478. This occurs while the contents of the read flip-flop 2466 are being read into the designated address to affect the transfer called for by this command.

The data revolver 2 and its associated circuitry are illustrated in FIGURE 75. This data revolver includes a pair of delay lines 2600 and 2602. The delay line 2600 has an output terminal designated ($\overline{2R_r}$) which is connected to the base of a transistor 2604, and the delay line 2602 has an output terminal designated ($2R_R$) which is connected to the base of a transistor 2606.

The collector of the transistor 2604 is connected to the left input terminal of a read flip-flop 2608 and the collector of the transistor 2606 is connected to the right input terminal of that flip-flop. The emitters of the transistors 2604 and 2606 are connected together and to the collector of a transistor 2610. The emitter of the latter transistor is grounded. The timing signal ($T_R$) of FIGURE 1D is introduced to the base of the transistor 2070. The output signal (2R) of the data revolver 2 is produced at the right output terminal of the read flip-flop 2963.

The delay line 2600 has a second output terminal which is displaced one character time from the output terminal described above, and the second output terminal is designated ($\overline{2R_R-7R}$). This output terminal is connected to the base of a transistor 2612. In like manner the delay line 2602 has an output terminal ($2R_R-7R$) which is displaced one character time from the output terminal ($2R_R$). This latter output terminal is connected to the base of a transistor 2614.

The collector of the transistor 2612 is connected to the left input terminal of a second read flip-flop 2616, and the collector of the transistor 2614 is connected to the right input terminal of that flip-flop. The emitters of the transistors 2612 and 2614 are connected to the collector of a transistor 2618. The emitter of the transistor 2618 is grounded and the timing signal ($T_R$) is applied to the base of that transistor. The output signal ($2R$—7) of the data revolver 2 is derived from the right output terminal of the read flip-flop 2616. This signal precedes the signal 2R from the read flip-flop 2608 by one character time.

A write flip-flop 2620 is associated with the delay lines 2600 and 2602. The left output terminal of this flip-flop is connected to the input terminal of the delay line 2600 and supplies the signal $2W_0^1$ to that delay line. The right output terminal of the flip-flop 2620 is connected to the input terminal $2W_1^0$ of the delay line 2602.

The input terminal of the write flip-flop circuitry is designated (2W). This input terminal is connected to the base of a transistor 2622 and to the base of a transistor 2624. The transistor 2622 is connected as an inverter, and its emitter is grounded. The collector of the transistor 2622 is connected to a 2.2 kilo-ohm resistor 2626, and this resistor is connected to the negative terminal of the three-volt direct voltage source. The collector of the transistor 2622 is also connected to the base of a transistor 2628.

The collector of the transistor 2624 is connected to the right input terminal of the write flip-flop 2620 and the collector of the transistor 2628 is connected to the left input terminal of that flip-flop. The emitters of the transistors 2624 and 2628 are connected to the collector of a transistor 2630. The emitter of the transistor 2630 is grounded and the timing signal ($T_W$) of FIGURE 1D is applied to its base. It is apparent that any signal introduced to the input terminal (2W) will trigger the write flip-flop 2620 to a true or false state depending upon whether a binary 1 or a binary 0 is represented. The triggering of the write flip-flop will set up pulses in the delay lines 2600 and 2602, and these pulses will be read by the read flip-flops 2608 and 2616, as described above.

The normal circulating loop for the data revolver 2 is established through a grounded emitter transistor 2632 which has its collector connected to a transistor 2634. The transistor 2634 has its collector connected to a common lead 2636, which, in turn, connects back to the input terminal (2W).

The lead 2636 is also connected to a resistor 2638 which has a resistance of 3.9 kilo-ohms and which is connected to the negative terminal of the three-volt direct voltage source.

The base of the transistor 2634 is connected to a common lead 2640, and this common lead is connected to a resistor 2642. The resistor 2642 has a resistance of 3.9 kilo-ohms, and it is connected to the negative terminal of the three-volt direct voltage source.

A group of three transistors 2644, 2646 and 2648 each has its collector connected to the common lead 2640. The transistors 2644 and 2648 each have a grounded emitter and the term WA *g* is introduced to the emitter of the transistor 2646. The term (Y) derived from the circuitry of FIGURE 38 is introduced to the base of the transistor 2644 and the term (MULT. $\overline{\text{III.D}}$) is introduced to the base of the transistor 2648 and the term 82 derived from the circuitry of FIGURE 49 is applied to the base of the transistor 2646.

A transistor 2650 has its collector connected to the common lead 2636 and the emitter of this transistor is connected to the collector of a transistor 2652 and to the collector of a transistor 2654. The emitter of the transistor 2652 is connected to the collector of a grounded emitter transistor 2656 and the emitter of the transistor 2654 is connected to the collector of a grounded emitter transistor 2658.

The term (Y) derived from the circuitry of FIGURE 38 is applied to the base of the transistor 2650 and the term (60) described in conjunction with FIGURE 70 is applied to the base of the transistor 2656. The mask term (MSK) of FIGURE 73 is applied to the base of the transistor 2652 and the ($\overline{\text{MSK}}$) term is applied to the base of the transistor 2654. Finally, the output signal (2R) from the read flip-flop 2608 of revolver 2 is introduced to the base of the transistor 2658.

As described above, the command (Y) is to copy only unmasked characters of a designated word into the revolver 2. When this command is true, the normal circulating loop through the transistor 2634 is broken because the transistor 2644 becomes conductive. Also, the transistor 2630 is conditioned for conduction, so that when the (MSK) term is true, the contents (60) are read through the transistors 2656, 2652 and 2650 into the write flip-flop 2620. However, when the term ($\overline{\text{MSK}}$) is true, the transistor 2654 becomes conductive to reestablish the circulating loop from the transistor 2658. Therefore, only when the (MSK) term is true will a new character be introduced into the delay lines 2600 and 2602. Otherwise, the character which normally would have been circulated is reintroduced into the delay lines.

As discussed in conjunction with FIGURE 71, the term (82) addresses the data revolver 2 to permit the contents (*WA*.61.*g*.*A*) to be read into that revolver. This is accomplished by means of a transistor 2660 which has its collector connected to the common lead 2636. The term (82) is applied to the base of this transistor 2660, this term being produced by the address logic circuitry of FIGURE 49 in the described manner. Also, the contents WA61 *g* are introduced to the emitter of this transistor 2660 so that they may be read into the revolver 2. For this operation the transistor 2646 is conductive to break the normal circulating loop.

For arithmetic operations which will be described subsequently, a transistor 2662 is provided, as is a transistor 2664. The collector of the transistor 2662 is connected to the common lead 2636, and its emitter is connected to the collector of the transistor 2664. The emitter of the transistor 2664 is grounded. The term $$(MULT.\overline{III}.D)$$

is applied to the base of the transistor 2662 and the term (61) is applied to the base of the transistor 2664.

The data revolver 3 and its associated circuitry are shown in FIGURE 76. This data revolver 3 includes a pair of delay lines 2690 and 2692. Each of these delay lines provides a delay of one word time plus one character time, or thirteen character times. The delay line 2690 has an output terminal ($\overline{3R_R+7R}$) which is connected to the base of a transistor 2694. The delay line 2692 has an output terminal ($3R_R+7R$) which is connected to the base of a transistor 2696.

The delay line 2690 also has an output terminal designated ($\overline{3R_R}$) which is connected to the base of a transistor 2698, and the delay line 2692 has an output terminal designated ($3R_R$) which is connected to the base of a transistor 2700. The delay line 2690 further has an output terminal designated ($\overline{3R_R-7R}$) which is connected to the base of a transistor 2702, and the delay line 2692 has an output terminal designated ($3R_R-7R$) connected to the base of a transistor 2704.

The output terminals ($3R_R+7R$) and ($3R_R-7R$) represent the full thirteen character delay, the output terminals ($3R_R$) and ($\overline{3R_R}$) represent a twelve character (one-word) delay, and the output terminals ($\overline{3R_R-7R}$) and $3R_R-7R$ represent an eleven character delay.

The collector of the transistor 2694 is connected to the left input terminal of a read flip-flop 2706, and the collector of the transistor 2696 is connected to the right input terminal of that flip-flop. The emitter of the transistor 2694 and the emitter of the transistor 2696 are both connected to the collector of a transistor 2708. The emitter of the latter transistor is grounded and the timing signal ($T_R$) is introduced to the base of that transistor. This timing signal is described in conjunction with FIGURE 1D.

The collector of the transistor 2698 is connected to the left input terminal of a read flip-flop 2710 and the collector of the transistor 2700 is connected to the right input terminal of that flip-flop. The emitter of the transistor 2698 is connected to the emitter of the transistor 2700 and these emitters connect with the collector of a transistor 2712. The emitter of the latter transistor is grounded and the timing signal ($T_R$) is applied to its base.

The collector of the transistor 2702 is connected to the left input terminal of a read flip-flop 2714 and the collector of the transistor 2704 is connected to the right input terminal of that flip-flop. The emitter of the transistor 2702 is connected to the emitter of the transistor 2704, and these emitters are connected to the collector of a transistor 2716. The emitter of the latter transistor is grounded and the timing signal ($T_R$) is applied to its base.

A first output signal ($3R+7$) is produced at the right output terminal of the read flip-flop 2706. A second output signal (3R) is produced at the right output terminal of the read flip-flop 2710. Finally, a third output signal ($3R-7$) is produced at the right output terminal of the read flip-flop 2714.

A write flip-flop 2718 has its left output terminal connected to the input terminal of the delay line 2690, and has its right output terminal connected to the input terminal of the delay line 2692. The flip-flop 2718 supplies the signal $3W_0^1$ to the delay line 2690, and it supplies the signal $3W_1^0$ to the delay line 2692.

An output terminal (3W) is connected to the base of a transistor 2720 and to the base of a transistor 2722. The transistor 2720 is connected as an inverter, and its emitter is grounded and its collector is connected to a 2.2 kilo-ohm resistor 2724 and to the base of a transistor 2726, the resistor 2724 being connected to the negative terminal of the 3-volt direct voltage source.

The collector of the transistor 2726 connects with the left input terminal of the flip-flop 2718, and the collector of the transistor 2722 connects with the right input terminal of that flip-flop. The emitters of these transistors are both connected to a collector of a transistor 2728. The emitter of the latter transistor is grounded and the timing signal ($T_W$) of FIGURE 1D is applied to its base.

The input terminal (3W) is connected to a common lead 2730 and this lead connects with a resistor 2732. The resistor 2732 has a resistance of 3.9 kilo-ohms, and it is connected to the negative terminal of the three-volt direct voltage source.

A transistor 2734 has its collector connected to the lead 2730 and the emitter of this transistor connects with the collector of a transistor 2736 and the collector of a transistor 2738. The emitter of the transistor 2736 is connected to the collector of a grounded emitter transistor 3000, and the emitter of the transistor 2738 connects with the emitter of a transistor 3002 and the collector of a grounded emitter transistor 3004. The collector of the transistor 3002 is connected to the emitter of a transistor 3006 and the collector of a transistor 3008. The emitter of the transistor 3008 is connected to the collector of a grounded emitter transistor 3010.

The collector of the transistor 3006 is connected to the emitter of a transistor 3012, to the emitter of a transistor 3014, and to the collector of a transistor 3016. The collectors of the transistors 3012 and 3014 are both connected to the common lead 2730. The emitter of the transistor 3016 is connected to the collector of a grounded emitter transistor 3018.

A transistor 3020 and a transistor 3022 both have their collectors connected to the common lead 2730. The emitter of the transistor 3020 is connected to the collector of a grounded emitter transistor 3024. A transistor 3021 and a transistor 3023 each has its collector connected to the common lead 2730. The emitters of the transistors 3021 and 3023 are both connected to the collector of a grounded emitter transistor 3025.

The term (DIV.$ds$) is applied to the base of the transistor 2734. This term is derived from the circuitry of FIGURE 83, and its effect will be described subsequently. The term (DIV.$\overline{ds}$), on the other hand, is introduced to the base of the transistor 3021. The timing signal ($C_1$) of FIGURE 1B is applied to the base of the transistor 2738, and its converse ($\overline{C_1}$) is applied to the base of the transistor 2736. The right output terminal of the read flip-flop 2706 supplies its term ($3R+7$) to the base of the transistor 3000.

Figure 91:
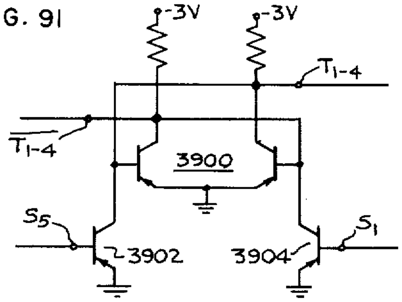

The command (Z) derived from the circuit of FIGURE 38 is applied to the base of the transistor 3020, and the contents (60) discussed in conjunction with FIGURE 70 are supplied to the base of the transistor 3024. The term (83) derived from the address logic of FIGURE 49 is applied to the base of the transistor 3022, and the term WA61 $g$ is applied to the emitter of that transistor. The term ($GD_1$) from the circuitry of FIGURE 29A is introduced to the base of the transistor 3008, and its converse ($GD_1$) is applied to the base of the transistor 3002. Likewise, the decimal zeros $\overline{III}$ from the circuitry of FIGURE 91 are applied to the base of the transistor 3004, and their converse are applied to the base of the transistor 3010.

The term (MULT.$\overline{III}$.D) is applied to the base of the transistor 3012. This term is derived from the circuitry of FIGURE 82, and will be discussed subsequently. The term (MULT.$\overline{III.D}$), on the other hand, is applied to the base of the transistor 3023. The timing signal ($C_{12}$) of FIGURE 1B is applied to the base of the transistor 3006, and its converse ($\overline{C_{12}}$) is applied to the base of the transistor 3016. The term ($L+M$) of FIGURE 35 is applied to the base of the transistor 3014, and the base of the transistor 3018 is connected to the right output terminal of the read flip-flop 2714 to receive the ($3R-7$) term. Finally, the term (TAL) from the circuitry of FIGURE 81 is applied to the base of the transistor 3025.

A transistor 3030 has its collector connected to the common lead 2730, and the emitter of this transistor is connected to the collector of a grounded emitter transistor 3032. The base of the latter transistor connects back to the right output terminal of the read flip-flop 2710 to complete the circulating loop. The base of the transistor 3030 is connected to a common lead 3034.

The term ($L+M$) is applied to the base of the transistor 3036, the term Z is applied to the base of the transistor 3038, the term 83 is applied to the base of the transistor 3040 and the term (MULT+DIV) is applied to the base of the transistor 3042. The latter term is derived from the circuitry of FIGURE 54. Also, the term (WA $g$) of FIGURE 44 is applied to the emitter of the transistor 3040. The common lead 3034 is connected to a resistor 3044, this resistor having a resistance 3.9 kilo-ohms and being connected to the negative terminal of the 3-volt direct voltage source.

It will be remembered that the command (Z) is to copy the contents of a designated word into the revolver 3. When this command occurs, the transistor 3038 becomes conductive to break the normal circulating loop through the transistor 3030. Also, the transistor 3020 becomes conductive to read the contents (60) from the addressed source into the revolver.

Likewise, for a (WA) command, and as discussed in conjunction with FIGURE 71, the term (83) addresses the data revolver 3. The conductivity of the transistor 3040 under these conditions breaks the normal circulating loop, and the conductivity of the transistor 3022 reads the contents into the revolver 3.

When either an (L) command or an (M) command occurs, the transistor 3036 becomes conductive to break the normal circulating loop. The transistor 3014 is also conditioned for conduction. For an (L) command and for an (M) command, the transistor 3016 becomes conductive so that the output ($3R-7$) from the read flip-flop 2714 is read into the delay lines 2150 and 2152. This produces a shift to the right for one character position, and the condition continues until $C_{12}$ character time at which time the transistor 3006 becomes conductive and the transistor 3016 becomes nonconductive.

Then, for an (L) command, the transistor 3002 is conductive so that a decimal zero is read into the twelfth character place. However, for an (M) command the transistor 3008 becomes conductive so that the converse, or an (L), is read into the $C_{12}$ character position. This is as desired because the command (L) is to shift the contents of the revolver 3 to the right for a specified number of character positions, as designated by its accompanying address, with the specified number of characters on the right being lost and the specified number of decimal zeros being inserted on the left. The command (M) is similar, with the exception that L's instead of zeros are inserted on the left.

In the manner described in conjunction with the (—) and ($) commands, for each word time that an (L) or an (M) command persists, a character shift occurs and a replacement by a decimal zero or an (L) takes place. These commands can be made to persist for a number of word times as designated by their accompanying address and until the temporal detector of FIGURE 55 is triggered true. Therefore, any desired shift up to eight character positions may be obtained.

As noted above, the operation of the transistor 2194 and its associated transistors, and of the transistor 3012 and its associated transistors, will be discussed after the following description of the arithmetic operations of the computer.

The computer of the invention performs decimal arithmetic rather than binary arithmetic, as pointed out above. Also, the computer of the present invention is of the "excess three" type in which the binary equivalent of decimal zero is 1100101, with the least significant bit being at the left, and with each succeeding binary number from 0 to 9 being the decimal equivalent plus 3. These binary numbers are distinguished from one another by the four left hand bits, when the least significant bit is at the left. These numbers are shown in the following table:

0=1100101
1=0010100
2=1010101
3=0110101
4=1110100
5=0001100
6=1001101
7=0101101
8=1101100
9=0011101

The least significant bit of each of the binary numbers in the above table is at the left. It will be seen that each of the binary numbers in the table is equal to its decimal equivalent minus 3. The fifth bit merely distinguishes the numbers from typewriter instructions, as shown in the table of FIGURE 2, the fifth bit being a "one" for all the decimal numbers from 0 to 9 and being a "zero" for the corresponding typewriter instructions. The sixth bit distinguishes the numbers and typewriter instructions from the alpha commands and addresses of FIGURE 3. The sixth bit of the numbers and typewriter instructions is a zero, but the sixth bit of the alpha commands and addresses is a one. The seventh bit of all the binary numbers is, as mentioned above, the parity bit.

Therefore, for arithmetic operations, only the first four digits of each character are actually used, and the different characters represent decimal digits of from 0 to 9. Then the different arithmetic operations are performed on a character-to-character basis of the words being processed, these operations corresponding to a digit-to-digit operation on the corresponding decimal numbers.

For addition or subtraction the adder circuit of FIGURE 77 is used. After each addition or subtraction, however, an "excess three" correction must be made so that the binary number representing the sum or difference will also bear a (+3) relation to its decimal equivalent, as did the original numbers.

It is well known, and it can be shown mathematically, that when the following rules are adhered to, the binary numbers representing the sum or difference will have the desired "excess three" relationship with their decimal equivalents:

(1) For addition, if the sum is less than 10, there will be no carry to the next character, and the "excess three" correction must be subtracted from the sum.

(2) For addition, if the sum is greater than 10, there will be a carry to the next character, and the "excess three" correction must be added to the sum.

(3) For subtraction, if the subtrahend is greater than the minued, there will be a borrow from the next character, and the "excess three" must be subtracted from the difference.

(4) For subtraction, if the subtrahend is less than the minuend, there will be no borrow from the next character, and the "excess three" must be added to the difference.

To determine whether the "excess three" is to be added or subtracted from the sum or difference, an independent preliminary addition or subtraction of the numbers being processed is made in the circuitry of FIGURE 78 to determine whether or not there is a carry or a borrow. This determination, in turn, is used to correct the sum or difference by adding or subtracting the "excess three" correction to or from the original sum or difference.

The adder circuit of FIGURE 77 adds the contents of the data revolver 1 with the contents (60) at all times when the term ($GD_1$) of FIGURE 29 is true, and it subtracts the contents (60) from the contents of the data revolver 1 at all times when the term ($\overline{GD_1}$) is true. Then, in response to any of the arithmetic commands, and to several others, the adder forms the term (61) in the circuit of FIGURE 43.

As shown by the diagram of FIGURE 71, a (U) or (V) command will leave the sum or difference in the data revolver 1. This is accomplished by the transistors 2546 and 2542 in the circuitry of the data revolver 1 in FIGURE 74, the transistor 2580 breaking the circulating loop in that circuit for the operation. The command (B), on the other hand, and as shown by the diagram of FIGURE 71, will place the sum or difference in a designated address.

The adder circuit of FIGURE 77 includes a grounded emitter transistor 3052 and a grounded emitter transistor 3054. The term (60) is introduced to the base of the transistor 3052, and the term ($\overline{1R}$) is introduced to the base of the transistor 3054. This latter term is derived from the read flip-flop 2466 of FIGURE 74.

The collector of the transistor 3052 is connected to the emitter of a transistor 3056, and to the base of a transistor 3058. The collector of the transistor 3054 is connected to the emitter of the transistor 3058 and to the base of the transistor 3056. The collector of the transistor 3052 is connected to a 3.9 kilo-ohm resistor 3060, and the collector of the transistor 3054 is connected to a 4.7 kilo-ohm resistor 3062. These resistors are both connected to the negative terminal of the 3-volt direct voltage source.

The transistors 3052, 3054, 3056 and 3058 are connected as an exclusive "or" network 3055 of the type described above. The collectors of the transistors 3056 and 3058 are both connected to a 2.2 kilo-ohm resistor 3064, this resistor being connected to the negative terminal of the 3-volt direct voltage source. These collectors are also connected to the base of a grounded emitter transistor 3066 and to the base of a grounded emitter transistor 3068.

The transistor 3068 and a further grounded emitter transistor 3070 are also connected in an exclusive "or" network 3069. The collector of the transistor 3068 is connected to the emitter of a transistor 3072 and to the base of a transistor 3074 whereas the collector of the transistor 3070 is connected to the base of the transistor 3072 and to the emitter of the transistor 3074. The term ($GD_1$) from the circuit of FIGURE 29A is applied to the base of the transistor 3070. This term is a zero for the add command (U), and this term is a one for the subtract command (V).

The collector of the transistor 3068 is connected to a resistor 3076, and the collector of the transistor 3070 is connected to a resistor 3078. Each of these resistors has a resistance of 4.7 kilo-ohms, and each is connected to the negative terminal of the 3-volt direct voltage source.

The collectors of the transistors 3072 and 3074 are connected to a common lead 3080. This common lead is connetced to a 3.9 kilo-ohm resistor 3082, and the resistor is connected to the negative terminal of the 3-volt direct voltage source.

A grounded emitter transistor 3084 has its collector connected to the lead 3080, and a term $\overline{(T_{1\text{-}4})}$ is introduced to the ase of this transistor. This term is derived in a manner to be described from the circuitry of FIGURE 91, and it is false for the first four bits of each character, these being the bits with which are used in performing arithmetic operations.

A transistor 3086 has a grounded emitter, and the collector of this transistor is connected to the emitter of a transistor 3088. The common lead 3080 is connected to the base of the transistor 3088, and the clock term ($T_C$) is applied to the base of the transistor 3086.

The collector of the transistor 3088 is connected to the emitter of a transistor 3090 and to the emitter of a transistor 3092. The collector of the transistor 3090 is connected to the left input terminal of a flip-flop 3094, and the collector of the transistor 3092 is connected to the right input terminal of that flip-flop. The term (60) is applied to the base of the transistor 3092, and the term $\overline{60}$ is applied to the base is applied to the base of the transistor 3090. The latter term is obtained from the collector of the transistor 3052.

The transistor 3052 also forms a phase inverting circuit, as described above, in addition to forming a portion of the exclusive "or" network 3055. The timing signal ($S_1C_1'$) of FIGURE 1B is applied to the base of a grounded emitter transistor 3096. The collector of this transistor is connected to the left input terminal of the flip-flop 3094, and the timing signal ($S_1C_1'$) serves to set the flip-flop 3094 in a false state at the beginning of each word being processed.

The term $\overline{(C_B)}$ is obtained at the left output terminal of the flip-flop 3094, and this term is applied to the base of a grounded emitter transistor 3098. The transistors 3066 and 3098 are connected in an exclusive "or" network 3100. The collector of the transistor 3066 is connected to the emitter of a transistor 3102 and to the base of a transistor 3104. The collector of the transistor 3098, on the other hand, is connected to the base of the transistor 3102 and to the emitter of the transistor 3104. A resistor 3106 is connected to the collector of the transistor 3066 and to the negative terminal of the 3-volt direct voltage source, this resistor having a resistance of 4.7 kilo-ohms. A similar resistor 3108 is connected to the collector of the transistor 3098 and to the negative terminal of the 3-volt direct voltage source.

A resistor 3110 is connected to the collectors of the transistors 3102 and 3104 and to the negative terminal of the 3-volt direct voltage source. This resistor has a resistance of 3.9 kilo-ohms.

The "exclusive or" network 3055 compares the contents (60) with the contents of the data revolver 1. It will be remembered that the contents (60) represent the contents from any designated address, and these contents are to be added or subtracted with the contents of the data revolver 1. The exclusive "or" network 3055 develops a term (½S). This term may be set out in the following logical equation:

$$\frac{1}{2}S=60\cdot\overline{1R}+\overline{60}\cdot 1R$$

Therefore, the term $\frac{1}{2}S=1$, when a (60) bit is a one and a (1R) bit is a zero, or when a (60) bit is a zero and the corresponding (1R) bit is a one. This (½S) term is the same regardless of whether an addition or a subtraction is being performed. The only difference between addition and subtraction is in the generation of the carry. This generation will now be described.

The "exclusive or" network 3069 compares the term (½S) with the term ($GD_1$) which was derived from the circuitry of FIGURE 29A. It will be remembered that the term ($GD_1$) is false for addition, and it is a true for subtraction. The "exclusive or" network 3069 develops a term X on the common lead 3080. This term may be represented by the following logical equation:

$$X=\frac{1}{2}S\cdot GD_1+\frac{1}{2}S\cdot GD_1$$

Therefore, for addition the term X is true when the term (½S) is zero. Moreover, the term (X) is true during subtraction when the term (½S) is true.

The flip-flop 3094 develops the carry, and this flip-flop is set false at the beginning of each word by the timing signal ($S_1C_1'$). Then, for an addition, the term (X) is true for each bit of the term (½S) which is true. When the term (X) is true, the transistor 3088 is conditioned for conduction. Then, if the corresponding bit of the contents (60) is a one, the carry flip-flop 3094 will be triggered to true for the next bit interval by the timing signal ($T_C$) at the base of the transistor 3086. Alternately, if the corresponding bit of the contents (60) is a zero, the carry flip-flop 3094 will be triggered false for the next bit interval.

In general, therefore, the carry flip-flop 3094 is triggered false at the beginning of each word. Then, for an addition, the state of that flip-flop can be changed only when a bit of the half sum term (½S) is zero. When that occurs, the carry flip-flop is triggered to true or to false depending upon whether the bit in the contents (60) corresponding to the (½S) bit is a one or a zero.

This triggering of the carry flip-flop 3094 causes it to assume a true state or a false state for the bit interval following the triggering bits. Conversely, for a subtraction, the carry flip-flop 3094 is capable of being triggered only upon the occurrence of a bit in the (½S) term corresponding to one. Again, when this occurs, the flip-flop 3094 is triggered true if the equivalent bit in the contents (60) is a one, and it is triggered false if the equivalent bit in the contents (60) is a zero, this triggering of the flip-flop causing it to assume the triggered state for the ensuing bit interval.

The carry flip-flop 3094 generates the term ($\overline{C}_B$), and this term may be represented by the following logical equation:

$$\overline{C}_B=60.X+\overline{60}.X$$

The term $\overline{C}_B$ is introduced to the transistor 3098 of the "exclusive or" network 3100. This latter "exclusive or" network develops the term ($S_B$), and this term is given by the following logical equation:

$$S_B=\frac{1}{2}S.\overline{C}_B+\overline{\frac{1}{2}S}.C_B$$

This term ($S_B$) is the uncorrected sum for an addition, and it is the uncorrected difference for a subtraction. This term must be corrected insofar as its "excess three" factor is concerned, so that it may bear the proper relationship with the corresponding decimal number. This correction is carried out in accordance with the rules given above. The term ($S_B$) is corrected in the circuitry now to be described with respect to the "excess three"

factor, so that a corrected sum or difference designated (SUM'$g$) may be derived.

As noted above, only the first four bits of each number are used to form the (SUM) term. The term (SUM'$g$) is then applied to the circuitry of FIGURE 79 so that the fifth and sixth identifying bits can be added. These latter bits distinguish the number, as pointed out, from typewriter instructions and from alpha commands and addresses. Then, and in a manner to be described, the number is applied to the redundancy circuit of FIGURES 43 and 44 so that the proper parity bit number 7 can be added to the sum or difference.

The term ($T_{1-4}$) is produced by the circuit of FIGURE 91, and the converse of this term is introduced to the transistor 3084. The term ($T_{1-4}$) is true for the first four bits only, so that the term $\overline{(T_{1-4})}$ is true for the fifth, sixth and seventh bits of each character. This causes the transistor 3084 to be conductive during the intervals of the fifth, sixth and seventh bits. This renders the transistor 3088 nonconductive so that the carry flip-flop 3094 cannot be triggered during the fifth, sixth and seventh bit intervals of any character. This, of course, is the desired situation.

To correct the term ($S_B$), it is first compared with the "excess three" term III in an exclusive "or" network 3112. The result is a half sum term similar to the (½S) term described above and which is designated (½S.$\overline{\text{III}}$). It will be remembered that when there is a carry or a borrow the "excess three" term must be added, but when there is no carry or borrow, the "excess three" term is to be subtracted. This applies, of course, when addition is being performed.

The circuit of FIGURE 78, therefore, in the manner to be described, determines whether or not there is a carry and develops the term ($E_C$) to denote whether or not a carry to the next character is involved. This term is compared in an "exclusive or" network 3114 with the (½S.$\overline{\text{III}}$) term, the operations in this "exclusive or" network corresponding to the operations carried out in the "exclusive or"network 3069 described above. The result from the "exclusive or" network 3114 controls the triggering of a flip-flop 3116. This latter flip-flop develops a term (C.$\overline{\text{III}}$) and this term is compared with the term (½S.$\overline{\text{III}}$) in an exclusive "or" network 3118 to provide the term $\overline{\text{SUM}'.g}$.

Briefly, therefore, the term (III) must be added to the term ($S_B$) when a carry exists, and the term (III) must be subtracted from the term ($S_B$) when no carry exists. As in the previous addition, this is accomplished by first adding the two terms together, and then generating a carry when an addition is to be made, and of generating no carry when a subtraction is to be made. For the latter operation, the flip-flop 3116 is the carry flip-flop and the term $\overline{(\text{SUM}'g)}$ is the corrected sum or difference.

The "exclusive or" network 3112 is made up of a grounded emitter transistor 3120 and of a grounded emitter transistor 3122, together with a transistor 3124 and a transistor 3126. The term ($S_B$) is introduced to the base of the transistor 3120, and the "excess three" term $\overline{\text{III}}$ from the circuitry of FIGURE 92 is introduced to the base of the transistor 3122. The collector of the transistor 3120 is connected to the emitter of the transistor 3124 and to the base of the transistor 3126. In like manner, the collector of the transistor 3122 is connected to the emitter of the transistor 3126 and to the base of the transistor 3124. A 4.7 kilo-ohm resistor is connected from the collector of the transistor 3120 to the negative terminal of the 3 volt direct voltage source, this resistor being designated 3128. A resistor 3130 of 2.2 kilo-ohms is connected to the collector of the transistor 3122 and to the negative terminal of the 3 volt direct voltage source.

The collectors of the transistors 3124 and 3126 are connected to a resistor 3132 and to an output terminal 3134. The resistor 3132 has a resistance of 2.2 kilo-ohms and is connected to the negative terminal of the 3 volt direct voltage source.

The term (½S.$\overline{\text{III}}$) is developed at the output terminal 3134. This term may be represented by the following logic equation:

$$½S.\overline{\text{III}} = S_B.\overline{\text{III}} + S_B.\text{III}$$

The output terminal 3134 is connected to the base of a grounded emitter transistor 3136 which is included in the exclusive "or" network 3118. This output terminal is also connected to the base of a grounded emitter transistor 3138 which is included in the "exclusive or" network 3114. The "exclusive or" network 3114 also includes a grounded emitter transistor 3140, and a pair of transistors 3142 and 3144. The collector of the transistor 3138 is connected to a resistor 3146, to the emitter of the transistor 3142 and to the base of the transistor 3144. This resistor has a resistance of 4.7 kilo-ohms, and it is connected to the negative terminal of the 3 volt direct voltage source. The collector of the transistor 3140, on the other hand, is connected to a resistor 3148, to the base of the transistor 3142 and to the emitter of the transistor 3144. The resistor 3148 has a resistance of 4.7 kilo-ohms, and this resistor is connected to the negative terminal of the 3 volt direct voltage source. The term $\overline{(E_C)}$ from the circuitry of FIGURE 78 is introduced to the base of the transistor 3140. This term is true whenever a carry is to be generated for the following character, and it is false when there is no such carry. As noted above, and as will be described in detail in conjunction with FIGURE 78, this term is developed by a preliminary comparison of the characters being processed.

The collectors of the transistors 3142 and 3144 are connected to a common lead 3146 and to a resistor 3148. The resistor has a resistance of 3.9 kilo-ohms, and it is connected to the negative terminal of the 3 volt direct voltage source. A transistor 3150 has a grounded emitter, and it has its collector connected to the common lead 3146. The timing signal $\overline{(T_{1-4})}$ from the circuit of FIGURE 91 is applied to the base of the transistor 3150 so that the control of the flip-flop 3116 will be effective only for the first four bits of each character, which are the bits with which we are presently concerned.

A term (Y) is developed on the common lead 3146, and this term may be derived from the following logical equation:

$$Y = ½S\overline{\text{III}}.\overline{E}_C + ½S\overline{\text{III}}.E_C$$

The term (Y) is introduced to the base of a transistor 3152, and the emitter of this latter transistor connects with the collector of a grounded emitter transistor 3154. The clock timing signal ($T_C$) is applied to the base of the transistor 3154. The collector of the transistor 3152 is connected to the emitter of a transistor 3156 and to the emitter of a transistor 3158. The term ($\overline{\text{III}}$) from the circuitry of FIGURE 92 is applied to the base of the transistor 3156, and the term ($\overline{\text{III}}$) from the same circuit is applied to the base of the transistor 3158. The collector of the transistor 3156 connects with the left input terminal of the carry flip-flop 3116, and the collector of the transistor 3158 connects with the right input terminal of the carry flip-flop 3116.

A grounded emitter transistor 3160 is also provided with its collector connected to the left input terminal of the flip-flop 3116. The term ($S_1C'_1$) of the timing signal of FIGURE 1B is applied to the base of the transistor 3160 to trigger the flip-flop 3116 at the beginning of each new word.

The term (C.$\overline{\text{III}}$) is developed at the right output terminal of the flip-flop 3116. This is the carry term which is added to the term (½S.$\overline{\text{III}}$) to provide the corrected sum term $\overline{(\text{SUM}'g)}$, the latter term having the proper "excess three" factor included in it.

The term (C.$\overline{\text{III}}$) is introduced to the base of a transistor 3162. This transistor, like the transistor 3136 has a grounded emitter and is included in the "exclusive or" network 3118. The "exclusive or" network includes a further transistor 3164 and a transistor 3166. The collector of the transistor 3136 connects with a resistor 3168, with the emitter of the transistor 3164, and with the base of the transistor 3166. The resistor 3168 has a resistance of 4.7 kilo-ohms, and is connected to the negative terminal of the 3-volt direct voltage source. The collector of the transistor 3162 is connected to a resistor 3170, to the base of the transistor 3164 and to the emitter of the transistor 3166. The resistor 3170 has a resistance of 4.7 kilo-ohms, and this resistor is connected to the negative terminal of the 3 volt direct voltage source.

The collectors of the transistors 3164 and 3166 are connected to a resistor 3172 and to an output terminal 3174. The resistor has a resistance of 3.9 kilo-ohms, and it is connected to the negative terminal of the 3-volt direct voltage source.

The term $\overline{(\mathrm{SUM}'g)}$ is produced at the output terminal 3174. This term may be expressed by the following logical equation:

$$\overline{\mathrm{SUM}'g}=(\tfrac{1}{2}S.\overline{\mathrm{III}})(C.\overline{\mathrm{III}})+(\tfrac{1}{2}S.\overline{\mathrm{III}})(C.\overline{\mathrm{III}})$$

The corrected sum or difference term (SUM'g) at the output terminal 3174 of the adder circuit of FIGURE 77 has four significant bits, and this signal is introduced to the input terminal 3180 of the circuit of FIGURE 79 in order that the fifth and sixth identifying bits may be added to the signal.

The input terminal 3180 is connected to the emitter of a transistor 3182, and the collector of the transistor is connected to a common lead 3184. The timing signal ($T_{1-4}$) derived from the circuit of FIGURE 91 is applied to the base of the transistor 3182, so that the transistor is conductive for the first four bits of each character.

The circuit of FIGURE 79 also includes a grounded emitter transistor 3185, the collector of which is connected to the emitter of a transistor 3186. The collector of the transistor 3186 is connected to the common lead 3184 and and to a resistor 3188. The resistor 3188 has a resistance of 3.9 kilo-ohms, and it is connected to the negative terminal of the 3 volt direct voltage source.

Figure 90:
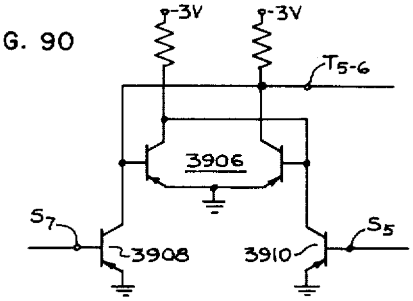

The term ($\overline{\mathrm{1R}}$) from the data revolver 1 of FIGURE 72 is introduced to the base of the transistor 3185, and a timing signal ($T_{5-6}$) from the circuitry of FIGURE 90 is applied to the base of the transistor 3186. The term ($T_{5-6}$) renders the transistor 3186 conductive for the fifth and sixth bit of each character. During the processing under discussion, the data revolver 1 contains only numbers, so that the proper identification of a blank for the fifth bit and a blank for the sixth bit is read to the common lead 3184. This common lead is connected to an output terminal 3190.

It is clear, therefore, that sixth bit signal appears at the output terminal 3190, with four of the bits representing a decimal digit of the sum or difference being determined, and the fifth and sixth bits identifying the signal as a number. The term at the output terminal 3190 is designated (SUM), and this term is introduced to the base of the transistor 906 of the circuitry of FIGURE 43 to become part of the contents (61) so that the sum may be fed to any specified address as shown by the diagram of FIGURE 71.

It will be appreciated that the parity or redundancy bit still has not been included in the (SUM) term. However, the contents (61) are introduced to the base of the transistor 991 of FIGURE 44, and the presence of the arithmetic command causes the transistor 980 to become conductive, so that the transistor 984 renders the transistor 988 conductive. This permits the contents (61) to be read through the transistor 990 to the base of the transistor 961 of the bit counter circuitry.

Then, and in the described manner, as each character of the (SUM) term is read into the (61) contents, the characters of each word are counted and the redundancy bit counter develops the term (RED) or ($\overline{\mathrm{RED}}$) at the end of the sixth bit of each character. This term is then applied to the base of the transistor 903 of FIGURE 43 so that the seventh bit of each character, as controlled by the conductivity of the transistor 901, is a one or a zero depending upon the bit count of the first six bits.

In the manner described above, therefore, a corrected sum or difference is obtained by the computer, a sum occurring in the presence of a (U) command and a difference occurring in the presence of a (V) command. This sum or difference then has its identifying fifth and sixth bits included in each of its characters by the circuitry of FIGURE 79, and the redundancy bits of each character is then generated by the circuits of FIGURES 43 and 45.

As noted above, the circuit of FIGURE 78 performs a preliminary comparison of each character of the words being added or subtracted to determine whether or not a carry is to be generated from one character to the next. It is necessary that this preliminary comparison be made, because the presence or absence of a carry after the treatment of the last bit of the characters being processed must be determined before the actual treatment of the first bit of these characters is carried out by the circuit of FIGURE 77. This follows, because the carry is generated in the circuit of FIGURE 77 by the flip-flop 318 if the final carry is a one and the carry is not generated if the final carry is a zero.

In a constructed embodiment of the invention the operands for sum and subtraction can be obtained from three difference sources. That is, these operands can be derived from the block register 6, the transfer block register 8, and from the data revolver 2. The circuitry of FIGURE 78 is constructed to provide the necessary "excess three" correction term for data derived from any of these sources.

The circuitry of FIGURE 78 includes a transistor 3200 having a grounded emitter and having a collector connected to the emitters of each of a group of transistors 3202, 3204 and 3206. The term ($\overline{C_{12}.FIN}$) is introduced to the base of the transistor 3200, this term being derived from the circuitry of FIGURE 57. It will be remembered that this term is true except for the last character of the word being executed. The term (#A) is applied to the base of the transistor 3202. This term is true for all number addresses and it is derived from the circuitry of FIGURE 48E. The term ($B_2$) is introduced to the base of the transistor 3204, and that term is derived from the circuitry of FIGURE 50 and it is true for a group of addresses including the block register 6.

The term ($B_4$) is introduced to the base of the transistor 3206, and this term is true for a group of addresses including the transfer block register 8.

The collector of the transistor 3202 is connected to the emitter of a transistor 3208, the collector of the transistor 3204 is connected to the emitter of a transistor 3210, and the collector of the transistor 3206 is connected to the emitter of a transistor 3212. The term ($2R-7$) from the read flip-flop 2616 of the data revolver 2 of FIGURE 75 is applied to the base of the transistor 3208. Likewise, the term ($B_6R-7$) from the read flip-flop 1977 of the data block register 6 of FIGURE 65 is applied to the base of the transistor 3210, and the term ($TBR-7$) from the read flip-flop 2073 of the transfer block register 8 of FIGURE 67 is applied to the base of the transistor 3212.

The collectors of the transistors 3208, 3210 and 3212 are connected to a common lead 3214 on which the term $\overline{60a}$ appears, and to a resistor 3216. This resistor has a resistance of 3.9 kilo-ohms, and it is connected to the negative terminal of the 3 volt direct voltage source.

The term ($C_{12}.FIN$) from the circuit of FIGURE 57 is also applied to the base of a grounded emitter transistor 3218. The collector of this transistor is connected to the emitters of each of a group of transistors 3220, 3222 and 3224. The collectors of these transistors are respectively connected to the emitters of the transistors 3208, 3210 and 3212. The term (#A′) is applied to the base of the transistor 3220, this term being derived from the circuitry of FIGURE 47. The term $B_2'$ of FIGURE 52, and the term $B_4'$ of that figure, are applied to the bases of the transistors 3222 and 3224 respectively.

The common lead 3214 is connected to the base of a grounded emitter transistor 3226. This emitter is included in an exclusive "or" network 3228, and a plurality of transistors 3230, 3232, 3234, 3236, 3238 and 3240 are all connected in that exclusive "or" network. The collector of the transistor 3226 is connected to the emitter of the transistor 3230, to a resistor 3242, and to the base of the transistor 3232. The resistor 3242 has a resistance of 4.7 kilo-ohms, and this resistor is connected to the negative terminal of the 3 volt direct voltage source.

The transistor 3236 has a grounded emitter, and its collector is connected to the emitter of the transistor 3234. Likewise, the transistor 3240 has a grounded emitter, and its collector is connected to the emitter of the transistor 3238. The collectors of the transistors 3234 and 3238 are connected to the base of the transistor 3230, to the emitter of the transistor 3232, and to a resistor 3244. The latter resistor has a resistance of 4.7 kilo-ohms, and it is connected to the negative terminal of the 3 volt direct voltage source.

The ($C_{12}.FIN$) term is introduced to the base of the transistor 3236. This term is true at the end of the last character of the command being executed. The term ($OH_1$) is derived from the order holder of FIGURE 28, and it represents the first bit of the command character to be executed next. This term is applied to the base of the transistor 3234. The term ($GD_1$) is derived from the gate driver of FIGURE 29*a* and represents the first bit of the command character being executed. This term is applied to the base of the transistor 3238. Finally, the term ($\overline{C_{12}.FIN}$) of FIGURE 57 is applied to the base of the transistor 3240. The latter term is true at all times except at the end of the last character of the command being executed.

The collectors of the transistors 3230 and 3232 are connected to a resistor 3246 and to the base of a grounded emitter transistor 3248. The resistor 3246 has a resistance of 2.2 kilo-ohms, and it is connected to the negative terminal of the 3-volt direct voltage source.

The transistor 3248 is included in an "exclusive or" network 3250. The collector of the transistor 3248 is connected to a resistor 3252, to the emitter of a transistor 3254 and to the base of a transistor 3256. The resistor 3252 has a resistance of 3.9 kilo-ohms, and it is connected to the negative terminal of the 3 volt direct voltage source. The term ($1R-7$) from the read flip-flop 2476 of the data revolver 1 of FIGURE 74 is introduced to the base of a grounded emitter transistor 3258 which is also included in the "exclusive or" network 3250. The collector of this latter transistor is connected to the base of the transistor 3254, to the emitter of the transistor 3256 and to a resistor 3260. The resistor 3260 has a resistance of 4.7 kilo-ohms, and this resistor connects with the negative terminal of the 3-volt direct voltage source.

The collectors of the transistors 3254 and 3256 are both connected to a resistor 3262 and to the base of a transistor 3264. The resistor 3262 has a resistance of 2.2 kilo-ohms, and this resistor is connected to the negative terminal of the 3-volt direct voltage source.

A transistor 3266 has a grounded emitter and the collector of this transistor is also connected to the base of the transistor 3264. The term ($\overline{T_{1-4}}$) from the circuit of FIGURE 91 is introduced to the base of the transistor 3266. The timing signal $T_W$ of FIGURE 1B is applied to the base of a transistor 3268. The emitter of this transistor is grounded and its collector connects with the emitter of the transistor 3264. The collector of the transistor 3264 is connected to the emitter of a transistor 3270 and to the emitter of a transistor 3272. The common lead 3214 is connected to the base of the transistor 3270 and the collector of the transistor 3226 is connected to the base of the transistor 3272. The collector of the transistor 3270 is connected to the left input terminal of a flip-flop 3274, and the collector of the transistor 3272 is connected to the right input terminal of that flip-flop.

The left output terminal of the flip-flop 3274 is connected to the base of a transistor 3276, and the right output terminal of the flip-flop 3274 is connected to the base of a transistor 3278. The collectors of the transistors 3276 and 3278 are connected together and to the collector of a grounded emitter transistor 3280. The timing signal $S_7$ of FIGURE 1D is applied to the base of the transistor 3280.

The collector of the transistor 3276 connects with the left input terminal of a flip-flop 3282, and the collector of the transistor 3278 connects with the right input terminal of that flip-flop. The right output terminal of the flip-flop 3282 is connected to the base of a grounded emitter transistor 3284. This latter transistor is included in an exclusive "or" network 3286.

A transistor 3288 is also included in the "exclusive or" network 3286, and the term ($\overline{GD_1}$) of the circuit of FIGURE 29*a* is applied to the base of the latter transistor. The transistor 3288 has a grounded emitter, and its collector connects with the base of a transistor 3290 and with the emitter of a transistor 3292, both of these latter transistors being included in the "exclusive or" network 3286. The collector of the transistor 3284 is also connected to a resistor 3294, and the collector of the transistor 3288 is also connected to a resistor 3296. Each of these resistors has a resistance of 4.7 kilo-ohms, and both are connected to the negative terminal of the 3-volt direct voltage source. The collector of the transistor 3284 connects with the emitter of the transistor 3290 and with the base of the transistor 3292.

The collectors of the transistors 3290 and 3292 are both connected to a resistor 3298 and to an output terminal 3300. The resistor 3298 has a resistance of 4.7 kilo-ohms, and this resistor is connected to the negative terminal of the 3-volt direct voltage source.

The circuitry of the transistors 3200, 3202, 3204, 3206, 3218, 3220, 3222, 3224, 3208, 3210 and 3212 serves merely to produce on the common lead 3214, a bit-by-bit sequence of the next character to be executed in the adder of FIGURE 77, with the last bit of that character being produced on the lead 3214 before the character is executed in the adder of FIGURE 77. It is for that reason that the base of the transistor 3208 receives the term ($2R-7$), and the base of the transistor 3210 receives the term ($P_6R-7$), and the base of the transistor 3212 receives the term ($TBR-7$). This means that each character in the data revolver 2, or in the block register 6, or in the transfer block register 8, is read into the circuitry of FIGURE 78 one character time before the same character is read into the adder of FIGURE 77.

The terms #A′, $B_2'$ and $B_4'$ are respectively derived one character time before the corresponding terms #A, $B_2$ and $B_4$. For the first character in the word to be executed from the selected one of these sources, the prime terms are used. The term ($C_{12}\cdot FIN$) is true for the last character of the preceding command, therefore if the data revolver 2 is addressed, the transistor 3220 and the transistor 3218 both become conductive for the character time before the first character is introduced to the adder. This permits the first character from the data revolver 2 to be introduced to the common lead 3214. For the second character, the first character is being introduced to the adder circuit and executed, so that the term (#A) is true, together with the term $(\overline{C_{12}.FIN})$.

Therefore, the transistors 3200 and 3202 become conductive so that the term (2R—7) read into the transistor 3208 appears on the lead 3214. In like manner, the address terms ($B_2'$) and ($B_2$) cause the block register 6 to be selected, where the terms ($B_4'$) and ($B_4$) cause the transfer block to be selected. Therefore, an appropriate address causes each character of the addressed source to appear in a bit-by-bit sequence on the lead 3214 one character time before the same character is executed in the adder circuit of FIGURE 77.

The character on the lead 3214 is introduced in a bit-by-bit sequence to the base of the transistor 3270, and the converse is introduced in a bit-by-bit sequence to the base of the transistor 3272. Therefore, the flip-flop 3274 is triggered true at ($T_W$) time when the transistor 3268 is conditioned for conduction for every one bit on the lead 3214 and if the transistor 3264 is conditioned for conduction. Likewise, when the transistor 3264 is conditioned for conduction, the flip-flop 3274 is triggered to a false state for every zero on the lead 3214. Expressed differently, the state of the flip-flop 3274 can be changed by the signal appearing on the lead 3214 only for those bits of that signal for which the transistor 3264 is conditioned for conduction.

The character appearing on the lead 3214 is compared with the state of the order holder 1 when $(C_{12}.FIN)$ is true, that is, for the first character of any word, and the character on the lead 3214 is compared with the state of the gate driver ($GD_1$) when the term $(\overline{C_{12}.FIN})$ is true, that is, for characters other than the first character of each word.

It will be remembered that for addition, the term ($OH_1$) is a zero for the first character being processed by the circuitry of FIGURE 78, and for subtraction this term is a one. Likewise, for addition, the term ($GD_1$) is zero for the other characters following the first character of the word being processed, and for subtraction this term is a one for these characters. The term (Z) is introduced to the base of the transistor 3248. The term $\overline{Z}$ can be expressed as $$\overline{Z}=\overline{60a}(OH_1\cdot C_{12}\cdot FIN+GD_1\cdot \overline{C_{12}FIN})$$

The term $\overline{Z}$ is then compared in the exclusive "or" network 3250 with the term (1R—7). This latter term, of course, is the character in the data revolver 1 preceding the character being processed by the adder circuitry of FIGURE 77. The resulting term ($\overline{A}$) is introduced to the base of the transistor 3264.

Therefore, the flip-flop 3274 is triggered in the same manner as the flip-flop 3094 of FIGURE 77. That is, the flip-flop 3274 is triggered to provide a carry from bit-to-bit in accordance with one rule for addition, and to develop a carry from bit-to-bit in accordance with another rule for subtraction. The carries generated by the flip-flop 3274 are those which are proper in accordance with the rules of binary arithmetic to provide the correct sum or difference of the quantities being added or subtracted. It will also be remembered that these quantities represent the character preceding the character of each corresponding word being executed in the adder of FIGURE 77. The carry is designated C′ and the absence of a carry is designated $\overline{C'}$, and the carry C′ is introduced to the base of the transistor 3278 and the term C′ is introduced to the base of the transistor 3276.

The transistor 3280 is nonconductive except for the last bit of each character. For each character the flip-flop 3274 is triggered back and forth depending upon whether a carry is to be carried over to the following bit. As the last bit of the character, that is bit number 4, is executed, the flip-flop 3274 is triggered to a state determining whether a carry is to be carried over to the next character. It is that carry which is of significance here, because it determines whether the "excess three" corrected is to be added or subtracted to the ($S_B$) term in the adder of FIGURE 77. The flip-flop 3282 is caused to assume a state corresponding to that last carry by rendering the transistor 3280 conductive at the seven bit time. The flip-flop 3282, therefore, develops a term (E′C) at its output terminal which represents whether or not a carry was generated to be carried over to the next character.

The term ($E_C'$) will be a true for addition when there is such a carry to the next character. However, the term ($E_C'$) will be false for subtraction when there is a carry to the next character. As noted above, it is desired to develop the term ($\overline{E_C}$) which is true for addition when there is a carry and which is false for subtraction when there is a carry. This is achieved by the "exclusive or" network 3286 which compares the term ($E'_C$) with the term ($\overline{GD_1}$). The term ($\overline{GD_1}$) is true for addition and is false for subtraction. Therefore, for addition and when ($E_C'$) is true indicating a carry, the term ($\overline{GD_1}$) is also true so that the term ($E_C$) is true which is desired. Likewise, during subtraction when the term ($\overline{E'_C}$) is true indicating a carry, the term ($\overline{GD_1}$) is false so that ($\overline{E_C}$) is false, which is desired.

The circuitry of FIGURE 78, therefore, provides a term ($\overline{E_C}$) which is true whenever there is a carry, and which determines whether the "excess three" factor is to be added or subtracted from the sum in the adder of FIGURE 77.

Multiplication is carried out in the computer by means of the revolvers 1, 2 and 3. This arithmetic operation is executed upon the formation of the instruction (MULT (2)). This instruction places the contents of the revolver 2 in the term (60) of FIGURE 70 to be introduced to the adder of FIGURE 77, and this causes the contents of the revolver 2 to be added to the contents of the revolver 1. The sum is then placed in the revolver 2, and this addition process is continued for each character and from character to character until each corresponding character in the revolver 3 is reduced to ($\overline{III}$), the reduction in revolver 3 being by binary 1 for each sum taken.

Therefore, the instruction (MULT (2)) means to multiply the contents of the revolver 1 with the contents of revolver 3, and to add the product to the previous contents of revolver 2. After multiplication, the revolver 3 will contain twelve (III's), and the original contents of revolver 1 will have been shifted to the left a number of character positions equal to the number of significant characters originally in the revolver 3.

The procedure is first to add the characters in revolver 1 to the characters in revolver 2 repeatedly, with the first character in revolver 3 being reduced by binary one for each such addition. The additions are carried out until this first character in the revolver 3 is reduced to ($\overline{III}$). Then, the contents of revolver 1 represent its original contents plus the first partial product. The contents of revolver 3 are now shifted to the right by one character position, and the contents of the revolver 1 are shifted to the left. This shift to the right in the revolver 3 permits the second character of the revolver 3 to be reduced by one for each addition of the contents of revolvers 1 and 2 until it too is zero. The shift of the contents of revolver 1 to the left is proper to that the partial products in revolver 2 may be added in the correct ordinal significance.

This adding, subtracting and shifting continues until all the characters in revolver 3 are reduced to ($\overline{III}$'s). For each shift in the revolvers 1 and 3, the lost character is replaced with a ($\overline{III}$). The adding and shifting continues, as mentioned above, until the revolver 3 contains all ($\overline{III}$'s). Then, the (FIN) flip-flop of FIGURE 57 is triggered true to signify the completion of the multiplication operation.

The computer includes the circuit of FIGURE 86 for controlling the multiplication process. This circuit includes an exclusive "or" network 3310. This network includes a pair of grounded emitter transistors 3312 and 3314. The term $(3R-7)$ from the read flip-flop 2714 of FIGURE 76 is introduced to the base of the transistor 3312. The term ($\overline{III}$) from the network of FIGURE 92 is introduced to the base of the transistor 3314.

The collector of the transistor 3312 is connected to the emitter of a transistor 3316 and to the base of a transistor 3318. The collector of the transistor 3314, on the other hand, connects with the base of the transistor 3316 and the emitter of the transistor 3318. The collector of the transistor 3312 is connected to a resistor 3320 which has a resistance of 2.2 kilo-ohms and which is connected to the negative terminal of the 3-volt direct voltage source. The collector of the transistor 3314 is connected to a resistor 3322, this latter resistor having a resistor 4.7 kilo-ohms and being connected to the negative terminal of the 3-volt direct voltage source.

The collectors of the transistors 3316 and 3318 are connected to a resistor 3324. This latter resistor has a resistance of 3.9 kilo-ohms, and it is connected to the negative terminal of the 3-volt direct voltage source. The collectors of the transistors 3316 and 3318 are also connected to the base of a transistor 3326 and to the base of a grounded emitter transistor 3328. The emitter of the transistor 3326 is connected to a grounded emitter transistor 3330, and the term $(C_{12}S_{11})$ is introduced to the base of the latter transistor, this latter term being the timing signal described in conjunction with FIGURE 1B.

The transistor 3328 is connected as a phase inverter, and its collector is connected to a resistor 3332 and to the base of a transistor 3334. The resistor 3332 has a resistance of 2.2 kilo-ohms, and it is connected to the negative terminal of the 3-volt direct voltage source. The timing signal $(T_{1-4})$ derived from the circuit of FIGURE 91 is applied to the base of a transistor 3336. The collector of this transistor is connected to the emitter of the transistor 3334, and the emitter of the transistor 3336 is connected to the collector of a grounded emitter transistor 3338. The timing signal $(T_W)$ of FIGURE 1B is applied to the base of the transistor 3338.

The collector of the transistor 3326 is connected to the right input terminal of a flip-flop 3340, and the collector of the transistor 3334 is connected to the left input terminal of that flip-flop. The term $\overline{III}$.D′ is derived at the right output terminal of the flip-flop 3340 and is applied to the base of a transistor 3342. The term $\overline{III}$.D′ is obtained at the left output terminal of the flip-flop 3340 and is applied to the base of a transistor 3344.

The emitters of the transistors 3342 and 3344 are connected to the collector of a grounded emitter transistor 3346. The timing signal $(S_1C'_1)$ of FIGURE 1 is applied to the base of the transistor 3346. The collector of the transistor 3344 is connected to the left input terminal of a flip-flop 3348, and the collector of the transistor 3342 is connected to the right input terminal of that flip-flop. The term ($\overline{III}$.D) is obtained at the right output terminal of the flip-flop 3348.

The circuit described above functions as a zero detector. Its purpose is to compare the character $(C_1)$ in the revolver 3 with ($\overline{III}$) or decimal zero, and to indicate whether the $(C_1)$ character is ($\overline{III}$) or not. This comparison, however, is carried out at $(C_{12})$ time so that the proper indication may be made at $(C_1)$ time as to whether the $(C_1)$ character is a ($\overline{III}$) or not. It will be remembered that for every addition of the contents of the revolvers 1 and 2, the particular $(C_1)$ character in the revolver 3 is reduced by binary one, and that these additions continue until the character (C) in the revolver 3 is reduced to ($\overline{III}$).

The flip-flop 2714 of FIGURE 76 reads the $(C_1)$ character in the revolver 3 at $(C_{12})$ time. Therefore, as the $(C_1)$ character passes through this flip-flop, the resulting triggering of the flip-flop is translated to the transistor 3312 of the exclusive "or" network 3310. This permits the $(C_1)$ character to be compared with decimal zero or ($\overline{III}$). The resulting output signal from the "exclusive or" network 3310 is applied to the transistor 3326 and with inverted phase to the transistor 3334. If the comparison of the first bit of the $(C_1)$ character coincides with the corresponding bit of ($\overline{III}$) at $(C_{12})$ time, the conduction of the transistors 3326 and 3340 causes the flip-flop 3340 to be triggered true.

The flip-flop 2714 continues in its true state, until a bit of the $(C_1)$ character does not coincide with the corresponding bit of ($\overline{III}$), at which time the transistor 3334 becomes conductive to trigger the flip-flop 3340 false. The transistor 3336 completes the latter conductivity path to the transistor 3338 only for the first four bits of the character which, as mentioned above, are the significant number bits. Also, the transistor 3338 completes the conductivity path to trigger the flip-flop 3340 to a false state at $(T_W)$ time.

Therefore, if the $(C_1)$ character does not equal ($\overline{III}$) at $(C_{12})$ time, the flip-flop 3340 is triggered false. This causes the transistor 3344 to be conductive, so that the flip-flop 3348 is triggered false at $(S_1C_1')$ time. That is, the flip-flop 3348 is triggered false at the beginning of the $(C_1)$ character and at $C_1$ time when that character is not a zero. Conversely, when the character is a decimal zero ($\overline{III}$), the flip-flop 3340 is triggered true. Therefore, the term ($\overline{III}$.D) is true at $(C_1)$ time when the following $(C_1)$ character is a decimal zero, and this term is false when the following character is not a decimal zero.

The term ($\overline{III}$.D) is applied to the base of a grounded emitter transistor 3350 in FIGURE 82, and the term ($\overline{MULT}$) of FIGURE 54 is applied to the base of a grounded emitter transistor 3352 in FIGURE 82. The collectors of the transistors 3350 and 3352 are connected to a common lead 3354. The term (MULT.$\overline{III}$D) is produced at an output terminal connected to the common lead 3354, and this lead is also connected to a resistor 3356 and to the base of a grounded emitter transistor 3358. The resistor 3356 has a resistance of 2.2 kilo-ohms, and it is connected to the negative terminal of the 3-volt direct voltage source.

The collector of the transistor 3358 is connected to a common lead 3360, and the collector of a grounded emitter transistor 3362 is also connected to that common lead. The term ($\overline{MULT}$) is also introduced to the base of the transistor 3362. The common lead 3360 is connected to an output terminal at which the term (MULT.$\overline{III}$.D) appears, and this common lead is also connected to a 2.2 kilo-ohm resistor 3364, the resistor being connected to the negative terminal of the 3-volt direct voltage source.

As mentioned above, the term (MULT.$\overline{III}$.D) is applied to the base of the transistor 2584 in FIGURE 74 to break the circulating loop of the data revolver 1, and this term is also applied to the base of the transistor 2508. It will be remembered that whenever this term is true, it signifies a (MULT) command plus a reduction of the corresponding character in the revolver 3 to ($\overline{III}$). It will also be remembered that when this occurs it is desired to shift the contents of the data revolver 1 to the left by one character position so that the partial products may be added with the proper ordinal significance. This shift is realized because the term (MULT.$\overline{III}$.D) breaks the normal circulating loop from the read flip-flop 2466, and completes a circulating loop from the read flip-flop 2476 through the transistor 2506 and the transistor 2504. This circulating loop continues, until the shifted contents in revolver 3 indicates a character which is not ($\overline{III}$). Then, the term (MULT.$\overline{III}$.D) goes false so that normal circulation is returned until the following character in the revolver 3 is reduced to ($\overline{III}$). The shift in the data revolver 1 causes the previous ($C_1$) character to be lost, and this character is replaced by ($\overline{III}$) by the conductivity of the transistor 2512 completing a path to the transistor 2520 at the original ($C_1$) time.

When the term (MULT.$\overline{III}$.D) is true, indicating that the corresponding character in the revolver 3 has not been reduced to ($\overline{III}$), the circulating loop of the data revolver 2 of FIGURE 75 is broken because of the conductivity of the transistor 2648. Also, the transistor 2662 is conductive so that the contents (61) may be read into the data revolver 2. This content, as shown in FIGURE 71, and in the presence of a (MULT) command (5) plus the address of the revolver 2 which accompanies the command, causes the output from the adder of FIGURE 77 to be introduced to the revolver 2.

Therefore, the instruction under consideration not only causes the contents of the revolver 2 to form the term (60) which is introduced to the adder of FIGURE 77 to be added with the contents of the revolver 1, but this instruction also causes the output from the adder of FIGURE 77, which is now the term (61), to be introduced through the transistors 2662 and 2664 of FIGURE 75 into the revolver 2.

Therefore, the contents of revolver 1 are added to the contents of revolver 2, with the sum being placed in revolver 2, so long as a corresponding character in the revolver 3 is not ($\overline{III}$). This character in revolver 3, as mentioned above, is reduced by binary one for each such addition until it is reduced to ($\overline{III}$). Then, as described, the contents of the revolver 1 are shifted to the left, and the contents of the revolver 3 are shifted to the right, for the reasons mentioned.

The circuitry of FIGURE 81 serves to subtract binary one from the corresponding character in the revolver 3 until that character is reduced to decimal zero ($\overline{III}$). This circuitry includes an exclusive "or" network 3400 which includes a grounded emitter transistor 3402 and a grounded emitter transistor 3404. The output (3R) from the read flip-flop 2710 of the date revolver 3 circuitry of FIGURE 76 is applied to the base of the transistor 3404.

The collector of the transistor 3402 is connected to the emitter of a transistor 3406 and to the base of a transistor 3408. This collector is also connected to a 4.7 kilo-ohm resistor 3410, the resistor being connected to the negative terminal of the 3-volt direct voltage source. The collector of the transistor 3404 is connected to the base of the transistor 3406 and to the emitter of the transistor 3408. This collector is also connected to a 4.7 kilo-ohm resistor 3412, the resistor being connected to the negative terminal of the 3-volt direct voltage source. The collectors of the transistors 3406 and 3408 are connected to a resistor 3414 and to an output terminal designated (TAL). The resistor 3414 has a resistance of 3.9 kilo-ohms and is connected to the negative terminal of the 3-volt direct voltage source.

The term (TAL) is introduced to the base of a transistor 3416 which has a grounded emitter and which is included in an exclusive "or" network 3418. This exclusive "or" network also includes a grounded emitter transistor 3420, and the term ($GD_1$) of FIGURE 29*a* is applied to the base of the transistor 3420. The collectors of the transistors 3420 and 3416 are respectively connected to a 2.2 kilo-ohm resistor 3422 and to a 4.7 kilo-ohm resistor 3424, both these resistors being connected to the negative terminal of the 3-volt direct voltage source.

The collector of the transistor 3420 connects with the emitter of a transistor 3426 and with the base of a transistor 3428. The collector of the transistor 3416, on the other hand, connects with the emitter of the transistor 3428 and with the base of the transistor 3426. The collectors of the transistors 3426 and 3428 are connected to a resistor 3430 and to the base of a transistor 3432. The resistor 3430 has a resistance of 3.9 kilo-ohms, and this resistor is connected to the negative terminal of the 3-volt direct voltage source. The clock timing signal ($T_C$) is applied to the base of a grounded emitter transistor 3434, and the collector of this transistor is connected to the emitter of the transistor 3432.

The collector of the transistor 3432 is connected to the left input terminal of a flip-flop 3436, as is the collector of a grounded emitter transistor 3438. The timing signal ($\overline{T_{1-4}}$) from the circuitry of FIGURE 91 is applied to the base of the transistor 3438.

A grounded emitter transistor 3440 has its collector connected to the right input terminal of the flip-flop 3436, and the term ($S_1C_1'$) of FIGURE 1B is applied to the base of the transistor 3440. The term $\overline{TAL.C}$ is produced at the left output terminal of the flip-flop 3436, and this term is introduced back to the base of the transistor 3402.

Just before the first bit time of the first character, the flip-flop 3436 is triggered true. This causes the term ($\overline{TAL.C}$) to be false. Then, if the first bit of the $C_1$ character in the revolver 3 is a one, the term (TAL) is a zero. For multiplication, the term ($GD_1$) is zero, so that the transistor 3432 is rendered conductive and the flip-flop 3436 is triggered true at ($T_C$) time. The flip-flop 3436 continues to be false until the end of the first character. So long as this flip-flop is false, the bits of the term (TAL) coincide with the corresponding bits of the ($C_1$) character in the revolver 3. Therefore, the circuitry of FIGURE 81 in effect subtracts 1 from the ($C_1$) character in the revolver 3, so that the term (TAL) equals the ($C_1$) character minus 1. The transistor 3438 becomes conductive at the end of the first bit of the first character, so that the flip-flop 3436 is triggered false and the term (TAL) equals the contents of the revolver 3 until ($C_1$) time, at which the transistor 3430 again triggers the flip-flop 3436 true.

For the (MULT) command, the transistor 3042 of the circuitry of the revolver 3 of FIGURE 76 becomes conductive to break the circulating loop. Then, when the term (MULT.$\overline{III}$.D) is true, the conductivity of the transistor 3023 passes the term (TAL) to the write flip-flop 2718 of the revolver 3. It will be remembered that this term is the equivalent of the original contents of the revolver 3, except for the ($C_1$) character. For this character, and due to the operation of the circuit of FIGURE 81, the term (TAL) is in effect the ($C_1$) character minus 1 for each circulation. This continues until the ($C_1$) character is reduced to (III). When this occurs, the transistor 3023 becomes nonconductive, and the transistor 3012 becomes conductive due to the action of the circuitry of FIGURE 80.

The conductivity of the transistor 3012 causes the output from the read flip-flop 2714 to be introduced through the transistors 3018 and 3016, and this provides a shift to the right, this being desired for the reasons described above. For the ($C_{12}$) character, the transistor 3006 becomes conductive and the transistor 3002 is also conductive for multiplication. This causes a decimal zero (III) from the circuitry of FIGURE 31 to be introduced through the transistor 3004 to replace the original ($C_{12}$) character position as the contents of the revolver 3 are shifted to the right.

When all the characters in the revolver 3 have been replaced by ($\overline{III}$'s), the flip-flop 3340 will still be true just before $C_{12}$ character time. It will be remembered that the flip-flip was original triggered true at ($C_{12}S_{11\frac{1}{2}}$) time. Then, if it is still true at ($C'_{12}$) time, which is twelve character times later, it will indicate that all the characters in the revolver 3 are now ($\overline{III}$'s). When that occurs, the transistor 1578 of the circuitry of FIGURE 57 is made conductive at the same time as the transistors 1564 and 1574. This causes the (FIN) flip-flop 1515 to be triggered true. It will be remembered that when the term (FIN) is true, the next command is executed. In the present instance, this term becomes true at the completion of the multiplication operation.

For division the dividend is placed in the revolver 1, and the divisor is placed in the revolver 2. The quotient then appears in the revolver 3. The number of digits in the quotient is under the control of the programmer. This is predetermined by placing prior to division of a number of consecutive L's in the revolver 3 from the left or most significant side. This number of L's will correspond to the number of digits which will appear in the quotient. The character after the last L must be a zero. The least significant digit will occupy the $C_2$ position of revolver 3 and a decimal zero will always be automatically inserted in the $C_1$ position of that revolver. After division, the revolver 2 will contain the divisor unchanged, and revolver 1 will contain the remainder, the remainder being shifted left one character position for each L originally placed in the revolver 3.

The relative character positions of the dividend in revolver 1 and the divisor in revolver 2 are arranged so that the dividend is always less than ten times as great as the divisor. Then, the contents of the revolver 2 are subtracted from the contents of the revolver 1, with the difference being placed in the revolver 1, repeatedly until the contents of the revolver 2 are greater than the contents of the revolver 1. A TALLY 1 is entered into the revolver 3 for each such subtraction. When the contents of the revolver 2 are greater than those of the revolver 1, a shift is made to the left in the revolver 1 and in the revolver 3, and the processes are repeated.

As in multiplication, the address (2) is used to bring the contents of the revolver 2 into the adder of FIGURE 77. For division ($GD_1$) is a 1 instead of a 0, as it was for multiplication. And, as described above, the adder circuit subtracts rather than adds. Therefore, for the instruction DIV (2), the adder subtracts the contents of the revolver 2 from the contents of the revolver 1, which is desired for division, as mentioned above.

The subtraction operations described above are carried out when a term (*ds*) is false, and the above described shifting operations occur when this term is true. It will be remembered that the term (*ds*) is true when the contents of revolver 2 become greater than the contents of revolver 1.

The composite term (DIV.*ds*), and the composite term ($DIV.\overline{ds}$) are formed by the circuitry of FIGURE 83. This circuit includes a pair of grounded emitter transistors 3450 and 3452, both having their collectors connected to a common lead 3454. This common lead is connected to a resistor 3456 which has a resistance of 2.2 kilo-ohms, and which is connected to the negative terminal of the 3-volt direct voltage source.

The term ($\overline{DIV}$) from the circuit of FIGURE 54 is introduced to the base of the transistor 3450; and the term (*ds*) which is derived from the circuit of FIGURE 84, is applied to the base of the transistor 3452. The composite term ($DIV.\overline{ds}$) is derived at an output terminal connected to the common lead 3454.

The common lead 3454 is also connected to the base of a transistor 3458. The emitter of this transistor is grounded, and its collector is connected to a resistor 3460. The resistor has a resistance of 2.2 kilo-ohms, and it is connected to the negative terminal of the 3-volt direct voltage source. The collector of the transistor 3458 is connected to a common lead 3462, and the collector of a grounded emitter transistor 3464 is also connected to that lead. The term ($\overline{DIV}$) from the circuit of FIGURE 54 is also introduced to the base of the transistor 3464. The composite term (DIV.*ds*) is obtained at an output terminal connected to the common lead 3462.

Figure 88:
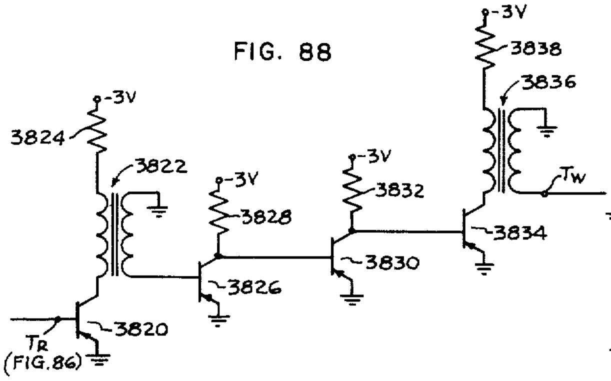
Figure 87:
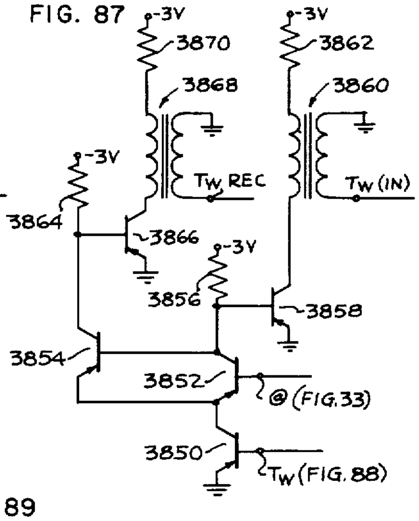

As noted above, the term (*ds*) is produced by the circuitry of FIGURE 84. This circuit includes a flip-flop 3470. A transistor 3472 has its collector connected to the left input terminal of the flip-flop 3470, and a transistor 3474 has its collector connected to the right input terminal. A transistor 3476 has its collector connected to the emitters of the transistors 3472 and 3474, and the emitter of the transistors 3476 connects with the collector of a grounded emitter transistor 3478. The term 60 discussed in conjunction with FIGURE 70 is applied to the base of the transistor 3474, and the term ($\overline{60}$) is applied to the base of the transistor 3472. The term ($\overline{60=1}$) derived from the circuitry of FIGURE 72 is applied to the base of the transistor 3476, and the term ($T_W$) derived from the circuit of FIGURE 88 is applied to the base of the transistor 3478.

A transistor 3480 has its collector connected to the left input terminal of the flip-flop 3470, and the emitter of the transistor 3480 is connected to the collector of a grounded emitter transistor 3482. The timing signal ($C_1S_{11}$) is applied to the base of the transistor 3480, and the term (60=1) from the circuit of FIGURE 72 is introduced to the base of the transistor 3482.

A term (*ds'*) is produced at the right output terminal of the flip-flop 3470, and this term is applied to the base of a transistor 3484. A term ($\overline{ds'}$) is obtained at the left output terminal of the flip-flop 3470, and this latter term is applied to the base of a transistor 3486.

The collector of the transistor 3484 is connected to the right input terminal of a flip-flop 3488, and the collector of the transistor 3486 is connected to the left input terminal of the flip-flop 3488. A grounded emitter transistor 3590 has its collector connected to the emitters of the transistors 3484 and 3486, and the emitter of the transitsor 3490 is grounded. The timing signal ($S_1C'_1$) is applied to the base of the transistor 3490. The term (*ds*) is obtained at the right output terminal of the flip-flop 3488.

It will be remembered that the circuit of FIGURE 72 produces the term (60=1) whenever the contents 60 are equal to the contents of the data revolver 1. For the present operations, and under the instruction DIV (2), the contents (60) are the contents of the data revolver 2. Therefore, (60=1) is true whenever the contents of the revolver 2 are equal to the contents of the revolver 1. When ($\overline{60=1}$) is true, the contents of the revolver 2 are not equal to the contents of the revolver 1. Then, each bit of the contents 60 which is a 1 and which produces the term ($\overline{60=1}$) is greater than the corresponding bit of the data revolver.

If the first bit of the character under consideration of the contents (60) is equal to the first bit of the corresponding character in the data revolver 1, the resulting conductivity of the transistors 3480 and 3482 will trigger the flip-flop 3470 true. Then the flip-flop 3470 will remain true until a bit is reached in the contents (60) which is a 1 and which is greater than the corresponding bit in the revolver 2. The resulting conductivity of the transistors 3474 and 3476 and 3478 at ($T_W$) time causes the flip-flop 3474 to be triggered true. The flip-flop 3470 is therefore triggered back and forth each time a bit of the contents (60) is different from a bit of the contents of the revolver 1. Then, the flip-flop 3470 is triggered true if the unequal bit in the contents (60) is a 1 and is triggered false if the unequal bit in the contents (60) is a 0. The triggering of the flip-flop 3474 continues character by character for the entire word of the contents (60) and of the revolver 1. The last triggering of the flip-flop 3470 before the end of the word will indicate the most significant bit of the most significant character at which an inequality occurs. Then, if the contents (60), which are the contents of the revolver 2, are greater at this point than the contents of the revolver 1, the term (*ds'*) is true. Then, at the beginning of the first character time of the next word and at $(S_1C_1')$ time, the flip-flop 3488 is triggered true to make $(ds)$ true. This indicates a shift, which is desired because the contents of the revolver 2 are greater than the contents of the revolver 1. On the other hand, if the contents of the revolver 2 are still less than the revolver 1, the term $(\overline{ds'})$ is true so that the flip-flop 3488 is triggered false to represent that an additional subtraction of the contents of the revolver 2 from the difference in the revolver 1 is to take place.

It will be noted that the transistor 2582 of the circuitry associated with the revolver 2 of FIGURE 74 becomes conductive upon the execution of the (DIV) command. This breaks the circulating loop of the revolver 2, this being desired because throughout the entire command a new difference is being placed in the revolver 2 or its contents are being shifted to the left.

As described above, whenever the term $(\overline{ds})$ is true, a subtraction is to be made. This causes the term $(DIV \cdot ds)$ to be true, so that the transistor 2544 is conductive. This permits the contents 61 from the adder to be read into the revolver 1. It will be remembered that the contents (61) now represents the difference between the original contents of the revolver 1 and the contents of the revolver 2. So long as the term $(DIV \cdot \overline{ds})$ is true, a new difference continues to be read into the revolver 1. This operation continues until the difference in revolver 1 is less than the contents of revolver 2.

Then, the term $(DIV \cdot \overline{ds})$ becomes false and the transistor 2544 is no longer conductive. Now the term $(DIV \cdot ds)$ becomes true to render the transistor 2510 conductive. This causes the left output terminal of the read flip-flop 2458 to be introduced from the transistor 2506 through the transistor 2504 and through the transistor 2510 into the write flip-flop 2478 so that the contents of the revolver 1 are shifted to the left. At $(C_1)$ time, the original character is replaced by a (III) due to the conductivity of the transistor 2512 and the nonconductivity of the transistor 2504.

There is no control on the data revolver 2 during division, because the divisor continues to circulate unchanged through the revolver, and, at the same time, to be fed into the adder of FIGURE 72 due to the address 2 causing the contents of the revolver 2 to become the contents (60).

The circuit of FIGURE 81 is used during division to place a 1 in the revolver 3 for each subtraction made of the contents of the revolver 2 from the contents of the revolver 1 between shifts. The term $(GD_1)$ is now a 1 during division, so that the tally circuitry of FIGURE 81 in effect adds a 1 into the revolver 3 for division, in the same manner in which it subtracted a 1 for multiplication. It will be remembered that the flip-flop 3436 of FIGURE 81 is false at all times except during the $(C_1)$ character time. So long as this flip-flop is false, the term (TAL) is the same as the original contents of the revolver 3. Therefore, for all character times except character $(C_1)$ time, the term (TAL) is in effect the contents of the revolver 3. However, during $(C_1)$ time, the term (TAL) is compared with 1 in the exclusive "or" network 3418 for division, so that the flip-flop 3436 is triggered true during $(C_1)$ time in such a manner that the term (TAL) at the output of the exclusive "or" network 3400 is 1 greater than the previous term represented at the (C) position in the revolver 3.

The circulating loop of the data revolver 3 of FIGURE 76 is broken when the term (DIV) is true, this being due to the conductivity of the transistor 3042. Then, so long as the term $(DIV \cdot \overline{ds})$ is true, the transistor 3021 is conductive, and the term (TAL) is fed into the data revolver 3. This term, is the equivalent of circulating the original contents of the revolver 3, with the exception that the $(C_1)$ character is increased by binary 1 for each circulation, that is, for each word time.

The above circulations continue so long as $(DIV \cdot \overline{ds})$ is true. However, when the contents of the revolver 2 become greater than the contents of the revolver 1, this term becomes false and cuts off the conductivity of the transistor 3021. At the same time, the term $(DIV \cdot ds)$ becomes true to render the transistor 2734 conductive so that the contents of the read flip-flop 2706 are read through the transistor 3000 and through the transistors 2734 and 2736 into the write flip-flops 2718. This provides the desired shift to the left. The shifted $(C_1)$ character is replaced by a (III) due to the conductivity of the transistor 2738 and the nonconductivity of the transistor 2736 at $(C_1)$ time.

Therefore, the term (TAL) is entered into the revolver 3 to form the first, or most significant, decimal digit of the quotient. This first character is shifted to the left upon the occurrence of the conditions described above, and the contents of the revolver 3 are shifted so that the next decimal digit of the quotient may be formed.

The above operation continues from step to step, with each shift of the revolver 3 causing an L to be shifted out of the revolver. These L's, as mentioned above, are inserted in the revolver 3 by the programmer. So long as shift of the revolver 3 causes an L to be shifted out, the process will continue. However, which such a shift causes a (III) to be shifted out of the revolver 3, the (FIN) flip-flop of FIGURE 57 is triggered to bring the process to a halt. Then, the quotient will appear in the revolver 3 shifted to the left one position, with the extreme right hand decimal digit being a 0, the remainder will appear in the revolver 1 similarly shifted, and the divisor will remain in its original position in the revolver 2.

It will be remembered that the term (MFK) is true for each decimal zero (III) digit in the revolver 3, this term being divided by the circuit of FIGURE 73. When the term (MFK) is true, the transistor 1576 of the (FIN) circuit of FIGURE 57 is conditioned for conduction. Also, the term $(DIV \cdot ds)$ conditions the transistor 1566 for conduction. This means that both the transistors 1566 and 1576 are conditioned for conduction upon a shift during division and when a decimal zero (or III) is reached in the revolver 3. When this occurs, the flip-flop 1550 is triggered true by the timing signal $(C'_{12})$ just after the twelfth character time so that the term (FIN) is true to terminate the process.

The timing signals $T_R$, $T_W$ and $T_C$ of FIGURE 1D are formed by the circuits of FIGURES 85, 86 and 88. The term $(T_R)$ occurs each bit time, and it is formed by the circuit of FIGURE 86. This circuit includes a common lead 3800, and a plurality of grounded emitter transistors 3802, 3804, 3806, 2808, 3810, 3812 and 3814 have their collectors connected to the common lead. The timing signals $S_1$, $S_2$, $S_3$, $S_4$, $S_5$, $S_6$ and $S_7$ are introduced to the bases of respective ones of the transistors. These timing signals $(S_1–S_7)$ are obtained from an appropriate delay line, with the signals occurring at the respective bit times of each binary character. Such a system is described and claimed in copending application, S.N. 167,337, filed October 15, 1958, by Frank Hill et al.

The common lead 3800 is connected to the primary of a transformer 3816, and the primary is connected to a resistor 3818. The resistor has a resistance of 220 ohms, and it is connected to the negative terminal of the 3-volt direct voltage source. The secondary of the transformer 3816 is connected to an output terminal designated $(T_R)$ and to ground. The timing signal $T_R$, as shown in FIGURE 1D, therefore occurs during each bit time.

As described above, the timing signal $(T_R)$ occurs at the beginning of each bit time, the timing signal $(T_C)$ occurs during the middle of each bit time, and the timing signal $(T_W)$ occurs at the end of each bit time. This splitting up of the timing signals permits the same data to be read and then written without the loss of time during the transition.

The signal $(T_W)$ is formed by the circuit of FIGURE 88. This circuit includes a transistor 3820, the signal ($T_R$) being applied to the base of this transistor. The emitter of the transistor 3820 is grounded and the collector is connected to the primary of a transformer 3822. The other terminal of the primary is connected to a resistor 3824. This resistor has a resistance of 3.9 kilo-ohms, and it is connected to the negative terminal of the 3-volt direct voltage source.

The secondary of the transformer 3822 has one terminal grounded, and other terminal is connected to the base of a grounded emitter transistor 3826. The collector of the transistor 3826 is connected to a resistor 3828 having a resistance of 2.2 kilo-ohms, and this resistor is connected to the negative terminal of the 3-volt direct voltage source. The collector of the transistor 3826 is also connected to the base of a grounded emitter transistor 3830, and the collector of the latter transistor is connected to a resistor 3832. The resistor 3832 has a resistance of 1.5 kilo-ohms, and it is connected to the negative terminal of the 3-volt direct voltage source.

The collector of the transistor 3830 is also connected to the base of a grounded emitter transistor 3834. The collector of the latter transistor is connected to the primary of a transformer 3836, and this primary is connected to a resistor 3838. The resistor 3838 has a resistance of 220 ohms, and it is connected to the negative terminal of the 3-volt direct voltage source. The secondary of the transformer 3836 has one terminal grounded, and the other terminal is connected to an output terminal designated ($T_W$). The timing signal ($T_W$) appears at the output terminal.

The timing signal ($T_C$) is developed by the circuitry of FIGURE 85. The timing signal ($T_W$) of FIGURE 88 is introduced to the base of a transistor 3840. The emitter of this transistor is grounded and its collector connects with the primary of a transformer 3842. The other terminal of the primary is connected to a resistor 3844 which has a resistance of 220 ohms, and this resistor is connected to the negative terminal of the 3-volt direct voltage source. One terminal of the secondary winding of the transformer 3842 is grounded, and the other terminal is connected to an output terminal at which the timing signal ($T_C$) appears.

It will be remembered that the circuitry of FIGURE 60 associated with the memory block register utilizes the timing signals $T_W$ (in) and $T_W$ (rec). These timing signals are formed by the circuitry of FIGURE 87. The timing signal ($T_W$) is applied to the base of a grounded emitter transistor 3850. The collector of this transistor is connected to the emitter of a transistor 3852 and to the emitter of a transistor 3854. The signal corresponding to the command @ is applied to the base of the transistor 3852. This command concerns the memory block register, as described above, and it is derived by the circuitry of FIGURE 33.

The collector of the transistor 3852 is connected to the base of the transistor 3854, to a resistor 3856 and to the base of a transistor 3858. The resistor 3856 has a resistance of 3.9 kilo-ohms, and this resistor is connected to the negative terminal of the 3-volt direct voltage source. The emitter of the transistor 3858 is grounded, and its collector is connected to the primary winding of a transformer 3860. The other terminal of the primary is connected to a 3.9 kilo-ohm resistor 3862, which in turn connects with the negative terminal of the 3-volt direct voltage source. One terminal of the secondary of the transformer 3860 is grounded, and the other is connected to an output terminal at which the term $T_W$ (in) is produced.

The collector of the transistor 3854 is connected to a 3.9 kilo-ohm resistor 3864 which is connected to the negative terminal of the 3-volt direct voltage source. This collector is also connected to the base of a grounded emitter transistor 3866, the collector of the latter transistor being connected to the primary of a transformer 3868. The other terminal of this primary is connected to a resistor 3870, this resistor having a resistance of 220 ohms, and being connected to the negative terminal of the 3-volt direct voltage source. One terminal of the secondary winding of the transformer 3868 is grounded, and the other is connected to an output terminal at which the timing signal $T_W$ (REC) is formed.

Figure 89:
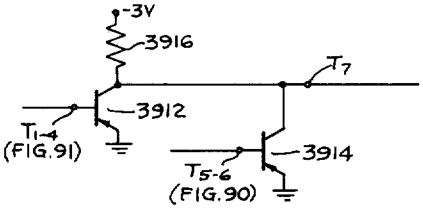

The timing signals $T_{1\text{-}4}$, $T_{5\text{-}6}$, and $T_7$ are formed by the circuits of FIGURES 89, 90 and 91. It will be remembered that the timing signal ($T_{1\text{-}4}$) goes negative for the first four bits of each character, the signal ($T_{5\text{-}6}$) goes negative for the fifth and sixth bits of each character, and the signal ($T_7$) goes negative for the seventh bit of each character.

The term ($T_{1\text{-}4}$) is formed in the circuit of FIGURE 91, and this circuit includes a flip-flop 3900. A transistor 3902 has its collector connected to the left input terminal of the flip-flop 3900, and a transistor 3904 has its collector connected to the right input terminal of the flip-flop. The emitters of both these transistors are grounded. The timing signal ($S_1$) of FIGURE 1D is applied to the base of the transistor 3904, and the timing signal ($S_5$) is applied to the base of the transistor 3902.

Therefore, the flip-flop 3900 is triggered true at the beginning of the first bit of each character, and this flip-flop is triggered false at the beginning of the fifth bit of each character. The flip-flop is therefore true for the first four bit times of each character. The term ($T_{1\text{-}4}$) is therefore produced at the right output terminal of the flip-flop 3900, and the term ($\overline{T_{1\text{-}4}}$) is produced at the left output terminal of the flip-flop.

The timing signal ($T_{5-6}$) is produced by the circuitry of FIGURE 90. This circuit includes a flip-flop 3906. A grounded emitter transistor 3908 has its collector connected to the left input terminal of the flip-flop, and a grounded emitter transistor 3910 has its collector connected to the right input terminal of the flip-flop. The timing signal $S_5$ of FIGURE 1D is applied to the base of the transistor 3910, and the timing signal ($S_7$) is applied to the base of the transistor 3908. The flip-flop 3906 is triggered true, therefore, at the beginning of the fifth bit time of each character, and the flip-flop is triggered false at the beginning of the seventh bit time of each character. The flip-flop is true, therefore, for the fifth and sixth bit times of each character. Therefore, the timing signal ($T_{5-6}$) is produced at the right output terminal of the flip-flop.

The timing signal ($T_7$) is produced by the circuitry of FIGURE 89. This circuitry includes a pair of grounded emitter transistors 3912 and 3914. The collectors of both these transistors are connected to a resistor 3916 and to an output terminal at which the timing signal ($T_7$) is produced. The resistor 3916 has a resistance of 2.2 kilo-ohms, and it is connected to the negative terminal of the 3-volt direct voltage source.

The timing signal ($T_{1-4}$) is applied to the base of the transistor 3912, and the timing signal ($T_{5-6}$) is applied to the base of the transistor 3914. Therefore, the output terminal ($T_7$) is reduced to zero at all times except for the seventh bit time of each character. Only during that time are both the transistors 3912 and 3914 nonconductive so that the term ($T_7$) becomes high negative.

The decimal zero ($\overline{III}$) generator is shown in FIGURE 92. It will be remembered that this generator is addressed by the address (8), and it serves to replace the contents of a revolver or block register with decimal zeros, or $\overline{III}$'s. The circuit of FIGURE 92 includes a flip-flop 3920. A pair of grounded emitter transistors 3922 and 3924 both have their collectors connected to the left input terminal of the flip-flop 3920. In like manner, a pair of grounded emitter transistors 3926 and 3928 have both their collectors connected to the right input terminal of the flip-flop 3920. The term ($\overline{III}$) is formed at the right output terminal of the flip-flop.

The timing signal ($S_3$) is applied to the base of the transistor 3924, the term ($S_6$) is applied to the base of the transistor 3922, the timing signal ($S_5$) is applied to the base of the transistor 3928 and the timing signal ($S_7$) is applied to the base of the transistor 3926.

It will be remembered that decimal zero ($\overline{III}$) is equal to 1100101, with the least significant digit being at the left. The triggering of the flip-flop 3920 is such that it is true for the first two bits, it is false for the third and fourth bits, it is true for the fifth bit, it is false for the sixth bit, and it is true for the seventh bit. Therefore, when this term is used in conjunction with any of the clocked flip-flops, the required decimal zero of 1100101 is produced.

The timing signals ($C_1$) and ($C'_1$) are formed by the circuitry of FIGURE 93. This circuit includes a flip-flop 3930. A transistor 3932 has its collector connected to the left input terminal of the flip-flop 3930, and a transistor 3934 has its collector connected to the right input terminal of the flip-flop. The emitters of the transistors 3932 and 3934 are both connected to the collector of a transistor 3936. The emitter of the latter transistor is grounded and the timing signal $S_5$ is applied to the base. The timing signal ($C_{12}$) is applied to the base of the transistor 3934, and its converse ($\overline{C_{12}}$) is applied to the base of the transistor 3932. It will be remembered that the timing signal ($C_{12}$) goes high negative for the twelfth character time of each word. The transistor 3936 becomes conductive at the beginning of the fifth bit of each character. Therefore, the flip-flop 3930 is triggered true at the beginning of the fifth bit of the twelfth character of each word, and it is triggered false at the beginning of the fifth bit of the first character of the following word, at which time ($\overline{C_{12}}$) is true.

The timing signal ($C_1'$) is produced at the right output terminal of the flip-flop 3930, and the timing signal $\overline{(C_1')}$ is produced at the left output terminal. The timing signal ($C_1'$), therefore, goes high negative at the fifth bit time of each character preceding a new word, and it goes to zero at the fifth bit time of the first character of the new word.

The term ($C_1'$) is applied to the base of a transistor 3938, and the term $\overline{(C_1')}$ is applied to the base of a transistor 3940. A grounded emitter transistor 3942 has its collector connected to the emitters of the transistors 3938 and 3940. The timing signal ($S_1$) is introduced to the base of the transistor 3942. The collector of the transistor 3940 is connected to the left input terminal of a flip-flop 3944, and the collector of the transistor 3938 is connected to the right input terminal of that flip-flop. The term ($C_1$) is formed at the right output terminal of the flip-flop 3944, and the term ($\overline{C_1}$) is formed at the left output terminal. This timing signal ($C_1$), as shown in FIGURE 1B, goes negative at the first bit time of the first character of each word, due to the conductivity of the transistor 3942 and of the transistor 3938. The term then goes zero at the end of the first character of the word, due to the conductivity of the transistor 3940 and of the transistor 3942.

The character counting signal (CA) is formed by the delay lines 3950 and 3952 of FIGURE 94 and by the circuitry associated with these delay lines. The delay lines 3950 and 3952 provide a 12-bit or 1 character delay, and they may be of the type described previously. A write flip-flop 3954 has its left output terminal connected to the input terminal ($CAW_1^0$) of the delay line 3950, and it has its right output terminal connected to the input terminal ($CAW_0^1$) of the delay line 3952. The flip-flop 3954 introduces the signal ($CAW_1^0$) to the delay line 3950, and it introduces the signal ($CAW_0^1$) to the flip-flop 3952.

Each of the delay lines 3950 and 3952 as mentioned, has a delay corresponding to one character, which in turn corresponds to seven binary bits. The output terminal of the delay line 3950 is connected to the base of a transistor 3956, and the output terminal of the delay line 3952 is connected to the base of a transistor 3958. The emitters of both these transistors are connected to the collector of a grounded emitter transistor 3960. The collector of the transistor 3956 is connected to the left input terminal of a read flip-flop 3962, and the collector of the transistor 3958 is connected to the right input terminal of that flip-flop. The timing signal ($T_C$) is introduced to the base of the transistor 3960.

The right output terminal of the flip-flop 3954 is also connected to the base of a transistor 3964. The emitter of the transistor 3964 connects with the collector of a grounded emitter transistor 3966. The signal ($T_C$) is applied to the base of the transistor 3966. The collector of the transistor 3964 is connected to the left input terminal of a flip-flop 3968. The right input terminal of the flip-flop is connected to the collector of a transistor 3970 and to the collector of a grounded emitter transistor 3972. The timing signal ($S_6$) is applied to the base of the transistor 3970, and the timing signal ($S_4$) is applied to the base of the transistor 3972. The emitter of the transistor 3970 is also connected to the collector of a grounded emitter transistor 3974. The timing signal ($C_{12}$) is applied to the base of the transistor 3974.

The right output terminal of the flip-flop 3968 is connected to the base of a grounded emitter transistor 3976, and the right output terminal of the flip-flop 3962 is connected to the base of a grounded emitter transistor 3978. These latter transistors are connected in an exclusive "or" network 3980 of the type described above, and the output terminal of the exclusive "or" network 3980 is connected to the base of a transistor 3982 and to the base of a grounded emitter transistor 3984. The collector of the latter transistor is connected to a 2.2 kilo-ohm resistor 3986, which in turn connects with the negative terminal of the 3-volt direct voltage source.

The collector of the transistor 3984 is also connected to the base of a transistor 3988. The emitter of the latter transistor, and the emitter of the transistor 3982, are connected to the collector of a grounded emitter transistor 3990. The timing signal ($T_W$) is applied to the base of the transistor 3990. The collector of the transistor 3988 is connected to the left input terminal of the flip-flop 3954, and the collector of the transistor 3982 is connected to the right input terminal of that flip-flop. The circulation of data through the assembly of FIGURE 94 causes the write flip-flop 3954 to produce the character counting signal (CA) at its right output terminal. This signal has the characteristics described above in conjunction with the table of FIGURE 2.

The timing signal ($C_{12}$) is formed by the circuitry of FIGURE 95. This timing signal goes negative for the twelfth character of each word. The circuit of FIGURE 95 includes a flip-flop 3992. A transistor 3994 has its collector connected to the left input terminal of that flip-flop, and a transistor 3996 has its collector connected to the right input terminal of that flip-flop. The timing signal ($C_{12}$) is produced at the right output terminal of the flip-flop 3992.

The emitters of the transistors 3994 and 3996 are both connected to the collector of a grounded emitter transistor 3998. The term ($CA_C$) from the circuit of FIGURE 94 is applied to the base of the transistor 3996, and the term $\overline{(CA_C)}$ from that circuit is applied to the base of the transistor 3994. The timing signal ($S_1$) is applied to the base of the transistor 3998. The term ($CA_C$) is negative at such times that the occurrence of the negative portion of the signal $S_1$ causes the flip-flop 3992 to be triggered at the first bit time of the twelfth character of each word. Likewise, the flip-flop 3992 is returned false at the beginning of the following character time when ($S_1$) again goes high negative. At this time, the term $\overline{(CA_C)}$ is true.

The term ($CA_C$) is also used to form the timing signal ($C_{12}'$). The timing signal ($C_{12}'$) goes high negative just before the twelfth character of each word, and this signal is formed by the circuit of FIGURE 96. The circuit of FIGURE 96 includes a grounded emitter transistor 4000. The collector of the transistor 4000 is connected to the emitter of a transistor 4002. The collector of the latter transistor is connected to a resistor 4004 and to the base of a grounded emitter transistor 4006. The resistor 4004 has a resistance of 3.9 kilo-ohms, and it is connected to the negative terminal of the 3-volt direct voltage source.

The collector of the transistor 4006 is connected to a resistor 4008 and to an output terminal at which the timing signal ($C_{12}'$) is produced. The resistor 4008 has a resistance of 2.2 kilo-ohms, and it is connected to the negative terminal of the 3-volt direct voltage source.

The term $CA_C$ is applied to the base of the transistor 4002. The signal $S_1$, on the other hand, is applied to the base of the transistor 4000. Therefore, the transistors 4000 and 4002 thus beome conductive just before each twelfth character time. This causes the term ($C_{12}'$) to go high negative at those times.

The term (BLK) is formed by the circuitry of FIGURE 97. The circuit of FIGURE 97 includes a flip-flop 4010. The term (BLK) is formed at the right output terminal of this flip-flop, and the term ($\overline{BLK}$) is formed at the left output terminal. A transistor 4012 has its collector connected to the left input terminal of the flip-flop 4010, and the term $\overline{(CA_C)}$ of FIGURE 94 is introduced to the base of that transistor. A transistor 4014 has its collector connected to the emitter of the transistor 4012, and the timing signal ($C_{12}$) produced by the circuitry of FIGURE 95 is applied to the base of the transistor 4014.

A transistor 4016 has its collector connected to the right input terminal of the flip-flop 4010 and the term ($CA-R$) derived from the read flip-flop 3962 of FIGURE 94 is applied to the base of that transistor. A transistor 4018 has its collector connected to the emitter of the transistor 4016, and the term $CA_C$ is applied to the base of the transistor 4018.

A grounded emitter transistor 4020 has its collector connected to the emitters of the transistors 4014 and 4018, and the timing signal $S_3$ is applied to the base of the transistor 4020. The above described terms cooperate to cause the term (BLK) to go negative at the times described above.

The invention provides, therefore, an improved digital computer of the serial type. In the manner described, the use of the particular delay line assemblies in the described embodiment of the invention permits read heads and associated circuitry to be coupled to the delay lines to permit the reading of the data to be carried out at different points on the delay lines. This permits a convenient shift circuitry for the revolvers and block registers to be incorporated, and it also permits for a simplification in the arithmetic operations of the apparatus.

The use of expandable input and output buffers, and of the described expandable storage memory, provides for a desired flexibility. This enables each computer constructed in accordance with the described embodiment of the invention to be tailored to its actual application, and this results in optimum efficiency and maximum economy.

As also described, the macro commands of the computer of the invention are stored as such and in the form of general command words. These commands are separated from the address portions, and each are fed to separate revolvers for the execution of each instruction. This, as noted above, results in a material saving of the storage space of the computer, and it also simplifies the programming of the equipment.

The concept of partial addressing for the expandible memory reduces the required number of different address words, and this also results in an economy of storage requirements. For added flexibility, the computer is capable of masking operations, by which only certain desired characters of the different words may be utilized.

In general, the computer of the invention is constructed in a rugged manner and by the utilization of a minimum amount of circuitry. This results in an economical unit, and yet one which exhibits a high degree of reliability and precision.

I claim:

1. In a digital computer, the combination of: at least one first circulating block storage register for storing signals representative of a plurality of different groups of individual related computer commands, at least one second circulating block storage register for storing signals representative of a plurality of different groups of individual addresses of operands stored in the computer, a first circulating revolver register for holding signals representative of a single group of commands, a second circulating register for holding signals representative of a single group of computer addresses, first control circuitry coupled to said first block storage register and to said first revolver for transferring signals corresponding to a selected group of commands to said first revolver register, second control circuitry coupled to said second block storage register and to said second revolver register for transferring signals corresponding to a selected group of computer addresses to said second revolver register, executing means responsive to the signals corresponding to individual commands of the group in said first revolver register and responsive to the signals corresponding to individual addresses of the group in said second revolver register to select and perform computer operations on the operands stored in the computer in accordance with the signals from the first and second revolver registers, and further control circuitry coupled to the first and second revolver registers and to the executing means for shifting signals corresponding to the individual commands from the first revolver register to said executing means on a sequential basis and for concurrently shifting signals corresponding to the individual addresses from said second revolver register to said executing means on a sequential basis.

2. The combination defined in claim 1 and in which said first and second control circuitry each includes a time-controlled detector means.

3. The combination defined in claim 1 and which includes an input-output buffer including a plurality of storage registers for individually storing signals representative of a predetermined number of computer words, a transfer register for storing signals representative of said predetermined number of computer words, first transfer circuit means coupled to said plurality of storage registers in said input-output buffer and to said transfer register for controlling the transfer of signals between said transfer register and said plurality of storage registers in said input-output buffer, and second transfer circuit means coupled to said transfer register and to said first and second circulating block registers for controlling the transfer of signals between said first and second circulating block registers and said transfer register.

4. The combination defined in claim 1 and which includes an input-output buffer including a plurality of storage registers for individually storing signals representative of a predetermined number of computer words, a transfer register for storing signals representative of said predetermined number of computer words, first transfer circuit means coupled to said plurality of storage registers in said input-output buffer and to said transfer register for controlling the transfer of signals between said transfer register and said plurality of storage registers in said input-output buffer, and second transfer circuit means coupled to said transfer register and to said executing means to control the transfer of signals between said executing means and said transfer register.

5. The combination defined in claim 1 and which includes an input-output buffer including a plurality of storage registers for individually storing signals representative of a predetermined number of computer words, a transfer register for storing signals representative of said predetermined number of computer words, first transfer circuit means coupled to said plurality of storage registers in said input-output buffer and to said transfer register and said plurality of storage registers in said input-output buffer, a second plurality of storage registers for individually storing signals representative of a predetermined number of computer words, second transfer circuit means coupled to said transfer register and to said second plurality of storage registers for controlling the transfer of signals between said transfer register and said storage registers of said second plurality, and third transfer circuit means coupled to said executing means and to said storage registers of said second plurality for controlling the transfer of signals between said executing means and said storage registers of said second plurality.

6. The combination defined in claim 1 and which includes an input-output buffer including a plurality of storage registers for individually storing signals representative of a predetermined number of computer words, a transfer register for storing signals representative of said predetermined number of computer words, first transfer circuit means coupled to said plurality of storage registers in said input-output buffer and to said transfer register for controlling the transfer of signals between said transfer register and said plurality of storage registers in said input-output buffer, a second plurality of storage registers for individually storing signals representative of a predetermined number of computer words, second transfer circuit means coupled to said transfer register and to said second plurality of storage registers for controlling the transfer of signals between said transfer register and said storage registers of said second plurality, and third transfer circuit means coupled to said executing means and to said storage registers of said second plurality for controlling the transfer of signals between said executing means and said storage registers of said second plurality.

7. The combination defined in claim 1 and in which said first and second control circuitry each includes time-controlled detector means, and which includes timing means for synchronizing the operation of said time-controlled detector means with the circulation of the signals in the first and second circulating block storage registers.

8. The combination defined in claim 7 and in which said timing means produces different count signals indicative of the circulation of the signals in the first and second circulating storage registers, and in which said first and second control circuitry each includes a compare network for comparing the different count signals from the timing means with signals derived from said executing means in response to particular command and address signals introduced thereto.

9. In a digital computer, the combination of: memory means for separately storing computer commands, operands, and addresses of the operands, and for selectively producing signals representative of the separately stored commands, operands and addresses; a first register means for holding at least one command selected from said memory means and for producing signals representative thereof; a second register means for holding at least one address selected from said memory means and for producing signals representative thereof; first control circuitry coupled to said memory means and to said first register means for selectively transferring signals corresponding to a selected command from said memory means to said first register means; second control circuitry coupled to said memory means and to said second register means for selectively transferring signals corresponding to a selected address from said memory means to said second register means; executing means; third control circuitry coupled to said first and second register means and responsive to the command in said first register means and to the address in said second register means to select an operand from said memory means and apply the selected operand to said executing means; and further control circuitry coupled to said first and second register means for causing the command from said first register means and the address from said second register means to be applied to said third control circuitry.

10. In a digital computer, the combination of: memory means for storing groups of related computer commands and for selectively producing binary signals representative of the individual groups, for separately storing a plurality of operands for use in the computer and for selectively producing binary signals representative of the individual operands, and for separately storing groups of addresses of the operand and for selectively producing binary signals representative of the individual groups; a first register means for holding individual groups of commands from said memory means and for producing binary signals representative of the successive individual commands in the group; a second register means for holding individual groups of addresses from said memory means and for producing binary signals representative of the successive individual addresses in the group; first control circuitry coupled to said memory means and to said first register means for selectively transferring signals corresponding to a selected group of commands from said memory means to said first register means; second control circuitry coupled to said memory means and to said second register means for selectively transferring signals corresponding to a selected group of addresses from said memory to said second register means; executing means; third control circuitry coupled to said first and second register means and responsive to individual commands of the group in said first register means and to individual addresses of the group in said second register means to select operands from said memory means and to apply the selected operands to said executing means; and further control circuitry coupled to said first and second register means and to said third control circuitry for causing individual commands from said first register means and corresponding individual addresses from said second register means together to be successively applied to said third control circuitry.

11. In a digital computer, the combination of: a first memory means for storing groups of related computer commands and for selectively producing binary signals representative of the different individual groups; a second memory means for storing a plurality of operands for use in the computer and for selectively producing binary signals representative of the individual operands; a third memory means for separately storing groups of addresses of the operands stored in said second memory means and for selectively producing binary signals representative of the individual groups; a first register means for holding individual groups of commands from said first memory means and for producing binary signals representative of the successive individual commands in the group; a second register means for holding individual groups of addresses from said third memory means and for producing binary signals representative of the successive individual addresses in the group; first control circuitry coupled to said first memory means and to said first register means for selectively transferring signals corresponding to a selected group of commands from said first memory means to said first register means; second control circuitry coupled to said third memory means and to said second register means for selectively transferring signals corresponding to a selected group of addresses from said third memory means to said second register means; executing means; third control circuitry coupled to said first and second register means and responsive to individual commands of the group in said first register means and to individual addresses of the group in said second register means to select operands from said second memory means and transfer the selected operands to said executing means; and further control circuitry coupled to said first and second register means and to said third control circuitry for causing the individual commands from said first register means and corresponding individual addresses from said second register means to be applied concurrently to said third control circuitry.

12. The combination defined in claim 11 in which said first control circuitry includes logic circuitry coupled to said first register means and to said second register means and responsive to signals therefrom representative of a particular command in said first register means and a particular address in said second register means for causing said first control circuitry to selectively transfer signals representative of a selected group of commands from said first memory means to said first register means.

13. The combination defined in claim 11 in which said second control circuitry includes logic circuitry coupled to said first and second register means and responsive to signals representative of a particular command in said first register means and a particular address in said second register means for causing said second control circuitry to selectively transfer signals corresponding to a selected group of addresses from said third memory means to said second register means.

14. The combination defined in claim 11 and which includes logic circuitry coupled to said executing means and responsive to signals indicating the completion of the execution of a particular individual command by said executing means to produce a control signal to activate said further control circuitry and thereby cause signals corresponding to the next individual command in the first register means and to the next associated address in the second register means to be transferred from the first and second register means to said third control circuitry.

References Cited in the file of this patent

UNITED STATES PATENTS

| | | |
|---|---|---|
| 2,797,862 | Andrews | July 2, 1957 |
| 2,891,723 | Newman | June 23, 1959 |
| 2,954,166 | Eckdahl | Sept. 27, 1960 |

OTHER REFERENCES

Publication: Journal of the Association for Computing Machinery, an article entitled "The IBM Speedcoding System," pages 4–6, January 1954.